US005448738A

United States Patent [19]

Good et al.

[11] Patent Number: 5,448,738

[45] Date of Patent: Sep. 5, 1995

[54] METHOD FOR INFORMATION COMMUNICATION BETWEEN CONCURRENTLY OPERATING COMPUTER PROGRAMS

[75] Inventors: William E. Good; Harold A. Hildebrand; Cedric V. Snyder, Jr., all of Houston; Joseph L. Stiles, Bellaire; Kathleen M. Whitfield, Katy; Marie S. Jansen, Spring, all of Tex.

[73] Assignee: Landmark Graphics Corporation, Houston, Tex.

[21] Appl. No.: 790

[22] Filed: Jan. 4, 1993

Related U.S. Application Data

[63] Continuation of Ser. No. 852,737, Mar. 16, 1992, abandoned, which is a continuation of Ser. No. 735,156, Jul. 23, 1991, abandoned, which is a continuation of Ser. No. 297,659, Jan. 17, 1989, abandoned.

[51] Int. Cl.[6] .............................. G06F 13/14

[52] U.S. Cl. .............................. 395/700; 364/DIG. 1; 364/230; 364/232.22; 364/280; 364/280.6; 364/284; 364/284.4

[58] Field of Search .................. 364/230, 232.22, 230, 364/232.22, 280, 280.6, 284.3, 284.4; 395/700

[56] References Cited

U.S. PATENT DOCUMENTS 3,686,641 8/1972 Logan et al. .................. 340/172.5
4,891,785 1/1990 Donohoo .................. 364/900
5,287,456 2/1994 Rhodes et al. .................. 395/200

FOREIGN PATENT DOCUMENTS 0366583 5/1990 European Pat. Off. .

OTHER PUBLICATIONS

"7th International Conference On Distributed Computing Systems", D. Otway, et al., Berlin, W. Germany, Sep. 21, 1987, pp. 113-118.

*Primary Examiner*—Kevin A. Kriess
*Assistant Examiner*—Jon Backenstose
*Attorney, Agent, or Firm*—Bush, Moseley, Riddle & Jackson

[57] ABSTRACT

A method of communication in a computer system is provided for transferring information between multiple, concurrently operating programs, each of which may have a respective window display. The user communicates with each of the application programs through the window display as well as through an input device, such as a mouse or keyboard. A list of information codes is registered with a dispatcher program for each of the application programs which requires data. One or more of the application programs generate templates which include data and a corresponding information code. The generated templates are transmitted to the dispatcher program. The dispatcher program then compares the information code in the received template to the registered list of information codes to find any matches and thereby identify the one or more application programs which have registered to receive the information in the received template. The dispatcher program then transmits the received template to each of the identified application programs. Information communication is therefore carried out between multiple operating programs without user direction for the steps of the communication process.

69 Claims, 22 Drawing Sheets

66

| TEMPLATE FORMAT CODE | TEMPLATE MATCHING KEY | CONTROL INFORMATION | FIELD 1 | FIELD 2 | FIELD n |
|---|---|---|---|---|---|
| | | | | | |

67

| | | | WELL ID | X-LOCATION | Y-LOCATION |
|---|---|---|---|---|---|
| 11 | 1 | – | – | – | – |

68

| | | | WELL ID | X-LOCATION | Y-LOCATION |
|---|---|---|---|---|---|
| 11 | – | – | TX-709 | 29.1 | 45.4 |

FIG. 6
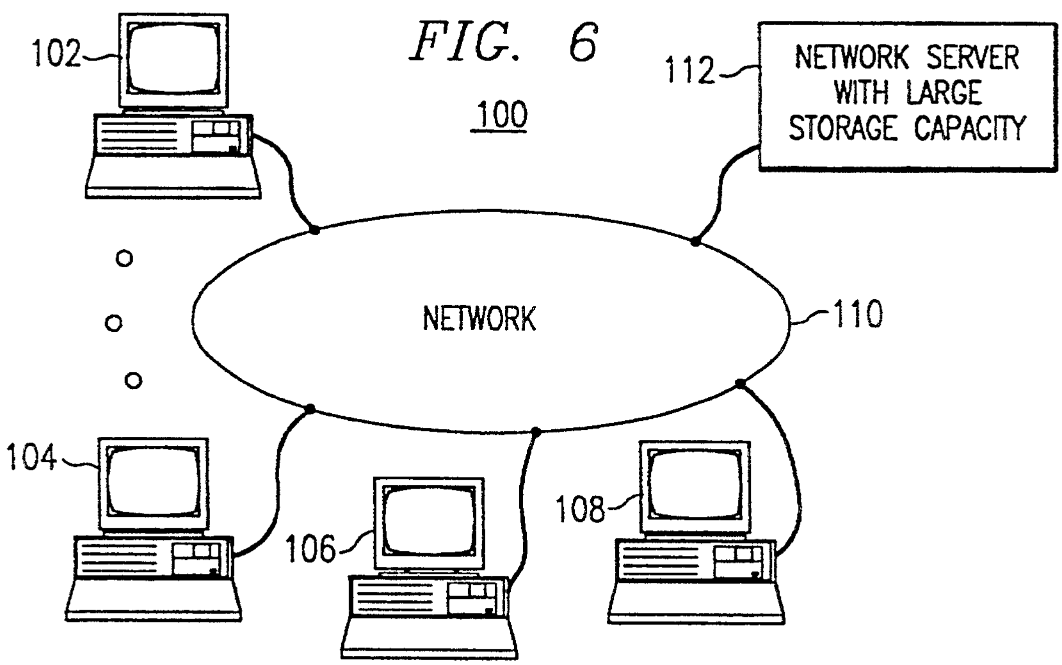
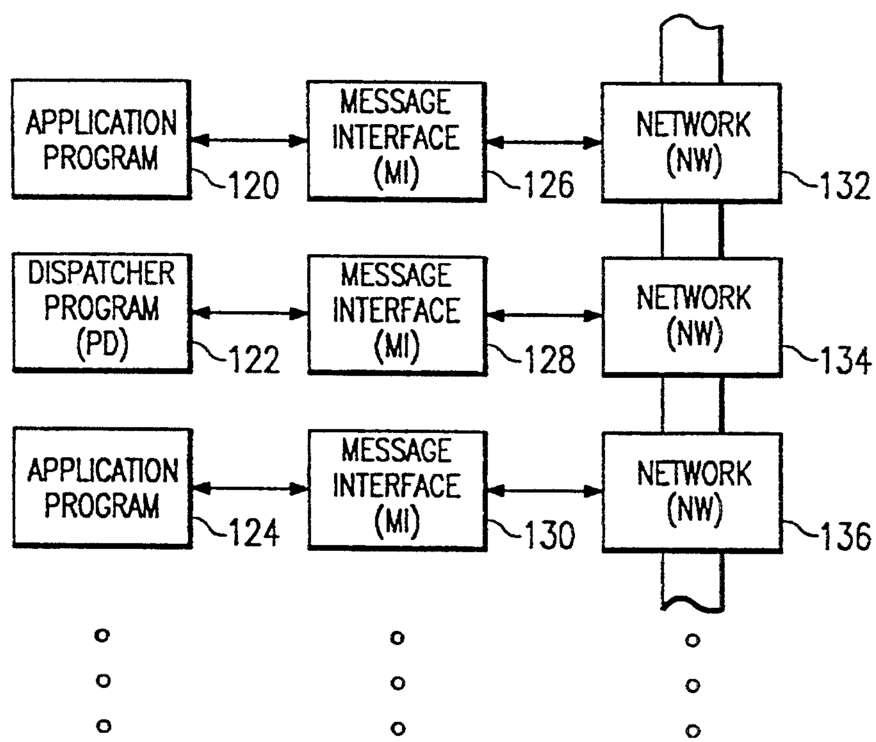
FIG. 7

METHOD FOR INFORMATION COMMUNICATION BETWEEN CONCURRENTLY OPERATING COMPUTER PROGRAMS

This application is a continuation of application Ser. No. 07/852,737 filed on Mar. 16, 1992, application Ser. No. 07/735,156 filed on Jul. 23, 1991, and application Ser. No. 07/297,659 filed on Jan. 17, 1989, all are now abandoned.

TECHNICAL FIELD

The present invention pertains in general to information communication between computer programs and can be used in conjunction with application programs which have a window display interface for a user.

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

Computer systems, particularly those operating with a network, often have multiple programs operating concurrently. It is frequently necessary for information to be transferred from one program to another, either within a single processor or across a network. A user must often process information by use of different programs as well as retrieving display information by using multiple programs which are active concurrently within the system. It is therefore important that information be quickly and easily transferred between multiple programs operating within the system. In addition, it is important that the user be able to easily and quickly change and specify the type of information exchanged between the multiple programs.

Windowing software technology is applied where it is important for a user to be able to display and interact with multiple programs which can be running concurrently in a computer system. A "window" is defined to be a portion of a display screen, such as a CRT. The window covers less than the entirety of the screen so that there may be multiple windows on the screen at one time. Typically, the user moves a cursor around the screen by use of an input device, such as a mouse or multiple keys at a keyboard. The cursor can be moved from one window to the next on the screen and, when the cursor is present within one of the windows, the user is placed in communication with the application program which generated that window. This type of windowing "environment" allows a user to access several different application programs easily so that he can accomplish multiple tasks without having to load a new program each time a new task must be performed.

As with other concurrent operating program systems, it is often necessary for a user to transfer information from one windowed program to another. Transferring information between programs is a principal objective of the present invention. The present invention can be well applied within a windowing environment, although such an environment is not necessary for practicing the invention.

There are two conventional techniques for transferring information between programs. The first is termed "cut and paste". This comprises pointing to (selecting) information such as text or data in one window to highlight it and thereby separate it from the remaining information in the window. The user then presses a special button or key which moves the selected information to an area of memory specially designated by the operating system and known as the "paste memory" or "clipboard". The user next moves the cursor to another window which is to receive the information. A "paste button" or command is invoked by the user to retrieve the stored information from the designated memory area and place it at the location of the cursor. Note that all steps of this process are carried out by the user and there is no designation of which of the window programs are information producer programs or information user programs.

A second conventional technique is to establish a programmed connection between two programs, each of which may display information in a window. Both programs must be designed to respond to a predetermined input command that causes information to be shifted from one program to the other. This operation, likewise, may be entirely under user direction and require a user input before it can function. Another disadvantage of this technique is that each communication path between pairs of programs must be programmed into the code of both programs, which creates an inflexible system. With this conventional method, it is difficult to add new communication paths or to change existing ones.

Therefore, there exists a need for a rapid and flexible method of transferring information between multiple application programs which are available concurrently to a user.

SUMMARY OF THE INVENTION

A selected embodiment of the present invention is a method for communicating information between multiple programs operating concurrently in a computer system which includes an output device such as a screen for supplying information to a user and an input device such as a mouse or keyboard for receiving commands from the user. Each of a plurality of application programs may generate a window display at the output device. The user interfaces with the application programs through the corresponding window display and the input device. One or more information codes are registered with a dispatcher program for each of selected ones of the application programs to produce a list comprising information codes for each registered application program. Each of the information codes represents a specific type or collection of said information. The information codes in the list for the registered application programs represent information which is used by the corresponding application programs. Templates which include information and the corresponding information code are generated by one or more of the application programs and are transmitted to the dispatcher program. The information code in the generated template is compared to the information codes in the registered list to find any matches which identify the application programs that are registered to receive the information identified by the information code in the list. The dispatcher program then transmits the generated template, or at least the information in the generated template, to each of the identified application programs identified by matches. Thus, the information-producing application programs and information-using application programs can conduct information exchange as the information is produced without the need for communication direction by the user.

BRIEF DESCRIPTION OF THE DRAWINGS

For a more complete understanding of the present invention and the advantages thereof, reference is now made to the following description taken in conjunction with the accompanying drawings in which:

FIG. 6 is an illustration of a computer system network which can implement the present invention, FIG. 7 is an illustration of application, dispatcher and network software interaction for a network system.

BRIEF DESCRIPTION OF THE APPENDICES

Program source code listings for the program embodiments set forth herein are included in the Appendices. The description of the present invention is made in reference to these appendices as well as to the figures.

Figure 21:
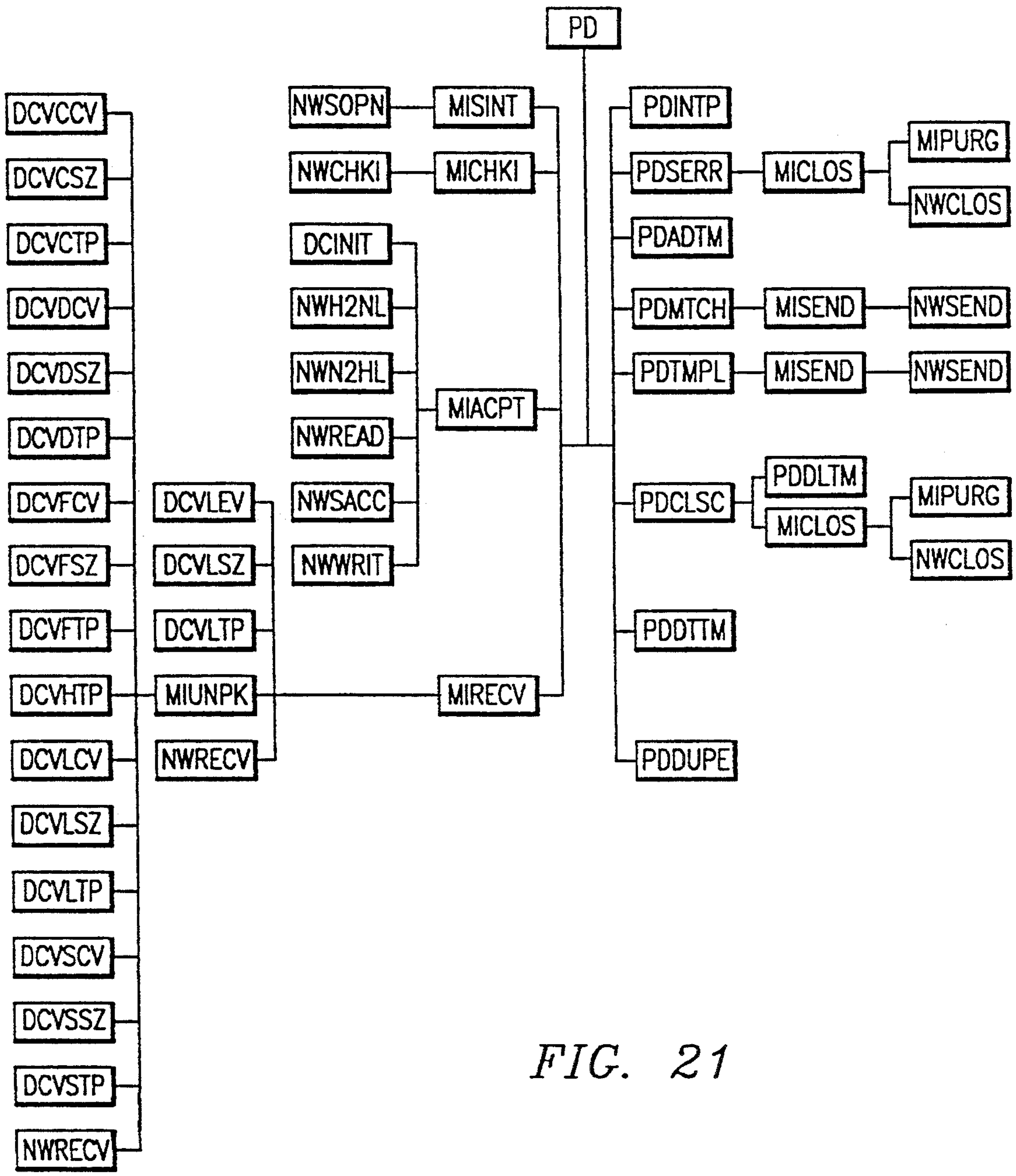
FIG. 21 is a structure chart for a dispatcher program.
Figure 22:
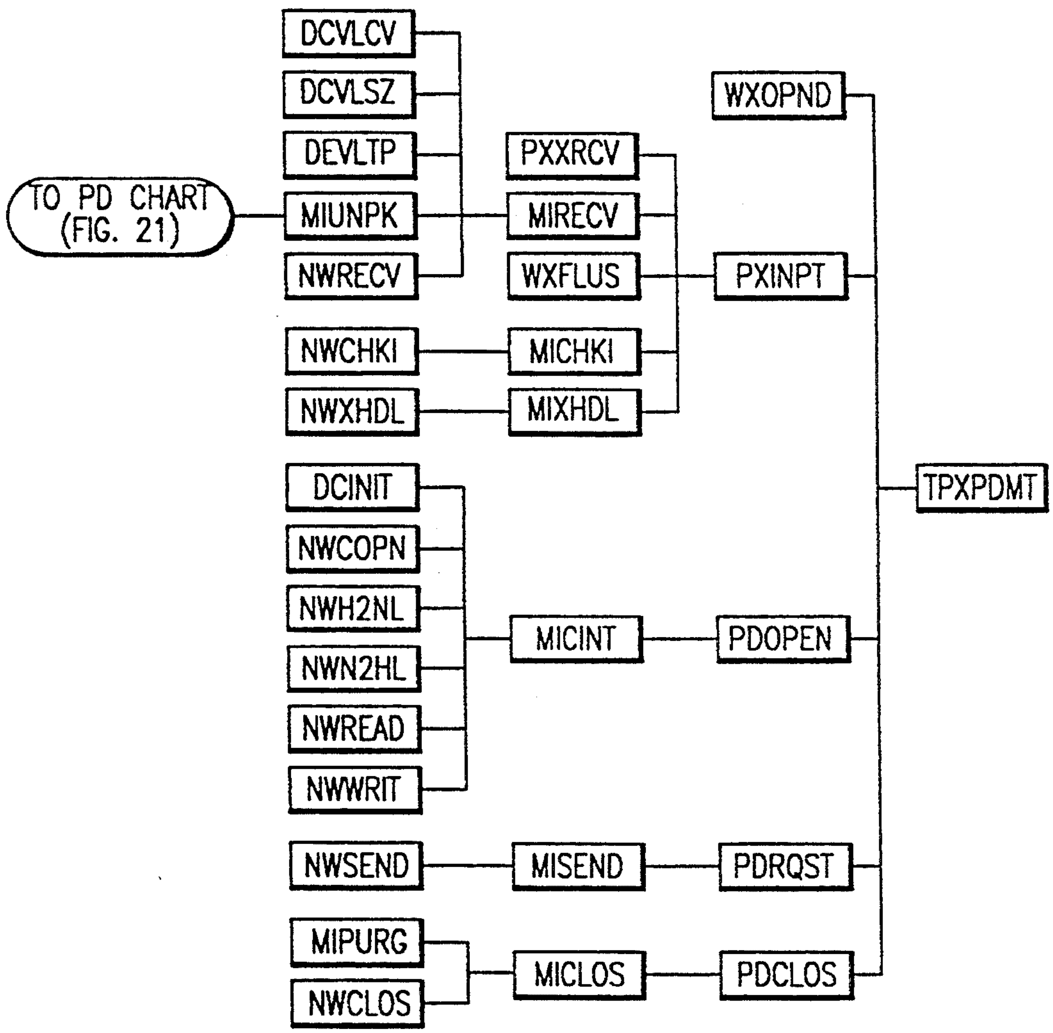
FIG. 22 is a structure chart for an application program which registers with the dispatcher program to receive data.
Figure 23:
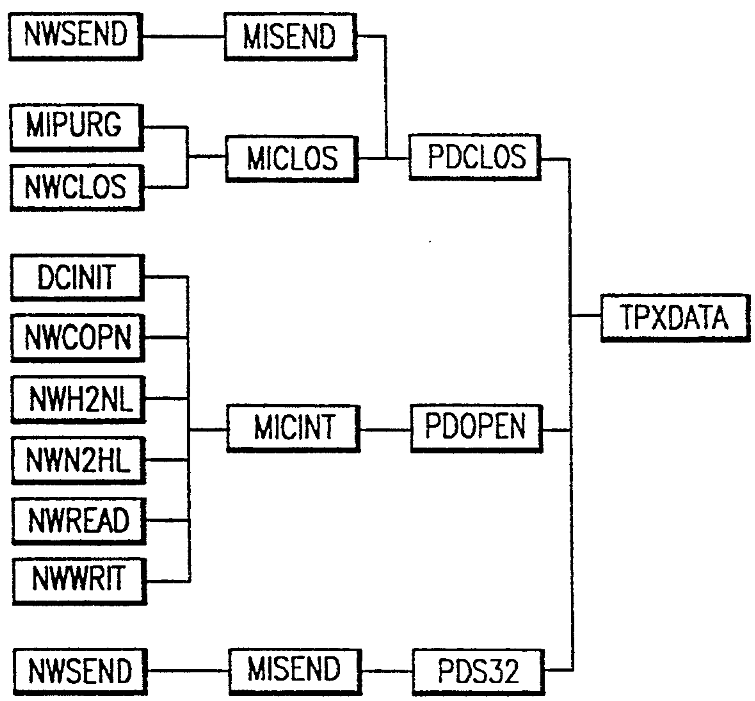
FIG. 23 is a structure chart for an application program which generates data and provides it to the dispatcher program.

Appendices I-1 through 1-55 are source code listings for the pointing dispatcher (PD) program, which is structurally shown in FIG. 21, together with each of the listed program modules which correspond to or interact with the PD program, Appendices II-1 through II-5 are source code listings for TPXDATA, a data-generating program, which is structurally shown in FIG. 22, and the associated program modules, which are not previously shown in Appendix I, Appendices III-1 through III-2 are source code listings for TPXPDMT, a data-using program, which is structurally shown in FIG. 23, and the associated program modules which are not previously shown in Appendices I or II.

The Appendices I, II and III correspond to the program structure charts in FIGS. 21, 22 and 23. However, each program module is listed only one time even though it may appear multiple times in the structure charts.

The source code listings in the Appendices are in the "C" language, which is a well-established and widely used language in the industry.

DETAILED DESCRIPTION OF THE INVENTION

The present invention is a program for transferring data between concurrently operating programs in a computer system. As further discussed below, the computer system may be a network or a single processor. The embodiment disclosed for the present invention utilizes a "windowing" environment wherein application programs concurrently produce displays on a single screen. Such a "windowing" configuration can be produced by use of a program such as "X Window", a software product which is distributed by the MIT X Window Consortium and is sold by International Business Machines Corp. (IBM).

Figures 1, 2A, 2B, 2C:
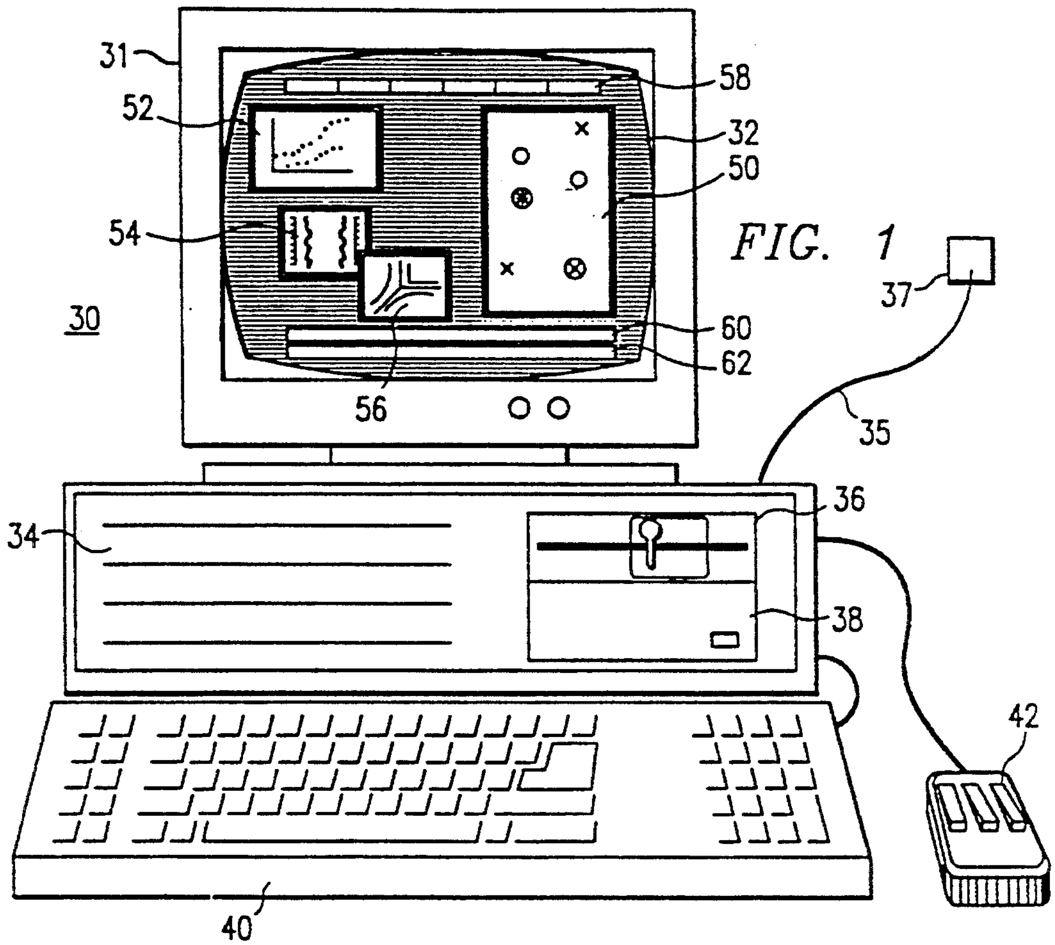
FIG. 1 is an illustration of a computer system with a screen having multiple windows opened on the screen, together with a keyboard, remote sensor and mouse input devices.
FIGS. 2A–2C illustrate a general template format as well as empty and full templates for data as used in accordance with the present invention.

A hardware embodiment and sample screen display for implementing the present invention are illustrated in FIG. 1. A computer system 30 includes a monitor 31 having a screen 32, a chassis 34 which includes the computer electronics as well as a floppy disk drive 36 and a fixed disk drive 38. A cable 35 connects the system 30 to a remote sensor 37 which is, for example, an industrial process sensor for monitoring parameters such as temperature, pressure, position, etc. The system further includes input devices which are a keyboard 40 and a "mouse" 42. The system 30 can be either a stand alone processor or one processor within a network which contains other processors, such as the system 30.

A selected embodiment of the system 30 is an IBM RTPC model 115.

The RT-PC model 115 operates with the AIX operating system version 2.2, which is described in an IBM manual entitled "Using the AIX Operating System" copyright date 1985, 1988. This operating system includes the capability of having multiple concurrently operating programs, a process which is termed multitasking. This operating system can operate across a network such that programs and data at different points in the network can be accessed by programs at other points in the network.

As used herein the term "application program" is a program that provides the functional results requested by the user and is in contrast to operating system programs which provide for basic hardware and software operations but are not those which are specific to the user's application.

On the screen 32 there are illustrated various "windows" which have been opened for respective application programs. These include windows 50, 52, 54, and 56. The present invention is described in reference to a system for processing and evaluating well information for petroleum exploration activities, although the present invention is not limited to this application. The window 50 displays a map of well locations with different designations for various types of wells. The window 52 shows a cross plot of well log data. Window 54 is a log display for a range of depths in a particular well. The window 56 is a three dimensional plot, which is termed a spider plot.

The screen 32 further includes operational windows 58, 60 and 62 which are utilized to create or change window displays or call up operational programs and to display options to the user. A cursor is moved about the screen 32 by operation of the mouse 42 for selecting a particular program or data for use by the operator.

In this particular example, the operator has selected one of the wells displayed in the window 50 and has called up information related to that well. This information is displayed in the windows 52, 54, and 56. By evaluating well information in this way, the user can access and examine large quantities of information in an easily perceived manner. However, such utilization requires that the application programs rapidly transmit and receive information between them for producing the various displays.

The present invention serves to transfer data between various application programs, as discussed above. There is used in the present invention an item which is termed a "template". A description of the template in various forms is shown in FIGS. 2A, 2B, and 2C. Referring now to FIG. 2A there is shown a "generic" template 66. Such a template 66 includes a plurality of fields which define the use of the template and the information conveyed by it. Viewing from left to right, there is first a "TEMPLATE FORMAT CODE" field, which contains one of a group of predefined codes that defines the information which is to be conveyed by the template. This code is used in relation to the data fields which are at the right hand side of the template. There may be one or more of such data fields. The template format code defines how many fields there are in a particular template as well as the type of information that is contained within each of the fields.

Template 66 further includes a "Template-matching KEY" field which serves the function of specifying particular occurrences of the data fields that must be matched before a "filled" template is sent to an identified application program. For each of the specified data fields in a template, including the TEMPLATE FORMAT CODE, there is a corresponding bit location or number in the Template-matching KEY field to specify if a particular field must be exactly matched before the received template is transmitted to a registered application program. Thus, if the Template-matching KEY field is zero, this field functions as a wildcard since nothing is required for a match, thereby allowing all data to match a template having a zero Template-matching KEY. A user which registers a template with a zero field for the Template-matching KEY field receives all data templates which are transmitted.

There is further included in template 66 a field termed "CONTROL INFORMATION" which serves the function of carrying information which was placed in this field originally by the registering application program. The CONTROL INFORMATION is typically the address of a subroutine for an application program. This particular subroutine is the one that is called when the filled data template is returned to the application program. When such a template is received, the receiving application program executes the indicated subroutine.

Referring now to FIG. 2B, there is shown a template 67 which is termed an "empty" template, which is a template with no information in the data fields. This template includes the number "11" in the TEMPLATE FORMAT CODE field. The code 11 is arbitrarily defined for this example as a template having three units or fields of information, one for each of three data fields. Field 1 is defined to be "WELL ID", which is the identification of a particular well, field 2 is defined to be "X LOCATION" and field 3 is defined to be "Y-LOCATION". The X and Y location fields define a particular location for the well identified in field 1. The locations specify a point within a two-dimensional grid system. Such locations can be, but are not necessarily, latitude and longitude numbers. Template 67 also includes the number "1" in the Template-matching KEY field. A "1" indicates that the TEMPLATE FORMAT CODE and only the TEMPLATE FORMAT CODE must match between two templates before the two templates are termed matching. The template 67 is further defined herein as a "data-matching template" which is registered on behalf of an application program to obtain for that program the data defined in fields 1, 2 and 3.

There may be any number of template format codes and these codes can be defined to represent any specific information or any collection of information. In a more general sense, these template format codes are information codes which likewise can represent any specific information, such as a WELL ID, or a collection of information, such as the combination of WELL ID, X-location and Y-location.

If an application program which requires data generates a template, such as shown in FIG. 2B, this program may also provide a limitation so that it does not receive every template having template format code 11. For example, the data-using application program may insert specific WELL ID information in field 1. To indicate that only those templates having corresponding WELL ID data are to be received, a bit or number is set in the Template-matching KEY field corresponding to field 1. The program dispatcher (PD), described below, always checks each received template against the template-matching key to determine if a match exists for the specified data fields, including the TEMPLATE FORMAT CODE. Only if there are matches for all of these fields, template format code and any specified data fields, is the generated template then sent to the identified, requesting application program.

Referring to FIG. 2C, there is shown what is termed a "full" template 68, which is a template having data in the data fields. This corresponds to the template 67, but includes actual data in the data fields 1, 2 and 3. In field 1, there is shown an actual WELL ID which is TX-709. In field 2, there is shown an actual X-LOCATION, which is 29.1 and in field 3 there is shown an actual Y-LOCATION, I which is 45.4.

Depending upon their function, the application programs described herein may generate "empty" or "full" templates or both.

In the description of the present invention, the terms data and information are both used and the term information includes any form of data. The term "information code" means a code, such as a number, that represents a specific type of information or a collection of specific types of information.

A functional description of the present invention is now made in reference to FIGS. 3A, 3B, 3C and 3D. These FIGURES schematically represent a time sequence of operations for transferring data between two application programs. A central program in the present invention is termed a "dispatcher". In the flow diagrams and appendices it is further referred to as a "Pointing "Dispatcher" and this term is abbreviated as "PD" In FIGS. 3A–3D there are shown application programs A, B and C as well as a dispatcher program. It must be noted that the illustrations in FIGS. 3A–3D are not windows, as illustrated in FIG. 1.

Figure 3A:
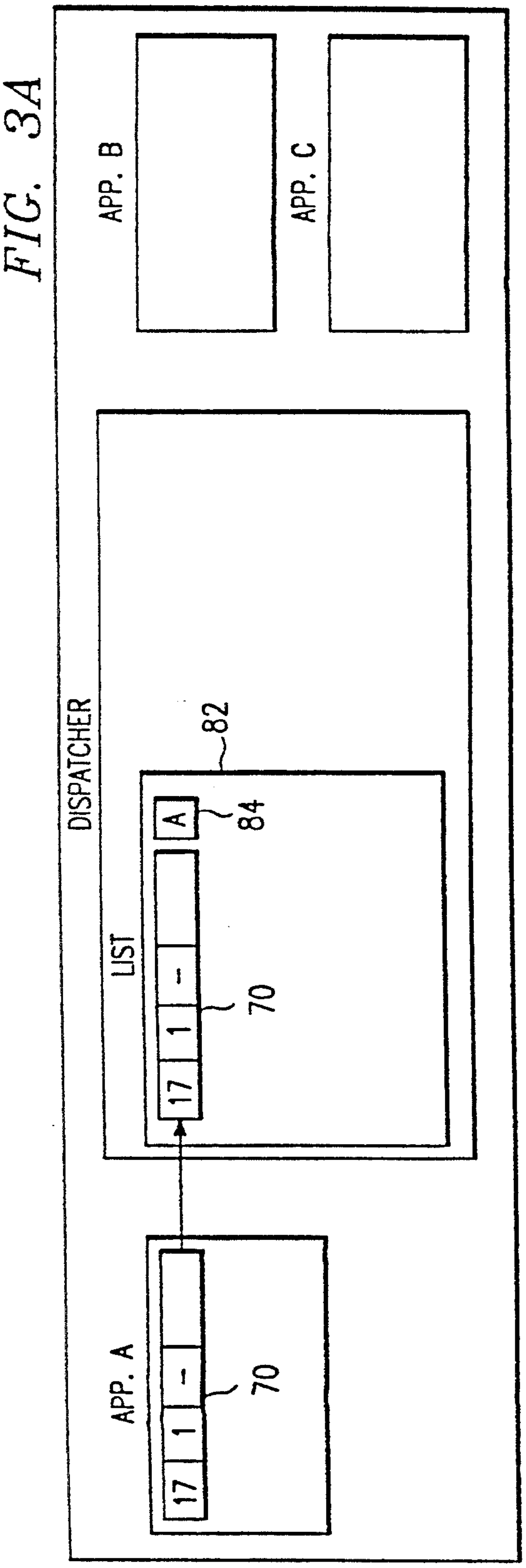
FIGS. 3A–3D are overview, time sequenced, schematic diagrams showing data flow and the interaction of concurrently operating application programs and a dispatcher program for data template registrations in accordance with the present invention.

FIG. 3A is a representation of the step "REGISTERING DATA TEMPLATE". In this step, the application program A transfers a template 70 to the dispatcher where it is placed in a list 82. The template 70 has a template format code of (17) which arbitrarily defines that the template includes one data field, which is shown at the right-hand side, and that this field comprises a WELL ID. The Template-matching KEY contains a 1, which indicates that the TEMPLATE FORMAT CODES must be matched. Nothing has been specified in the CONTROL INFORMATION field. In this instance the template 70 is termed an "empty template". The list 82 comprises one or more sets of corresponding elements comprising a template and an application identifier, such as identifier 84. The identifier 84 represents the identification of the particular application program which has registered a template in the list 82 with the dispatcher program.

The application program A registers the template 70 with the dispatcher program which stores that template in list 82 for the purpose of making it known to the dispatcher program that application program A requires the type of data identified by the template format code (17) in template 70.

Figure 3B:
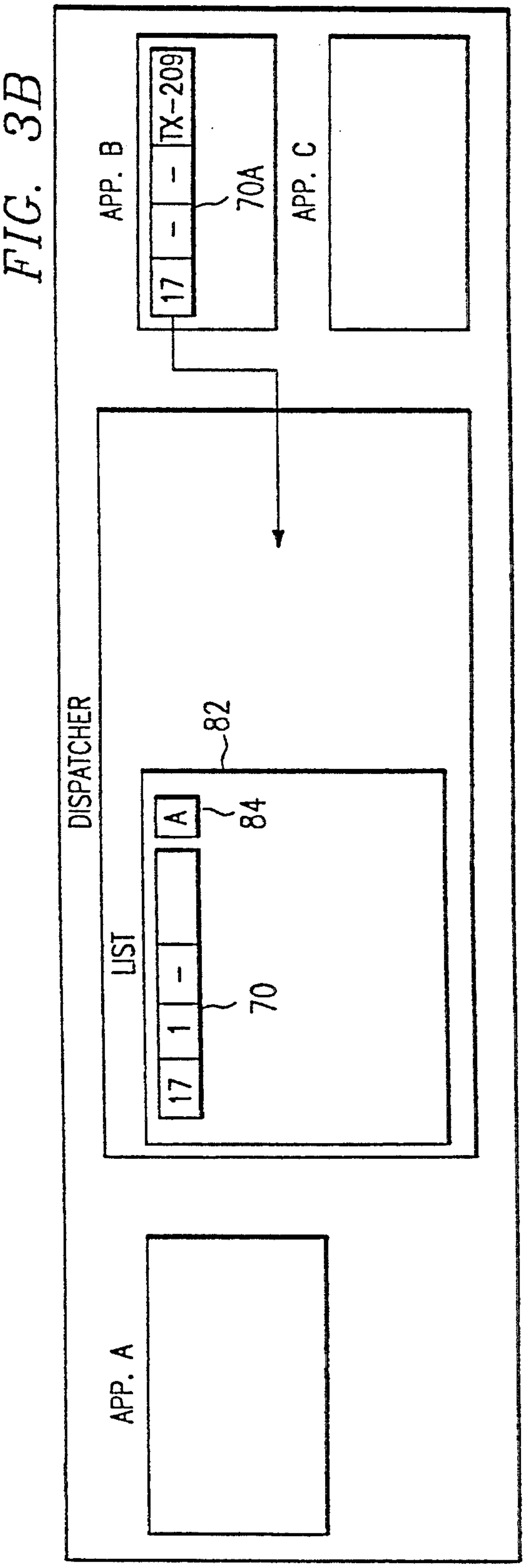

Referring now to FIG. 3B, there is the next time sequential step of "PRODUCING AND TRANSMITTING DATA TEMPLATE". A data-filled template can be generated by any one of many application programs. In this example, application program B generates a template 70A, which is the template 70 filled with data in its one data field. This "full" template 70A is then transmitted to the dispatcher program.

Figure 3C:
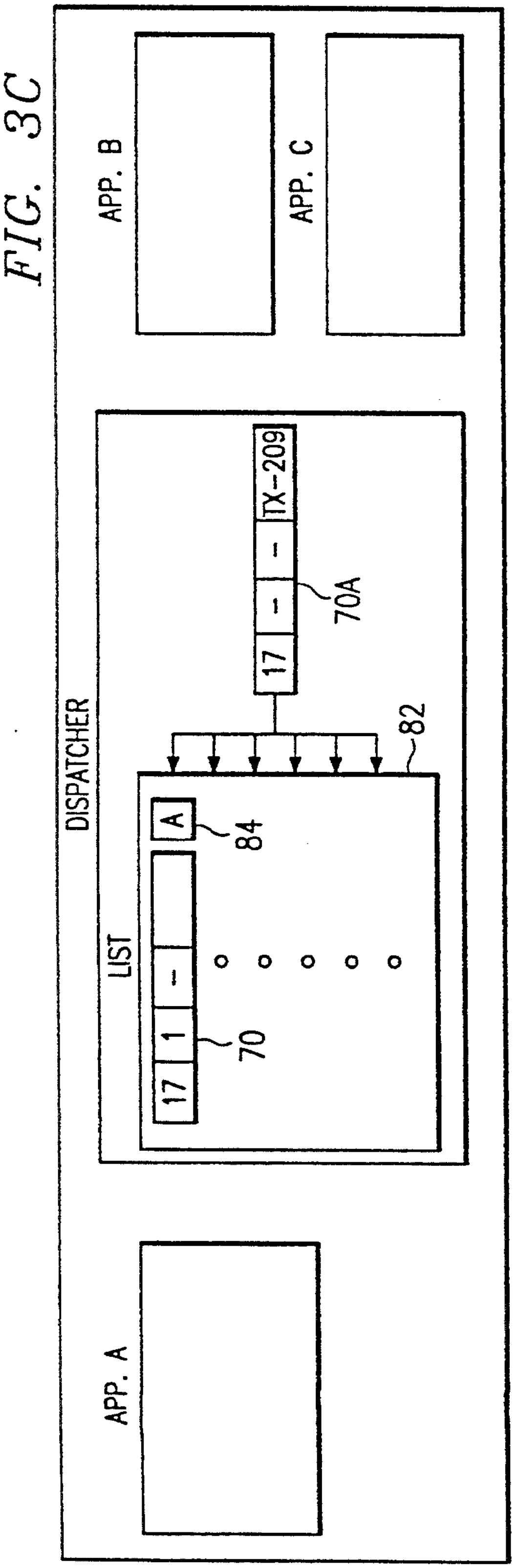

The next sequential step is shown in FIG. 3C. This is termed "COMPARING TO FIND MATCHES". In the dispatcher program the template format code in template 70A is compared to each of the template format codes in the templates within the registration list 82. There can be any number of entries recorded in the list 82. When a match is found between the template format code of the received template, such as 70A, with an entry in the list, such as template 70, there is then identified a particular application program by the application identifier, such as 84, which identifies the application program (A) that registered the template 70.

Figure 3D:
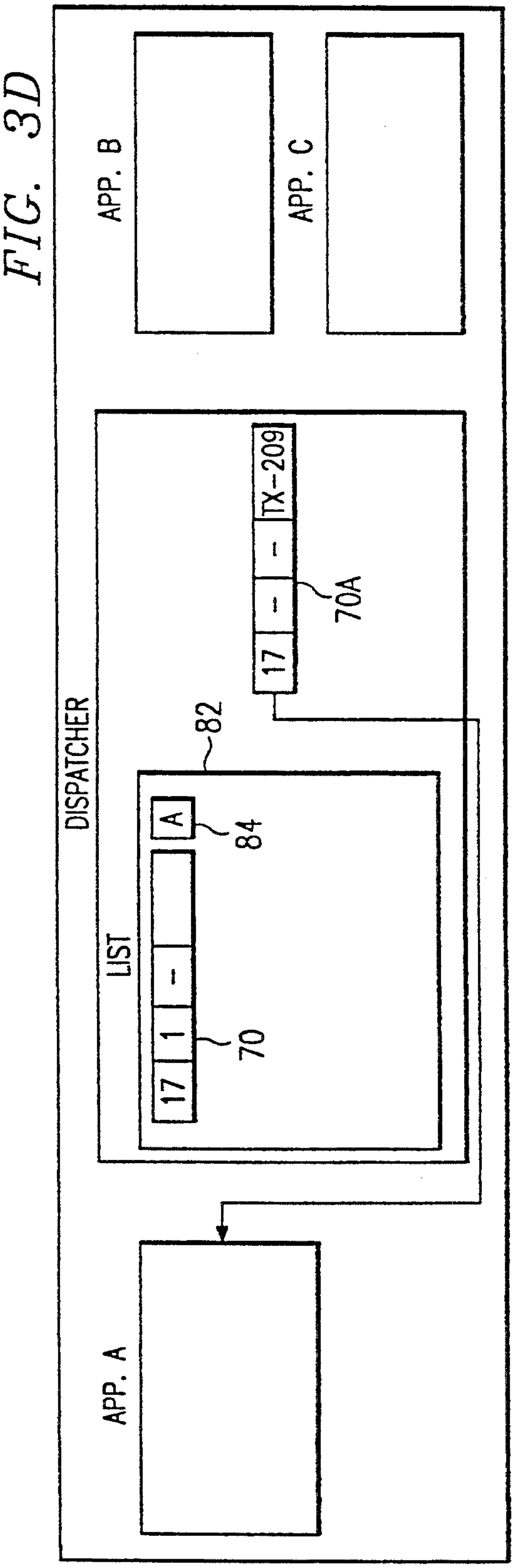

Referring now to FIG. 3D there is shown the next sequential step which is termed "TRANSMITTING DATA TEMPLATE". In the previous step the dispatcher had determined that there was a match which identified the application program A. In response to this match the dispatcher program sends the template 70A to the application program A. The application program A receives the template 70A which includes the data "TX-209" which is the identification of a well. Thus, the application program A has received the data which it originally requested by registering with the dispatcher program. Note that with the present invention, the application programs do not communicate directly between each other, but instead each application program only communicates with the dispatcher program.

Figure 4A:
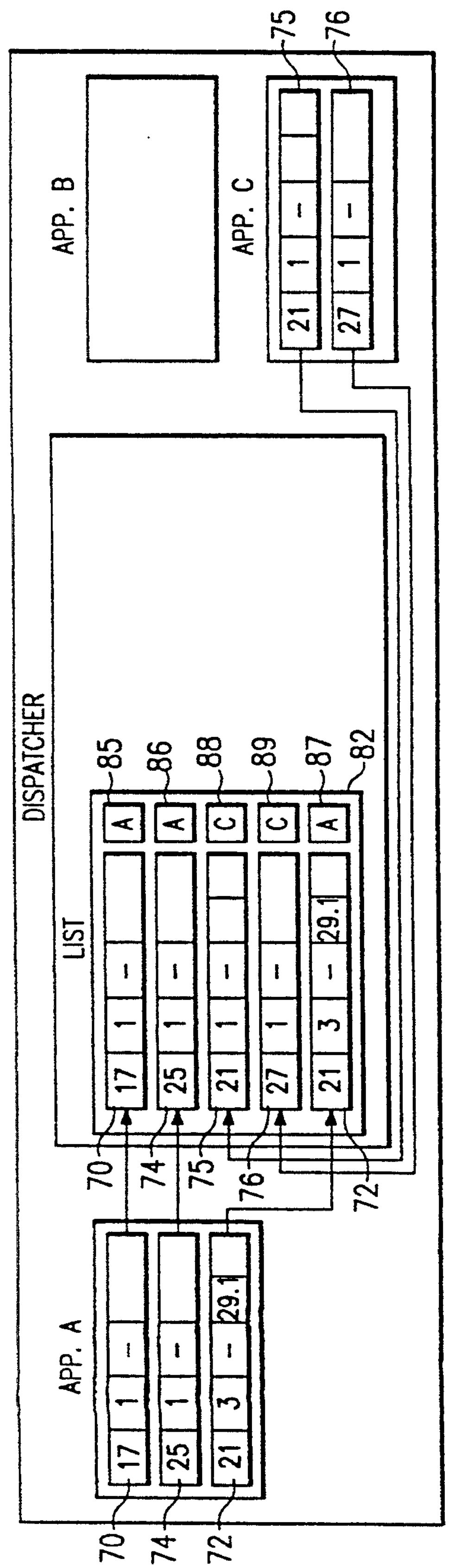
FIGS. 4A–4D are overview, time sequenced, schematic diagrams showing data flow and the interaction of concurrently operating application programs and a dispatcher program for data template registration in a more complex example in accordance with the present invention.

A more complex example of the present invention is now described in reference to FIGS. 4A, 4B, 4C and 4D. These figures likewise represent time sequential steps in accordance with the present invention, but demonstrate a more complex example. In FIG. 4A, application program A registers three "empty" templates 70, 72, and 74 in the list 82 in the dispatcher program. These templates have respective template format codes of 17, 21 and 25. Template 70 is, for example, "WELL ID" template 72 is "WELL LOCATION" and template 74 is "LOG TYPE". Template 72 has two fields, which are X and Y coordinates. Additionally, template 72 has the X filled out to be 29.1, and the template-matching key is 3, which indicates that both the TEMPLATE FORMAT CODE and the first data field must correspond to a received template in order to have a match. Together with these templates, there are included corresponding application identifiers 85, 86 and 87. These templates can be registered at any time and in any order. Application program C likewise registers two templates 75 and 76. Template 76 is, for example, a depth range of a well. This template has a 27 format code. In the list 82, these templates are provided with corresponding application identifiers 88 and 89.

Figure 4B:
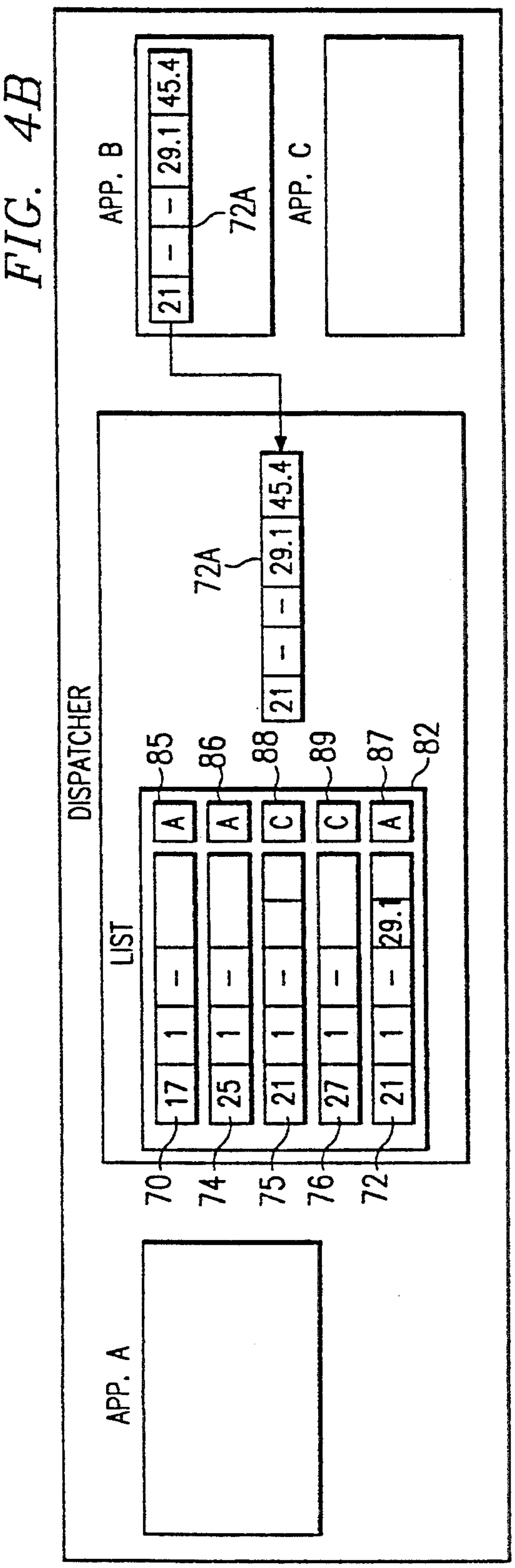

Referring now to FIG. 4B, it is shown that the application program B produces the full template 72A and transmits this template to the dispatcher program. Template 72A is template 72 filled with data.

Figure 4C:
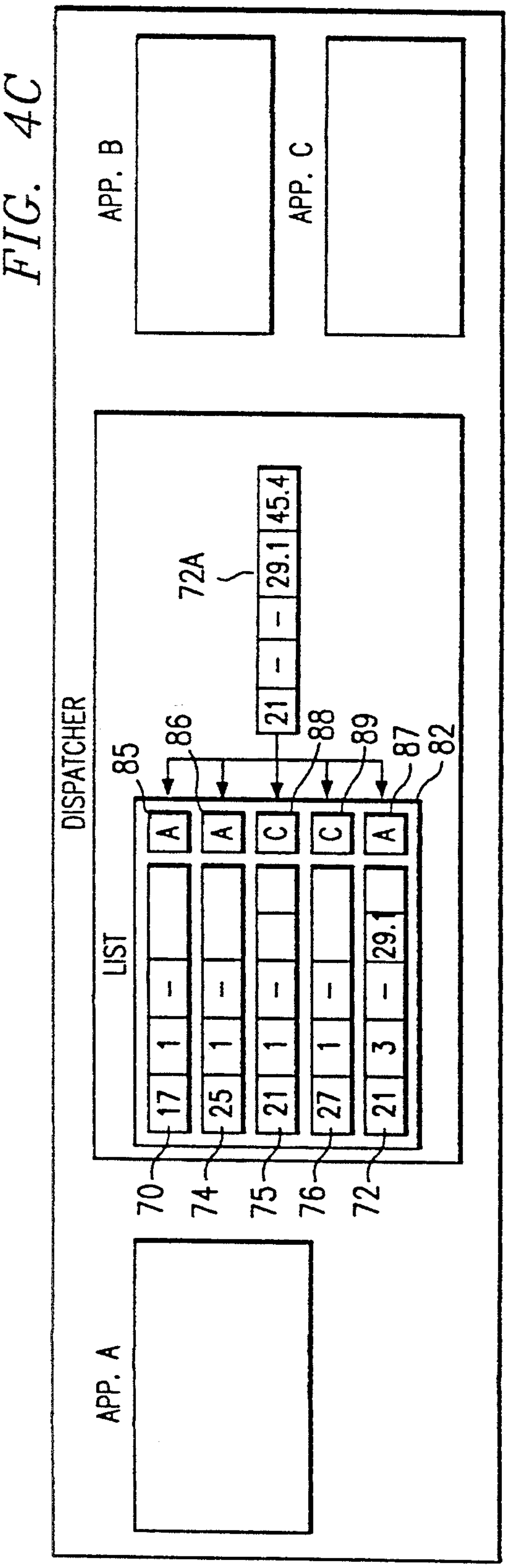

Referring now to FIG. 4C, the template format codes in the templates stored in the list 82 and the fields corresponding to the bits set in the key field of each of the stored templates in the list 82 are compared against the same fields in the received template 72A. A comparison is made to find matches. These matches specify the application identifiers 88 and 87. This indicates that the application programs A and C have registered to receive the type of data identified as WELL LOCATION. Note that if the X field value in template 72A had been something other than 29.1, the template 72A would have only matched the application C stored template 75.

Figure 4D:
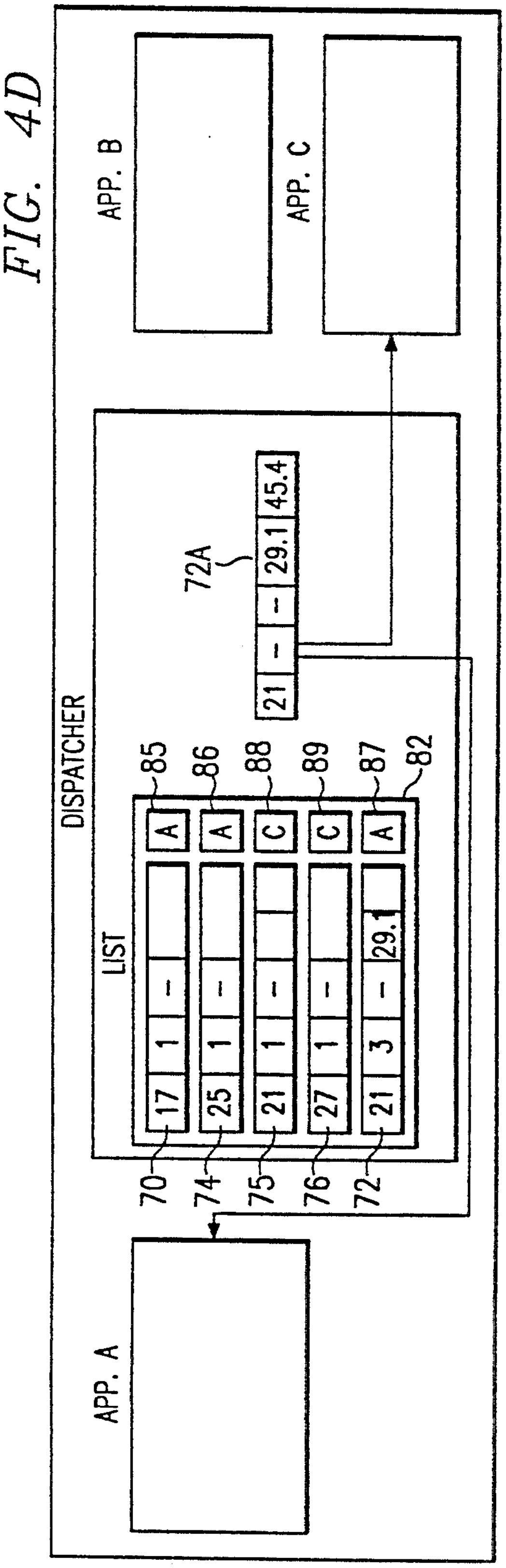

Referring now to FIG. 4D, there is shown the step of transmitting the template 72A to each of the application programs A and C. In the described embodiment, the full template is transmitted to each of the application programs. It is not necessary that the entire template 72A be transmitted to the application programs A and C, but instead it may be desirable to transmit only the data portion and possibly other fields containing desired information to the application programs A and C.

Note that in the example shown in FIGS. 4A–4C that a single application program can register to receive more than one type of data. Likewise, any number of application programs can be registered with the list 82 in the dispatcher and it is possible that multiple application programs can register to receive the same data, although this is not necessary. Further, note that the dispatcher sends the generated template to each of the application programs where a match of the fields indicated by the template-matching key is identified. Thus, the method of the present invention makes it possible to readily create a very complex data communication procedure which operates without the necessity for user intervention or program customization. Further, as described below, any of the application programs may delete a registered template and terminate receipt of the type of data described in the template format code. Thus, the data communication interaction, although it may be complex, can be easily established and altered.

A further aspect of the present invention is now described in reference to FIGS. 5A–5G. There has previously been described a process of registering a data template by a data-using program so that upon generation of the registered data by a data-generating application program, the data is provided to the registered data-using application program. A further aspect of the present invention concerns the registration of data-generating programs with the dispatcher program. The purpose for such registration is to ensure that there exist user programs for data that will be generated. It is a waste of resources to generate and transmit data when there is no application program that requires that data. Thus, the following registration process is carried out so that data templates are generated only when there are active users of those templates.

Figure 5A:
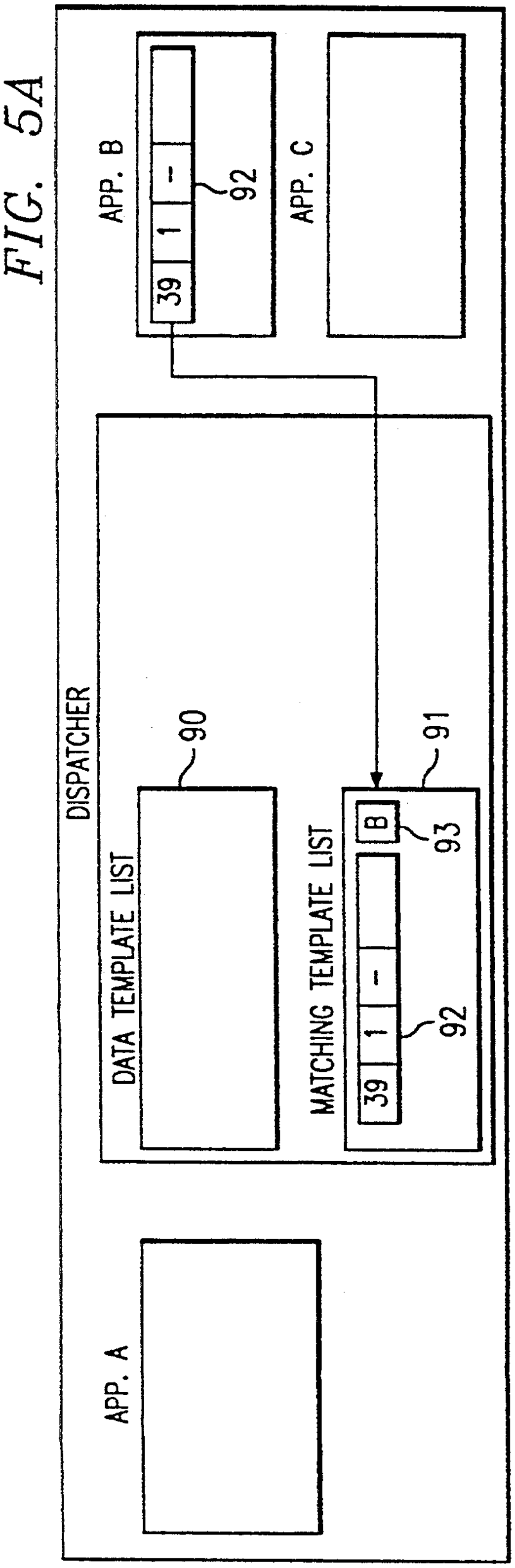
FIGS. 5A–5G are overview, time sequenced, schematic diagrams showing data flow and interaction of concurrently operating application programs and a dispatcher program for template-matching template registration in accordance with the present invention.

Referring now to FIGS. 5A–5G, there is shown a time sequence of steps for carrying out a further aspect of the present invention. These steps show the process of registration by a data-generating application program. Referring now to FIG. 5A, there are shown application programs A, B and C together with the dispatcher program. Within the dispatcher program there are two lists. A data-matching template list 90 serves the same function as the list 82 previously described in reference to FIGS. 3A–3D and FIGS. 4A–4D. A template-matching template list 91 is a registration of data-generating application programs which are available to generate the type of data specified in the registered template. In FIG. 5A, application program B can generate data which is defined by the template format code 39. Refer to FIGS. 2A–2C for a description of template fields. Application program B generates a template 92 which includes the number 39 in the TEMPLATE FORMAT CODE field, with the number 1 in the Template-matching KEY field, and with nothing in the remainder of the fields. The format code 39 is arbitrary and, for the present example, defines data which specifies a WELL ID. This WELL ID, in a full template, is conveyed in one data field within the template 92. Application program B generates the template 92, which is an empty template, and transmits it to the dispatcher program where it is stored in the list 91 together with an application identifier 93, which identifier specifies the application program B. This registration records at the dispatcher program that the data type 39 can be generated, if it is required, by a data-using application program.

Figure 5B:
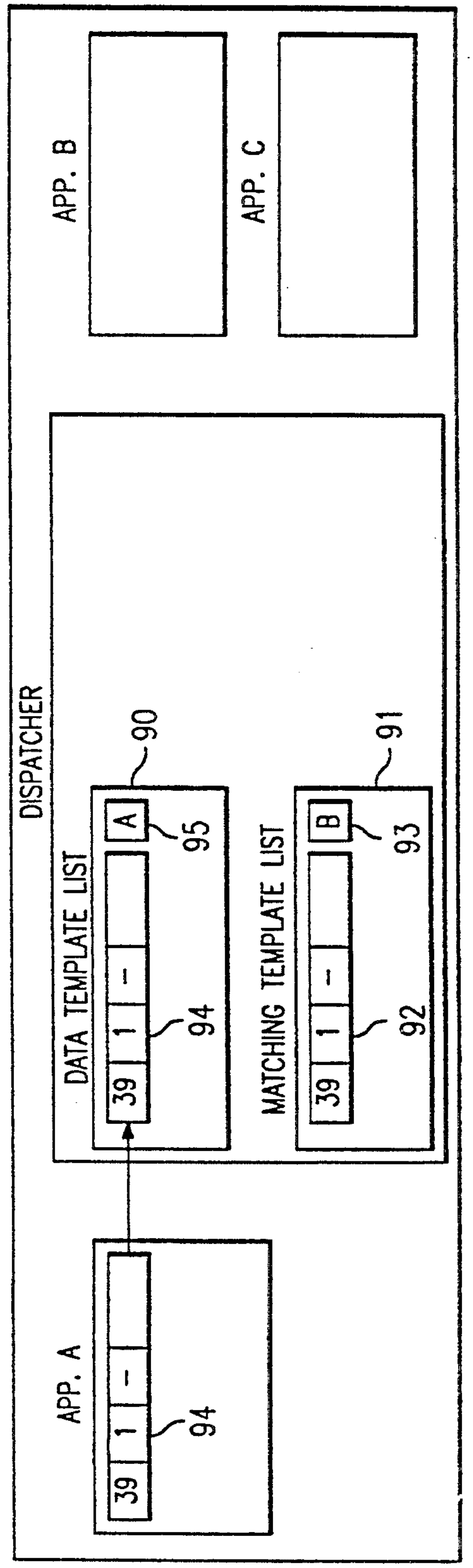

Referring now to FIG. 5B, there is shown the step of "REGISTERING Data-matching TEMPLATE". In this step of the procedure, the application A program registers a template to indicate that it has a requirement for particular data. This is the same as the registration process described in FIGS. 3A–3D and 4A–4D. Application program A generates a template 94 which is transmitted to the dispatcher program and stored in the data template list 90. The data template 94 includes the code 39 in the TEMPLATE FORMAT CODE field and 1 in the Template-matching KEY field, while the remaining fields contain no information. The dispatcher program assigns an application identifier 95 to correspond to the stored template 94.

Figure 5C:
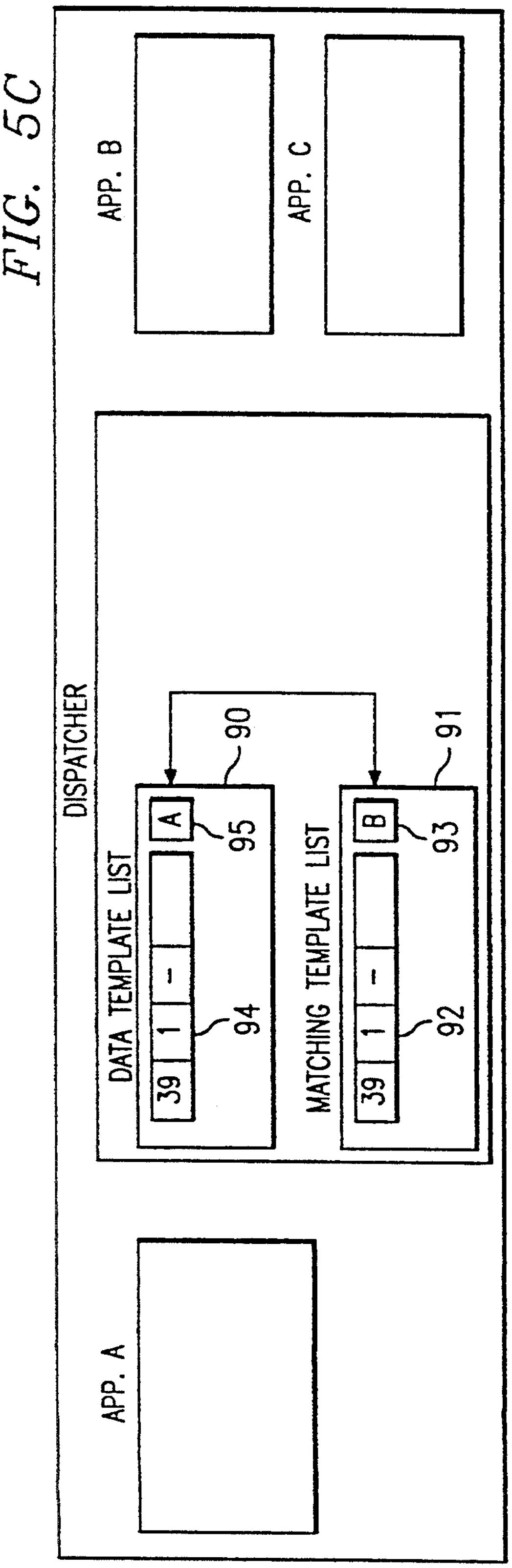

Referring now to FIG. 5C, there is shown a step of "COMPARING TO FIND MATCH". In this step the dispatcher program compares the template format codes for the templates in the data template list 90 with the templates in the matching template list 91 to find any matches. If there is a match of these codes, the dispatcher program has determined that the data required by the application A program can be produced by the application B program. Thus, the application B program is identified as a required data-generating program.

Figure 5D:
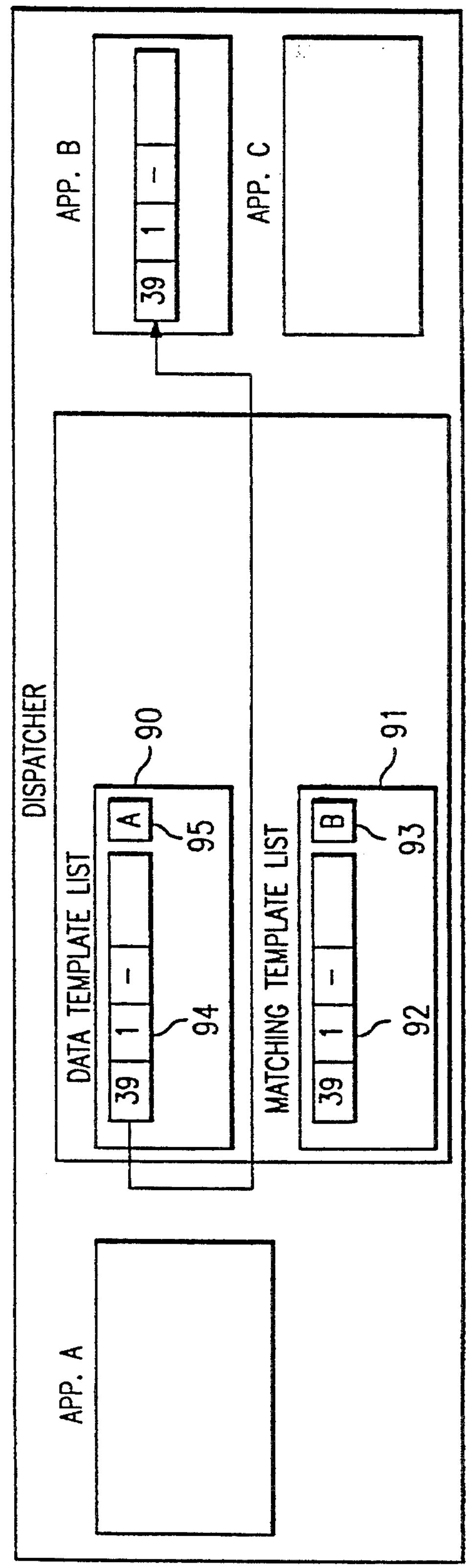

Referring now to FIG. 5D, there is shown the step of "TRANSMITTING EMPTY DATA TEMPLATE". In this step the dispatcher program transmits the data template 94 from the list 90 to the application B program. This action serves to notify the application B program that a user has been registered to receive the data that application B program generates.

Figure 5E:
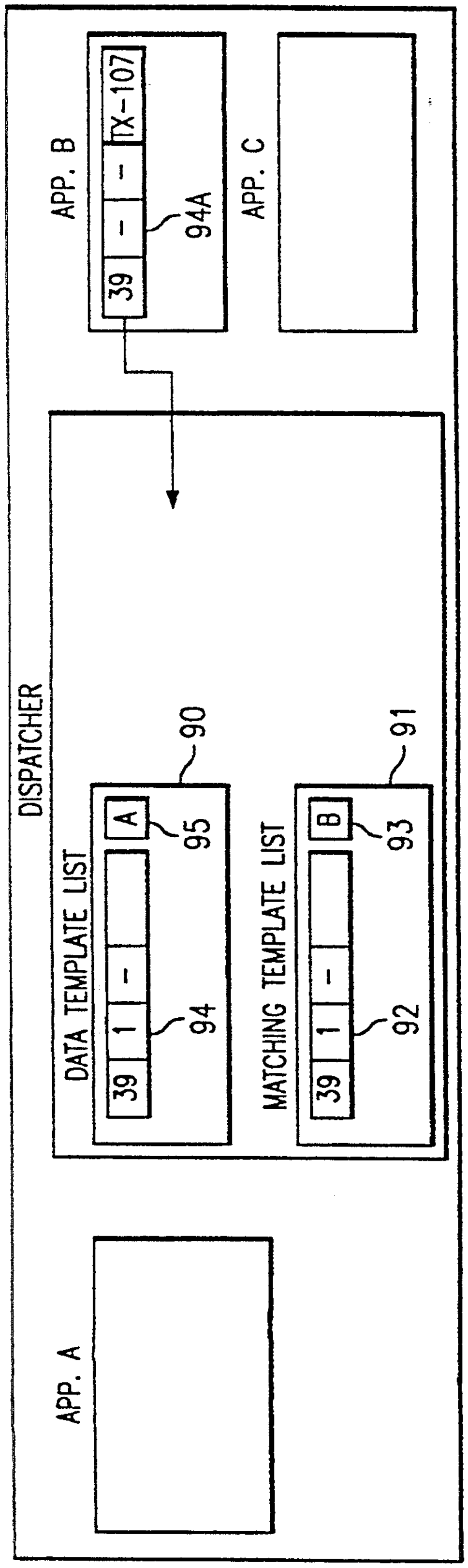

Referring now to FIG. 5E, there is shown the step of "PRODUCING AND TRANSMITTING FULL DATA TEMPLATE". Upon receipt of the data template 94 by the application B program in the previous step, the application program B has been directed to proceed with the generation of its templates, namely those with a template format code of 39. In response, the application B program generates a template 94A, which corresponds to the template 94 but includes specific data within field 1 of the template. In this example the WELL ID "TX-107" is provided in this field. The template 94A is transmitted from the application B program to the dispatcher program.

Figure 5F:
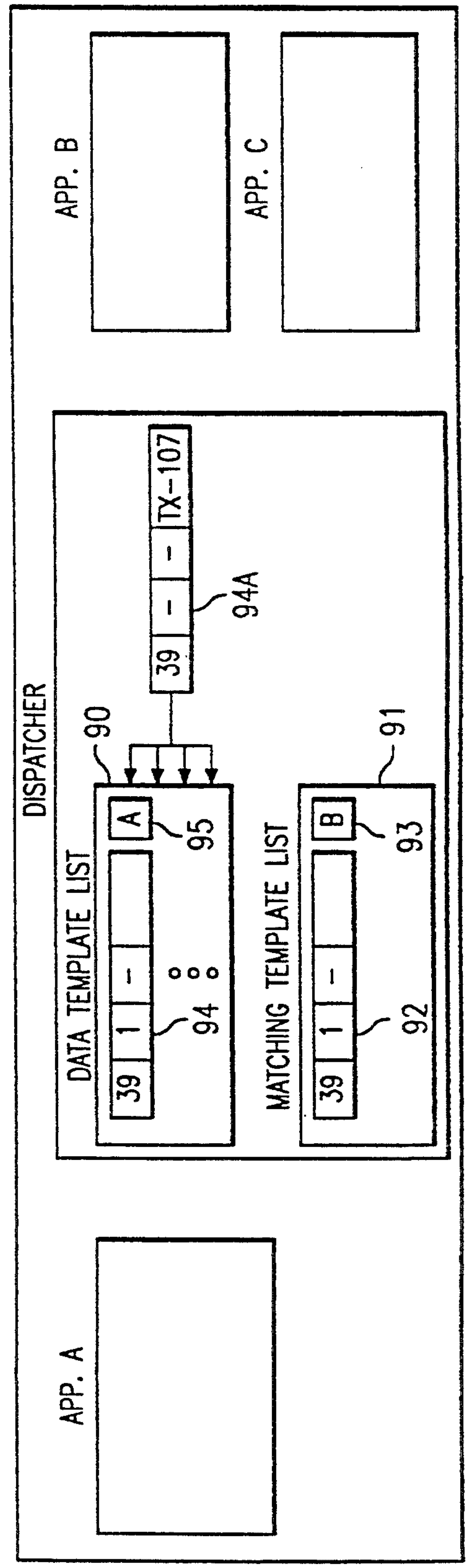

Referring now to FIG. 5F, there is shown the step of "COMPARING TO FIND MATCHES". This process is the same as that described previously in reference to FIGS. 3A–3D and 4A–4D. The dispatcher program compares the template format code in the received template 94A with the template format codes in the stored templates in the list 90. This comparison produces a match which identifies the application A program as being a registered user for the received template 94A.

The dispatcher program determines whether any of the application programs are registered to receive the information produced in the generated template by determining whether the generated template matches the registered template submitted by an application program. A match is determined by using the Template-matching KEY field in each registered application template to determine which fields in the registered template must match the corresponding fields in the generated template in order for the two templates to be considered as matching. The information code in each template is included as one of the fields for which a match can be required. Normally the information code is always required for a match. However, it is possible to set the Template-matching KEY field to zero. This causes the key to act like a wild card, in that no fields within the two templates being compared are required to match, thereby allowing all templates to match a registered template which has a zero in the matching key field.

Figure 5G:
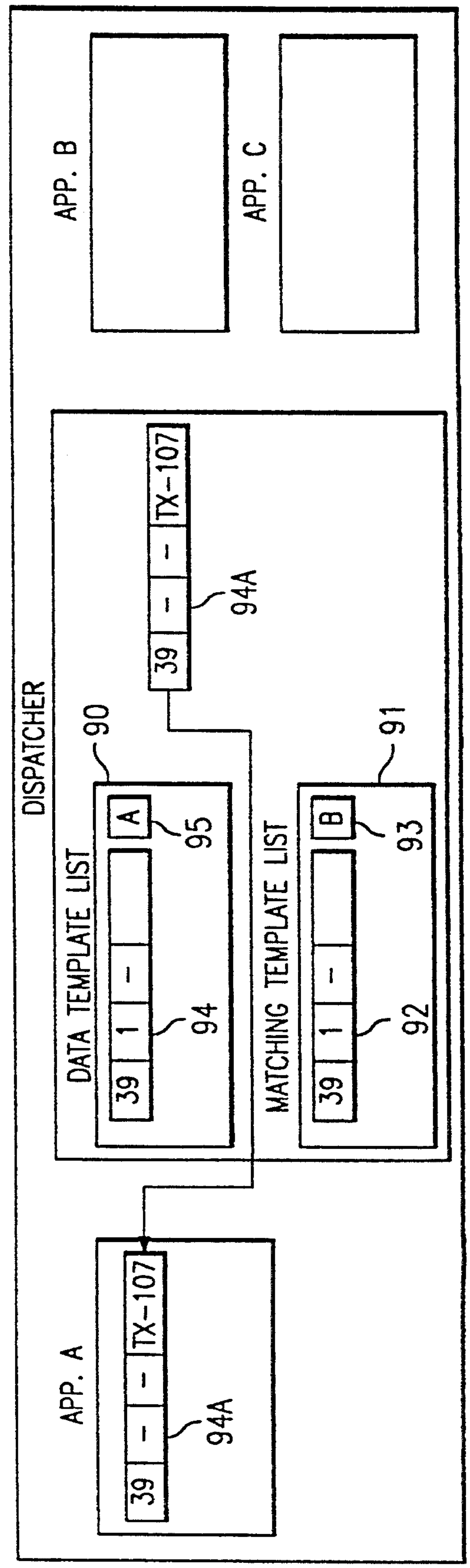

Referring now to FIG. 5G, there is shown the step of "TRANSMITTING FULL DATA TEMPLATE". In this final step, the dispatcher program transmits the received template 94A to the application A program to complete the data transfer process. The application A program has received the data that it required and the application B program has generated that data. However, there has been no direct communication between the application programs A and B. Further, the application B program has generated only the amount of data which has been required by a user program. Thus, the application B program has operated in an efficient manner by not broadcasting templates that are not required.

The registration of a data-using program or a data-generating program with the dispatcher program can be initiated by many types of input commands. A user can input a command! to a data-using program, which typically would have a window display, and command that program to register to receive data from the dispatcher program. Likewise, a user can input a command to a data-generating program and cause it to either immediately begin producing data templates and broadcasting them to the various dispatcher programs within a system or command a data-generating program to register with the dispatcher program. Input commands can also be received from other programs that are operating within the processor or in the system. For example, in a real-time industrial production system, such as a chemical plant, certain programs may monitor process parameters by use of the sensor 37 shown in FIG. 1. Upon detection of a predetermined parameter, such a monitoring program can cause one or more application programs to register to receive data, register to generate data or to generate data for broadcast. Further, input commands to set up the various registrations can be produced in a set-up routine which is executed upon the initialization of the overall system or is executed during operation of the system by still some further input from an operator, other programs or outside sensors.

In view of the descriptions of the use of data-matching templates and template-matching templates as presented in FIGS. 3A–3D and 4A–4D, a further example is now presented in reference to the window displays shown in FIG. 1. In a sequence of operations a user can call up an application program to display log data for a well. For example, a user could establish a screen 54 for displaying a particular type of log data over a set depth range. The user determines the type of information he wishes to see but there is not yet any information for use by the application program which produces the window 54. The user inputs a first command to cause the application program to register with the dispatcher program to receive the required information. This is a step of registering a data-matching template. Such a template, for example, may be a registration to receive log data. The user then transfers the cursor to the window 50, which is a display map for various wells. If the user then positions the cursor within one of the well symbols and inputs a second command, the application program which produces the window 50 then generates a template which contains log data for a selected well. This template is then transmitted to the dispatcher program which examines its registration list to determine if any previous application program has registered to receive log data. In the particular example, the application program for window 54 has made such a registration. The dispatcher program then transmits the template, which includes the log data, to the application program which produces window 54. Alternately, the template may only include a reference to the location of the actual log data, such as within a mass storage device, for example, a disk drive. The application program can then use the supplied location to retrieve the actual log data. The reference is an indicator for the location of the required data, such as an address within a mass storage medium. That application program then processes the received data to produce the log data display shown in the window 54. The user has thus caused the transfer of information between the concurrently operating application programs that produce the windows 50 and 54.

As shown in FIG. 1, the user may have multiple display windows active at one time to cause different types of log data to be transmitted from the data-generating application program to each of the application programs which produce the different log displays. The user can further select different wells and cause the transmission of new templates to change the information displayed in the windows.

As a further example in reference to FIG. 1, the user may establish a display which shows a pressure gauge, temperature gauge, position indicator or the like. The user could then cause one or more of these application programs which produce these windows to register with the dispatcher program to receive critical values or values from selected sensors. A further application program, which perhaps does not produce a window display, can monitor the processes through one or more of the sensors 37. This process monitoring application program can generate templates either selectively or periodically and transmit them to the dispatcher program. When the dispatcher program finds a match, by using the Template-matching KEY field, templates can then be transmitted to the application programs to produce a display of the required information. In this example the user does not initiate the operation of the data-generating application program, but, communication is provided between multiple, concurrently operating application programs by use of the dispatcher program in accordance with the present invention.

Referring now to FIG. 6, there is schematically illustrated a network 100 implementation for the present invention. The network 100 includes a plurality of processors 102, 104, 106 and 108, each of which can be similar to the system 30 illustrated in FIG. 1. These processors are each connected to a network interconnection 110. There is further included a network server 112 which is provided with a large storage capacity for providing access to data by each of the processors on the network.

In reference to FIGS. 3A–3D, FIGS. 4A–4D and FIGS. 5A–5G, there are described multiple application programs and a dispatcher program. In the network 100, each of these application and dispatcher programs can be located at any one of the terminals or server on the network. At a particular processor, such as 104, there may be an application A, which requires data. The application A could register with a dispatcher program which may be physically located at the processor 108. Further, a data-generating application, such as B, may be located at the processor 102. The actual locations of the programs are irrelevant. The communication and data exchange between the application programs and the dispatcher is carried out across the network without regard to the location of the programs. All of the programs which produce windows on a single display must be working with the same copy of the dispatcher program. If there are multiple displays being operated on a network, there will be one copy of the dispatcher program for each display. In a typical application the dispatcher program will operate on the same work station as the corresponding display.

A representative network implementation consists of the TCP/IP protocol running under AIX ver. 2.2 utilizing an Ungermann-Bass network controller circuit which is connected to an ETHERNET cable.

As used herein, the term "computer system" means either a single stand-alone processor, as shown in FIG- URE 1, or a a network of such processors as shown in FIGURE 6.

Referring now to FIG. 7, there is illustrated the software interaction between the application and dispatcher programs in relation to the communication programs on a network. Application program 120, dispatcher program 122 and application 124 communicate respectively with message interface (MI) programs 126, 128 and 130. The message interface (MI) programs interact with network (NW) programs which themselves-communicate across the network to the various processors, devices, storage and other programs. The message interface programs 126, 128 and 130 communicate respectively with network programs 132, 134 and 136, all of which network programs are interconnected through the network interconnection.

The message interface (MI) and network (NW) programs are prepared in conformance with the standards and definitions set forth in TCP/IP (Defense Communications Agency, DDN Protocol Handbook, Vol. 1-3 (NIC5004-6), Dec. 1985), which describes the selected network software implementation for the selected embodiment. However, it must be noted that there are numerous types and models of networks which could equally well embody the present invention and corresponding networking software would be utilized with these other networks.

In FIGS. 3A–3D and FIGS. 4A–4D, there are shown the steps of transmitting templates. Any of these steps of transmitting can be a transmission across the network between the processors.

The present invention includes data-using application programs, data-generating application programs and a dispatcher program for communicating data between the application programs. A given application program may be both a data-using program as well as a data-generating program. The data-using programs are registered with the dispatcher program to receive specific types of data. The data-generating programs produce templates of such data and transmit these to the dispatcher program which, in turn, supplies them to the registered data-using programs.

A further description of the present invention is directed to describing each of these three programs in detail. A data-using program which registers with the dispatcher program is described in a flow diagram in FIG. 8. A data-generating application program which produces a data template is described in reference to FIG. 9. The dispatcher program, also referred to as a pointing dispatcher (PD), is described in the flow diagrams illustrated in FIGS. 10–20.

These flow diagrams reference various program modules which serve to implement particular programs. A source code listing is presented in the Appendices for each of these referenced modules.

The following description also references various subroutines. These are described as follows:

| PROGRAM MODULE | APPENDIX | FUNCTION |
|---|---|---|
| 1. PD (POINTING DISPATCHER) | I-1 | Carries out basic operations for the pointing dispatcher program. |
| 2. PDINTP | I-2 | Initializes the array of handles. |
| 3. PDSERR | I-3 | Handles errors within PD. |

-continued

| PROGRAM MODULE | APPENDIX | FUNCTION |
|---|---|---|
| 4. PDADTM | I-4 | Adds a new template to appropriate list. |
| 5. PDMTCH | I-28 | Searches template lists for a match for a data-matching template. |
| 6. PDTMPL | I-6 | Searches template lists for a match for a template-matching template. |
| 7. PDCLSC | I-7 | Closes off a client's (application's) connection to PD, at PD's end. |
| 8 . PDDTTM | I-8 | Deletes the matching template. |
| 9. PDDUPE | I-9 | Checks if incoming template already exists. |
| 10. PDDLTM | I-15 | Deletes all templates in a particular list. |
| 11. PDCLOS | I-13 | Closes the client's end of the connection to PD. |
| 12. PDOPEN | I-12 | Opens a connection to PD. |
| 13. PDS32 | I-14 | Sends a data template to PD. |
| 14. PDRQST | II-1 | Sends a data-matching or template-matching template to PD. |

Figure 8:
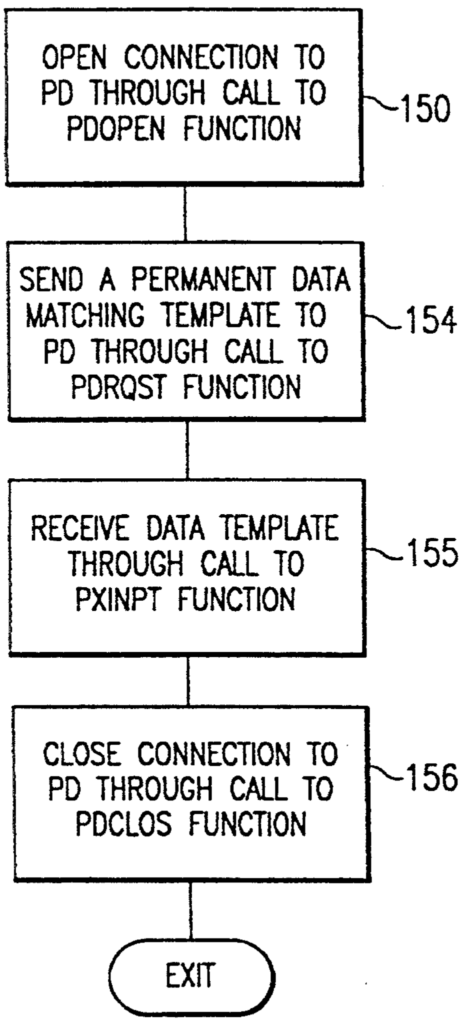
FIG. 8 is a flow diagram illustrating the operation of an application program which requires data and registers with the dispatcher program to obtain the data.
Figure 9:
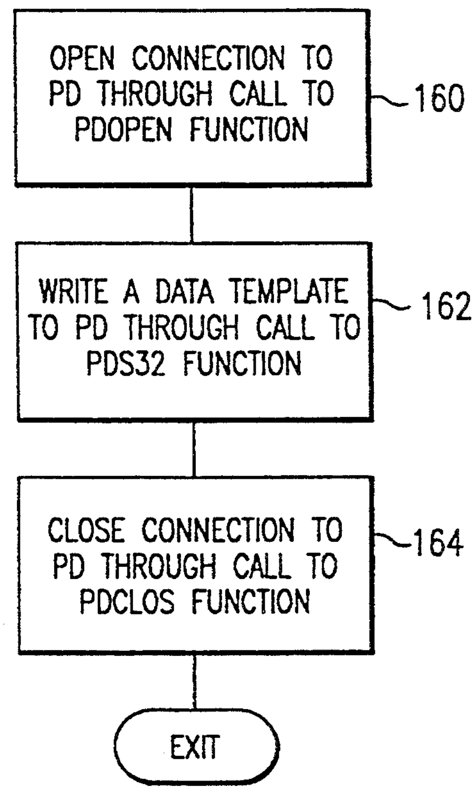
FIG. 9 is a flow diagram illustrating the operation of a data-generating program which provides data to the dispatcher program.

The procedure for registering a template by a data-using application program with the dispatcher program is described in the flow diagram shown in FIG. 8. This corresponds to the steps shown in FIGS. 3A and 4A. The example application program is termed TPXPDMT. A source code listing of this program is presented in Appendix II-2. In block 150, a connection is established between the data-using program TPXDMT and the dispatcher program PD by making a call to the PDOPEN function. This function is described in a source listing presented in Appendix (I-12. The process set forth in block 150 establishes a communication path between the application program and the dispatcher program.

In block 154, a permanent data-matching template is transferred from the application program TPXPDMT to the pointing dispatcher PD program by a call to the PDRQST function, which function is set forth as a code listing in Appendix II-1. A permanent data-matching template is one which is produced by a data-using application program that desires to receive all transmissions of the selected data until cancelled by the application program. An example is template 70 shown in FIG. 3A. On the other hand, a temporary data-matching template is one in which the data-using application program desires to receive only one transmission of the selected data. A template of this type is cancelled after one data transmission to the registered program.

Following block 154, the program transitions to a functional block 155 wherein the dispatcher program receives the transmitted template by use of the subroutine PDR32. This subroutine is described as a source code listing in Appendix III-1.

In block 156, the connection between the data-using application TPXPDMP and the dispatcher program PD is terminated by placing a call to the PDCLOS function. The PDCLOS function is presented as a code listing in Appendix 1–13.

The flow diagram for the operation carried out by a data-generating application program is shown in FIG.

9. This corresponds to the steps shown in FIGS. 3B and 4B. This operation is initiated at a block 160. In this step a connection is established between the data-generating program, which is labeled as TPXDATA and the dispatcher program, which is termed PD. This is done by making a call to the PDOPEN function. Note that a source listing for the program module PDOPEN is provided at Appendix I-12. The purpose of the step set forth in block 160 is to establish a communication path between the application program and the dispatcher program.

In block 162 a "full" data template is transferred to the dispatcher program by making a call to the PDS32 function. An example of such a "full" template is 70A in FIG. 3B. The template transmitted is one which includes both a template format code and data which is in the data field. A source listing for the PDS32 program is presented in Appendix 1-14.

The connection between the application program and the dispatcher program is terminated through operations set forth in block 164. The termination of the connection is carried out by a call to the PDCLOS function, which is set forth in Appendix I-13. Thus, the procedure described in FIG. 9 opens a connection, transmits a template to the dispatcher program and then closes the connection between the application program and the dispatcher program. The receipt and use of the data template by the dispatcher program is described in the flow diagrams shown in FIGS. 10–20.

Figure 10:
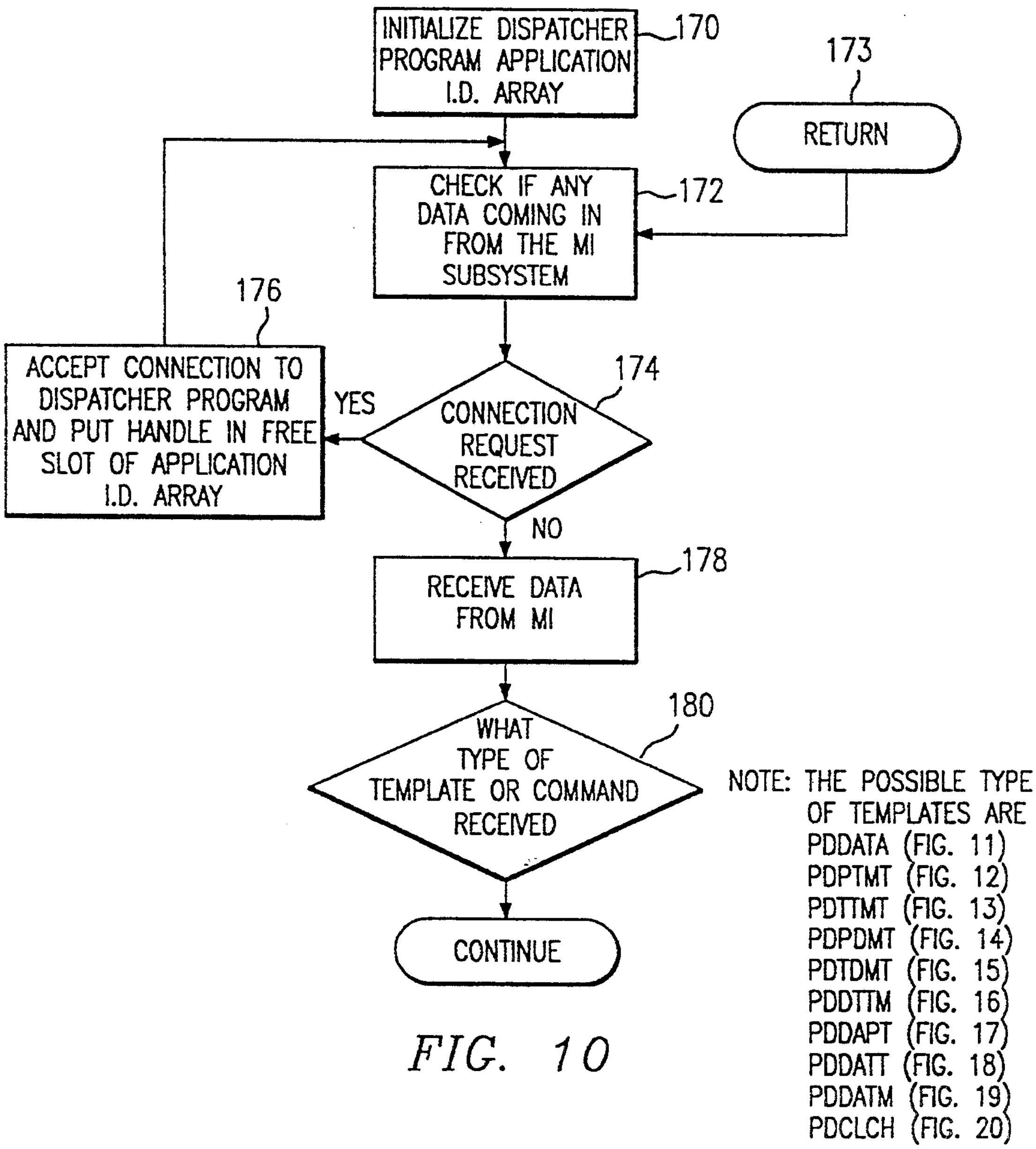
FIGS. 10–20 are flow diagrams illustrating the setup of a registration list in a dispatcher program by an application program and the transfer of data between application programs and the dispatcher program.

A basic flow diagram for the pointing dispatcher (PD) program is presented in FIG. 10. These operations correspond to the steps shown in FIGS. 3C, 3D and 4C, 4D. The code listing for the dispatcher program (PD) program is presented in Appendix I-1.

As described above, the dispatcher program stores a registration list for data-using application programs which have registered with the PD. There may also be other registration lists maintained by the dispatcher program. The registration lists which may be maintained by the dispatcher program are as follows:

1. A registration of permanent data-matching templates and the corresponding application identifiers.
2. A registration list of temporary data-matching templates and the corresponding application identifiers.
3. A registration list of permanent template-matching templates and the corresponding application identifiers.
4. A registration list of temporary template-matching templates and the corresponding application identifiers.

The first step in the PD program is shown at block 170. In this block an identification (ID) array for the dispatcher program is initialized. This is a process of setting aside a memory area for loading application program identifiers and template format codes. This array is initially set to be blank. In block 172, a check is made to determine if any data has been received from the message interface (MI) subsystem. This is a check to determine if any program has attempted to establish a connection to the PD program. When specific functions, described below, have been completed by the PD program, a return is made through entry point 173 to block 172. The answer to the check made in block 172 is carried out in question block 174. If a connection request has been received, a YES exit is taken to block 176. If a connection request has not been received, the NO exit is taken to a block 178.

If the YES exit is taken at question block 174, the dispatcher program accepts the connection it has received and it places the handle (identification) of the connected application program in a free slot of the application ID array. After this is completed, entry is next made to the block 172.

If the NO exit is taken from the question block 174, data, a template or command, has been received from the message interface (MI).

Following block 178, entry is made to a question block 180. An inquiry is made to determine the type of template or command which has been received by the dispatcher program. The potential types of templates and commands are listed in FIG. 10 and are described below. Depending upon the template which is received, the dispatcher program proceeds to the appropriate flow diagram in the indicated figure. For example, if the template PDDATA is received, the PD program continues operation with the flow diagram shown in FIG. 11. Flow diagrams in FIGS. 11–20 are described for each of the possible template types.

| TEMPLATE NAME | FUNCTION |
|---|---|
| 1. PDDATA (Data) | Template which contains template format code and data within the data field. |
| 2. PDPTMT (Permanent Template Matching Template) | This template is used to add to the list of permanent template-matching templates. It contains an information code, but no data. |
| 3. PDTDMT (Temporary Data Matching Template) | A template containing a template format code which is sent by data-using programs to establish a registration with the dispatcher program for a one time data transmission |
| 4. PDPDMT (Permanent Data Matching Template) | This is a template containing a template format code but no data. The template is sent by data-using program for registration with the dispatcher wherein the registration is continued until cancelled. |
| 5. PDTTMT (Temporary Template Matching Template) | This template is used to add to the list of temporary template matching templates. It contains an information code, but no data. |
| 6. PDDTTM (Delete This Template Message) | This functional action finds the template which matches the incoming template, and if these steps are done serves to delete the pre-existing template on the list. |
| 7. PDDAPT (Delete All Permanent Templates) | This template serves to delete all permanent templates from the dispatcher list. |
| 8. PDDATT (Delete All Temporary Templates) | This template serves to delete all of the temporary templates on the dispatcher list. |
| 9. PDDATM (Delete All Template Messages) | This template serves to delete all of the permanent and temporary templates on the dispatcher list. |
| 10. PDCLCH (Close Channel) | This template serves to close the application's connection to PD. |

Figure 11:
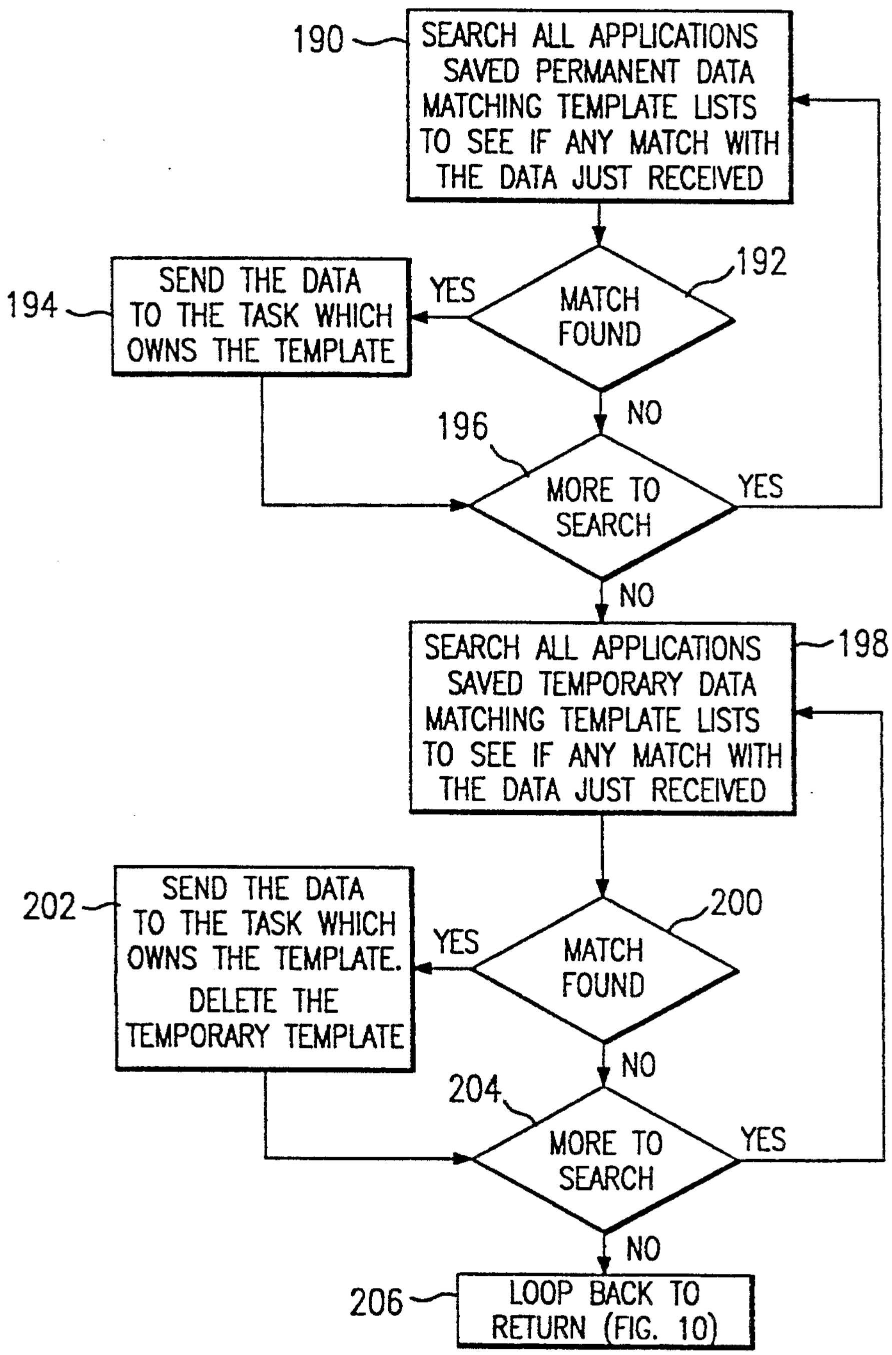

Referring now to FIG. 11, there is shown the instance of the dispatcher program receiving actual data, namely a "filled" template. This is referred to as PDDATA. In this instance, a data-generating application program has generated a template containing actual data. This template is transmitted to the dispatcher program. In block 190, the dispatcher program first examines all entries in a permanent data-matching template list, which is maintained at the dispatcher program, to find if there is any match with the "filled" data template just received. This is a comparison of the fields in the received template with the fields for the stored templates, as indicated by the Template-matching KEY field for each of the stored templates. After the search is made, an inquiry block 192 is entered to answer the question of whether a match has been found. The YES exit leads to block 194 and the NO exit leads to a question block 196.

If the YES exit is taken from block 192 to block 194, the data template which was received is sent to the application program which has been identified in the match. This identified program is termed the owner of the template. After the data has been sent, the dispatcher program enters the question block 196.

If the NO exit is taken from the question block 192, a further question is asked in question block 196. The question in this block is to determine if there is more searching to be performed in the list of registered, permanent, templates. If the YES exit is taken, the dispatcher program returns to block 190 and repeats the process. If the NO exit is taken, the dispatcher program enters block 198.

In block 198, a search is performed over all of the temporary data-matching templates to determine if there is any match on this list. The exit from this block leads to a question block 200 to select the next action depending upon whether a match was found in the temporary data-matching template list. If a match is found, the YES exit is taken to a block 202 which carries out two actions. First, the received data template is sent to the task (application program) which registered the template with the dispatcher program. Next, the temporary template is deleted from the list.

Following block 202, the dispatcher program enters a question block 204 to determine if there is more remaining in the temporary data-matching template list to be searched. The block 204 is likewise entered if the NO exit is taken from the question block 200. If it is determined that there are more items in the temporary data-matching list to be searched, the YES exit is taken from block 204 which returns the program to block 198. If there is nothing more to search, the NO exit is taken to a block 206, and the dispatcher program is routed back to the return entry 173 shown in FIG. 10 for the dispatcher program.

Figure 12:
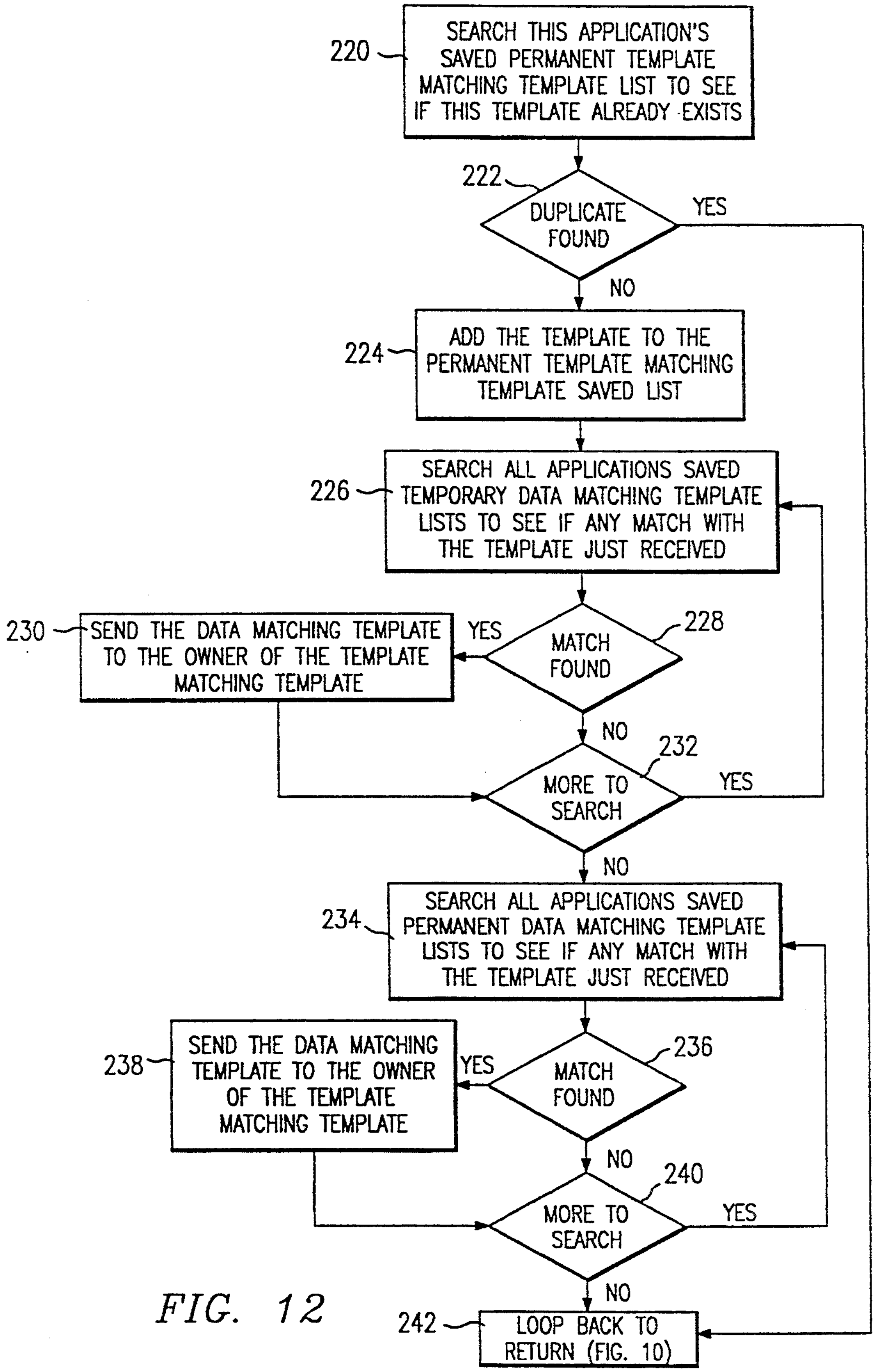

Referring now to FIG. 12, there is shown a flow diagram for the receipt of a permanent template-matching template, which is identified as PDPTMT. In this procedure, a data-generating application program transmits a permanent template-matching template to the dispatcher program for the purpose of registering to indicate that the data-generating application program is available to produce the data specified in the template. The objective of this procedure is to ensure that data is generated only if there exists application programs which are users of the generated data.

The first step in the process is to search the permanent template-matching template list within the dispatcher program to determine if this permanent template-matching template has previously been registered by the sending application program. Block 220 leads to a question block 222 to determine if a duplicate has been found. If the answer is yes, the program is taken to the exit block 242 of the flow chart shown in FIG. 12 and returned to the entry point 173 in FIG. 10 because there is no need to register the template. If no duplicate has been found, the program takes the NO exit from the question block 222 to a block 224. The function carried out in functional block 224 is to add the template which has been received to the list of permanent template-matching templates. Associated with this template is an application program identifier.

Following block 224, a search is carried out as set forth in block 226. Note that at the dispatcher program, as discussed above, data-using application programs register in a list with the dispatcher program to receive a specified type of data. This can be either a temporary or permanent registration. Likewise, a data-generating program can register with the dispatcher program to indicate that it is available to generate a particular type of data. These registrations likewise can be either temporary or permanent. The present instance is a description of the registration of a permanent template-matching template by a data-generating program.

In block 226, there is a search of the temporary data-matching templates, which have been listed for application programs. These are the templates which have been registered by data-using application programs to indicate that data is required. From block 226, dispatcher program enters question block 228 to selectively respond if a match has been found. If such a match has been found, the YES exit is taken to block 230. Within block 230, the identified data-matching template is sent to the data-generating application program which submitted the permanent template-matching template noted in block 220. The data-matching template is taken from the list which is searched in block 226. The sending of the data-matching template to the data-generating application program notifies that program that it is to generate such templates because there is now an identified user.

If no match has been found, the program is transferred to a question block 232. Likewise, the exit from block 230 enters question block 232.

In the question block 232, an inquiry is made to determine if there is more searching to be done in the list of temporary data-matching templates. If there is more searching to be carried out, the YES exit is taken to return the dispatcher program to block 226. If the searching is complete, the NO exit is taken to a block 234.

In the block 234, a search is carried out for making a comparison to all of the saved permanent data-matching templates to determine if the field in the received template matches any of the codes in the stored templates, as indicated by the codes in the matching key fields. Following block 234, the program enters a question block 236 for routing the program depending upon the finding of a match. If such a match is found, the YES exit is taken from block 236 to block 238. Within the block 238, the data-matching template which was matched is sent to the data-generating program which originated the permanent template-matching template received in block 220. This notifies that data-generating program that there is a user for its data and that it should proceed with the generation of such data templates.

If no match is found for the question block 236, the NO exit is taken to a question block 240. This block is likewise entered following the operations in functional block 238. If there are more items to be searched in the list of permanent data-matching templates, the YES exit is taken to return the program to block 234. If there are no further items in the list to be searched, the NO exit is taken to block 242 which takes the program to the return entry 173 of the dispatcher program at FIG. 10.

Figure 13:
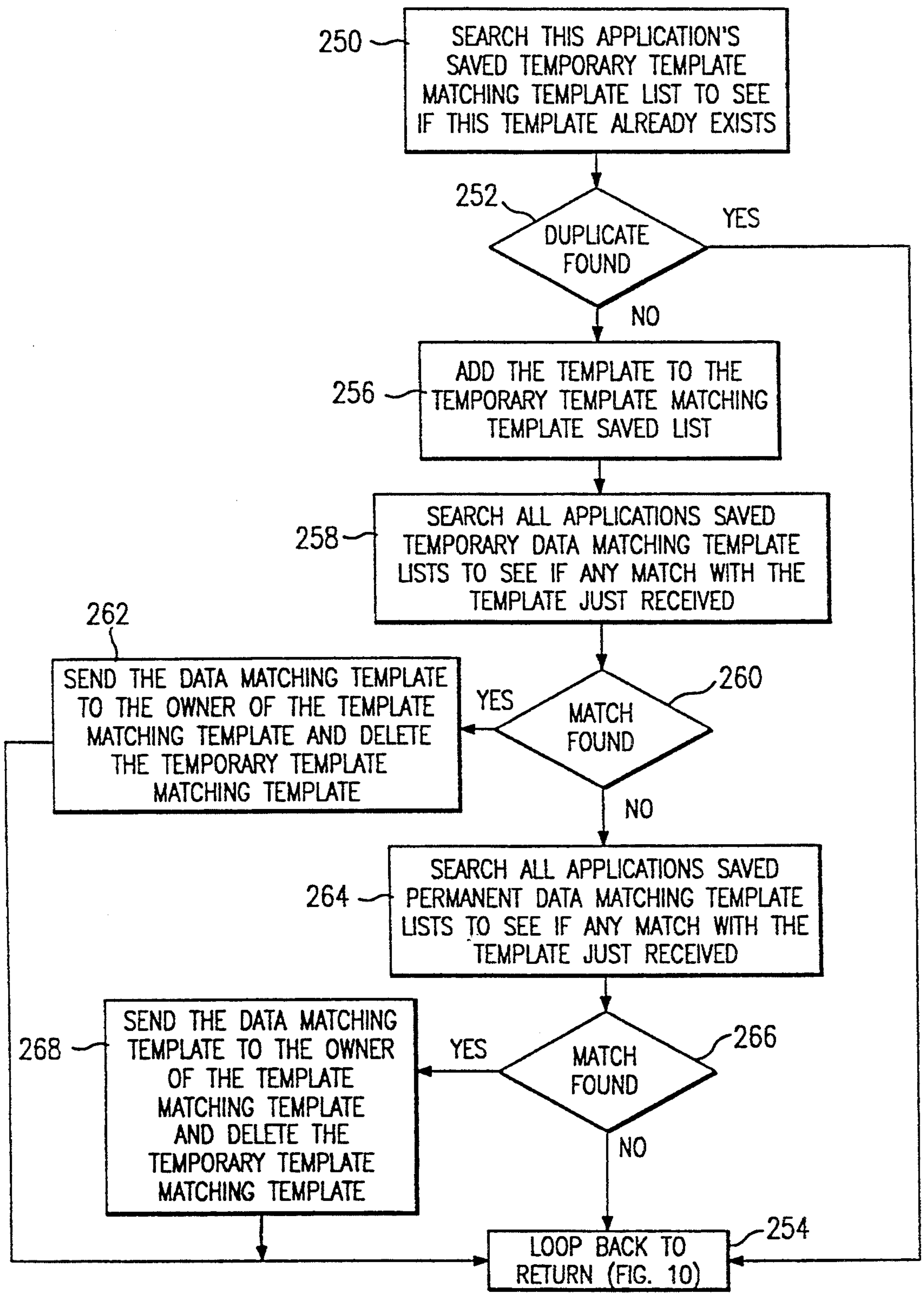

Referring now to FIG. 13, there is shown a process which is much like that described in reference to FIG. 12 but applies to a temporary, rather than permanent, template-matching template. In a block 250 the dispatcher program performs a search in the temporary template-matching template list to determine if the application program submitting the temporary template-matching template has previously made such a submission. Following block 250 there is entered a question block 252 to route the program dependent upon the finding of a duplicate. If a duplicate is found, the program is transferred through the YES exit to a block 254 which returns the program to the return entry 173 in FIG. 10. If no duplicate is found, the NO exit is taken to a block 256. Within this block the dispatcher program adds the received template to the temporary template-matching template list, together with an application identifier for the application which submitted the template.

Following block 256, the dispatcher program enters a block 258. Within this functional block, the dispatcher program searches across all of the entries in the temporary data-matching template list to determine if any correspond to the template most recently received. Following block 258, the dispatcher program enters a question block 260 to route the program depending upon the answer to the question of a match. If a match is found, the YES exit is selected which leads to the block 262. If no match is found, the NO exit is selected which leads to the block 264. If entry is made to the block 262, the dispatcher program sends the data-matching template found in the match to the application program which submitted the temporary template-matching template. The sending of this template directs the identified data-generating program to produce the specified data template. A further step is to delete the temporary template-matching template from the saved list in which it was added during the operation set forth in block 256. Upon completion of these steps, the program exits from block 262 and enters the loop back block 254.

If the NO exit is selected from question block 260, the program enters a functional block 264. Within this block the dispatcher program searches the list of permanent data-matching templates to determine if there is any template match with the template received at the block 250. Upon completion of this search, the program transfers from block 264 to a question block 266. If a match is found during the search carried out in functional block 264, the YES exit is taken to a functional block 268. If no match is found, the NO exit is taken to the loop back block 254. Within the block 268, the dispatcher program sends the data-matching template located in the search set forth in block 264 to the application program (owner) which submitted the template-matching template to block 250. The transmission of this data-matching template indicates to the originating data-generating application program that there is in existence a data-using application program which requires the data that is produced by the submitting application program. Also within block 268, the temporary template-matching template is deleted from the list because such a temporary template is used for only one instance.

Upon completion of the functions set forth in block 268, the program exits to the loop back block 254 which returns the program to the return entry 173 in the basic dispatcher program flow diagram set forth in FIG. 10.

Figure 14:
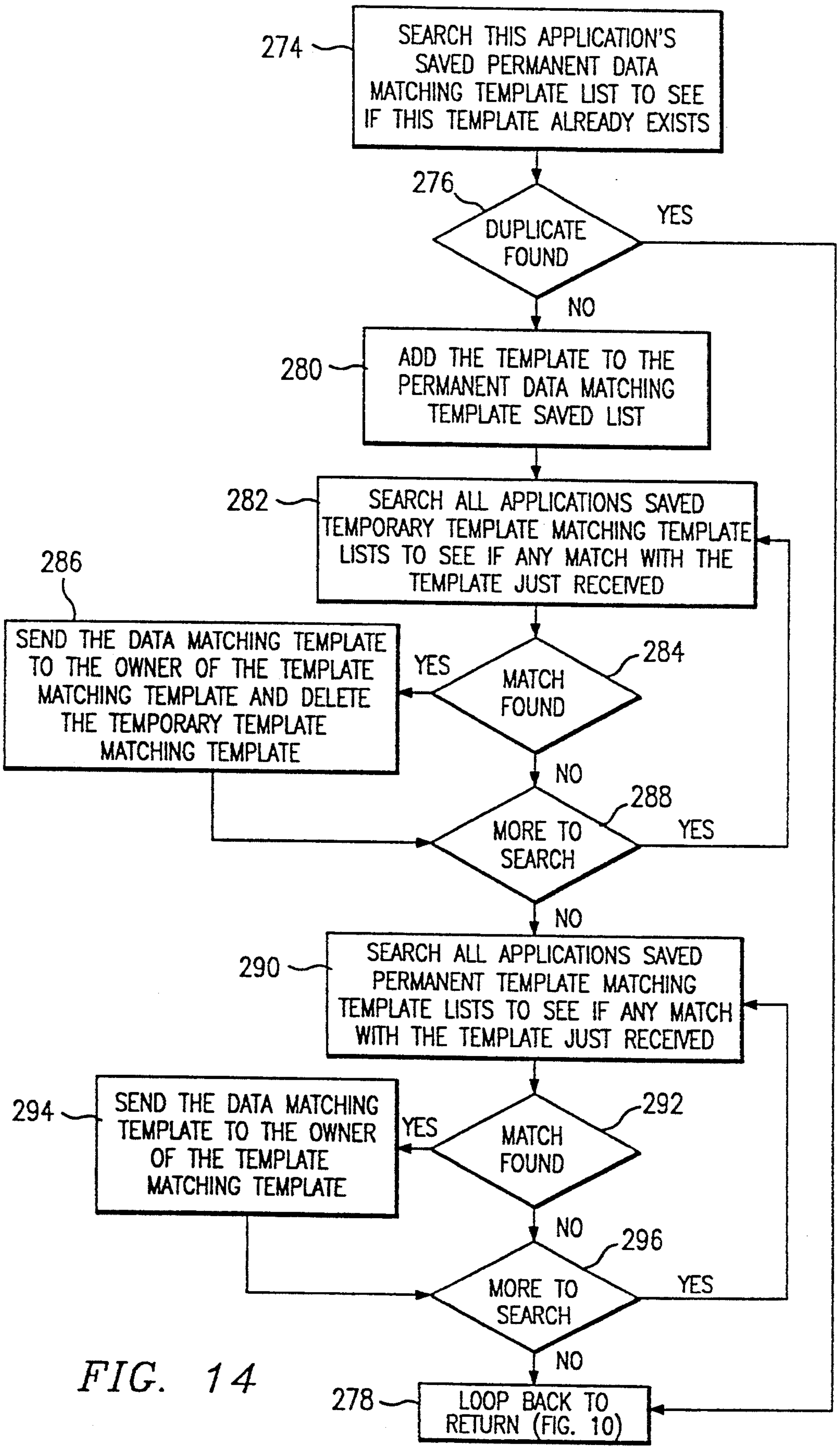
Figure 15:
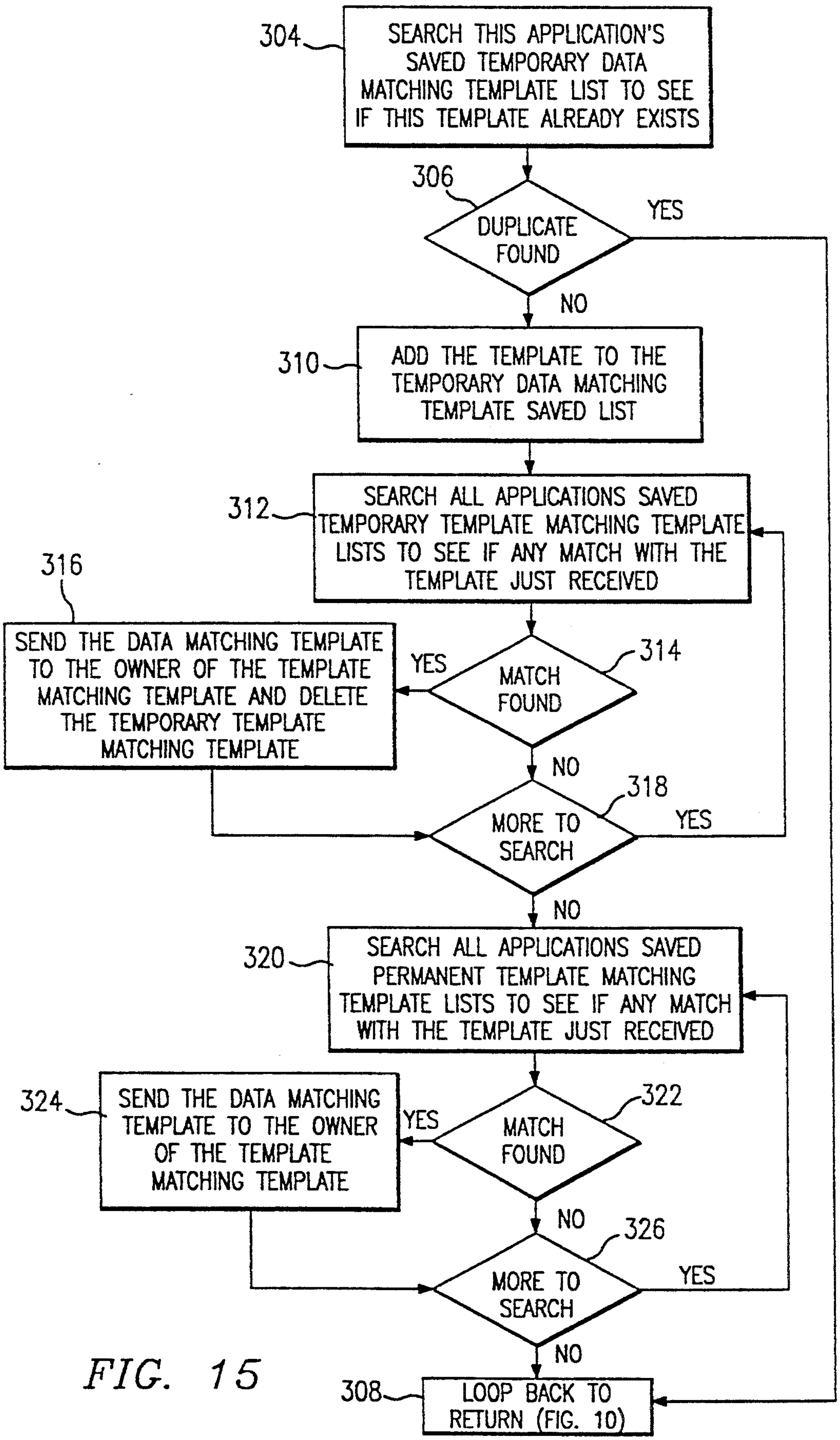

The flow diagrams that illustrate the operation of the dispatcher program for the process of registering permanent and temporary data-matching templates are described in FIGS. 14 and 15, respectively. This is a process wherein a data-using application program registers with the dispatcher program to receive one or all templates of a specified type which are produced by the data-generating application programs. A temporary registration provides the data-using application program with one data template only and the registration at the dispatcher program is cancelled after the one template is sent to the registered application program. With a permanent registration, all data templates of the specified type are provided to the registered application program until the registration is cancelled.

Referring now to FIG. 14, there is described a process carried out by the dispatcher program upon receipt of a permanent data-matching template. This is termed process PDPDMT. Upon receipt of a permanent data-matching template, in block 274, the function is carried out of checking that application's corresponding saved list to determine if the submitted template has already been registered. From block 274 the program proceeds to a question block 276. If a duplicate is found, the YES exit is taken which proceeds to the block 278 that returns the program to the entry point 173 in FIG. 10. If no duplicate is found, the NO exit is taken from block 276 to a functional block 280.

Within the functional block 280, the dispatcher program adds the received template to the saved list of permanent data-matching templates together with the application identifier for the transmitting application program.

The dispatcher program transfers from the functional block 280 into a functional block 282 where it searches the entire list of saved temporary template-matching templates to determine if any of them match format codes with the template just received. This is a check of matching templates to determine if there are any data-generating programs which have registered to indicate that they are prepared to produce the data requested by the application program which submitted the permanent data-matching template. From the functional block 282, the program proceeds to the question block 284. If such a match of the permanent data-matching template with a temporary template-matching template is made within block 282, the YES exit is taken to a functional block 286. Within the functional block 286, the dispatcher program sends the data-matching template found in block 282 to the data-generating application program which previously registered that template. This serves to notify that application program that it should initiate generation of "filled" data templates since there is now a registered user for such templates. But, since the registration of the template-matching template is only temporary, that temporary template is deleted.

A question block 288 is entered both from the NO exit of question block 284 and the output of functional block 286. Within the question block 288, the dispatcher program determines if there is more searching to be done within the temporary template-matching template list. If there is more to be searched, the YES exit is taken which returns the program to the functional block 282. If there is nothing more to search in this list, the program is directed to a functional block 290.

Within the block 290, the dispatcher program searches the list of saved permanent template-matching templates to determine if there is any template function code match with the received permanent data-matching template. From block 290, the program proceeds to a question block 292. If a match is found from the search performed in block 290, the YES exit is taken to a functional block 294. Within functional block 294, the dispatcher program performs the operation of sending the data-matching template found in the search performed in block 290 to the data-generating application program corresponding to the application identifier for the template-matching template. The transmission of this data-matching template serves to notify that data-generating application programs that it should proceed with the generation of "filled" data templates since there is now a registered user for such templates.

A question block 296 is entered if no match is found in the question block 292 and the NO exit is taken from block 292, or if the function 294 is carried out. Within the block 296, an inquiry is made to determine if there is more to be searched in the permanent template-matching template list set forth in block 290. If there is additional material to be searched, the YES exit is taken from block 296 to the functional block 290. If the searching has been completed, the NO exit is taken to the block 278 which returns the program to the entry point 173 of the dispatcher program in FIG. 10.

The final registration function of the dispatcher program is described in reference to FIG. 15. This flow diagram describes the operations that are performed when the dispatcher program receives a temporary data-matching template from a data-using application program. Such a template is submitted to the dispatcher program when a data-using application program requires only one "filled" data template. The first functional operation is carried out in block 304. The dispatcher program searches the temporary data-matching template list to determine if the submitting data-using application has previously registered the same template that was received. A routing inquiry is made in a question block 306 following functional block 304. If a duplicate is found, the YES exit is taken to a functional block 308 which routes the program back to the entry point 173 of the dispatcher program flow diagram illustrated in FIG. 10.

If no duplicate is found in the question block 306, the NO exit is taken to a functional block 310. Within this block, the dispatcher program adds the received template to the list of temporary data-matching templates together with the application identifier corresponding to the transmitting data-using application program.

The dispatcher program proceeds from functional block 310 to a functional block 312. Within the block 312, the dispatcher program searches the list of saved temporary template-matching templates for all application programs to determine if there is any match with the template just received. The program proceeds to a question block 314 to route the program depending upon the finding of a match. If such a match is found, the dispatcher program proceeds to a functional block 316 through the YES exit, but if no match is found, the program proceeds through the NO exit to a further question block 318. Within the functional block 316, the dispatcher program sends the data-matching template received in block 304 to the identified application program which registered the temporary template-matching template that was identified in the search performed in functional block 312. The sending of this template to the registered data-generating application program informs that program that it should proceed with the generation of a "filled" data template because there is now an identified user of the data that it produces. Within block 316, the dispatcher program proceeds to delete the temporary matching template identified in block 312 because temporary templates require only oneresponse and it should not be used again.

If no match is found within the question block 314 or the functions are accomplished within block 316, the dispatcher program proceeds to a question block 318. Within this block, a determination is made as to whether more searching should be performed within the temporary template-matching template list. If more searching is required, the YES exit is taken back to the functional block 312. If no further searching is required, the dispatcher program takes the NO exit to a functional block 320.

Within the functional block 320, the dispatcher program proceeds to search the list of permanent template-matching templates for all application programs to determine if there is any template match with the temporary data-matching template received at block 304. From the functional block 320, the dispatcher program proceeds to a question block 322. If a match is found, the program proceeds through the YES exit to a functional block 324, but if no match is found, the program takes the NO exit to a further question block 326. Within the functional block 324, the dispatcher program sends the received data-matching template to the identified data-generating application program (owner) of the template-matching template that was identified by the match found in the search performed within functional block 320. The sending of this data-matching template to the data-generating application program informs the program that it should proceed with the generation of its particular "filled" data template since there is now an identified user of that data. This process continues until cancelled because this is a permanent template.

Within the question block 326, the dispatcher program determines if there is more searching to be performed within the list of permanent template-matching templates. If more searching is to be performed, the YES is taken back to the functional block 320. If the searching is complete, the dispatcher program takes the NO exit to the functional block 308 which returns the program back to the return entry point 173 for the dispatcher program in FIG. 10.

The immediately preceding flow diagrams for the dispatcher program have described processes for the registration of various types of templates. FIGS. 16–19 describe the dispatcher operations for deleting specific templates or groups of templates. These deletion processes are required so that the communication function of the present invention can be flexible and dynamic.

Figure 16:
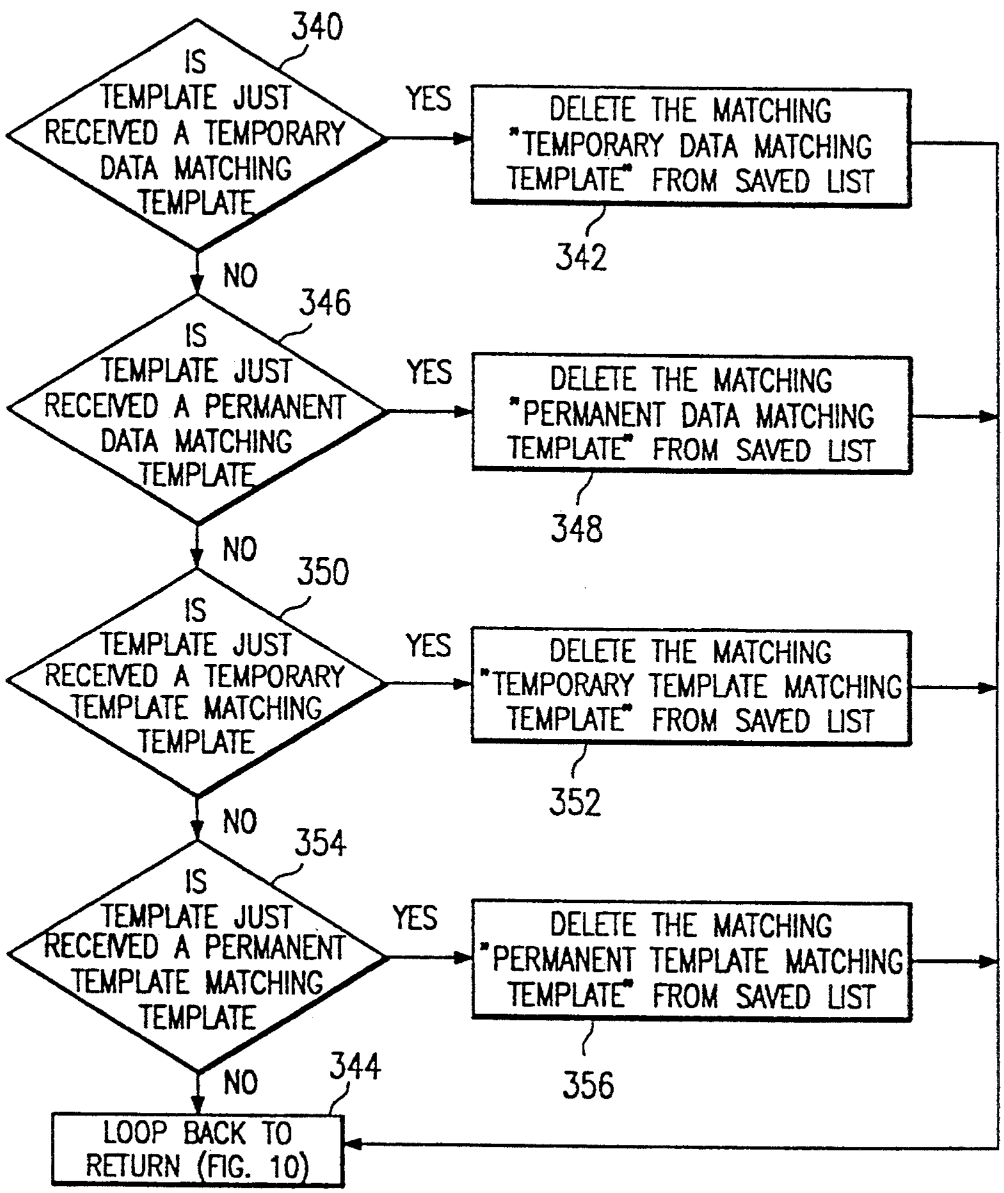

Referring now to FIG. 16, there is described a process for the deletion of specific templates by an application program. Application programs can generate both temporary and permanent templates. They can also generate "data-matching" and "template-matching templates". There are thus four possible templates and there are four corresponding template lists within the dispatcher program. In FIG. 16, there is described the process for deleting a specific template having any one of the four types. The procedure described in FIG. 16 is initiated upon receipt of a deletion command and a template. In question block 340, an examination is made to determine if the received template is a "temporary data-matching template". If it is, the YES exit is taken to a functional block 342 wherein the dispatcher program deletes the received temporary data-matching template from the corresponding saved list. Following block 342, the dispatcher program proceeds to a block 344 which returns the program to the entry point 173 for the dispatcher program flow diagram shown in FIG. 10.

If the NO exit is taken from the question block 340, a question block 346 is entered to determine if the received template is a "permanent data-matching template". If such a template is received, the YES exit is taken from block 346 to a functional block 348. Within the block 348, the dispatcher program deletes the received permanent data-matching template from the corresponding saved list. The dispatcher program exits from functional block 348 to the loop back block 344 which returns the program to the entry point 173 in FIG. 10.

If the NO exit is taken from block 346, the dispatcher program enters a question block 350. This block determines if the received template is a "temporary template-matching template". If this is true, the YES exit is taken to a functional block 352 wherein the dispatcher program deletes the received temporary template-matching template from the saved list. The dispatcher program then proceeds to the loop back functional block 344.

If the NO exit is taken from the question block 350, the dispatcher program enters the question block 354. The function within this block determines if the received template is a "permanent template-matching template". If this is true, the YES exit is taken to a functional block 356 wherein the dispatcher program deletes the received permanent template-matching template from the corresponding saved list and then returns the program to the loop back block 344. If the NO exit is taken from the question block 354, the dispatcher program is taken to the loop back functional block 344 where the program is returned to the entry point 173 within FIG. 10.

Figure 17:
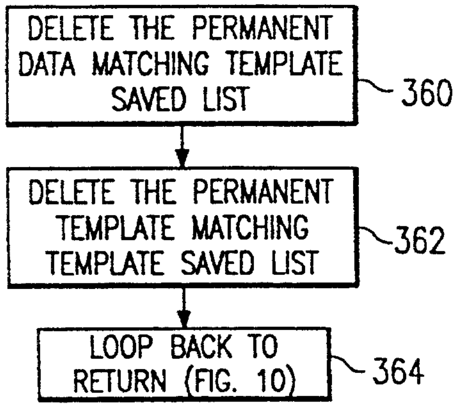

A group deletion of templates by the dispatcher program is now described in reference to FIG. 17. The process described in this flow diagram deletes all permanent templates for a specific application program. Upon receipt of the process PDDAPT by the dispatcher program, the functional block 360 is entered. Within this functional block, a dispatcher program deletes all permanent data-matching templates from the saved list for the submitting application program. The dispatcher program then proceeds to functional block 362 and deletes all the permanent template-matching templates from the saved list for the submitting application. Thus, all permanent templates of both the data-matching type and the template-matching type are deleted for the particular application program which made the submission to the dispatcher program. Finally, the dispatcher program exits from functional block 362 to a functional block 364 which returns the dispatcher program to the entry point 173 in FIG. 10.

Figure 18:
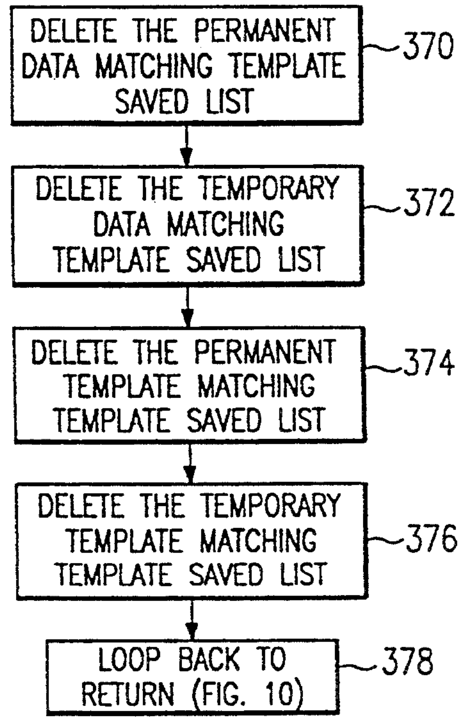

Referring now to FIG. 18 for the dispatcher program, the process shown herein serves the function of deleting all template lists for a specified application program. This is the process which is termed PDDATM. Upon receipt of this process from an application program, the dispatcher program enters a first functional block 370. Within this functional block, the dispatcher program deletes all of the permanent data-matching templates from the corresponding list for the submitting application program.

From the functional block 370, the dispatcher program proceeds to the functional block 372 where it deletes all of the temporary data-matching templates from the corresponding saved list for the submitting application program.

From block 372, the dispatcher program proceeds to functional block 374 wherein it deletes all of the permanent template-matching templates from the corresponding saved list for the application program which submitted the request to make the deletions.

From the functional block 374, the dispatcher program proceeds to functional block 376 wherein it deletes all of the temporary template-matching templates in the saved list for the submitting application program. At this point all of the templates for a particular application program have been deleted from the lists within the dispatcher program. Finally, the dispatcher program proceeds to the functional block 378 which returns the program to the entry point 173 in FIG. 10.

Figure 19:
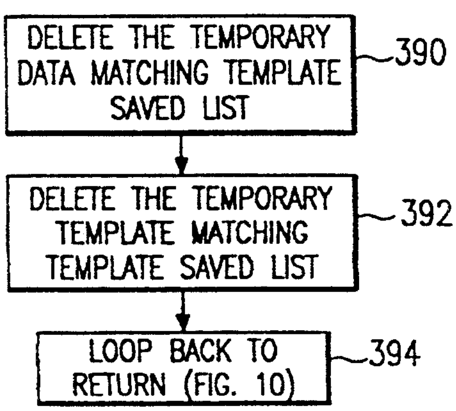

Referring now to FIG. 19, there is shown the process for deleting only the temporary templates for a particular application program. This process is termed PDDATT. In the first functional block 390, the dispatcher program deletes all of the temporary data-matching templates for the submitting application program from the corresponding list stored within the dispatcher program. The dispatcher program then proceeds to functional block 392 where it deletes all of the temporary template-matching templates from the corresponding list for the submitting application program. Finally, the dispatcher program proceeds to a functional block 394 which returns the program back to the entry point 173 within FIG. 10.

Figure 20:
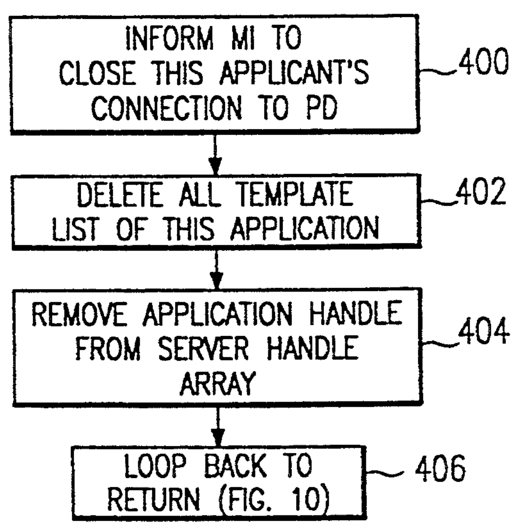

The final function described for the dispatcher program is shown in FIG. 20. This process, termed PDCLCH, closes the connection between an application program and the dispatcher program. Within a functional block 400, the dispatcher program informs the message interface (MI) to close the communication connection with the dispatcher program (PD). The MI is the interface between the dispatcher program, as well as the application programs, and the networking software. This is shown in reference to FIG. 7.

From functional block 400, the dispatcher program proceeds to functional block 402 wherein it deletes all of the templates for the submitting application from all lists maintained at the dispatcher program.

Following functional block 402, the dispatcher program proceeds to functional block 404 wherein the application handle (identification of the submitting application program), is deleted from the array that was initially set up by the dispatcher program in functional block 170 shown in FIG. 10. Finally, the dispatcher program is transferred to a block 406 which loops the program back to the entry point 173 in FIG. 10.

The flow diagram for PDCLCH shown in FIG. 20 differs from that for PDDATM shown in FIG. 18. In FIG. 18, the application handle is maintained and the application program can return and register new templates in the lists at the dispatcher program. But in the flow diagram shown in FIG. 20, the application handle has been deleted and must be reestablished before there can be any registration of templates by the application program.

Referring now to FIG. 21, there is shown a structure chart for the pointing dispatcher (PD) program. Each of the subroutines shown in this chart is provided as a listing in Appendix I.

FIG. 22 is a structure chart for a program TPXPDMT which is a program that registers with the dispatcher program to receive data. Each of the subroutines that make up this program are presented as code listings in Appendices I or II.

In FIG. 23 there is shown a structure chart for the program TPXDATA. This is a data-generating program which provides information to the pointing dispatcher program. Each of the subroutines shown in this structure chart is presented as a code listing in Appendices I, II or III.

In summary, the present invention provides a novel, rapid and efficient method for communicating information between independent, but concurrently operating, programs within a computer system.

Although one embodiment of the invention has been illustrated in the accompanying drawings and described in the foregoing Detailed Description, it will be understood that the invention is not limited to the embodiment disclosed, but is capable of numerous rearrangements, modifications and substitutions without departing from the scope of the invention.

What is claimed:

1. A method for transferring information between multiple programs operating concurrently in a computer system, the method comprising the computer-executed steps of:

registering at least one information code and an application program identification for each said information code by one of a plurality of information-using application programs during execution on the computer system with a dispatcher program, each of said information codes representing a specific type or collection of said information and each of said application program identifications corresponding to one of said plurality of information-using application programs, said registering by said one of said plurality of information-using application programs being for the purpose of receiving information represented by said registered at least one information code and without further requests on the part of said one of said plurality of information-using application programs, producing a list comprising at least one of said information codes and said application program identifications, producing selected information and a corresponding information code by an information-generating application program executing on said computer system, transmitting said selected information and corresponding information code by said information-generating application program executing on said computer system to said dispatcher program, comparing said information code which corresponds to said selected information with the information codes in said list to find matches which identify through said application program identification at least one of said plurality of information-using application programs which are registered in said list to receive the type or collection of information indicated by said information code which corresponds to said selected information, and transmitting at least said selected information to each of said identified information-using application programs.

2. A method for transferring information between multiple programs operating concurrently in a computer system as recited in claim 1 wherein said selected information is an indicator for other information to be utilized by said one or more identified application programs and said identified application programs retrieve said other information by reference to said indicator for use thereby.

3. A method for transferring information between multiple programs operating concurrently in a computer system as recited in claim 1 wherein at least one of said steps of transmitting includes transmission across a network which interconnects a plurality of processors within said computer system.

4. A method for transferring information between multiple programs operating concurrently in a computer system as recited in claim 1 including the step of deleting the registered information code corresponding to said selected information from said list for each of said identified application programs after said selected information has been transmitted to each of said identified application programs.

5. A method for transferring information between multiple programs operating concurrently in a computer system as recited in claim 1 including the steps of:

producing second selected information and a corresponding information code by an application program, transmitting said second selected information and corresponding information code to said dispatcher program, comparing said information code which corresponds to said second selected information with the information codes in said list to find matches which identify through said application program identification at least one of said application programs which are registered in said list to receive the type or collection of information indicated by said information code which corresponds to said second selected information, and transmitting at least said second selected information to each of said identified application programs.

6. A method for transferring information between multiple programs operating concurrently in a computer system as recited in claim 1 wherein said steps of registering and producing are initiated upon receipt of respective user commands.

7. A method for transferring information between multiple programs operating concurrently in a computer system as recited in claim 1 wherein the entirety of said selected information and corresponding information code are transmitted to said identified application programs.

8. A method for transferring information between multiple programs operating concurrently in a computer system, the method comprising the computer-executed steps of:

registering template codes and at least one application program identification by one of a plurality of information-using application programs during execution on the computer system with a dispatcher program, each of said template codes representing a respective template which comprises a set of fields that include a field for said template code which defines a specific type or collection of said information and at least one data field defined for data corresponding to the information defined by said template code and said application program identifications corresponding respectively to said information-using application programs, said registering by said one of said plurality of information-using application programs being for the purpose of receiving information represented by said registered at least one information code and without further requests on the part of said one of said plurality of information-using application programs, producing a list comprising at least one of said template codes for each of selected information-using application programs, producing one of said templates by an information-generating application program executing on said computer system wherein said produced template includes information and the corresponding one of said template codes, transmitting said produced template to said dispatcher program, comparing the template code in said produced template with the template codes in said list to find matches which identify through said application program identifications at least one of said information-using application programs which are registered in said list to receive the type or collection of information in said produced template, and transmitting at least the information in said produced template to each of said identified information-using application programs.

9. A method for transferring information between multiple programs operating concurrently in a computer system as recited in claim 8 wherein the information in said produced template is an indicator for other information to be utilized by said identified application programs and said identified application programs retrieve said other information by reference to said indicator for use thereby.

10. A method for transferring information between multiple programs operating concurrently in a computer system as recited in claim 8 wherein at least one of said steps of transmitting includes transmission across a network which interconnects a plurality of processors within said computer system.

11. A method for transferring information between multiple programs operating concurrently in a computer system as recited in claim 8 including the step of deleting the registered template code corresponding to said produced template from said list for each of said identified application programs after said information in said produced template has been transmitted to each of said identified application programs.

12. A method for transferring information between multiple programs operating concurrently in a computer system as recited in claim 8 including the steps of:

producing a second one of said templates by an application program wherein said second produced template includes information and the corresponding one of said template codes, transmitting said second produced template to said dispatcher program, comparing the template code in said second produced template with the template codes in said list to find matches which identify through said application program identifications at least one of said application programs which are registered in said list to receive the type or collection of information in said second produced template, and transmitting at least the information in said second produced template to each of said identified application programs.

13. A method for transferring information between multiple programs operating concurrently in a computer system as recited in claim 8 wherein the entirety of said produced template is transmitted to said identified application programs.

14. A method for transferring information between multiple programs operating concurrently in a computer system which includes an input device and an output device for communicating with a user, the method comprising the computer-executed steps of:

producing a window display at said output device for each of a plurality of application programs, wherein the user interfaces with said window application programs by use of the corresponding window display and said input device, registering at least one information code and an application program identification for each said information code by one of a plurality of information-using application programs during execution on said computer system with a dispatcher program, each of said information codes representing a specific type or collection of said information and each of said application program identifications corresponding to one of said information-using application programs, said registering by said information-using application program being for the purpose of receiving information represented by said registered at least one information code and without further requests on the part of said one of said plurality of information-using application programs, producing a list comprising at least one of said information codes and said application program identifications, producing a template by an information-generating application program during execution on said computer system wherein said template comprises a set of fields which include one of said information codes in one field and at least one data field defined for data corresponding to the information defined by the information code in the template, transmitting said produced template to said dispatcher program, comparing the information code in said produced template with the information codes in said list to find matches which identify through said application program identification at least one of said information-using application programs which are registered in said list to receive the type or collection of information indicated by the information code in said produce template, and transmitting at least the information in said produced template to each of said identified information-using application programs.

15. A method for transferring information between multiple programs operating concurrently in a computer system as recited in claim 14 wherein the information in said produced template is an indicator for other information to be utilized by said identified application programs and said identified application programs retrieve said other information by reference to said indicator for use thereby.

16. A method for transferring information between multiple programs operating concurrently in a computer system as recited in claim 14 wherein at least one of said steps of transmitting includes transmission across a network which interconnects a plurality of processors within said computer system.

17. A method for transferring information between multiple programs operating concurrently in a computer system as recited in claim 14 including the step of deleting the registered information code corresponding to said produced template form said list for each of said identified application programs after the information in said produced template has been transmitted to each of said identified application programs.

18. A method for transferring information between multiple programs operating concurrently in a computer system as recited in claim 14 including the steps of:

producing a second template by an application program wherein said second template includes information and a corresponding one of said information codes, transmitting said second produced template to said dispatcher program, comparing the information code in said second produced template with the information codes in said list to find matches which identify through said application program identification at least one of said application programs which are registered in said list to receive the type or collection of information indicated by the information code in said second produced template, and transmitting at least the information in said second produced template to each of said identified application programs.

19. A method for transferring information between multiple programs operating concurrently in a computer system as recited in claim 14 wherein said steps of registering and producing are initiated upon receipt of respective user commands.

20. A method for transferring information between multiple programs operating concurrently in a computer system as recited in claim 14 wherein the entirety of said produced template is transmitted to said identified application programs.

21. A method for transferring information between multiple programs operating concurrently in a computer system, the method comprising the computer-executed steps of:

registering at least one information code and an application program identification for each said information code by one of a plurality of information-using application programs during execution on said computer system with a dispatcher program, each of said information codes representing a specific type or collection of said information and each of said application program identifications corresponding to one of said information-using application programs, said registering by said one of a plurality of information-using application programs being for the purpose of receiving information represented by said registered at least one information code and without further requests on the part of said one of said plurality of information-using application programs, producing a list comprising at least one of said information codes and said application program identifications, examining said list by a particular application program, which particular application program generates information corresponding to a particular one of said information codes, to determine if said particular information code is recorded in said list, producing a template by said particular information-generating application program executing on said computer system wherein said template comprises a set of fields which include said particular information code in one field and at least one data field defined for data corresponding to the information code in the template, said template produced only when said particular information code in said template has been determined to be recorded in said list, transmitting said produced template to said dispatcher program, comparing said particular information code in said produced template with the information codes in said list to find matches which identify at least one of said information-using application programs which are registered in said list to receive the type or collection of information indicated by said particular information code in said produced template, and transmitting at least the information in said produced template to each of said identified information-using application programs.

22. A method for transferring information between multiple programs operating concurrently in a computer system as recited in claim 21 wherein the information in said produced template is an indicator for other information to be utilized by said identified application programs and said one or more identified application programs retrieve said other information by reference to said indicator for use thereby.

23. A method for transferring information between multiple programs operating concurrently in a computer system as recited in claim 21 wherein at least one of said steps of transmitting includes transmission across a network which interconnects a plurality of processors within said computer system.

24. A method for transferring information between multiple programs operating concurrently in a computer system as recited in claim 21 including the step of deleting the registered information code corresponding to said produced information from said list for each of said identified application programs after said information in said produced template has been transmitted to each of said identified application programs.

25. A method for transferring information between multiple programs operating concurrently in a computer system as recited in claim 21 including the steps of:

producing a second template by said particular application program wherein said second template includes information and the corresponding particular information code only when said particular information code has been determined to be recorded in said list, transmitting said second produced template to said dispatcher program, comparing said particular information code in said second produced template with the information codes in said list to find matches which identify at least one of said application programs which are registered in said list to receive the type or collection of information indicated by said particular information code in said produced template, and transmitting at least the information in said second produced template to each of said identified application programs.

26. A method for transferring information between multiple programs operating concurrently in a computer system as recited in claim 21 wherein the entirety of said produced template is transmitted to said identified application programs.

27. A method for transferring information between multiple programs operating concurrently in a computer system, the method comprising the computer executed steps of:

registering an information code with a dispatcher program by one of a plurality of information-generating application programs during execution on said computer system to produce a first list comprising the identity of said one of said plurality of information-generating application programs and associated therewith said information code which represents a type or collection of information produced by said one of said plurality of information-generating application programs, registering at least one of said information codes with a dispatcher program by one of a plurality of information-using application programs during execution on said computer system to produce a second list comprising the identity of said one of said plurality of information-using application programs and at least one information code which represents the type or collection of information used by said one of said plurality of information-using application programs, comparing the information codes in said first and second lists to find a match which identifies an information code representative of information to be produced by said one of said plurality of information-generating application programs, transmitting a notification of said identified information code to said one of said plurality of information-generating application programs when a match is found that identifies said one of said plurality of information-generating application programs, producing by said identified one of said plurality of information-generating application programs, during execution on said computer system and upon receipt of said notification, a template which comprises a set of fields which include in one field thereof the information code which was registered by said identified one of said plurality of information-generating application programs and at least one data field defined for data corresponding to the information defined by the information code in the template, transmitting said produced template to said dispatcher program, comparing the information code in said produced template with the information codes in said second list to find matches which identify at least one of said plurality of information-using application programs which are registered in said second list to receive the type or collection of information indicated by the information code in said produced template, and transmitting at least the information in said produced template to each of said identified one of said plurality of information-using application programs.

28. A method for transferring information between multiple programs operating concurrently in a computer system as recited in claim 27 wherein the information in said produced template is an indicator for other information to be utilized by said identified application programs and said identified application programs retrieve said other information by reference to said indicator for use thereby.

29. A method for transferring information between multiple programs operating concurrently in a computer system as recited in claim 27 wherein at least one of said steps of transmitting includes transmission across a network which interconnects a plurality of processors within said computer system.

30. A method for transferring information between multiple programs operating concurrently in a computer system as recited in claim 27 including the step of deleting said registered information code corresponding to said produced template from said list for each of said identified application programs after said information in said produced template has been transmitted to each of said identified application programs.

31. A method for transferring information between multiple programs operating concurrently in a computer system as recited in claim 27 including the steps of:

producing a second template which includes information and the corresponding information code, which information code was registered by said information-generating program, transmitting said second produced template to said dispatcher program, comparing the information code in said second produced template with the information codes in said second list to find matches which identify at least one of said application programs which are registered in said second list to receive the type or collection of information indicated by the information code in said second produced template, and transmitting at least the information in said second produced template to each of said identified application programs.

32. A method for transferring information between multiple programs operating concurrently in a computer system as recited in claim 27 wherein the entirety of said produced template is transmitted to said identified application programs.

33. A method for transferring information between multiple programs operating concurrently in a computer system which includes an input device and an output device for communicating with a user, the method comprising the computer-executed steps of:

producing first and second window displays at said output device respectively for first and second application programs, wherein the user interfaces with said window application programs by use of the corresponding window display and said input device, said first application program registering during execution on said computer system an information code and the identity of said first application program with a dispatcher program in response to a first command, said information code representing a specific type or collection of said information for said first application program to receive, said second application program producing, during execution on said computer system, in response to a second command, a template which comprises a set of fields which includes one of said information codes in one field and at least one data field defined for data corresponding to the information defined by the information code in the template, transmitting said produced template to said dispatcher program, comparing the information code in said produced template with the information code registered with said dispatcher program to find a match which identifies said first application program which was registered to receive the type or collection of information indicated by the information code in said produced template, and transmitting at least the information in said produced template to said first application program.

34. A method for transferring information between multiple programs operating concurrently in a computer system as recited in claim 33 wherein the information in said produced template is an indicator for other information to be utilized by said identified first application program and said identified first application program retrieving said other information by reference to said indicator for use thereby.

35. A method for transferring information between multiple programs operating concurrently in a computer system as recited in claim 33 wherein at least one of said steps of transmitting includes transmission across a network which interconnects a plurality of processors within said computer system.

36. A method for transferring information between multiple programs operating concurrently in a computer system as recited in claim 33 including the step of deleting the information code corresponding to said produced information from said list for said identified first application program after said information in said produced template has been transmitted so said identified first application programs.

37. A method for transferring information between multiple programs operating concurrently in a computer system as recited in claim 33 including the steps of:

said application program producing a second template which includes information and said information code, transmitting said second produced template to said dispatcher program, comparing the information code in said second produced template with the information code registered with said dispatcher program to find a match which identifies said first application program which was registered to receive the type or collection of information indicated by the information code in said second produced template, and transmitting at least the information in said second produced template to said first application program.

38. A method for transferring information between multiple programs operating concurrently in a computer system as recited in claim 33 wherein the entirety of said produced template is transmitted to said identified first application program.

39. A method of transferring information between multiple programs operating concurrently in a computer system, the method comprising the computer-executed steps of:

registering templates and application program identifications by information-using application programs during execution on said computer system with a dispatcher program, wherein each of said registered templates corresponds to at least one of said information-using application programs, each of said templates comprising a set of fields which includes in one field a template format code which defines a specific type or collection of said information, at least one data field to contain, when filled, data corresponding to the information defined by the information code in the template, and a field for a template matching key which references a specific data field in the corresponding template, producing a list comprising at least one of said templates and corresponding ones of said program identifications, producing one of said templates by an information-generating application program during execution on said computer system wherein said produced template includes in the at least one data field the information specified for that template and the corresponding one of said template format codes, providing said produced template to said dispatcher program, comparing the information specified by the template matching keys in said list to the corresponding information in the produced template to find template matches which identify at least one of said information-using application programs by said application program identifications and which have the information specified by the template matching key matching the corresponding information in the produced template, and transmitting at least the information in said produced template to each of said identified information-using application programs.

40. A method for transferring information between multiple programs operating concurrently in a computer system as recited in claim 39 wherein at least a part of the information in said produced template is an indicator of other information to be utilized by said identified application programs and said identified application program retrieves said other information by reference to said indicator for use thereby.

41. A method for transferring information between multiple programs operating concurrently in a computer system as recited in claim 39 wherein at least one of said steps of transmitting includes transmission across a network which interconnects a plurality of processors within said computer system.

42. A method for transferring information between multiple programs operating concurrently in a computer system as recited in claim 39 including the step of deleting the registered template corresponding to said produced template from said list for each of said identified application programs after at least the information in said produced template has been transmitted to each of said identified application programs.

43. A method for transferring information between multiple programs operating concurrently in a computer system as recited in claim 39 including the steps of:

producing a second one of said templates by an application program wherein said second produced template includes the information specified for that template and the corresponding one of said template format codes, transmitting said second produced template to said dispatcher program, comparing the information specified by the template matching keys in said list to the corresponding information in the second produced template to find template matches which identify at least one of said application programs by said application program identifications and which have the information specified by the template matching key matching the corresponding information in the produced template, and transmitting at least the information in said second produced template to each of said identified application programs.

44. A method for transferring information between multiple programs operating concurrently in a computer system as recited in claim 39 wherein the entirety of said produced template is transmitted to said identified application programs.

45. A method for transferring information between multiple programs operating concurrently in a computer system, the method comprising the computer-executed steps of:

registering templates and identifications for corresponding application programs by one of a plurality of information-using application programs executing on said computer system with a dispatcher program, each of said templates comprising a set of fields which includes in one field a template code which represents a specific type or collection of said information for that template, at least one data field defined for data corresponding to the information defined by the information code in the template, and a control field defined for and including specific information related to the corresponding application program, producing a list comprising at least one of said templates for at least one of said plurality of information-using application programs, producing one of said templates by an information-generating application program executing on said computer system wherein said produced template includes information in the data fields and the corresponding one of said template codes, transmitting said produced template to said dispatcher program, comparing the template code in said produced template with the template codes in said list to find matches which identify at least one of said information-using application programs which are registered in said list to receive the type or collection of information indicated by the template code in said produced template, and transmitting at least the information in the data fields of said produced template and the specific information in the control field of the matched, registered template to each of said identified information-using application programs.

46. A method for transferring information between multiple programs operating concurrently in a computer system as recited in claim 45 wherein at least a part of the information in said produced template is an indicator for other information to be utilized by said identified application programs and said identified application programs retrieve said other information by reference to said indicator for use thereby.

47. A method for transferring information between multiple programs operating concurrently in a computer system as recited in claim 45 wherein at least one of said steps of transmitting includes transmission across a network which interconnects a plurality of processors within said computer system.

48. A method for transferring information between multiple programs operating concurrently in a computer system as recited in claim 45 including the step of deleting the registered template corresponding to said produced template from said list for each of said identified application programs after said information in said produced template has been transmitted to each of said identified application programs.

49. A method for transferring information between multiple programs operating concurrently in a computer system as recited in claim 45 including the steps of:

producing a second of said templates by an application program wherein said produced template includes information and a corresponding one of said template codes, transmitting said produced template to said it dispatcher program, comparing the template code in said second produced template with the template codes in said list to find matches which identify at least one of said application programs which are registered in said list to receive the type or collection of information indicated by the template code in said second produced template, and transmitting at least the information in said second produced template and the specific information in the control field of the matched, registered second template to each of said identified application programs.

50. A method for transferring information between multiple programs operating concurrently in a computer system as recited in claim 45 wherein the entirety of said produced template is transmitted to said identified application programs.

51. An apparatus for transferring information between multiple programs operating concurrently in a computer system comprising:

registering means for registering at least one information code and an application program identification for each said information code by an information-using application program executing on said computer system with a dispatcher means to produce a list comprising at least one of said information codes and said application program identifications, each of said information codes representing a specific type or collection of said information and each of said application program identifications corresponding to one of said information-using application programs, said registering by said information-using application program being for the purpose of receiving information represented by said registered said at least one information code and without further requests on the part of said information-using application program, producing means for producing selected information and a corresponding information code by an information-generating application program executing on said computer system, transmitting means for transmitting said selected information and corresponding information code by said information-generating application program executing on said computer system to said dispatcher program, comparing means for comparing said information code which corresponds to said selected information with the information codes in said list to find matches which identify through said application program identification at least one of said information-using application programs which are registered in said list to receive the type or collection of information indicated by said information code which corresponds to said selected information, and transmitting means for transmitting at least said selected information to each of said identified information-using application programs.

52. The apparatus of claim 51 for transferring information between multiple programs operating concurrently in a computer system wherein said selected information is an indicator for other information to be utilized by said one or more identified application programs and said identified application programs retrieve said other information by reference to said indicator for use thereby.

53. The apparatus of claim 51 for transferring information between multiple programs operating concurrently in a computer system wherein at least one of said computer program means for transmitting includes means for transmission across a network which interconnects a plurality of processors within said computer system.

54. The apparatus of claim 51 for transferring information between multiple programs operating concurrently in a computer system including:

computer program means for deleting the registered information code corresponding to said selected information from said list for each of said identified application programs after said selected information has been transmitted to each of said identified application programs.

55. The apparatus of claim 51 for transferring information between multiple programs operating concurrently in a computer system further including:

computer program means for producing second selected information and a corresponding information code by an application program, computer program means for transmitting said second selected information and corresponding information code to said dispatcher program, computer program means for comparing said information code which corresponds to said second selected information with the information codes in said list to find matches which identify through said application program identification at least one of said application programs which is registered in said list to receive the type or collection of information indicated by said information code which corresponds to said second selected information, and computer program means for transmitting at least said second selected information to each of said identified application programs.

56. The apparatus of claim 51 for transferring information between multiple programs operating concurrently in a computer system wherein said computer program means for registering and computer program means for producing are initiated upon receipt of respective user commands.

57. The apparatus of claim 51 for transferring information between multiple programs operating concurrently in a computer system wherein the entirety of said selected information and corresponding information code are transmitted to said identified application programs.

58. An apparatus for transferring information between multiple programs operating concurrently in a computer system comprising:

registering means for registering at least one information code and an application program identification for each said information code by an information-using application program executing on said computer system with a dispatcher means to produce a list comprising at least one of said information codes and said application program identifications, each of said information codes representing a specific type or collection of said information and each of said application program identifications corresponding to one of said information-using application programs, said registering by said information-using application program being for the purpose of receiving information represented by said registered said at least one information code and without further requests on the part of said information-using application program, examining means for examining said list by a particular application program, which particular application program generates information corresponding to a particular one of said information codes, to determine if said particular information code is recorded in said list, producing means for producing a template by said particular information-generating application program executing on said computer system wherein said template comprises a set of fields which include said particular information code in one field and at least one data field defined for data corresponding to the information code in the template, said template produced only when said particular information code in said template has been determined to be recorded in said list, transmitting means for transmitting said produced template to said dispatcher program, comparing means for comparing said particular information code in said produced template with the information codes in said list to find matches which identify at least one of said information-using application programs which are registered in said list to receive the type or collection of information indicated by said particular information code in said produced template, and transmitting means for transmitting at least the information in said produced template to each of said identified information-using application programs.

59. The apparatus of claim 58 for transferring information between multiple programs operating concurrently in a computer system wherein the information in said produced template is an indicator for other information to be utilized by said identified application programs and said one or more identified application programs retrieve said other information by reference to said indicator for use thereby.

60. The apparatus of claim 58 for transferring information between multiple programs operating concurrently in a computer system wherein at least one of said computer program means for transmitting includes means for transmission across a network which interconnects a plurality of processors within said computer system.

61. The apparatus of claim 58 for transferring information between multiple programs operating concurrently in a computer system including computer program means for deleting the registered information code corresponding to said produced information from said list for each of said identified application programs after said information in said produced template has been transmitted to each of said identified application programs.

62. The apparatus of claim 58 for transferring information between multiple programs operating concurrently in a computer system further including:

computer program means for producing a second template by said particular application program wherein said second template includes information and the corresponding particular information code only when said particular information code has been determined to be recorded in said list, computer program means for transmitting said second produced template to said dispatcher program, computer program means for comparing said particular information code in said second produced template with the information codes in said list to find matches which identify at least one of said application programs which are registered in said list to receive the type or collection of information indicated by said particular information code in said produced template, and transmitting at least the information in said second produced template to each of said identified application programs.

63. A method for transferring information between multiple programs operating concurrently in a computer system as recited in claim 58 wherein the entirety of said produced template is transmitted to said identified application programs.

64. An apparatus for transferring information between multiple programs operating concurrently in a computer system, comprising:

registering means for registering templates and application program identifications by information-using application programs executing on the computer system with a dispatcher means to produce a list comprising at least one of said templates and corresponding ones of said program identifications, wherein each of said registered templates corresponds to at least one of said information-using application programs, each of said templates comprising a set of fields which includes in one field a template format code which defines a specific type or collection of said information at least one data field to contain, when filled, data corresponding to the information defined by the information code in the template, and a field for a template matching key which references a specific data field in the corresponding template, producing means for producing one of said templates by an information-generating-application program executing on the computer system wherein said produced template includes in the at least one data field the information specified for that template and the corresponding one of said template format codes, providing means for providing said produced template to said dispatcher program, comparing means for comparing the information specified by the template matching keys in said list to the corresponding information in the produced template to find template matches which identify at least one of said information-using application programs by 'said application program identifications and which have the information specified by the template matching key matching the corresponding information in the produced template, and transmitting means for transmitting at least the information in said produced template to each of said identified information-using application programs.

65. The apparatus of claim 64 for transferring information between multiple programs operating concurrently in a computer system wherein at least a part of the information to be utilized by said identified application programs and said identified application program retrieves said other information by reference to said indicator for use thereby.

66. The apparatus of claim 64 for transferring information between multiple programs operating concurrently in a computer system wherein at least one of said computer program means for transmitting includes computer program means for transmitting across a network which interconnects a plurality of processors within said computer system.

67. The apparatus of claim 64 for transferring information between multiple programs operating concurrently in a computer system including:

computer program means for deleting the registered template corresponding to said produced template from said list for each of said identified application programs after at least the information in said produced template has been transmitted to each of said identified application programs.

68. The apparatus of claim 64 for transferring information between multiple programs operating concurrently in a computer system including:

computer program means for producing a second one of said templates by an application program wherein said second produced template includes the information specified for that template and the corresponding one of said template format codes computer program means for transmitting said second produced template to said dispatcher program, computer program means for comparing the information specified by the template matching keys in said list to the corresponding information in the second produced template to find template matches which identify at least one of said application programs by said application program identifications and which have the information specified by the template matching key matching the corresponding information in the produced template, and computer program means for transmitting at least the information in said second produced template to each of said identified application programs.

69. The apparatus of claim 64 for transferring information between multiple programs operating concurrently in a computer system wherein the entirety of said produced template is transmitted to said identified application programs.

* * * * *

UNITED STATES PATENT AND TRADEMARK OFFICE

CERTIFICATE OF CORRECTION

PATENT NO. : 5,448,738

DATED : September 5, 1995

INVENTOR(S) : William E. Good, et al

It is certified that error appears in the above-indentified patent and that said Letters Patent is hereby corrected as shown below:

Column 25, line 27, insert the following appendices:

Signed and Sealed this

Seventh Day of October, 1997

Attest:

BRUCE LEHMAN

*Attesting Officer*

*Commissioner of Patents and Trademarks*

```
/*
C --- CHECKIN DATE: XX/XX/88
C --- MODULE NUMBER:      337001
C
C
CA    NAME:        PD
CA
CA
CA    FUNCTION:    Pointing Dispatcher Task
CA
CA
CA    APPLICATION /SUBSYSTEM: Pointing Dispatcher (pd) EXTERNAL
CA
CA
C     AUTHOR:      Marie Jansen
C
C
CA    LINKAGE:     cc pd.c -DRT /u/lgc/lib/libsubsy.a    \
CA                         -lsock -lbsd -o pd
CA                 OR
CA                 cc pd.c -DC386 /usr/lgc/lib/libsubsy.a   \
CA                         -lnsl_s -ltcp -o pd
CA
CA
CA    ARGUMENT
CA     NAME        USE   TYPE  DESCRIPTION
CA    --------     ---   ----  -----------
CA     none
CA
CA    1.    Invoke "pd" in separate shell or in background mode.
CA          Before pd can start up properly, the following MUST be present:
CA          (a)   network board (such as Ungerman-Bass or Micom)
CA          (b)   TCP/IP software must be installed (even if the machine is
CA                on a network of one, networking must be present and operational).
CA          (c)   The /etc/hosts file must exist and contain the local host name
CA                and address, in addition to the names and addresses of any other
CA                hosts to which a task might wish to connect.
CA          (d)   The /etc/services file must exist, and must have been edited to
CA                contain a line for pd as follows:
CA                        pd          2000/tcp
CA    2.    PD will continue running until either a fatal error occurs, or it
CA          receives an interrupt (Alt-Pause on the RT, if running in foreground).
CA          Anytime it receives a error when sending to or receiving from a
CA          client however, PD will NOT consider this to be a fatal error.
CA          Rather, it assumes the problem is on the client end, and simply
CA          removes that client from its list of connections, and motors on.
CA
CA
CA    RESTRICTIONS:     none
CA
CA
CA
```

```
c     PORTABILITY:        PORTABLE
c
c
c     METHOD:
c
c     1)    Calls pdintp to initialize the array of "pseudo" handles to -1.
c     2)    Calls pdintp to set up and initialize the main server handle.
c     3)    Sets up an handle ready array for the michki to find out if any
c           I/O is coming into PD from MI.
c     4)    Calls michki to check if data appeared at the main server handle.
c           If so, that means another task has performed a connect (i.e.,
c           it's trying to open a channel to the PD); therefore call
c           miacpt to accept the connection.
c     5)    For each pseudo handle existing in the array, check if data is
c           waiting to received, then call mirecv to actually receive that
c           data.
c     6)    Find the pseudo handle array index so that the data come in will
c           properly retrieved from or stored into the template saved table.
c     7)    For each message read in, determine the command code, then
c           act accordingly:
c           PDDATA (Data):
c                 Call pdmtch (1st for the permanent data matching
c                 templates, then for the temporary ones) to search each
c                 task's data matching templates to see if any match the data.
c                 If so, send the data to the owner of each matching template.
c                 If a temporary template matches the data, delete all temporary
c                 data matching templates belonging to that task.
c           PDTDMT (Temporary Data Matching Templates):
c                 Call pdadtm to add the template to the sending task's list
c                 of tdmt's.  Call pdmtchg, 1st for permanent template matching
c                 templates, then for the temporary ones, to search each task's
c                 list of template matching templates to see if any match the
c                 data matching template just received.  If so, send the tdmt
c                 to the owner of each matching template-matching-template.
c                 If a temporary template matches the tdmt, delete all temporary
c                 template matching templates belonging to that task.
c           PDPDMT (Permanent Data Matching Templates):
c                 Handled the same as PDTDMT, except the incoming template.is
c                 added to the pdmt list for the owning task.
c           PDTTMT (Temporary Template Matching Templates):
c                 Call pdadtm to add the template to the list of ttmt's for the
c                 task associated with the socket from which it was read in.
c                 Call pdtmpl, 1st for pdmts and them for tdmts, to search each
c                 task's list of data matching templates to see if any match the
c                 template matching template just received.  If so, send the
c                 data matching template to the owner of the ttmt just read in,
c                 and then delete the ttmt from the list (even though it was just)
c                 added).
c           PDPTMT (Permanent Template Matching Templates):
c                 Call pdadtm to add the template to the list of ptmt's for the
c                 task associated with socket from which it was read in.
c                 Continue as for the ttmt's except if any matches are made,
c                 do not delete the ptmt just read in, since it's permanent.
c           PDDTTM (Delete This Template Message):
c                 Find the template which matches the incoming one, and delete
c                 it.
```

```
c           PDDAPT (Delete All Permanent Templates):
c                 Call pddltm for the 2 lists of permanent templates.
c           PDDATT (Delete All Temporary Templates):
c                 Call pddltm for the 2 lists of temporary templates.
c           PDDATM (Delete All Template Messages):
c                 Call pddltm for each list of templates belonging to this task
c                 (pdmts, tdmts, ptmts, ttmts).
c           PDFLPD (Flush PD output):
c                 Handled completely by pdwrt; this task should never see this
c                 command.
c           PDOPCH (Open Channel):
c                 Handled completely by pdwrt; this task should never see this
c                 command.
c           PDCLCH (Close Channel):
c                 Set the pseudo handle number in the array to -1 (so that
c                 the entry will be freed).  Delete all templates belonging
c                 to the task associated with this handle.
c
c
c      REVISED:
c      1.  01/25/88 -- MSJ -- Initial release.
c      2.  02/15/88 -- MSJ -- Removed commands for Match all Templates and Match
c                  all Data, because I realized that by writing a template with
c                  pdkey = 0 you can match anything.  Added command for Delete
c                  all Permanent Templates and Delete This Template.
c      4.  02/26/88 -- MSJ -- Changed up error handling, so that pd wouldn't
c                  exit because of problems with send or receives, but instead
c                  just close that client socket.  Added handling for byte-
c                  swapping, including some initial handshaking with a
c                  client first connects.
c      5.  03/09/88 -- MSJ -- Added handling for the PDDATT and PDFLPD commands.
c      6.  03/29/88 -- EEA -- Changed error return call to 'ohnooo'
c      7.  07/14/86 -- WKH -- The following items were implemented to replace
c                  the direct LAN communication by going through the MI
c                  subsystem:
c                  a.  Renamed pd error code to be prefixed by PD according
c                      to the defines in pd.h.
c                  b.  Replaced pdintp and points by misint.
c                  c.  Replaced pdsacc by miacpt.
c                  d.  Included files midefs.h and nwdefs.h
c                  e.  Passed in server handle as input argument to pdserr
c                  f.  Changed all references to socket by reference to handle
c                  g.  Added server handle and ready handle arrays.
c                  h.  Added logic to used pseudo handle array index to index into
c                      template saved table.
c                  i.  Modified PDCLDH case logic to free server pseudo handle i
c                      array entries entries.
c                  j.  Updated documentation cc new standard.
c
c
c------------------------------------------------------------------------------
c     Copyright (C) 1987, 1988, LANDMARK GRAPHICS CORP.
c     All rights Reserved.
c------------------------------------------------------------------------------
c
```

```
*/

#include <lgc/lgcdef.h>
#include <lgc/pd.h>
#include <lgc/nwdefs.h>
#include <lgc/midefs.h>

extern void pdintp_ ();              /* Initialize PD parameters */
extern void pdserr_ ();              /* PD error handling routine */
extern void pdadtm_ ();              /* Add template to saved list */
extern void pdmtch_ ();              /* Search template matching templates */
extern void pdtmpl_ ();              /* Search data matching templates */
extern void pdclsc_ ();              /* Close a connection to PD */
extern void pddttm_ ();              /* Delete PD templates */
extern void pdddpe_ ();              /* Test for duplicate PD templates */

extern void misint_ ();              /* MI server initialization */
extern void michki_ ();              /* MI check if I/O ready at any PD handles */
extern void miacpt_ ();              /* Accept a connection request at PD */
extern void mirecv ();               /* Receive data into PD */

/* Pointing Dispatcher */

main()
{
      long srvhdl [NW_MXHL];   /* file handle for network communication */
      long numsrv;             /* number of handle allocated for server */
      long numhdl;             /* number of handle to check */
      long rdyarr [NW_MXHD+1];/* array of handle ready for input */
      struct MI_DSC mibuf;     /* MI buffer structure */
      pdtmplt msg;             /* PD template structure */

      /*
            local variables
            */
      long hdlmatch;           /* flag for a connected handle matches an input
                                  ready handle */
      long hdlccnt;            /* count of connected handles */
      long freeslot;           /* free slot in the handle array */
      char nodnam [64];        /* node name */

      long module = 100;       /* module number for error reporting */
      long pdhand;             /* pointing dispatecher server handle ID */
      long handindx;           /* index of the handle from which data was read */
      long flgidx;             /* index into mi buffer fld array bytes */
      long psindx;             /* index into the pseudo handle array */
      long idx;                /* temporary indx variable */
      long msgtyp;             /* used with mirecv, set to false when a server
                                  handle is received */
      long type;               /* permanent or temporary template type */
      long ier;                /* error code */
      tmpltlst **tmpltptr = NULL; /* current template pointer (list processing) */

      /*
            Next is array of "pseudo" handle structures; these handless are the
```

```
      ones that the server actually uses to communicate (read/write) with
      the client handles, because the main server handle can only do accepts.
*/
pdrwhand pseudhand [NW_MXHL];

/*
      Initialize the pseudhand array of structures to all -1
*/
pdinto_ psuedhand;

/*
      Initial handle array, MW_MXHL is the maximum MI handle number
      for a process
*/
for (handindx = 0; handindx < NW_MXHL; srvhdl[handindx++] = -1);

/*
      Initialize pointing dispatcher server MI handles, pd always connect
      to local hose, therefore hostname for misint is '\0'
      */
nodnam[0] = NULL;
misint_ (nounam, "pd", srvhdl, &numsrv,&ier);
if (ier !=SUCCESSFUL)
      {
      ohnoo_(&ier,
        'pd: failed on call to misint");
      exit ();
      }
else

numhdl = numsrv;
/*
      Process Pointing Dispatcher request
      */
for (,;,
      {
     /*
      Check for data waiting to come into PD at any of the MI handle
      */

      michki_ (&numhdl,srvhdl,rdyarr,&ier);

      if (ier !=SUCESSFUL)
         {
         ohnoo_(&ier,
              "pd: failed on call to michki, to check MI handle");
              break;
         }

      /*
            If any element in the rdyarr array is greater than -1, then
            there is data coming into PD from MI, rdyarr terminates with an
            -1 entry
            */
            nandindx = 0;
```

```
while (rdyarr[handindx] >= 0)
    {
    msgtyp = TRUE;
    for (hdlccnt = 0; hdlccnt < numsrv; hdlccnt++)
        {
        if (rdyarr[handindx] == servhdl[hdlccnt])
            {
            msgtyp = FALSE;
            /*
              Search for a free slot in the server array
            */
            for (freeslot=0; freeslot <numhdl; freeslot++)
                 if (srvhdl[freeslot] < 0) break;

            /*
              If no more slot available in handle array, just loop
              Till slot is available.  Perhaps some handle may get
              closed eventually and free up the slots
            */
            if (freeslot == NW_MXHL)
                {
                ier = PD_HANDLE_FULL;
                ohnooo_ (&ier,"pd: no more empty slot for handle");
                break;
                }

            /*
              Accept the new handle for connection into the free slot
              of the server handle array
            */
           miacpt_ (&srvndl[hdlccnt],&srvhdl[freeslot],&ier);
           if (ier != SUCCESSFUL)
              {
              ohnoo_(&ier, "pd: failed to call on miacpt");
              break;
              }
           else
              if (freeslot >= numhdl) numhdl = freeslot + 1;
           }
        }
/*
      The data comming in does not ask for a connection to be made, it
      is from already connected handle, so data is a message type.
*/

if (msgtyp == TRUE)
   {

   /*
      Get the message from MI
   */
      mirecv (&rdyarr[handindx], &mibuf, &ier);
      if (ier != SUCCESSFUL)
         {
         ohnoo_ (&ier, "pd: failed to call mirecv");
```

```
        rdyarr[handindx] = -1;
        break;
       }


    /*
       Check correct number of long from the MI_buffer, has
       to have at least one long integer for the pdcmd
    */
    if ((mibuf.n_lng < 1) || (mibuf.lng_arr[0].nelem < 1))
       {
        ier = PD_MIBUF_WRONG;
        ohnooo_ (&ier,
                 "pd: Incorrect data in MI input buffer");
        rdyarr[handindx] = -1;
        break;
       }

    /*
       Move all long integer data from the MI buffer to
       the PD temporary template
    */
    msg.pdcmd = mibuf.lng_arr[0].arr_ptr[0];

    if ((mibuf.n_lng >= 2) && (mibuf.lng_arr[1].nelem >= 1))
       msg.pdkey = mibuf.lng_arr[1].arr_ptr[0];

    if ((mibuf.n_lng >= 3) && (mibuf.lng_arr[2].nelem >= 1))
       {
        for (fldidx=0; fldidx<mibuf.lng_arr[2].nelem; fldidx++)
            msg.pdfld[fldidx] = mibuf.lng_arr[2].arr_ptr[fldidx];

        if (mibuf.lng_arr[2].nelem < 32)
           for (fldidx=mibuf.lng_arr[2].nelem; fldidx<32; fldidx++)
               msg.pdfld[fldidx] = 0;
       }
    else
       for (fldidx = 0; fldidx < 32; fldidx++)
             msg.pdfld[fldidx] = 0;

    /*
       Move function pointer from MI buffer to PD
       temporary template
    */
    if ((mibuf.n_ptr >= 1) && (mibuf.l_ptr >= 1))
         bcopy(mibuf.ptr_arr, (char *) &msg.pdrtn, mibuf.l_ptr/8);
    else msg.pdrtn = (pvoidfn) NULL;

    /*
       Find a pseudo handle array entry which handle number is
       the same as the rdyarr handle number. If a match is found,
       means the handle has been previously saved in the table
    */
    psindx = -1;
    for (idx=0; idx<NW_MXHL; idx++)
        {
```

```
            if (pseudhand[idx].handle == rdyarr[handindx])
                {
                 psindx = idx;
                 break;
                }
          }

    /*
       If there is no match between the pseudo handle array handle
       number with the rdyarr array handle number, a free entry is
       needed to be found for possible storing  the handle. So find
       the first pseudo array with handle number equal to -1. Note
       that there may be free entries among the non-free entries.
    */
    if (psindx == -1)
       {
       for (idx=0; idx<NW_MXHL; idx++)
            if (pseudhand[idx].handle == -1)
               {
                psindx = idx;
                break;
               }
       }

    /*
        No available free entry into the pseudo handle array
        and no match, then too many handle has been opened
    */
    if (psindx == -1)
       {
        ier = PD_HNARRY_FULL;
        ohnooo_ (&ier, "pd: Too many handles have been opened");
        break;
       }

   /*
        Base on the PD type dispatch Information
     */
     switch (msg.pdcmd)
          {
           /* data */
           case PDDATA:
                /*
                   first, search the permanent templates
                   to see if any match the data just received.
                */

                type = PDPDMT;
                pdmtch_ (&msg, &mibuf, pseudhand, &type, &ier);
                if (ier == PDMTCH_INVL_TYPE)
                     {
                      /* If type was invalid, there's a bug in
                         pd, so exit!
                      */
                      pdserr_ (srvhdl, &numsrv, &pdhand,
"pd: failed on call 1 to pdmtch for PDDATA: invalid type", &ier);
```

```
                exit();
              }
          else if (ier != SUCCESSFUL)
              {
               /* There must be some problem with the client,
                  so remove the client and go on to the next
                  input.
               */
               pdclsc_ (&rdyarr[handindx], pseudhand);
               for (idx=0; idx<numhdl; idx++)
                   if (rdyarr[handindx] == srvhdl[idx])
                       {
                        srvhdl[idx] = -1;
                        break;
                       }
               break;
              }
          /*
             Now search the temporary templates
          */

          type = PDTDMT;
          pdmtch_ (&msg, &mibuf, pseudhand, &type, &ier);
          if (ier == PDMTCH_INVL_TYPE)
              {
               pdserr_ (srvhdl, &numsrv, &pdhand,
       "pd: failed on call 2 to pdmtch for PDDATA", &ier);
               exit ();
              }
          else if (ier != SUCCESSFUL)
              {
               pdclsc_ (&rdyarr[handindx], pseudhand);
               for (idx=0; idx<numhdl; idx++)
                   if (rdyarr[handindx] == srvhdl[idx])
                       {
                        srvhdl[idx] = -1;
                        break;
                       }
               break;
              }
      break;

      /* temporary data matching template */
      case PDTDMT:
          /*
             Make sure the template isn't a duplicate.
          */
          pddupe_ (&msg, &psindx, pseudhand, &ier);
          if (ier == PDDUPE_MATCH)
              {
               ohnooo_ (&ier,
"pd: new template matches already existing one; new one ignored");
               break;
              }
          /*
             Get memory for the new template, and
```

```
                   add it to the temporary data template list.
                */
                pseudhand[psindx].handle = rdyarr[handindx];

                pdadtm_ (&msg, &pseudhand[psindx].tdmt, &ier);
                if (ier != SUCCESSFUL)
                   {
                    /* The only error that can occur is a malloc
                       problem, so something is bad wrong!
                    */
                    pdserr_ (srvhdl, &numsrv, &pdhand,
"pd: failed on call to pdadtm, to add new temporay templates", &ier);
                    exit ();
                   }

                /*
                   Now search the list of temporary template
                   matching templates for a match.  For each
                   match, send the tdmt to the owner of the
                   matching template matching template, then
                   delete the temporary tmt.
                */

                type = PDTTMT;
                pdmtch_ (&msg, &mibuf, pseudhand, &type, &ier);
                if (ier == PDMTCH_INVL_TYPE)
                   {
                    /* if type is invalid, there must be a
                       weird bug in this task, so exit!
                    */
                    pdserr_ (srvhdl, &numsrv, &pdhand,
         "pd: failed on call 1 to pdmtch for PDTDMT", &ier);
                    exit ();
                   }
                else if (ier != SUCCESSFUL)
                   {
                    /* There must be a problem with the client
                       so remove it from the list, and go on.
                    */
                    pdclsc_ (&rdyarr[handindx], pseudhand);
                    for (idx=0; idx<numhdl; idx++)
                        if (rdyarr[handindx] == srvhdl[idx])
                           {
                            srvhdl[idx] = -1;
                            break;
                           }
                    break;
                   }
                /*
                   Now search the list of permanent template
                   matching templates for a match.  For each
                   match, send the pdmt to the owner of the
                   matching ptmt.
                */
                type = PDPTMT;
                pdmtch_ (&msg, &mibuf, pseudhand, &type, &ier);
```

```
                if (ier == PDMTCH_INVL_TYPE)
                   {
                    pdserr_ (srvhdl, &numsrv, &pdhand,
          "pd: failed on call 2 to pdmtch for PDTDMT", &ier);
                    exit ();
                   }
                else if (ier != SUCCESSFUL)
                        {
                         pdclsc_ (&rdyarr[handindx], pseudhand);
                         for (idx=0; idx<numhdl; idx++)
                              if (rdyarr[handindx] == srvhdl[idx])
                                 {
                                  srvhdl[idx] = -1;
                                  break;
                                 }
                         break;
                        }
                break;

                /* permanent data matching template */
             case PDPDMT:
                /*
                   Make sure the template isn't a duplicate.
                */
                pddupe_ (&msg, &psindx, pseudhand, &ier);
                if (ier == PDDUPE_MATCH)
                     {
                      ohnooo_ (&ier,
 "pd: new template matches already existing one; new one ignored");
                      break;
                     }
                /*
                   Get memory for the new template, and
                   add it to the list.
                */
                pseudhand[psindx].handle = rdyarr[handindx];
                pdadtm_ (&msg,&pseudhand[psindx].pdmt, &ier);

                if (ier != SUCCESSFUL)
                   /* The only error is a malloc problem, so
                      get the heck out of here!
                   */
                     {
                      pdserr_ (srvhdl, &numsrv, &pdhand,
 "pd: failed on call to pdadtm, to add new permanent templates ", &ier);
                      exit ();
                     }

                /*
                   Now search the list of temporary template
                   matching templates for a match.  For each
                   match, send the pdmt to the owner of the
                   matching template matching template, then
                   delete the temporary tmt.
                */
                type = PDTTMT;
```

```
        pdmtch_ (&msg, &mibuf, pseudhand, &type, &ier);

        if (ier == PDMTCH_INVL_TYPE)
           {
            /* If type was bad, there's some weird
               bug in pd, so get outta here!
            */
            pdserr_ (srvhdl, &numsrv, &pdhand,
"pd: failed on call 1 to pdmtch for PDPDMT", &ier);
            exit ();
           }
        else if (ier != SUCCESSFUL)
            {
             /* There must be a problem with the client,
                so remove the client handle, and go on.
             */
             pdclsc_ (&rdyarr[handindx], pseudhand);
             for (idx=0; idx<numhdl; idx++)
                  if (rdyarr[handindx] == srvhdl[idx])
                     {
                      srvhdl[idx] = -1;
                      break;
                     }
             break;
            }
        /*
           Now search the list of permanent template
           matching templates for a match.  For each
           match, send the pdmt to the owner of the
           matching ptmt.
        */
        type = PDPTMT;
        pdmtch_ (&msg, &mibuf, pseudhand, &type, &ier);
        if (ier == PDMTCH_INVL_TYPE)
           {
            pdserr_ (srvhdl, &numsrv, &pdhand,
"pd: failed on call 2 to pdmtch for PDPDMT", &ier);
            exit ();
           }
        else if (ier != SUCCESSFUL)
            {
             pdclsc_ (&rdyarr[handindx], pseudhand);
             for (idx=0; idx<numhdl; idx++)
                 if (rdyarr[handindx] == srvhdl[idx])
                    {
                     srvhdl[idx] = -1;
                     break;
                    }
             break;
            }
    break;

    /* temporary template matching template */
    case PDTTMT:
       /*
          Make sure the template isn't a duplicate.
```

```
    for (type = PDTDMT; type < PDDTTM; type--)
        {
         if (type == PDTDMT)
             tmpltptr = &pseudhand[psindx].tdmt;
         else if (type == PDPDMT)
             tmpltptr = &pseudhand[psindx].pdmt;
         else if (type == PDTTMT)
             tmpltptr = &pseudhand[psindx].ttmt;
         else if (type == PDPTMT)
             tmpltptr = &pseudhand[psindx].ptmt;
         pddttm_ (&msg, tmpltptr, &ier);
         if (ier != SUCCESSFUL)
             {
              /* there are currently no errors that
                 can be returned, so assume a bug!
              */
              poserr_ (srvhdl, &numsrv, &pdhand,
                 "pd: failed on call to pddttm", &ier);
              exit ();
             }
        }
break;

/* delete all permanent templates */
case PDDAPT:
    pddltm_ (&pseudhand[psindx].pdmt);
    pddltm_ (&pseudhand[psindx].ptmt);
break;

/* delete all temporary templates */
case PDDATT:
    pddltm_ (&pseudhand[psindx].tdmt);
    pddltm_ (&pseudhand[psindx].ttmt);
break;

/* delete all templates for this task */
case PDDATM:
    pseudhand[psindx].handle = -1;
    pddltm_ (&pseudhand[psindx].pdmt);
    pddltm_ (&pseudhand[psindx].tdmt);
    pddltm_ (&pseudhand[psindx].ptmt);
    pddltm_ (&pseudhand[psindx].ttmt);
break;

/* flush this PD output FIFO */
case PDFLPD:
    /* handled by pdwrt; should never by seen by pd */
break;

/* open (initialize) channel */
case PDOPCH:
    /* handled by pdwrt_ function */
break;

/* close channel */
case PDCLCH:
```

```
                        */
                        pddupe_ (&msg, &psindx, pseudhand, &ier);
                        if (ier == PDDUPE_MATCH)
                            {
                             ohnooo_ (&ier,
    "pd: new template matches already existing one; new one ignored");
                             break;
                            }
                        /*
                           Get memory for the new template, and
                           add it to the temporary template template list.
                        */
                        pseudhand[psindx].handle = rdyarr[handindx];
                        pdadtm_ (&msg, &pseudhand[psindx].ttmt, &ier);
                        if (ier != SUCCESSFUL)
                            {
                             /* The only error is a malloc problem,
                                so get out of here!
                             */
                             pdserr_ (srvhdl, &numsrv, &pdhand,
"pd: failed on call to pdadtm, to add new temporary template (ttmt)", &ier);
                             exit ();
                            }

                        /*
                           Now search the list of data
                           matching templates for a match.  For each
                           match, send the dmt to the owner of the
                           incoming template matching template, then
                           delete the tmt if it's temporary.
                        */
                        type = PDTTMT;
                        pdtmpl_ (&mibuf, &msg, pseudhand,
                                 &rdyarr[handindx], &type, &ier);
                        if (ier != SUCCESSFUL)
                            {
                             /* There must have been a problem with the
                                client on the send, so remove the client.
                             */
                             pdclsc_ (&rdyarr[handindx], pseudhand);
                             for (idx = 0; idx < numhdl; idx++)
                                 if (rdyarr[handindx] == srvhdl[idx])
                                     {
                                      srvhdl[idx] = -1;
                                      break;
                                     }
                             break;
                            }
                    break;

                    /* permanent template matching template */
                    case PDPTMT:
                        /*
                           Make sure the template isn't a duplicate.
                        */
                        pddupe_ (&msg, &psindx, pseudhand, &ier);
```

```
                    if (ier == PDDUPE_MATCH)
                        {
                         ohnooo_ (&ier,
"pd: new template matches already existing one; new one ignored");
                         break;
                        }
                    /*
                       Get memory for the new template, and
                       add it to the permanent template template list.
                    */
                    pseudhand[psindx].handle = rdyarr[handindx];
                    pdadtm_ (&msg, &pseudhand[psindx].ptmt, &ier);
                    if (ier != SUCCESSFUL)
                       {
                        /* The only error that can occur is a malloc
                           problem, so get outta here!
                        */
                        pdserr_ (srvhdl, &numsrv, &pdhand,
"pd: failed on call to pdadtm, to add new permanent template (ptmt)", &ier);
                        exit ();
                       }

                    /*
                       Now search the lists of data
                       matching templates for a match.  For each
                       match, send the dmt to the owner of the
                       incoming template matching template, then
                       delete the tmt if it's temporary.
                    */
                    type = PDPTMT;
                    pdtmpl_ (&mibuf, &msg, pseudhand, &rdyarr[handindx],
                             &type, &ier);
                    if (ier != SUCCESSFUL)
                       {
                        /* There must have been a problem with the
                           client on the send, so close the client.
                        */
                        pdclsc_ (&rdyarr[handindx], pseudhand);
                        for (idx=0; idx<numhdl; idx++)
                            if (rdyarr[handindx] == srvhdl[idx])
                               {
                                srvhdl[idx] = -1;
                                break;
                               }
                        break;
                       }
                break;

                /* delete the match of this template message */
                case PDDTTM:
                    /*
                       Check each of the template types for a match.
                       Take advantage of the fact that the numeric
                       values for the 4 types are in ascending,
                       sequential order.
                    */
```

```
                    /*
                       Remove the pseudo-handle from the table,
                       shut it down and close it, and delete all
                       of the templates associated with it. Also
                       the server slot which stores the client
                       connection handle

                    */

                    pdclsc_ (&rdyarr[handindx], pseudhand);

                    ror (lax=0; ldx,<numhdl; idx_)
                        {
                        if (rdyarr [handindx] == srvhdl[idx])
                            {
                            srvhdl[idx] = -1;
                            break;
                            }
                        {

                    /* make sure we break out of the pdrecv loop */
                 break;

                 default:
                     ier = PD_INVAL_CMD;
                     ohnooo_(&ier, "pd:  received invalid PD Command");
                 break;

                } /* end of the switch */
            } /* end of if msgtyp is true */
         handindx++; /* increase ready handle index */
        } /* end of while to check each handle for data */
     } /* end of while to check each handle for data */
   } /* end of forever loop */
} /* end of main for loop */
```

```
/*
C --- CHECKIN DATE: xx/xx/88
C --- MODULE NUMBER: 370014
C
C
CA Name:          PDINTP
CA
CA
CA FUNCTION:      Initialize array of socket structure handled by PD
CA
CA
CA APPLICATION/SUBSYSTEM:     Pointing Dispatcher (pd) INTERNAL
CA
CA
C  AUTHOR:      Marie Jansen
C
C
CA LINKAGE:    pdintp_ (pshand);
CA
CA
CA ARGUMENT
CA   NAME       USE    TYPE    DESCRIPTION
CA --------     ---    ---     -----------
CA pshand       I      pdrwhand[]
CA                             Array of "pseudo" socket structures.
CA                             NW_MXHL is number of elements
CA
CA
CA NOTES:   none
CA
CA
CA RESTRICTIONS:  none
CA
CA PORTABILITY:   PORTABLE
C
C
C  METHOD:
C
C  For each element of the array, set all structure members to either
C  zero or NULL.
C
C
C  Revised:
C
C  1. 01/25/88 -- MSJ -- Initial release.
C  2. 02/26/88 -- MSJ -- Changed NUM_FD_BITS to PD_FD_BITS_NUM>
C  3. 03/28/88 -- EEA -- Changed error return call to 'ohnooo'
C  4. 08/24/88 -- WHK -- The following were implemented to use the
C                        MI and NW subsystems:
C                        a. Included the NW structures
C                        b. Changed PD_FD_BITS_NCM to NW_MXHL.
C                        c. Changed pssock to pshand.
C                        d. Changed pdrwsock to pdrwhand.
C
C
```

```
C-------------------------------------------------------------------------------
C     Copyright (C) 1987, 1988, LANDMARK GRAPHICS CORP.
C     All rights reserved.
C-------------------------------------------------------------------------------
C
*/

#include <lgc/lgcdef.h>
#include <lgc/ph.h>
#include <lgc/nwdefs.h>

void pdintp_ (pshand)
/*
   An array of "psuedo" handle structure; these handles are the
   ones that the server actually uses to communicate (read/write) with
   the client handles, because the main server handle can only do acctps.
*/
pdrwhand pshand[];

{
    long ier;           /* local error code */
    long i;             /* index variable */

    /*
       Make sure the entire array is initialized to either -1 or NULL
    */
    for (i = 0; i < NW_MXHL; i--)
        {
        pshand[i].handle = 1;          /* "pseudo" handle ID */
        pshand[i].pdmt = NULL;         /* beginning of list of templates */
        pshand[i].tdmt = NULL;         /*    "    "    "    "    "     */
        pshand[i].ptmt = NULL;         /*    "    "    "    "    "     */
        pshand[i].ttmt = NULL;         /*    "    "    "    "    "     */
       {

    ler = SUCCESSFUL;
    ohnooo_ (&ier, "pdintp: completed successfully");
    return;

 }
```

```
/*
C --- CHECKIN DATE: xx/xx/88
C --- MODULE NUMBER    37008
C
C
CA NAME:    PDSERR
CA
CA
CA FUNCTION: Close off all handles in the pseudo handle table and
CA           all server handles, and send error message in event of
CA           an error within the pd task.
CA
CA
CA APPLICATION/SUBSYSTEM:   Pointing Dispatcher (pd) INTERNAL
CA
CA
C  AUTHOR:    Marie Jansen
C
C
CA LINKAGE:   void pdserr_ (pdsock, pssock, level, msg, ier);
CA
CA
CA ARGUMENT
CA   NAME      USE     TYPE     DESCRIPTION
CA --------    ---     ----     -----------
CA srvhdl      I       long[]   server handle array.
CA numsrv      I       long*    number or server handles in the server handle
CA                              array to be closed
CA psnand      I       pdrwhand[]
CA                              Array of "pseudo" handle structures
CA                              (connections to clients). NW_MXHL is the length
CA                              of the array.
CA msg         I       char *   Message to be sent to ohnooo.
CA ier         I       long     Error code to be sent to ohnooo.
CA
CA
CA NOTES:   none
CA
CA
CA RESTRICTIONS:
CA
CA 1. This is only for the use of the main pd task. It is not
CA    useful for any other routines or applications.
CA
CA
C  PORTABILITY:   PORTABLE
C
C
C  METHOD:
C
C  1)Close each of the existing pd pseudo handles.
C  2)Close the main pd server handles.
C  3) Call ohnooo
C
C
C  REVISED:
```

```
c
c 1. 01/25/88 -- MSJ -- Initial release
c 2. 02/26/88 -- MSJ -- Changed NUM_FD_BITS to PD_FD_BITS_NUM. Also,
c                       added a call to snutoown on the sockets.
c 3. 03/28/88 -- EEA -- changed error return call to 'ohnooo'
c 4. 07/14/88 -- WKH -- The following items are implemented to use the
c                       MI and NW subsystem instead of direct interface with
c                       the network:
c                       a: Replaced direct calls to network functions by calls
c                          to the MI subsystem.
c                       b: Include NW definitions.
c                       c: Replaced all references to socket by references
c                          to handle and closed handles instead of sockets.
c                       d: Updated documentation to new standard.
c
c
c-------------------------------------------------------------------------------
c   Copyright (C) 1987, 1988, LANDMARK GRAPHICS CORP.
c   All rights reserved.
c-------------------------------------------------------------------------------
c
*/

#include <lgc/lgcdef.h>
#include <lgc/pd.h>
#include <lgc/nwdefs.h>

extern void miclos_ ():

void pdserr_ ( srvhdl, numsrv, pshand, msg, ier )
/*
   An array of "server" handles and the number of handles assigned to
   the PD subsystem by MI at time of misint is called
*/
long srvhdl [NW_MXHL];
long *numsrv;

/*
   Next is an array of "pseudo" handle structures; these handles are the
   ones that the server actually uses to communicate (read/write) with
   the client handles, because the main server handle can only do accepts.
*/
pdrwhand *pshand[];
char *msg;      /* error message to be sent to ohnooo */
long *ier;      /* error code */

{
     long handindx;       /* index of the handle to be closed */
     long errflag;        /* local error flag, set to 1 if any error came */
                          /* back for miclos */

 /*
 Close each existing (non-negative) "pseudo" handle.
 */
 errflag = 0;
 for (handindx = 0; handindx < NW_MXHL; handindx++)
```

```
        {
         if (pshand[handindx]->handle >= 0)
            {
            miclos_ (pshand[handindx]->handle, ier);
            if (ier != 0)
               {
               ohnooo_ (ier, msg);
               errflag = 1;
               }
            }
         }
  /*
      close each existing (non-negative) "server" handle
  */
  ior (handindx =0; handindx <*numsrv; handindx++)
      {
      if (srvhdl[handinds] >=0)
         {
         miclos (servhdl[handindx], ier);
         if (ier != 0)
              {
              ohnooo_ (ier, msg);
              errflag = 1;
              }
           }
         }

     if (errflag ==0)
        ohnooo_ (&errflag, "pdserr: completed successfully");
     return;
}
```

```
/*
C --- CHECKIN DATE: xx/xx/88
C --- MODULE NUMBER    37012
C
C
CA NAME:    PDADTM
CA
CA
CA FUNCTION: Add a new templae to the list.
CA
CA
CA APPLICATION/SUBSYSTEM:   Pointing Dispatcher (pd) INTERNAL
CA
CA
C  AUTHOR:    Marie Jansen
C
C
CA LINKAGE:   Pdadtm_ (datptr, lsptr, ier);
CA
CA
CA ARGUMENT
CA   NAME     USE    TYPE    DESCRIPTION
CA --------   ---    ----    -----------
CA datptr     I      pdtmpl *
CA                           Pointer to the data message.
CA lsptr      I      tmpltlst **
CA                           Pointer to the first element of
CA                           the template array.
CA ier       O     long*     0 = successfully completed.
CA                           337001201 = malloc failed.
CA
CA
CA NOTES:   none
CA
CA
CA RESTRICTIONS: none
CA
CA
C  PORTABILITY:   PORTABLE
C
C  METHOD:
C
C  1) Reset the pointers in the linked list in order to add the
C     new template to the beginning of the indicated list.
C  2) Copy the information over from the pd message to the template
C     storage.
C
C
C  REVISED:
C
C 1. 01/25/88 -- MSJ -- Initial release.
C 2. 03/28/88 -- EEA -- changed error return call to 'ohnooo'
C 3. 07/14/88 -- WKH -- Renamed error code to be prefixed by PD as
C                       defined in "pd.h" and updated documentation
                        to new standard.
```

```
c
c
c------------------------------------------------------------------------------
c   Copyright (C) 1987, 1988, LANDMARK GRAPHICS CORP.
c   All rights reserved.
c------------------------------------------------------------------------------
c
*/

#include <lgc/pd.h>
#include <lgc/pd.h>

void pdadtm_ (datptr, lstptr, ier)

pdtmplt   *datptr;      /* pointer to the pd shortened data message */
tmpltlst **lstptr;      /* pointer to beginning of list of templates */
long *ier;        /* error code */

{
   tmpltlst *tmpltptr; /* current poiner within template list */
   long module = 1200; /* module number, for error code purposes */
   long i, k;          /* index variables */

   /*

     Allocate storage for the new template.
   */
   if (( tmpltptr = (tmpltlst *) malloc (sizeof (tmpltlst)) ) == NULL)
       {
       *ier = PDADTM_MALLOC_ER;
       ohnooo_ (ier, "pdadtm: failed on malloc for new template");
       return;
       }

  /*
    Add the new template to the beginning of the template list.
  */
  tmpltptr->nexttmplt = *lstptr;
  *lstptr = tmplptr;

  /*
    Copy the infromation from the pd message to the template storage.
  */
  (*lstptr)->pdmsg.pdcmd = datptr->pdcmd;
  (*lstptr)->pdmsg.pdkey = datptr->pdkey;
  (*lstptr)->pdmsg.pdrtn = datptr->pdrtn;

  for (i =0; i < 32; i++)
      (*lstptr)->pdmsg.parld[i] = datptr->parld[i];

  *ier = SUCCESSFUL;
  ohnooo_ (ier, "pdadtm: completed successfully");
  return;
```

```
/*
C --- CHECKIN DATE: 03/09/88
C --- MODULE NUMBER   370009
C
C
CA NAME:     PDMTCH
CA
CA
CA FUNCTION: Search for a template matching the message received.
CA           Handle appropriately if match found.
CA
CA
CA APPLICATION/SUBSYSTEM:   Pointing Dispatcher (pd) INTERNAL
CA
CA
C  AUTHOR:     Marie Jansen
C
C
CA LINKAGE:   pdmtch_ (datptr, pshand, type, ier);
CA
CA
CA ARGUMENT
CA   NAME       USE    TYPE     DESCRIPTION
CA --------     ---    ----     -----------
CA datptr       I      pdtmplt *
CA                              Pointer to the PD saved table
CA midatptr     I      MI_DsAd Pointer to the incoming MI message
CA pshand       I      pdrwhand[]
CA                              Array of "pseudo" hanale structures
CA                              NW_MXHL is number of elements.
CA type         I      long*    Type of template to be searched for a match;
CA                              PDPDMT, PDTDMT, PDPTMT, or PDTTMT.
CA ier          I      long*    0 = successfully completed.
CA                              237000901 = invalid type.
CA                              all errors from pdsend.
CA
CA NOTES:
CA
CA The incoming "data" message may be data, a permanent data matching
CA template, or a temporary data matching template.  Data matching
CA templates are treated the same as data hbecause they must be compared
CA against the lists of permanent and temporary TEMPLATE matching
CA templates, just as data must be compared against DATA matching
CA templates.
CA
CA
CA RESTRICTIONS: none
CA
CA
C  PORTABILITY:   PORTABLE
C
C
C  METHOD:
C
C  In a loop for each task owning templates:
```

```
c       1) Set the pointer for the the beginning of the appropriate list
c          according to the value of type.
c       2) For each template in the list, check if the key flag (pdkey) is
c          set; if so, check if the corresponding fileds in the template and
c          the incoming message are equal.  If so, we have a match.
c       3) For each match, copy the template's subrountine into the incoming
c          message's routine field (so that it will get executed when it
c          gets read in by pxinpt).  Then determine which handle is "owned"
c          from the corresponding handle.
c       4) If the matching tempalte is temporary, delete it.
c
c
c
c       REVISED:
c
c       1.  01/25/88 -- MSJ -- Initial release.
c       2.  02/26/88 -- MSJ -- Changed to work with new pdsend; changed up error
c                              handling.
c       3.  03/09/88 -- MSJ -- Changed to not delete ALL temporary templates on a
c                              match; instead, only delete the actual matching
c                              template.
c       4.  03/28/88 -- EEA -- Changed error return call to 'ohnoo'
c       5.  08/29/88 -- WKH -- The following itmes are implemented to use the
c                              MI and NW subsystem instead of direct interface with
c                              the network:
c                              a.  Renamed error code to be prefixed by PD as d
c                                  defined in pd.h.
c                              b.  Include NW definitions.
c                              c.  Replace all references to socket by references
c                                  to handle.
c                              d.  Updated documentation to new standard
c
c
c-------------------------------------------------------------------------------
c       Copyright (C) 1987, 1988, LANDMARK GRAPHICS CORP.
c       All rights reserved.
c-------------------------------------------------------------------------------
c
c
*/

#include <lgc/lgcdef.h>
#include <lgc/pd.h>
#include <lgc/nwdefs.h>

extern void misend ();

void pdmtch_ (datptr, midatptr, pshand, type, ier)

pdtmplt *datptr;      /* pointer to the pd saved table */

MI_DsAd midatptr;     /* pointer to the incoming mi message */

/*
     Next is an array of "pseudo" handle structures; these handles are the
```

```
      ones that he server acutally uses to communicate (read/write) with
      the client handles, because the main server handle can only do accepts.
      Each of these handle structures also contains the lists of each
      template type for this task.

   pdrwhand pshand();
   long *type;        /* PDPDMT, PDTDMT, PDPTMT, or PDTTMT */
   long &ier;         /* error code */

   {

      tmpltlst **lstptr;        /* pointer to the begin of the current template list */
      tmpltlst *tmpltprt;       /* current pointer within template list */
      tmpltlst *prevptr;        /* temporary pointer for sue when deleting a template */
      long module = 900;        /* module number, for error code purposes */
      long i, j;                /* index variables */
      long match;               /* whether or not a match is made */

      /*
            Search for templates which match the incoming message.
            More than one template can match, so all existing templates
            must be checked.  The outer loop is set up to get each task's
            (handle's) template list (there are at most NW_MXHL handles).
      */
      for (j-0; j < NW_MXHL; j++)
          {

            /* Set the pointer to the beginning of the appropriate list. */
            if (*type == PDPDMT)
                  lstptr = &pshand[j].pdmt;
            else if (*type == PDTDMT)
                  istptr = &pshand[j].tdmt;
            else if (*type == PDPTMT)
                  lstptr = &pshand[j].ptmt;
            else if (*type == PDTTMT)
                  lstptr = &pshand[j].ttmt;
            else
                {
                  *ier = PDMTCH_INVL_TYPE;
                  ohnooo_(ier, "pdmtch: failed because type arg is invalid")1
                  return;
                }
       /* Now check each template in this task's list */
          for ( tmpltptr = *lstptr, prevptr = NULL;    tmpltptr != NULL; )
              {
               /*
                  A template is considered to match if for each bit that
                  has been set int he template's pdkey field, the corresponding
                  field values (fld[0], etc.) match in the template and the data.
               */
               if (pshand[j].handle == -1)
                  match = FALSE;
              else
                   {
                    match = TRUE;
                    for (1 = 0; i < 32; i++)
```

```
                {
                /* 1st check if the i-th bit of keyflg is set */
                if ( (tmpltptr->pdmsg.pdkey & (1 << i)) == (1 << i) )
                      {
                      /* The i-th bit is set; now check field values */
                      if (tmpltptr->pdmsg.pdfld[i]
                            !+ datptr->pdfld[i])
                       {
                            match = FALSE;
                            break; /* no match; no need to continue
                                      this inside for loop */
                             }
                      }
                }
          }
    if ( match == TRUE )
          {
          datptr->pdrtn = tmpltptr->pdmsg.pdrtn;
          midatptr->n_ptr = 1;
          midatptr->l_ptr = size01(tmpltptr->pdmsg.pdrtn) * 8;
bcopy((char *)&tmpltptr->pdmsg.pdrtn,midatptr->ptr_arr,midatptr->l_ptr/8);

          /*
                Send the data form the "pseudo"
                handle to which the template belongs.
                (He's the one who wants the data.)
          */

          misend (&pshand[j].handle, midatptr, ier);
          ir (*ier != SUCCESSFUL)
                {
                ohnoo_(ier, "pd: failed on call to misend");
                return;
                }

          /*
                If a match is made for a temporary template
                (whether it's data-matching or template-matching),
                delete the matching temporary template
                for this task.
          */
          if (*type == PDTDMT || *type == PDTTMT)
                {
                /*
                      If the matching template is at the beginning
                      of the list, lstptr must be adjusted.
                */
                if (tmpltptr == *lstptr)
                      {
                      *lstptr = tmpltptr->nxttmplt;
                      free (tmpltptr);
                      tmpltptr = *lstptr;
                      }
                else
                      {
```

```
                        prevptr->nxttmplt = tmpltpcr->nxttmplt;
                        free (tmpltptr);
                        tmpltptr = prevptr->nxttmplt;
                        }
                    }
                /*
                    Once we get a match, don't bother searching any more
                    of this task's templates (there shouldn't be any more
                    that match, since duplicate templates aren't allowed).
                */
                Break;

                } /* end of if the template matches data */

            else
                {
                prevptr = tmpltptr;
                tmpltptr = tmpltptr->nxttmplt;
                }
            } /* end of for loop (searching templates) */
        /* j++; */
    } /* end of while loop (searching each task's list) */

    *ier = SUCCESSFUL;
    ohnoo_ (ier, "pdmtch: completed successfully");
    return;
    }
```

```
/*
C --- CHECKIN DATE: xx/xx/88
C --- MODULE NUMBER: 570013
C
C
CA  NAME:       PDTMPL
CA
CA
CA  FUNCTION:   Search for a template matching the template received.
CA              Handle appropriately if match found.
CA
CA
CA  APPLICATION/SUBSYSTEM:  Pointing Dispatcher (pd) INTERNAL
CA
CA
C   AUTHOR:     Marie Jansen
C
C
CA  LINKAGE:    pdtmpl_ (datptr, pshand, handindx, type, ier);
CA
CA
CA  ARGUMENT
CA    NAME      USE   TYPE     DESCRIPTION
CA  --------    ---   ----     ----- -----
CA  midatptr    I     MI_DsAd  MI buffer structure
CA  datptr      I     pdtmplt *
CA                             Pointer to the incoming message.
CA  pshand      I     pdrwsock[]
CA                             Array of "pseudo" handle structures.
CA                             NW_MXHL is number of elements.
CA  handno      I     long *   handle number which received the tmt.
CA  type        I     long *   Type of template received:
CA                             PDPTMT or PDTTMT.
CA  ier         O     long *   0 = successfully completed.
CA                             all errors from pdsend.
CA
CA
CA
CA  NOTES:
CA
CA  The incoming message may be either a permanent or temporary
CA  template matching template.
CA
CA
CA  RESTRICTIONS:   none
CA
CA
C   PORTABILITY:   PORTABLE
C
C
C   METHOD:
C
C   For each task with templates:
C   1) First set the list pointer to the beginning of the task's
C      pdmt list (permanent data matching templates); the next time
C      thru the loop, set it to the tdmt list.
C   2) For each template in the list, check each bit in the key flag
```

```
C       (pdkey);  if set, check if the corresponding field values
C       match in the template and the incoming message.  If all key
C       flags which are set have matching pdfld's, we have a match.
C    3) For each match, temporarily save the matching template's
C       routine name, replacing it with that of the incoming message.
C    4) Send the matching template to the task owning the incoming
C       message (by sending from the incoming handle ID).
C    5) If the incoming template is temporary (and a match was found),
C       delete it.
C
C
C    REVISED:
C
C    1. 01/25/88 -- MSJ -- Initial release.
C    2. 02/15/88 -- MSJ -- Made a correction in the header; swapped which
C                          template. I checked for pdkey set on (should
C                          always be whichever template belongs to whichever
C                          task that is going to receive either data or a
C                          template as a result of the match, because the
C                          requester may want everything to match).
C    3. 02/26/88 -- MSJ -- Changed to work with the new pdsend; changed up error
C                          handling.
C    4. 03/09/88 -- MSJ -- Changed some comments.
C    5. 05/26/88 -- EEA -- changed error return call to 'ohnooo'
C    6. 07/14/88 -- WKH -- The following items are implemented to use the
C                          MI and NW subsyatem instead of direct interface with
C                          the network:
C                          a. Include NW definitions.
C                          b. Replaced all references to socket by references
C                             to handle and network calls by MI calls.
C                          c. Updated documentation to new standard.
C
C---------------------------------------------------------------------------
C     Copyright (C) 1987, 1988, LANDMARK GRAPHICS CORP.
C     All rights reserved.
C---------------------------------------------------------------------------
C
*/

#include <lgc/lgcdef.h>
#include <lgc/pd.h>
#include <lgc/nwdefs.h>

extern void misend ();

void pdtmpl_ (midatptr, datptr, pshand, handno, type, ier)

MI_DsAd midatptr;        /* MI buffer stucture */
pdtmplt *datptr;         /* pointer to the incoming message */
/*
   Next is an array of "pseudo" handle structures; these handles are the
   ones that the server actually uses to communicate (read/write) with
   the client handles, because the main server handle can only do accepts.
   Each of these handle structures also contains the lists of each
   template type for this task.
*/
```

```
pdrwhand pshand[];
long *handno;    /* handle number in pshand (actually, the handle ID from
                    which the template matching template was received).  */
long *type;      /* PDPMNT or PDTINT */
long *ier;       /* error code */

{
    tmpltlst *tmp;       /* temporary pointer */
    tmpltlst *lstptr;    /* pointer to the begin of the current template list */
    tmpltlst *tmpltptr; /* current pointer within template list */
    long module = 1300; /* module number, for error code purposes */
    long i, j, k;        /* index variables */
    long idx;            /* index variable  */
    long match;          /* whether or not a match is made */
    long handindx;       /* index into pshand array for a match */
    void (*rtnsave) (); /* save the template's routine */

    /*
       Search for templates which match the incoming tmt message.
       More than one template can match, so all existing templates
       must be checked.  The outer loop is set up to get each task's
       (handle's) template list (there are at most NW_MXHL handles).
    */

    for (j = 0; j < NW_MXHL; j++)
        {
         /*
            Set the pointer to the beginning of the appropriate list.
            First, search the pdmt list, then the tdmt list.
         */
         for ( k = 0, lstptr = pshand[j].pdmt; k < 2 ;
               k++,   lstptr = pshand[j].tdmt )
             {
              /* Now check each template in this task's list */
              for ( tmpltptr = lstptr;    tmpltptr != NULL;
                    tmpltptr = tmpltptr->nxttmplt)
                  {
                   /*
                      A template is considered to match if for each bit that has
                      been set in the template's keyflg field, the corresponding
                      field values (fld[0],etc.) match in the template & the
                      data.
                   */
                   match = TRUE;
                   for (i = 0; i < 32; i++)
                       {
                        /* 1st check if the i-th bit of keyflg is set */
                        if ( (datptr->pdkey & (1 << i))
                                   == (1 << i) )
                            {
                             /* The i-th bit is set; now check field values */
                             if (tmpltptr->pdmsg.pdfld[i]
                                        !=  datptr->pdfld[i])
                                 {
                                  match = FALSE;
                                  break; /* no match; no need to continue this
```

```
                                        inside          loop */
                            }
                    }
            } /* end of for - checking key flags for match */

    it ( match == TRUE )
        {
        /*
           Save the routine in the matching template, then
           replace it with the routine in the incoming template.
           */
           rtnsave = tmpltptr->pdmsg.pdrtn;
           tmpltptr->pdmsg.pdrtn = datptr->pdrtn;

           /*
                Send the data from the "pseudo"
                handle to which the INCOMING template belongs.
                (He's the one who wants the data.)
           */

           misend (handno,midatptr,ier);
           if (*ier != SUCCESSFUL)
                {
                 ohnooo_ (ier, "pdtmpl:  failed on call to pdsend");
                 return;
                }
           /* Put the template's routine back */
          tmpltptr->pdmsg.pdrtn = rtnsave;

          /*
                If a match is made and the incoming template is a
                temporary tmt, delete it.  (It will always be
                at the beginning of the template list, since it
                was just added.
          */
          handindx = -1;
          for (idx=0; idx<NW_MXHL; idx++)
               if   (pshand[idx].handle == *handno)
                    {
                     hanindx  =  idx;
                     break;
                    }

          if ((*type  == PDTTMT) && (handindx  != -1))
               {
                tmp = pshand[handindx].ttmt->nxttmplt;
                free  (pshand[handindx].ttmt);
                pshand[handindx].ttmt = tmp;
                return;            /* no need to search anymore
                                      templates for this ttmt */
               }

           } /* end of if the template matches data */
     } /* end of for loop (searching templates) */
   } /* end of for loop (searching either pdmt or tdmt) */
 } /* end of for loop (searching each task's list) */
```

```
    *ier = SUCCESSFUL;
    ohnooo_ (ier, "pdtmpl: completed successfully");
    return;
}
```

```
/*
C--- CHECKIN DATE: xx/xx/88
C--- MODULE NUBMER:  370019
C
C
CA  NAME:   PDCLSC
CA
CA
CA  FUNCTION:    Close a client handle from the pd task.
CA
CA
CA  APPLICATION/SUBSYSTEM:   Pointing Dispatcher (pd) INTERNAL
CA
CA
C   AUTHOR:    Marie Jansen
C
C
CA  LINKAGE:    void pdclsc_ (handno, pshand);
CA
CA
CA  ARGUMENT
CA    NAME          USE   TYPE          DESCRIPTION
CA  --------        ---   ----          -----------
CA  handno          I     long *        handle to be closed.
CA  pshand          I/O   pdrwhand[]
CA                                      Array of "pseudo" handle structures
CA                                      (connections to clients).  Size of
CA                                      the array is the maximum size allowd
CA                                      by the NW subsystem, NW_MXHL.
CA
CA
CA
CA  NOTES:   none
CA
CA
CA  RESTRICTIONS:  none
CA
CA
C   PORTABILITY:        PORTABLE
C
C
C   METHOD:
C
C   1)  Calls pdrecv, with the flush argument set, in order to flush
C       out any messages that might be present in pdrecv's internal
C       static buffer.
C   2)  Calls shutdown and close on the client socket.
C   3)  Calls pddltm for each of the task's template lists, in order
C       to delete all of them.
C
C
C   REVISED:
C
C   1. 02/26/88 -- MSJ -- Initial release.
C   2. 03/09/88 -- MSJ -- Added a cell to pdrecv, to flush out any queued up
C.                        message.
```

```
c     3.  03/28/88 -- EEA -- changed error return call to 'ohnooo'
c     4.  06/01/88 -- MSJ -- Fixed bug in call to pdrecv (Thanks to Olivier
c                            at Cray!)
c     5.  08/30/88 -- WKH -- Replaced all direct calls to socket functions by
c                            calls to the MI subsystem, and all socket references
c                            with handle references.  Updated documentation to
c                            new standard.
c
c
c-----------------------------------------------------------------------------
c     Copyright (C) 1987, 1988, LANDMARK GRAPHICS CORP.
c     All rights reserved.
c-----------------------------------------------------------------------------
c
*/

#include <lgc/lgcdef.h>
#include <lge/nwdefs.n
#include <lgc/pd.h>

extern void pddltm_ ();     /* delete templates */
extern void miclos_ ();     /* MI handle close */

void pdclsc_ (handno, pshand)
long *handno;            /* which handle to close */
/*
   Next is an array of "pseudo" handle structures; these handles are the
   ones that the server actually uses to communicate (read/write) with
   the client handles, because the main server handle can only do accepts.
*/
pdrwhand pshand[];

{
      long handinax;     /* pseudo handle structure entry index, its
                            handle number is the same as handno */
      long ier;          /* local error code */
      long idx;          /* internal index variable */

      /* Find entry of pseudo handle structure array which handle
         is the same the handle to be closed */
      handindx = -1;
      for (idx=0; idx<MN_MXHL; idx++)
            {
             if (pshand[idx].handle == *handno)
               {
                handindx = idx;
                break;
                }
            }

      /*
        An entry in the pseudo handle array is found, delete all
        templates belonging to this client.
      */
      if (handindx > -1)
```

```
        if (pshand[handindx].handle > -1)
           {
           pddltm_ (&pshand[handindx].pdmt);
           pddltm_ (&pshand[handindx].tdmt);
           pddltm_ (&pshand[handindx].ptmt);
           pddltm_ (&pdhsnf[handindx].ttmt);
           pshand[handindx].handle = -1;

    /*
          The MI function miclos does the actual close and shutdown
          of the socket pointed by the handle number
    */

    if (*handno > -1)
       {
        miclos_(handno, &ier);
        if (ier != 0)
           {
           ohnooo_ (&ier,"pdclsc: Network error from miclos");
           return;
           }
        }

    ier = SUCCESSFUL;
    ohnooo_ (&ier, "pdclsc: completed successfully");
    return;
}
```

```
/*
C --- CHECKIN DATE: xx/xx/88
C --- MODULE NUMBER:  370016
C
C
CA  NAME:       PDDTTM
CA
CA
CA  FUNCTION:   Search for a template matching the template received.
CA              Delete any template which matches the incoming one.
CA
CA
CA  APPLICATION/SUBSYSTEM:  Pointing Dispatcher (pd) INTERNAL
CA
CA
C   AUTHOR:     Marie Jansen
C
C
CA  LINKAGE:    pddttm_ (datptr, lstptr, ier);
CA
CA
CA  ARGUMENT
CA    NAME        USE   TYPE        DESCRIPTION
CA  --------      ---   ----        -----------
CA  datptr         I    tmpltlst *
CA                                  Pointer to the incoming message.
CA  lstptr         I    tmpltlst **
CA                                  Pointer to the first element of
CA                                  the template array to be searched.
CA  ier            O    long *      0 = successfully completed.
CA
CA
CA  NOTES:  none
CA
CA
CA  RESTRICTIONS:  none
CA
CA
C   PORTABILITY:   PORTABLE
C
C
C   METHOD:
C
C   1) For each template in the list, check if the key flag (pdkey) is
C      set; if so, check if the corresponding fields in the template and
C      the incoming message are equal.  If so, we have a match.
C   2) For each match, delete the matching (not incoming) template.
C
C
C   REVISED:
C
C   1. 02/15/88 -- MSJ -- Initial release.
C   2. 02/26/88 -- MSJ -- Took out reference to invalid type as an error,
C                         since, there's no way that can happen.
C   3. 03/09/88 -- MSJ -- Fixed so it really works!
C   4. 03/28/88 -- EEA -- Changed error return call to 'ohnooo'
```

```
C   5. 05/24/88 -- WKH -- Removed overlay definition for datptr and
C                          updated documentation to new standard.
C
C
C-----------------------------------------------------------------------
C    Copyright (C) 1987, 1988, LANDMARK GRAPHICS CORP.
C    All rights reserved.
C-----------------------------------------------------------------------
C
*/

#include <lgc/lgcdef.h>
#include <lgc/pd.h>

void pddttm_ (datptr, lstptr, ier)

tmpltlst *datptr;        /* pointer to the pd saved table */
tmpltlst **lstptr;       /* pointer to the beginning of the list of templates */
long *ier;               /* error code */

{
    tmpltlst *tmpltptr; /* current pointer within template list */
    tmpltlst *prevptr;  /* pointer to previous template */
    long module = 1600; /* module number, for error code purposes */
    long i;             /* index variable */
    long match;         /* whether or not a match is made */

    /*
       Search for a template which matches the incoming message.
       There should only be one, since duplicate templates are not
       allowed.
    */
    for ( tmpltptr = *lstptr, prevptr = NULL;    tmpltptr != NULL; )
         {
          /*
             A template is considered to match if for each bit that
             has been set in the template's pdkey field, the corresponding
             field values (fld[0],etc.) match in the template and the data.
          */
          match = TRUE;
          for (i = 0; i < 32; i++)
               {
                /* 1st check if the i-th bit of pdkey is set */
                if ( (tmpltptr->pdmsg.pdkey & (1 << i)) == (1 << i) )
                     {
                      /* The i-th bit is set; now check field values */
                      if (tmpltptr->pdmsg.pdfld[i]
                                != datptr->pdmsg.pdfld[i])
                           {
                            match = FALSE;
                            break; /* no match; no need to continue this
                                      inside for loop */
                           }
                     }
               } /* end of for loop - checking this template for fld matches */
```

```
        if ( match == TRUE )
            {
            if (tmpltptr == *lstptr)
                /*
                 The first element of the list matched, so
                 the main list pointer must be reset to point
                 to the next element, since the 1st element is
                 now going to be removed.
                */
                {
                 *lstptr = tmpltptr->nxttmplt;
                 free (tmpltptr);
                 tmpltptr = *lstptr;
                }
            else
                {
                prevptr->nxttmplt = tmpltptr->nxttmplt;
                free (tmpltptr);
                tmpltptr = prevptr->nxttmplt;
                }
              } /* end of if the template matches data*/
            else
              {
                prevptr = tmpltptr;
                tmpltptr = tmpltptr->nxttmplt;
              }

            } /* end of if the template matches data */

      *ier = SUCCESSFUL;
      ohnooo_ (ier, "pddttm: completed successfully");
      return;
}
```

```
/*
C--- CHECKIN DATE: xx/xx/88
C--- MODULE NUBMER:  370020
C
C
CA  NAME:   PDDUPE
CA
CA
CA  FUNCTION:     Check if the template input matches an already
CA                existing one.
CA
CA
CA  APPLICATION/SUBSYSTEM:   Pointing Dispatcher (pd) INTERNAL
CA
CA
C   AUTHOR:    Marie Jansen
C
C
CA  LINKAGE:   pddupe_ (datptr, handindx, pshand, ier);
CA
CA
CA  ARGUMENT
CA    NAME        USE   TYPE          DESCRIPTION
CA  --------      ---   ----          -----------
CA  datptr        I     pdtmplt *
CA                                    Pointer to the PD saved table
CA  handindx      I     long *        Handle index number of client.
CA  pshand        I     pdrwhand[]
CA                                    Array of "pseudo" handle structures.
CA                                    NW_MXHL is number of elements.
CA  ier           O     long *        0 = successfully completed.
CA
CA
CA  NOTES:   none
CA
CA
CA  RESTRICTIONS:  none
CA
CA
C   PORTABILITY:   PORTABLE
C
C
C   METHOD:
C
C   1)   Set a pointer to the beginning of the appropriate template list
C        for this task (first search permanent templates, then temporary).
C   2)   For each template in the list:
C        a) Bitwise AND the key fields of the incoming template and the
C           existing template in the list, to determine which fields both
C           templates require for matching.
C        b) If there are no "overlapping" match fields, the templates are
C           not duplicates, so go on to the next template in the list.
C        c) For each bit set in the resulting and 'd variable, check if
C           the corresponding pdfld's match.  If they all match, the
C           template is a duplicate, so return an error.
C
```

```
c
c   REVISED:
c
c   1. 02/27/88 -- MSJ -- Initial release.
c   2. 03/09/88 -- MSJ -- Changed up logic to determine what constitutes
c                         a duplicate template (now, a duplicate template
c                         is not necessarily considered a "matching"
c                         template).
c   3. 03/28/88 -- EEA -- Changed error return call to 'ohnooo'
c   4. 07/14/88 -- WKH -- The following items are implemented to use the
c                         MI and NW subsystem instead of direct interface with
c                         the network:
c                         a. Renamed error code to be prefixed by PD as
c                            defined in pd.h.
c                         b. Include NW definitions.
c                         c. Replaced all references to socket by references
c                            to handle.
c                         d. Updated documentation to new standard.
c
c
c-----------------------------------------------------------------------
c     Copyright (C) 1987, 1988, LANDMARK GRAPHICS CORP.
c     All rights reserved
c-----------------------------------------------------------------------
c
*/

#include <lgc/lgcdef.h>
#include <lgc/pd.h>
#include <lgc/nwdefs.h>

void pddupe_ (datptr, handindx, pshand, ier)

pdtmplt *datptr;         /* pointer to the pd saved table */
long *handindx;          /* handle index number of the client */

/*
   Next is an array of "pseudo" handle structures; these handles are the
   ones that the server actually uses to communicate (read/write) with
   the client handles, because the main server handle can only do accepts.
   Each of these handle structures also contains the lists of each
   template type for this task.
*/
pdrwhand pshand[];
long *ier;        /* error code */

{
    tmpltlst **lstptr;  /* pointer to the begin of the current template list */
    tmpltlst **lstptr1,  ** lstptr2;
    tmpltlst *tmpltptr; /* current pointer within template list */
    long i, j;          /* index variables */
    long match;         /* whether or not a match is made */
    long control;       /* controls whether the templates are duplicates */

    /* Set the pointer to the beginning of the appropriate list.  */
    if (datptr->pdcmd == PDPDMT == datptr->pdcmd == DTDMT)
```

```
         {
          lstptrl = (&pshand[*handindx].pdmt);
          lstptr2 = (&pshand[*handindx].tdmt);
         }
     else
         {
          lstptrl = (&pshand[*handindx].ptmt);
          lstptr2 = (&pdhsnf*[handindx].ttmt);
         }

     for (lstptr = lstptrl, j= 0; j < 2 ; lstptr = lstptr2, j++)
         {
         /* Now check each template in this task's list */
         for ( tmpltptr = *lstptr;     tmpltptr  != NULL;
               tmpltptr = tmpltptr->nxttmplt)
              {

              /*
               First, bitwise AND the key fields of each of the 2
               templates together.  This value determines which
               fields, if any, overlap as far as being required to
               match for the templates.  For example, if template A's
               key = 1, and template B's key 3, the and'd result
               will be 1, meanding pdfld[0] is a required match for
               both templates.  If bot templates' pdfld[0] values
               are equal, the new template is considered to be a
               duplicate (template A is a more generic case of template
               B; even though the 2 templates wouldn't match for
               template matching purposes, if data arrived which matched
               template A, it would also match template B, causing
               duplicate data to be sent to the owning task!  That's
               why the templates are considered duplicates.
              /*
              control = tmpltptr->pdmsg.pdkey & datptr->pdkey;

              /*
               If the result is 0, then there's no overlap in what the
               2 templates are matching on; therefore there's no way
               they can be duplicates.

              /*
              if (control == 0)
                   match = FALSE;

              else
                   {
                    /*
                      A template is considred to be a duplicate if for each
                      bit set in the control variable, the corresponding
                      field values (fld[0],etc.) match in both templates.
                   /*
                   match = TRUE
                   for (i = 0; i < 32; i++)
                        {
                        /* Check if the i-th bit of control is set */
                        if ( (control & (1 << i) ) == (1<<i))
                             {
```

```
                        /* The i-th bit is set; now check field values */
                        if (tmpltptr->pdmsg.pdfld[i]
                                != datptr->pdfld[i])
                           {
                            match = FALSE;
                            break; /* no match; no need to continue this
                                      inside for loop */
                           }
                      }
            {

      if ( match == TRUE )
            {
             *ier = PDDUPE_MATCH;
             ohnooo_ (ier,
    "pddupe: new template matches already existing one");
             return;
            }

         } /* end of for loop (searching templates) */
      } /* end of for loop (each of the 2 lists) */

    *ier = SUCCESSFUL;

    ohnooo_ (ier, "pddupe: completed sucessfully");
    return;
}
       onnooo_ (&ier,"pdclsc: Network error from miclos");
       return;
    }
```

```
/*
C --- CHECKIN DATE: xx/xx/88
C --- MODULE NUMBER:  none
C
C
CA  NAME:       PDCLNT.H
CA
CA
CA  FUNCTION:  Pointing Dispatcher include file
CA
CA
CA  APPLICATION/SUBSYSTEM:  Pointing Dispatcher (pd) EXTERNAL
CA
CA
C   AUTHOR:     Marie Jansen
C
C
CA  LINKAGE:    #include <lgc/pdclnt.h>
CA
CA
CA  ARGUMENT
CA    NAME       USE    TYPE     DESCRIPTION
CA  --------     ---    ----     -----------
CA
CA
CA  NOTES:
CA
CA  This file is included by <lgc/pxinpt.h>, so most users do not need
CA  to include it.
CA
CA
CA  RESTRICTIONS:  none
CA
CA
C   PORTABILITY:   PORTABLE
C
C
C   METHOD:  none
C
C
C   REVISED:
C
C   1. 01/18/88 -- MSJ -- Initial release.
C   2. 02/15/88 -- MSJ -- Added additional pd message structures.
C   3. 02/26/88 -- MSJ -- Added host type to the standard templates, in order o
C                         to handle byte-swapping.  Moved definition of global
C                         variable pdgenr into here from pxinpt.  Changed
C                         MAXDATA to PD_MAXDATA.
C   4. 03/05/88 -- MSJ -- Added new fields to the structures (all the pdn--
C                         fields). Took out some of the structure variations.
C   5. 03/24/88 -- MSJ -- Fixed some of the documentation.
C   6. 04/04/88 -- MSJ -- Cleaned up some more documentation.
C   7. 07/14/88 -- WHK -- Modified the following items for the MI subsystem:
C                         a. Renamed pdstrc.h to be pdclnt.h.
C                         b. Renamed PDSTRC to be PDCLNT.
C                         c. Decreased PD_MAXDATA from 2048 to 1024.
```

```
C                       d. Deleted PDMINL define.
C                       e. Moved _pdclient structure definition and pdclnt
C                          parameter from pd.h into this include.
C                       f. Added midefs.h include.
C                       g. Updated documentation to new standard .
C
C-----------------------------------------------------------------------
C    Copyright (C) 1987, 1988, LANDMARK GRAPHICS CORP.
C    All rights reserved.
C-----------------------------------------------------------------------
C
*/

#ifndef PDCLNT                  /* make sure this is only included once */

#define PDCLNT
#include <lgc/midefs.h>         /* include MI subsystem declarations */
#define PD_MAXDATA      1024

    /*
       The main part of the pd message. This must always be
       included as the first thing in any pd template structure which is
       defined.  It is not meant to be a stand-alone structure.
    */

    /* structure of main, "generic" pd message */
    typedef struct _pdtmplt
        {
         long pdcmd;              /* message command code          */
         void (*pdrtn)();         /* message processing subroutine */
         long pdkey;              /* key flags regarding pdflds    */
         long pdfld[32];          /* field values                  */
         } pdtmplt;


      typedef struct _pdclient
          {
           long handle           /* client MI handle number connected to pd */
          } pdclient;

 /*
    need by pxinpt for necessary select all interface routines for
    sending
 */
 #ifdef PXINPT_DEF
           struct MI_DSC pdbuff;        /* external pd message storage */
 #else
           extern struct MI_DSC pdbuff;
 #endif

 /*
    contain the client MI handle number
 */
 #ifdef PDOPEN_DEF
           pdclient pdclnt ;
 #else
```

```
            extern pdclient pdclnt;
#endif

#endif
```

```
/*
C --- CHECKIN DATE: xx/xx/88
C --- MODULE NUMBER:  none
C
C
CA  NAME:        PD.H
CA
CA
CA  FUNCTION:  Pointing Dispatcher include file
CA
CA
CA  APPLICATION/SUBSYSTEM:  Pointing Dispatcher (pd) INTERNAL
CA
CA
C   AUTHOR:      M. Miller
C
C
CA  LINKAGE:     #include <lgc/pd.h>
CA
CA
CA  ARGUMENT
CA    NAME       USE   TYPE    DESCRIPTION
CA  --------     ---   ----    -----------
CA
CA
CA  NOTES:
CA
CA
CA  RESTRICTIONS:  none
CA
CA
C   PORTABILITY:   PORTABLE
C
C
C   METHOD:  none
C
C
C   REVISED:
C
C   1. 01/19/88 -- MSJ -- Initial release.
C   2. 01/25/88 -- MSJ -- Added error code defines.
C   3. 02/26/88 -- MSJ -- Added the dcdefs.h include file for data conversion.
C                         Also added host type to the pseudo socket structure.
C   4. 03/28/88 -- EEA -- changed error return call to 'ohnooo'
C   5. 07/13/88 -- WKH -- Modified the following items for the MI subsystem.
C                         a. Renamed include file pdstrc.h with pdclnt.h
C                         b. Added include file midefs.h
C                         c. Deleted include file dcdefs.h
C                         d. Deleted all open LAN socket and data conversion
C                            related definitions and parameters
C                         e. Moved pdclient structure to pdclnt.h
C                         f. Deleted pdsellst structure
C                         g. Re-did error code prefix with PD and make first 8
C                            bytes unique to conform to the new standard.
C                         h. Updated documentation to new standard.
C
```

```
C-----------------------------------------------------------------------
C     Copyright (C) 1987, 1988, LANDMARK GRAPHICS CORP.
C     All rights reserved.
C-----------------------------------------------------------------------
C
*/

#ifndef PDINC
#    define PDINC

#    include  <signal.h>
#    include  <fcntl.h>
#    include  <errno.h>

#    include  <signal.h>
#    include  <fcntl.h>
#    include  <errno.h>

#    include  <lgc/midefs.h>      /* include MI subsystem declarations */
#    include  <lgc/pdclnt.h>      /* include PD client declarations */

    /*
      Structure defined in order to have linked lists of templates
    */
    typedef struct _tmpltlst
        {
         pdtmplt pdmsg;
         struct _tmpltlst *nxttmplt;
        } tmpltlst;

    /*
      Structure for the "pseudo" handles created for reading and writing
      on the server handle (the server handle itself just handles accepts)
      There will be one of these for each task connected to the pd.
      (This is only used by the pointing dispatcher task.)
    */
    typedef struct _pdrwhand
        {
         long handle;            /* handle ID from the MI subsystem */
         tmpltlst *pdmt;         /* list of permanent data templates */
         tmpltlst *tdmt;         /* list of temporary data templates */
         tmpltlst *ptmt;         /* list of permanent template templates */
         tmpltlst *ttmt;         /* list of temporary template templates */
        } pdrwhand;


     /* Error codes */
#   define PD_INVAL_CMD          237000101  /* Invalid PD command */
#   define PD_HANDLE_FULL        137000102  /* MI handle table full */
#   define PD_MIBUF_WRONG        237000103  /* Incorrect data from MI buffer */
#   define PD_HNARRY_FULL        137000104  /* Too many handles opened */
#   define PDMTCH_INVL_TYPE      237000901  /* invalid template type */
#   define PDADTM_MALLOC_ER      337001201  /* memory allocation error */
#   define PDDLTM_INVL_TYPE      237001501  /* invalid template type */
#   define PDDUPE_MATCH          137002001  /* find duplicate template */
```

ij e ıı G ⊥ I

```
/*
C --- CHECKIN DATE: xx/xx/89
C --- MODULE NUMBER:  37050.
C
C
CA  NAME:      PDOPEN
CA
CA
CA  FUNCTION:  Opens a connection to the Pointing Dispatcher for
CA             communications.
CA
CA
CA  APPLICATION/SUBSYSTEM:  Pointing Dispatcher (pd) EXTERNAL
CA
CA
C   AUTHORS:   Ced Snyder
C
C
CA  LINKAGE:   CALL PDOPEN (PDHOST, IER)
CA
CA
CA  ARGUMENT
CA    NAME       USE    TYPE    DESCRIPTION
CA  --------     ---    ----    -----------
CA  PDHOST        I     C*(*)   Ascii name of the host running the
CA                              pd to which you wish to connect.  Must be
CA                              NULL terminated (Ascii Z).
CA                              To connect to the pointing dispatcher on
CA                              the local host, set pdhost to NULL. (char(0)).
CA  IER           O     I*4     0 = successful completion.
CA                              non-zero = error codes from other pd routines
CA
CA
CA  NOTES:
CA
CA  1)  The pointing dispatcher must already be running on your machine
CA      before you can successfully call pdopen.  To do so, either:
CA      a) create another AIX shell thru the X window-manager, then
CA         execute pd  or
CA      b) from your existing shell, execute pd in background
CA         mode ( pd& ) or
CA      c) startup the command menu system ( cm ).
CA
CA  2)  Each task MUST call pdopen at the beginning before any
CA      communications thru the pointing dispatcher can take place.
CA      Even if your task does not call pd directly, there are probably
CA      subsystem layers that do, such as wxstat (mouse button/status
CA      line messages) interfacing with the mouse task (mstask) thru pd.
CA
CA  3)  For in-depth information on how to communicate with the pointing
CA      dispatcher, see Appendix B of the Reference Manual.
CA
CA
CA  RESTRICTIONS:
CA
CA
```

```
C   PORTABILITY:   PORTABLE
C
C
C   METHOD:
C
C   Calls micint to obtain a mi handle number for the client
C
C
C   REVISED:
C
C   1. 02/29/88 -- CS  -- Initial release.
C   2. 03/28/88 -- EEA -- changed error return call to 'ohnooo'
C   3. 04/04/88 -- MSJ -- Cleaned up the documentation.
C   4. 07/14/88 -- WKH -- Modified the following items for the MI subsystem:
C                         a. Replaced call to pdwrt_ by call to micint_
C                         b. Saved handle number returned by micint_
C                         c. Updated documentation to new standard
C
C
C-----------------------------------------------------------------------
C    Copyright (C) 1987, 1988, LANDMARK GRAPHICS CORP.
C    All rights reserved.
C-----------------------------------------------------------------------
C
*/
#define PDOPEN_DEF
#include <lgc/pdclnt.h>
#undef PDOPEN_DEF

#include <lgc/lgcdef.h>

extern void micint_ ();

void pdopen_ (pdhost, ier)

char *pdhost;          /* ASCIIZ name of host for PD */
long *ier;

{
    static char host[50];
    long   handle;        /* handle number return from MI  */

    /*
       When Fortran passed in char(0) as pdhost , the C
       compiler does not treat it as NULL. Therefore copy to
       a static variable and then test for NULL is neccessary
    */
    sprintf(host,pdhost);

    if (host[0] == NULL)
       micint_ (NULL,"pd",&handle,ier);
    else
       micint_ (host,"pd",&handle,ier);

    if (*ier != SUCCESSFUL)
       {
```

```
            ohnooo_ (ier,"pdopen: failed on call to micint");
            return;
           }

        /* Set client handle number */
        pdclnt.handle = handle;

        *ier = SUCCESSFUL;
        ohnooo_ (ier, "pdopen: completed successfully");
        return;
    }
```

```
/*
C --- CHECKIN DATE: xx/xx/88
C --- MODULE NUMBER:  370502
C
C
CA  NAME:       PDCLOS
CA
CA
CA  FUNCTION:  Closes the connection to the Pointing Dispatcher.
CA
CA
CA  APPLICATION/SUBSYSTEM:  Pointing Dispatcher (pd) EXTERNAL
CA
CA
C   AUTHORS:   Ced Snyder
C
C
CA  LINKAGE:   CALL PDCLOS (IER)
CA
CA
CA  ARGUMENT
CA  NAME         USE   TYPE     DESCRIPTION
CA  --------     ---   ----     -----------
CA  IER           O    I*4      0 = successful completion.
CA                              non-zero = error codes from other pd
CA                                         routines
CA
CA
CA  NOTES:
CA
CA  1)  If your task called pdopen (or pdwrt with the PDOPCH command),
CA      it MUST call pdclos before exiting.
CA
CA  2)  For in-depth information on how to communicate with the pointing
CA      dispatcher, see Appendix B of the Reference Manual.
CA
CA
CA  RESTRICTIONS:  none
CA
CA
C   PORTABILITY:   PORTABLE
C
C
C   METHOD:
C
C   Sets up pdtmplt structure and calls miclos
C
C
C   REVISED:
C
C   1. 02/29/88 -- CS  -- Initial release.
C   2. 03/28/88 -- EEA -- Changed error return call to 'ohncoo'
C   3. 04/04/88 -- MSJ -- Cleaned up some documentation.
C   4. 07/14/88 -- WKH -- Modified to use misend and miclos instead of pdwrt,
C                         and updated documentation to new standard.
C
```

```
C-----------------------------------------------------------------------
C    Copyright (C) 1987, 1989, LANDMARK GRAPHICS CORP.
C    All rights reserved.
C-----------------------------------------------------------------------
C
*/

#include <lgc/lgcdef.h>
#include <lgc/pdclnt.h>

extern void misend  ();
extern void miclos_ ();

void pdclos_ (ier)

long *ier;

{
    long   handle;              /* handle to be closed */
    long   pdcmd;               /* PD command */
    struct MI_DSC mibuf;        /* mi buffer */
    struct MI_LAD larray[1];    /* long array of MI buffer */

    handle = pdclnt.handle;     /* client handle number */
    pdcmd  = PDCLCH;

    /*
       Set MI buffer structure
    */
    mibuf.n_dbl = 0;
    mibuf.n_flt = 0;
    mibuf.n_lng = 1;
    mibuf.n_shr = 0;
    mibuf.n_str = 0;
    mibuf.n_ptr = 0;
    mibuf.l_ptr = 0;
    larray[0].nelem   = 1;
    larray[0].arr_ptr = &pdcmd;
    mibuf.lng_arr = larray;

    /*
       Send termination message to MI
     */
    misend (&handle, &mibuf, ier);

    if (*ier != SUCCESSFUL)
        {
         ohnooo_ (ier,"pdclos: failed on call to misend ");
         return;
        }

    /*
       Inform MI to close the client handle
     */
    if (handle > -1)
       {
```

```
            miclos_ (&handle,ier);

            if (*ier != SUCCESSFUL)
              {
               ohnooo_ (ier,"pdclos: failed on call to miclos ");
               return;
              }

            pdclnt.handle = -1;
          }

        *ier = SUCCESSFUL;
        ohnooo_ (ier, "pdclos: completed successfully");
        return;
    }
```

```
/*
CA  CHECKIN DATE: 09/13/88
CA  MODULE NUMBER:  370015
CA
CA
CA  NAME:      PDDLTM
CA
CA
CA  FUNCTION:  Delete Templates in the given list
CA
CA
CA  APPLICATION/SUBSYSTEM:  Pointing Dispatcher (pd) INTERNAL
CA
CA
C   AUTHOR:    Marie Jansen
C
C
CA  LINKAGE:   pddltm_ (lstptr);
CA
CA
CA  ARGUMENT
CA    NAME       USE   TYPE     DESCRIPTION
CA  --------     ---   ----     -----------
CA  lstptr        I    tmpltlst **
CA                              Pointer to the first element of
CA                              the template array.
CA
CA
CA  NOTES:  none
CA
CA
CA  RESTRICTIONS:  none
CA
CA
C   PORTABILITY:   PORTABLE
C
C
C   METHOD:
C
C   For each template in the list, call free.  Once I hit a NULL
C   template pointer, I know I've exhausted the list.
C
C
C   REVISED:
C
C   1. 01/25/88 -- MSJ -- Initial release.
C   2. 03/28/88 -- EEA -- Changed error return call to 'ohnooo'
C   3. 08/24/88 -- WKH -- Updated documentation to new standard.
C
C-----------------------------------------------------------------------
C    Copyright (C) 1987, 1988, LANDMARK GRAPHICS CORP.
C    All rights reserved.
C-----------------------------------------------------------------------
C
*/
```

```
#include <lgc/lgcdef.h>
#include "pd.h"

void pddltm_ (lstptr)

tmpltlst **lstptr;       /* pointer to beginning of list to delete */

{
    long ier;               /* local error code */
    tmpltlst *tmpltptr = NULL;  /* current template pointer (list processing) *.
    tmpltlst *tptr = NULL;

    /* Delete each of the templates in the list */
    for (tptr = *lstptr; tptr != NULL; )
          {
           tmpltptr = tptr->nxttmplt;
           free (tptr);
           tptr = tmpltptr;
          }

    /* Make sure the head of the list now points to NULL */
    *lstptr = NULL;

    ier = SUCCESSFUL;
    ohnooo_ (&ier, "pddltm: completed successfully");
    return;
}
```

```
/*
CA  CHECKIN DATE: 08/23/88
CA  MODULE NUMBER:   520008
CA
CA
CA  NAME:        MICLOS
CA
CA
CA  FUNCTION:  Closes the network communication for server/client.
CA
CA
CA  APPLICATION/SUBSYSTEM:  Message Interface (mi) CONTROLLED
CA
CA
C   AUTHOR:      Jonathan Winata
C
C
CA  LINKAGE:     CALL MICLOS (HANDLE, IER)
CA
CA
CA  ARGUMENT
CA    NAME          USE    TYPE     DESCRIPTION
CA  ---------       ---    ----     -----------
CA  HANDLE           I      I       file handle for network comm.
CA  IER              O      I       Error Return code
CA                                           0 = successful
CA                                   152000705 = no temporary buffer freed
CA                                   x4000yyzz = network routine status
CA
CA
CA  NOTES:
CA
CA  This routine does not generate its own error code. It passes the network
CA  subsystem error code.
CA
CA  main()
CA  {
CA       long     handle, ier;
CA
CA >>>> micint_("<host_name>","<server_name>",&handle,&ier);
CA                .
CA                .
CA                .
CA       miclos_(&handle,&ier);
CA  }
CA
CA
CA  RESTRICTIONS:  none
CA
CA
C   PORTABILITY:   PORTABLE
C
C
C   METHOD:
C
C   This routine frees dynamic memory used by this subsystem and then closes
```

```
C    the network communication by calling network subsystem routine nuclos.
C
C
C    REVISED:
C
C    1. 04/29/88 - Jonathan Winata - Original version.
C    2. 07/28/88 - EEA - changed to use X11/lgc path in #include statements
C    3. 08/16/88 - EEA - changed back to original #include path.
C    4. 07NOV88  EES  changed from EXTERNAL to CONTROLLED
C
C
C ---------------------------------------------------------------------
C  Copyright (C) 1988, LANDMARK GRAPHICS CORP.
C  All rights reserved.
C ---------------------------------------------------------------------
C
*/
#include         <lgc/lgcdef.h>

extern  void    mipurg_();
extern  void    nuclos_();
extern  void    ohnooo_();

#ifdef  MODULE
#undef  MODULE
#endif
#define MODULE  520008

void miclos_ (handle, ier)
long *handle;
long *ier;
{
    *ier = SUCCESSFUL;

    mipurg_(ier);                         /* free dynamic memory */
    if (*ier != SUCCESSFUL) {
        ohnooo_(ier,"miclos: error code from mipurg");
    }

    nuclos_(handle, ier);                 /* close network communication */
    if (*ier != SUCCESSFUL) {
        ohnooo_(ier,"miclos: error closing network comm");
        return;
    }

    ohnooo_(ier, "miclos: tracing");
    return;
}
```

```
/*
CA  CHECKIN DATE: 11/09/88
CA  MODULE NUMBER:  520003
CA
CA
CA  NAME:        MISEND
CA
CA
CA  FUNCTION:    Formats and sends a structure that is self descriptive through
CA               network communication.
CA
CA
CA  APPLICATION/SUBSYSTEM:  Message Interface (mi) CONTROLLED
CA
CA
C   AUTHORS:     Jonathan Winata
C
C
CA  LINKAGE:     void misend(handle,mibuf,ier)
CA
CA
CA  ARGUMENT
CA    NAME       USE   TYPE     DESCRIPTION
CA  ---------    ---   ----     -----------
CA  handle        I    long *   file handle for network comm.
CA  mibuf         I    MI_DsAd  self-descriptive structure
CA  ier           O    long *   Error Return code
CA                                        0 = successful
CA                              152000301 = no data to send
CA                              352000303 = malloc failure
CA                              352000304 = buffer addr check (debug)
CA                              352000306 = illegal handle
CA                              x5300yyzz = network routine status
CA
CA
CA  NOTES:
CA
CA  This routine may be called by other subsystems (i.e pd and netdb)
CA  It is declared CONTROLLED because it is not callable from FORTRAN.
CA
CA  This routine does not generate its own error status but passes on
CA  the status from network calls.
CA
CA  Function address is a special data-type that does not go through data
CA  conversion.  They are passed as bit-streams of a certain length (which
CA  may be different from system to system) rounded to the next byte boundary.
CA  This length is specified in the structure.
CA
CA
CA  RESTRICTIONS:
CA
CA  Callable only from C program because of the complexity of the structure.
CA
CA
C   PORTABILITY:   PORTABLE
C
```

```
C
C   METHOD:
C
C   This routine assumes that MIxINT has been called to get the handle to
C   network I/O.  The key to this routine is the structure MI_DSC.
C   This structure contains the number of elements for each data-type and
C   a pointer to an array of values for each data-type.
C
C   The structure is described in midefs.h
C
C   MISEND routine uses this structure to build a packed array that contains
C   all the information described in this structure and sends it across the
C   network.  The packed array that is build is understood by MIRECV that
C   unpacks the array and do the appropriate data conversion on the values
C   in the arrays.
C
C
C   REVISED:
C
C   1. 04/29/88 - Jonathan Winata - Original version.
C   2. 07/28/88 - EEA - changed to use X11 path in #include statements
C   3. 07/29/88 - Jonathan Winata - Checks for valid handle.
C   4. 08/16/88 - EES - changed back to original include path
C   5. 11/09/88 - WKH - Added free allocated memory and reset nvecs to
C                 zero at all places where fatal error occurs and before
C                 return.
C
C
C -----------------------------------------------------------------------
C  Copyright (C) 1988, LANDMARK GRAPHICS CORP.
C  All rights reserved.
C -----------------------------------------------------------------------
C
*/
#include        <lgc/lgcdef.h>
#ifdef  NW_INCL
#undef  NW_INCL
#endif
#include        <lgc/nwdefs.h>
#include        <lgc/dcdefs.h>

#ifdef  MI_INIT
#undef  MI_INIT
#endif
#include        <lgc/micoms.h>

extern  void    nwsend_();
extern  void    ohnooo_();

#ifdef  MODULE
#undef  MODULE
#endif
#define MODULE  520003

void misend(handle, mibuf, ier)
long    *handle;
```

```
MI_DsAd mibuf;
long    *ier;
{
    long   i, j, k;            /* index/loop counters */
    static char **vecs;        /* pointer to array of pointers */
    static long *len;          /* lengths of arrays pointed by **vecs */
    static long *vlen;         /* control buffer */
    static long nvecs = 0;     /* size of allocation for control buffer */

#ifdef  DBGSW
    *ier = LEV2ER + MODULE * 100 + MI_IADR;
    if (mibuf->dbl_arr == NULL && mibuf->n_dbl > 0)
        ohnooo_ (ier,"misend: dbl_arr is NULL");
    if (mibuf->flt_arr == NULL && mibuf->n_flt > 0)
        ohnooo_ (ier,"misend: flt_arr is NULL");
    if (mibuf->lng_arr == NULL && mibuf->n_lng > 0)
        ohnooo_ (ier,"misend: lng_arr is NULL");
    if (mibuf->shr_arr == NULL && mibuf->n_shr > 0)
        ohnooo_ (ier,"misend: shr_arr is NULL");
    if (mibuf->ptr_arr == NULL && mibuf->n_ptr > 0)
        ohnooo_ (ier,"misend: ptr_arr is NULL");
    for (i = 0; i < mibuf->n_str; i++) {
        j = mibuf->str_arr[i].len * mibuf->str_arr[i].nelem;
        if (mibuf->str_arr[i].str == NULL || j <= 0)
            ohnooo_ (ier,"misend: str_arr is NULL");
    }
#endif

    if (*handle < 0 || *handle >= NW_MXHL) {
        *ier = LEV3ER + MODULE * 100 + MI_IHDL;
        ohnooo_(ier,"misend: invalid handle");
        return;
    }
    *ier = SUCCESSFUL;

    /* figure out size of control buffer needed for this message */
    j = 0;
    i = mibuf->n_dbl + mibuf->n_flt + mibuf->n_lng +
        mibuf->n_shr  + mibuf->n_str;
    if (mibuf->n_ptr > 0)
        j = i;

    if ((i + j) <= 0) {
        *ier = LEV1ER + MODULE * 100 + MI_NODT;
        ohnooo_(ier,"misend: no data to send.");
        return;
    }
    if ((i + j) > nvecs)
    {
        if (nvecs > 0)
        {
            free(vecs);
            free(len);
            free(vlen);
        }
        nvecs = 0;
```

```
    vecs = (char **) malloc((i + j + 3) * sizeof(char *));
    if (vecs == NULL)
    {
        *ier = LEV3ER + MODULE * 100 + MI_IMEM;
        ohnooo_(ier,"misend: no memory for control buffer (vecs)");
        return;
    }
    len = (long *) malloc((i + j + 4) * sizeof(long));
    if (len == NULL)
    {
        free(vecs);
        nvecs = 0;
        *ier = LEV3ER + MODULE * 100 + MI_IMEM;
        ohnooo_(ier,"misend: no memory for control buffer (len)");
        return;
    }
    vlen = (long *) malloc((i + 1) * sizeof(long));
    if (vlen == NULL)
    {
        free(vecs);
        free(len);
        nvecs = 0;
        *ier = LEV3ER + MODULE * 100 + MI_IMEM;
        ohnooo_(ier,"misend: no memory for control buffer (vlen)");
        return;
    }
    nvecs = i + j;
}

/* first send header of longwords that contains the number of arrays *
 * to be sent from each data type.                                    */
len[0]  = sizeof(long);                  /* Number of data types */
vecs[0] = (char *)&vlen[0];
vlen[0] = MI_NDTP;
len[1]  = MI_NDTP * sizeof(long);  /* Array counts for each type */
vecs[1] = (char *)mibuf;
len[2]  = i * sizeof(long);              /* Length of each array */
vecs[2] = (char *)&vlen[1];
i = 3;
j = 1;

/* do it for each data types that are supported */
if (mibuf->n_dbl > 0)
    for (k = 0; k < mibuf->n_dbl; k++)
    {
        vlen[j++] = mibuf->dbl_arr[k].nelem;
        len[i]    = mibuf->dbl_arr[k].nelem * sizeof(double);
        vecs[i++] = (char *)mibuf->dbl_arr[k].arr_ptr;
    }

if (mibuf->n_flt > 0)
    for (k = 0; k < mibuf->n_flt; k++)
    {
        vlen[j++] = mibuf->flt_arr[k].nelem;
        len[i]    = mibuf->flt_arr[k].nelem * sizeof(float);
        vecs[i++] = (char *)mibuf->flt_arr[k].arr_ptr;
```

```
    }

if (mibuf->n_lng > 0)
    for (k = 0; k < mibuf->n_lng; k++)
    {
        vlen[j++] = mibuf->lng_arr[k].nelem;
        len[i]    = mibuf->lng_arr[k].nelem * sizeof(long);
        vecs[i++] = (char *)mibuf->lng_arr[k].arr_ptr;
    }

if (mibuf->n_shr > 0)
    for (k = 0; k < mibuf->n_shr; k++)
    {
        vlen[j++] = mibuf->shr_arr[k].nelem;
        len[i]    = mibuf->shr_arr[k].nelem * sizeof(short);
        vecs[i++] = (char *)mibuf->shr_arr[k].arr_ptr;
    }

if (mibuf->n_str > 0)
    for (k = 0; k < mibuf->n_str; k++)
    {
        vlen[j++] = mibuf->str_arr[k].nelem * 65536 +
                    mibuf->str_arr[k].len;
        len[i]    = mibuf->str_arr[k].nelem *
                    mibuf->str_arr[k].len;
        vecs[i++] = mibuf->str_arr[k].str;
    }

if (mibuf->n_ptr > 0)
{
    len[i]    = (mibuf->n_ptr * mibuf->l_ptr - 1) / MI_NBBY + 1;
    vecs[i++] = mibuf->ptr_arr;
}
len[i] = 0;

/* ready to send across */
nwsend_(handle, len, vecs, ier);
if (*ier)
{
    free(vecs);
    free(len);
    free(vlen);
    nvecs = 0;
    ohnooo_(ier,"misend: error sending message");
    return;
}

free(vecs);
free(len);
free(vlen);
nvecs = 0;
ohnooo_(ier,"misend: tracing");
return;
}
```

```
/*
CA  CHECKIN DATE: 11/10/88
CA  MODULE NUMBER:  520007
CA
CA
CA  NAME:         MIPURG
CA
CA
CA  FUNCTION:     Free dynamic memory without closing communication channel.
CA
CA
CA  APPLICATION/SUBSYSTEM:  Message Interface (mi) CONTROLLED
CA
CA
C   AUTHORS:      Jonathan Winata
C
C
CA  LINKAGE:      call mipurg (ier)
CA
CA
CA  ARGUMENT
CA    NAME        USE     TYPE      DESCRIPTION
CA  ---------     ---     ----      -----------
CA  ier            O      I*4       Error Return code
CA                                          0 = successful
CA                                  152000705 = no temporary buffer to purge
CA
CA
CA  NOTES:
CA
CA  This routine frees all dynamic memory that has been allocated by mirecv
CA  since the last call to mipurg/miclos.
CA
CA  This is particularly useful if you run out of memory after receiving
CA  a large message.  (This is not done automatically just in case there
CA  will be another large buffer to be received).
CA
CA  *** WARNING *** be very careful that none of the data that was in the
CA  buffer is needs to be accessed after this procedure is called.
CA
CA  main()
CA  {
CA      long    handle, ier;
CA
CA      micint_(getenv("DB_NODE"),"SWAT_Server",&handle,&ier);
CA                  .
CA                  .
CA                  .
CA      ptr = malloc(sizeof(something));
CA      if (ptr == NULL) {
CA          mipurg_(&ier);
CA          ptr = malloc(sizeof(something));
CA          if (ptr == NULL)             !- sorry, can't help it
CA              exit(-1);
CA      }
CA      . . . more processing . . .
```

```
CA      free(ptr);
CA      . . . more processing . . .
CA      miclos_(&handle,&ier);
CA  }
CA
CA
CA  RESTRICTIONS:  none
CA
CA
C   PORTABILITY:   PORTABLE
C
C
C   METHOD:  none
C
C
C   REVISED:
C
C    1. 04/29/88 - Jonathan Winata - Original version.
C    2. 07/28/88 - EEA - changed to use X11/lgc path in #include statements
C    3. 08/16/88 - EEA - changed back to original #include path.
C    4. 07NOV88  EES  changed from EXTERNAL to CONTROLLED
C    5. 11/10/88 - WKH - Deleted external declaration of nwpurg_, sinice
C                        it is never called by this routine.
C
C
C --------------------------------------------------------------------
C  Copyright (C) 1988, LANDMARK GRAPHICS CORP.
C  All rights reserved.
C --------------------------------------------------------------------
C
*/
#include        <lgc/lgcdef.h>

#ifdef  MI_INIT
#undef  MI_INIT
#endif
#include        <lgc/micoms.h>

extern  void    ohnooo_();

#ifdef  MODULE
#undef  MODULE
#endif
#define MODULE  520007

void mipurg_ (ier)
long *ier;
{
    *ier = SUCCESSFUL;

    if ((micoms_.mib_len + micoms_.hdr_len) == 0) {
        *ier = LEVIER + MODULE * 100 + MI_NALC;
        ohnooo_(ier, "mipurg: no memory allocated for MI");
        return;
    }
    /* free MI buffer for data conversion */
```

```
    if (micoms_.mib_len > 0)
         free(micoms_.mib_ptr);
    micoms_.mib_ptr = NULL;
    micoms_.mib_len = 0;
    if (micoms_.hdr_len > 0)
         free(micoms_.hdr_ptr);
    micoms_.hdr_ptr = NULL;
    micoms_.hdr_len = 0;
    ohnooo_(ier,"mipurg:  tracing");
    return;
}
```

```
/*
CA   CHECKIN DATE: 08/23/88
CA   MODULE NUMBER:   520000
CA
CA
CA   NAME:        MISINT
CA
CA
CA   FUNCTION:   Sets up the network communication for server.
CA
CA
CA   APPLICATION/SUBSYSTEM:  Message Interface (mi) CONTROLLED
CA
CA
C    AUTHOR:     Jonathan Winata
C
C
CA   LINKAGE:    CALL MISINT (NODE, SERVER, HANDLE, NUMSRV, IER)
CA
CA
CA   ARGUMENT
CA     NAME         USE    TYPE      DESCRIPTION
CA   ---------      ---    ----      -----------
CA   NODE            I     C*(*)     name of node where server is.
CA   SERVER          I     C*(*)     name of server
CA   HANDLE(1:*)     O     I         file handle for network comm.
CA   NUMSRV          O     I         number of handles allocated for server
CA   IER             O     I         Error Return code
CA                                            0 = successful
CA                                   352000003 = MIINIT failure
CA                                   x5300yyzz = network routine status
CA
CA
CA   NOTES:
CA
CA   This routine does not generate its own error code.  It just passes the
CA   network subsystem's error code.
CA
CA   Following is an example of how this routine is called:
CA
CA   #include     <lgc/nwdefs.h>
CA   main()
CA   {
CA       long srvhdl[NW_MXHL], numsrv, ier;
CA
CA       misint_("<node_name>","<server_name>",srvhdl,&numsrv,&ier);
CA       if (ier != 0) exit(-1);
CA
CA            . . . server process . . .
CA
CA   }
CA
CA
CA   RESTRICTIONS:   none
CA
CA
```

```
C   PORTABILITY:   PORTABLE
C
C
C   METHOD:
C
C   This routine initializes common blocks and establishes the server's
C   communication by calling network subsystem routine NWSOPN.
C
C
C   REVISED:
C
C   1. 06/29/88 - Jonathan Winata - Original version.
C   2. 07/28/88 - EEA - changed to use X11/lgc path in #include statements
C   3. 07/29/88 - Jonathan Winata - Calls MIINIT for allocating and
C                                   initializing internal table.
C   4. 08/16/88 - EEA - changed back to original #include path.
C   5. 07NOV88  EES  changed from EXTERNAL to CONTROLLED
C
C
C ------------------------------------------------------------------
C  Copyright (C) 1988, LANDMARK GRAPHICS CORP.
C  All rights reserved.
C ------------------------------------------------------------------
C
*/
#include        <lgc/lgcdef.h>
#ifdef  NW_INCL
#undef  NW_INCL
#endif
#include        <lgc/nwdefs.h>

#ifdef  MI_INIT
#undef  MI_INIT
#endif
#include        <lgc/micoms.h>

extern  void    nwsopn_();
extern  void    ohnooo_();

#ifdef  MODULE
#undef  MODULE
#endif
#define MODULE  520000

void misint_(node, server, handle, numsrv, ier)
char *node;
char *server;
long *handle;
long *numsrv;
long *ier;
{
    static  long    first = TRUE;   /* first time flag */
    long    i;

    *ier = SUCCESSFUL;
```

```
    if (first == TRUE) {
        miinit(ier);
        if (*ier != SUCCESSFUL) {
            *ier = LEV3ER + MODULE * 100 + MI_IMEM;
            ohnooo_(ier,"misint: no more memory for conversion map.");
            return;
        }
        first   = FALSE;
    }

    nwsopn_(node, server, handle, numsrv, ier);
    if (*ier) {
        ohnooo_(ier,"misint: network open error");
        return;
    }

    for (i = 0; i < *numsrv; i++)
        micoms_.hd_typ[handle[i]] = NW_SVTP;

    ohnooo_(ier,"misint: tracing");
    return;
}
```

```
/*
CA  CHECKIN DATE: 11/09/88
CA  MODULE NUMBER:  520009
CA
CA
CA  NAME:         MIUNPK
CA
CA
CA  FUNCTION:  Unpacks data portion of message from remote host to local
CA             host's buffer.  Data conversion is done when needed.
CA
CA
CA  APPLICATION/SUBSYSTEM:  Message Interface (MI) INTERNAL
CA
CA
C   AUTHOR:       Jonathan Winata
C
C
CA  LINKAGE:      long miunpk (handle,narrays,mibuf)
CA
CA
CA  ARGUMENT
CA    NAME        USE    TYPE     DESCRIPTION
CA  ---------     ---    ----     -----------
CA  handle         I     long     network comm handle
CA  narrays        I     long     number of arrays
CA  mibuf          O     MI_DsAd  self-descriptive structure
CA  miunpk()       O     long     Error Return code
CA                                    0 = successful else, network error
CA                               x4000yyzz = data conversion status
CA                               x5300yyzz = network routine status
CA
CA
CA  NOTES:
CA
CA  This routine copies data from the network data message buffer to
CA  client's message interface buffer converting data on the fly to the
CA  local system's architecture.
CA
CA  It assumes that the structure has been predefined by the caller and
CA  memory space to hold the data is allocated.
CA
CA  Function address is a special data-type that does not go through data
CA  conversion.  They are passed as bit-streams of a certain length (which
CA  may be different from system to system) rounded to the next byte boundary.
CA  This length is specified in the structure described in midefs.h.
CA
CA
CA  RESTRICTIONS:  none
CA
CA
C   PORTABILITY:   PORTABLE
C
C
C   METHOD:
C
```

```
c   This routine first allocates dynamic memory to store pointers to
c   temporary buffers for data conversion, pointers to output buffers,
c   lengths of buffers in bytes, and length of buffers in element counts.
c
c   Then for each array, it checks if the type is compatible with
c   local host type; if it is, it uses the actual output buffer for read
c   operation; else, it reads the array into temporary buffer and then
c   converts directly into output buffer (the actual processing of arrays
c   in temporary buffer is actually deferred until the buffer is full).
c
c
c   REVISED:
c
c   1. 06/29/88 - Jonathan Winata - Original version.
c   2. 07/28/88 - EEA - changed to use X11 path in #include statements
c   3. 08/16/88 - EEA - changed back to original include path
c   4. 11/09/88 - WKH - Added samehost flag to eliminate calling twice
c                  to dcvhtp. Added free allocated memory at all places
c                  before return. Added internal documentation.
c
c
c ----------------------------------------------------------------------
c  Copyright (C) 1988, LANDMARK GRAPHICS CORP.
c  All rights reserved.
c ----------------------------------------------------------------------
c
*/
#include        <lgc/lgcdef.h>
#ifdef  NW_INCL
#undef  NW_INCL
#endif
#include        <lgc/nwdefs.h>
#include        <lgc/dcdefs.h>

#ifdef  MI_INIT
#undef  MI_INIT
#endif
#include        <lgc/micoms.h>

extern  void    dcvccv_();
extern  void    dcvcsz_();
extern  void    dcvctp_();
extern  void    dcvdcv_();
extern  void    dcvdsz_();
extern  void    dcvdtp_();
extern  void    dcvfcv_();
extern  void    dcvfsz_();
extern  void    dcvftp_();
extern  void    dcvhtp_();          /* host type */
extern  void    dcvlcv_();
extern  void    dcvlsz_();
extern  void    dcvltp_();
extern  void    dcvscv_();
extern  void    dcvssz_();
extern  void    dcvstp_();
extern  void    nwrecv_();
```

```
extern  void    ohnooo_();

#ifdef  MODULE
#undef  MODULE
#endif
#define MODULE  520009

long miunpk (handle, narrays, mibuf)
long    *handle;
long    narrays;
MI_DsAd mibuf;
{
    struct  MIUNPK  {
        void    (*func)();      /* data conversion functions */
        char    *to;            /* buffer addresses to convert into */
    }   *mi;
    long    *nelem;  /* lengths */
    long    *nbyts;  /* length of array in bytes */
    char    **from;  /* array of buffer addresses to read into */
    char    *ptr;    /* pointer to temporary buffer for data conversion */
    char    *cptr;   /* pointer to current position in output buffer */
    char    *lptr;   /* pointer to current position in temp. buffer */
    long    i, j, k; /* general purpose index/loop counter */
    long    len;     /* length of temporary buffer used */
    long    htype;   /* host type */
    long    alen;    /* array length */
    long    rlen;    /* remaining length */
    long    flag;    /* compatibility flag */
    long    vsize;   /* variable size */
    long    samehost;/* host type identical flag */
    long    ier;

    ier = SUCCESSFUL;

    len = 0;
    htype = micoms_.dc_map[*handle];    /* get host type for data conversion */
    samehost = TRUE;

    /*
      Check if host type is identical, if it is not then get dynamic memory
      for conversion.
    */
    dcvhtp_(&htype,&flag);
    if (flag != SUCCESSFUL)
    {
        len     = MIALIGN((narrays * sizeof(struct MIUNPK)));
        lptr    = ptr = (char *)malloc(NW_NPSZ);
        samehost = FALSE;
    }

    /*
      Allocate memory and set up arrays for data conversion. One call to
      malloc get enough memory to store the from, nelem, nbytes and mi
      arrays. These memory locations are used for both host name compatible
      and non-compatible condition.
    */
```

```
len    += MIALIGN((narrays * sizeof(char **))) +
          MIALIGN((narrays * sizeof(long)))   +
          (narrays + 1) * sizeof(long);
cptr   = (char *)malloc(len);
from   = (char **)cptr;
cptr  += MIALIGN((narrays * sizeof(char **)));
nelem  = (long *)cptr;
cptr  += MIALIGN((narrays * sizeof(long)));
nbyts  = (long *)cptr;
if (flag != SUCCESSFUL)
{
    cptr += MIALIGN(((narrays + 1) * sizeof(long)));
    mi    = (struct MIUNPK *)cptr;
}

i   = 0;
len = 0;
/* Process double type */
if (mibuf->n_dbl > 0)
{
    /* Local host compatible with remote host */
    dcvdtp_(&htype,&flag);
    if (flag == SUCCESSFUL)
    {
        /* Compatible type; read directly into output buffers */
        for (j = 0; j < mibuf->n_dbl; j++)
        {
            nelem[i]    = 0;
            from[i]     = (char *)mibuf->dbl_arr[j].arr_ptr;
            nbyts[i++] = mibuf->dbl_arr[j].nelem * sizeof(double);
        }
    }
    else
    {
        /* Not compatible; conversion will have to be done */
        dcvdsz_(&htype,&vsize,&ier);
        if (ier != SUCCESSFUL)
        {
            if (samehost == FALSE) free(ptr);
            free(from);
            ohnooo_(&ier,"miunpk: remote double type is not recognized.");
            return;
        }
        /*
           Convert each input double array
        */
        for (j = 0; j < mibuf->n_dbl; j++)
        {
            rlen = mibuf->dbl_arr[j].nelem;                  /* get length */
            alen = rlen * vsize;                /* convert length to bytes */
            cptr = (char *)mibuf->dbl_arr[j].arr_ptr; /* output buffer */
            if ((len + alen) > NW_NPSZ)
            {
                /*
                   Current buffer will cause overflow of temp. buffer; so
                   process previous buffers
```

```
     */
    nbyts[i] = 0; /* terminate buffer list */
    /* previous buffers exist, process them */
    if (i > 0)
    {
        nwrecv_(handle,nbyts,from,&ier);
        if (ier != SUCCESSFUL)
        {
            if (samehost == FALSE) free(ptr);
            free(from);
            ohnooo_(&ier,"miunpk: error reading message.");
            return(ier);
        }
        for (k = 0; k < i; k++)
        {
            /* convert when needed */
            if (nelem[k] != 0)
            {
                (*mi[k].func)(&htype,&nelem[k],from[k],
                              mi[k].to,&ier);
                if (ier != SUCCESSFUL)
                    ohnooo_(&ier,"miunpk: conversion error.");
            }
        }
        i = 0;          /* reset index to control array */
        len = 0;        /* temp buffer is empty */
    }
    nbyts[1] = 0;   /* prepare buffer list of length 1 */
    while (alen > NW_NPSZ)
    {
        len      = NW_NPSZ / vsize; /* fit packet */
        rlen    -= len;            /* remaining to be done */
        nbyts[0] = len * vsize;
        from[0]  = ptr;   /* read into temporary buffer */
        nwrecv_(handle,nbyts,from,&ier);
        if (ier != SUCCESSFUL)
        {
            if (samehost == FALSE) free(ptr);
            free(from);
            ohnooo_(&ier,"miunpk: error reading message.");
            return(ier);
        }
        /* convert into output buffer */
        dcvdcv_(&htype,&len,ptr,cptr,&ier);
        if (ier != SUCCESSFUL)
            ohnooo_(&ier,"miunpk: conversion error.");
        cptr += len * sizeof(double);  /* adjust output ptr */
        alen -= nbyts[0];              /* and length remain */
    }
    len = 0;             /* temp buffer is empty */
    lptr = ptr;
}
/* still some remain that fit in temp buf */
if (rlen > 0)
{
    mi[i].func = dcvdcv_;    /* set up function */
```

```
                from[i]     = lptr;        /* point to temp buffer for read */
                mi[i].to    = cptr;        /* point to out buffer for cvt */
                nelem[i]    = rlen;        /* number of doubles to be procd */
                nbyts[i++] = rlen * vsize;
                len         = MIALIGN((rlen * vsize)); /* align */
                lptr       += len;         /* and adjust temp buf pointer */
            }
        }
    }
}
/* process float type */
if (mibuf->n_flt > 0)
{
    dcvftp_(&htype,&flag);
    if (flag == SUCCESSFUL)
    {
        for (j = 0; j < mibuf->n_flt; j++)
        {
            nelem[i]    = 0;
            from[i]     = (char *)mibuf->flt_arr[j].arr_ptr;
            nbyts[i++] = mibuf->flt_arr[j].nelem * sizeof(float);
        }
    }
    else
    {
        /* Not compatible; conversion will have to be done */
        dcvfsz_(&htype,&vsize,&ier);
        if (ier != SUCCESSFUL)
        {
            if (samehost == FALSE) free(ptr);
            free(from);
            ohnooo_(&ier,"miunpk: remote's float type is not supported");
            return;
        }
        for (j = 0; j < mibuf->n_flt; j++)
        {
            rlen = mibuf->flt_arr[j].nelem;       /* get length */
            alen = rlen * vsize;           /* convert to bytes */
            cptr = (char *)mibuf->flt_arr[j].arr_ptr; /* output buffer */
            if ((len + alen) > NW_NPSZ)
            {
                /* current buffer will cause overflow of temp. buffer; *
                 * so, process previous buffers                         */
                nbyts[i] = 0; /* terminate buffer list */
                /* previous buffers exist, process them */
                if (i > 0)
                {
                    nwrecv_(handle,nbyts,from,&ier);
                    if (ier != SUCCESSFUL)
                    {
                        if (samehost == FALSE) free(ptr);
                        free(from);
                        ohnooo_(&ier,"miunpk: error reading message.");
                        return(ier);
                    }
                    for (k = 0; k < i; k++)
```

```
                {
                    /* convert when needed */
                    if (nelem[k] != 0)
                    {
                        (*mi[k].func)(&htype,&nelem[k],from[k],
                                        mi[k].to,&ier);
                        if (ier != SUCCESSFUL)
                            ohnooo_(&ier,"miunpk: conversion error.");
                    }
                }
                i = 0;          /* reset index to control array */
                len = 0;        /* temp buffer is empty */
            }
            nbyts[1] = 0;   /* prepare buffer list of length 1 */
            while (alen > NW_NPSZ)
            {
                len      = NW_NPSZ / vsize; /* fit packet */
                rlen    -= len;             /* remaining to be done */
                nbyts[0] = len * vsize;
                from[0]  = ptr;    /* read into temporary buffer */
                nwrecv_(handle,nbyts,from,&ier);
                if (ier != SUCCESSFUL)
                {
                    if (samehost == FALSE) free(ptr);
                    free(from);
                    ohnooo_(&ier,"miunpk: error reading message.");
                    return(ier);
                }
                /* convert into output buffer */
                dcvfcv_(&htype,&len,ptr,cptr,&ier);
                if (ier != SUCCESSFUL)
                    ohnooo_(&ier,"miunpk: conversion error.");
                cptr += len * sizeof(float);  /* adjust output ptr */
                alen -= nbyts[0];               /* and length remain */
            }
            len = 0;              /* temp buffer is empty */
            lptr = ptr;
        }
        /* still some remain that fit in temp buf */
        if (rlen > 0)
        {
            mi[i].func = dcvfcv_;    /* set up function */
            from[i]    = lptr;       /* point to temp buffer for read */
            mi[i].to   = cptr;       /* point to out buffer for cvt */
            nelem[i]   = rlen;       /* number of doubles to be procd */
            nbyts[i++] = rlen * vsize;
            len        = MIALIGN((rlen * vsize)); /* align */
            lptr      += len;        /* and adjust temp buf pointer */
        }
    }
  }
}
if (mibuf->n_lng > 0)
{
    dcvltp_(&htype,&flag);
    if (flag == SUCCESSFUL)
```

```
.{
     for (j = 0;  j < mibuf->n_lng;  j++)
     {
         nelem[i]    = 0;
         from[i]     = (char *)mibuf->lng_arr[j].arr_ptr;
         nbyts[i++] = mibuf->lng_arr[j].nelem * sizeof(long);
     }
 }
 else
 {
     /* Not compatible; conversion will have to be done */
     dcvlsz_(&htype,&vsize,&ier);
     if (ier != SUCCESSFUL)
     {
         if (samehost == FALSE) free(ptr);
         free(from);
         ohnooo_(&ier,"miunpk: remote's long type is not recognized.");
         return;
     }
     for (j = 0;  j < mibuf->n_lng;  j++)
     {
         rlen = mibuf->lng_arr[j].nelem;      /* get length */
         alen = rlen * vsize;         /* convert to bytes */
         cptr = (char *)mibuf->lng_arr[j].arr_ptr; /* output buffer */
         if ((len + alen) > NW_NPSZ)
         {
             /* current buffer will cause overflow of temp. buffer; *
              * so, process previous buffers                         */
             nbyts[i] = 0; /* terminate buffer list */
             /* previous buffers exist, process them */
             if (i > 0)
             {
                 nwrecv_(handle,nbyts,from,&ier);
                 if (ier != SUCCESSFUL)
                 {
                     if (samehost == FALSE) free(ptr);
                     free(from);
                     ohnooo_(&ier,"miunpk: error reading message.");
                     return(ier);
                 }
                 for (k = 0; k < i; k++)
                 {
                     /* convert when needed */
                     if (nelem[k] != 0)
                     {
                         (*mi[k].func)(&htype,&nelem[k],from[k],
                                   mi[k].to,&ier);
                         if (ier != SUCCESSFUL)
                             ohnooo_(&ier,"miunpk: conversion error.");
                     }
                 }
                 i = 0;       /* reset index to control array */
                 len = 0;     /* temp buffer is empty */
             }
             nbyts[i] = 0;    /* prepare buffer list of length 1 */
             while (alen > NW_NPSZ)
```

```
                {
                    len       = NW_NPSZ / vsize; /* fit packet */
                    rlen     -= len;           /* remaining to be done */
                    nbyts[0] = len * vsize;
                    from[0]  = ptr;    /* read into temporary buffer */
                    nwrecv_(handle,nbyts,from,&ier);
                    if (ier != SUCCESSFUL)
                    {
                        if (samehost == FALSE) free(ptr);
                        free(from);
                        ohnooo_(&ier,"miunpk: error reading message.");
                        return(ier);
                    }
                    /* convert into output buffer */
                    dcvlcv_(&htype,&len,ptr,cptr,&ier);
                    if (ier != SUCCESSFUL)
                        ohnooo_(&ier,"miunpk: conversion error.");
                    cptr += len * sizeof(long);  /* adjust output ptr */
                    alen -= nbyts[0];            /* and length remain */
                }
                len = 0;              /* temp buffer is empty */
                lptr = ptr;
            }
            /* still some remain that fit in temp buf */
            if (rlen > 0)
            {
                mi[i].func = dcvlcv_;   /* set up function */
                from[i]    = lptr;      /* point to temp buffer for read */
                mi[i].to   = cptr;      /* point to out buffer for cvt */
                nelem[i]   = rlen;      /* number of doubles to be procd */
                nbyts[i++] = rlen * vsize;
                len        = MIALIGN((rlen * vsize)); /* align */
                lptr      += len;       /* and adjust temp buf pointer */
            }
        }
    }
}

if (mibuf->n_shr > 0)
{
    dcvstp_(&htype,&flag);
    if (flag == SUCCESSFUL)
    {
        for (j = 0; j < mibuf->n_shr; j++)
        {
            nelem[i]   = 0;
            from[i]    = (char *)mibuf->shr_arr[j].arr_ptr;
            nbyts[i++] = mibuf->shr_arr[j].nelem * sizeof(short);
        }
    }
    else
    {
        /* Not compatible; conversion will have to be done */
        dcvssz_(&htype,&vsize,&ier);
        if (ier != SUCCESSFUL)
        {
```

```
    if (samehost == FALSE) free(ptr);
    free(from);
    ohnooo_(&ier,"miunpk: remote's short type is not supported.");
    return;
}
for (j = 0; j < mibuf->n_shr; j++)
{
    rlen = mibuf->shr_arr[j].nelem;      /* get length */
    alen = rlen * vsize;          /* convert to bytes */
    cptr = (char *)mibuf->shr_arr[j].arr_ptr; /* output buffer */
    if ((len + alen) > NW_NPSZ)
    {
        /* current buffer will cause overflow of temp. buffer; *
         * so, process previous buffers                         */
        nbyts[i] = 0; /* terminate buffer list */
        /* previous buffers exist, process them */
        if (i > 0)
        {
            nwrecv_(handle,nbyts,from,&ier);
            if (ier != SUCCESSFUL)
            {
                if (samehost == FALSE) free(ptr);
                free(from);
                ohnooo_(&ier,"miunpk: error reading message.");
                return(ier);
            }
            for (k = 0; k < i; k++)
            {
                /* convert when needed */
                if (mi[k].func != 0)
                {
                    (*mi[k].func)(&htype,&nelem[k],from[k],
                                  mi[k].to,&ier);
                    if (ier != SUCCESSFUL)
                        ohnooo_(&ier,"miunpk: conversion error.");
                }
            }
            i = 0;       /* reset index to control array */
            len = 0;     /* temp buffer is empty */
        }
        nbyts[1] = 0;   /* prepare buffer list of length 1 */
        while (alen > NW_NPSZ)
        {
            len      = NW_NPSZ / vsize; /* fit packet */
            rlen    -= len;          /* remaining to be done */
            nbyts[0] = len * vsize;
            from[0]  = ptr;    /* read into temporary buffer */
            nwrecv_(handle,nbyts,from,&ier);
            if (ier != SUCCESSFUL)
            {
                if (samehost == FALSE) free(ptr);
                free(from);
                ohnooo_(&ier,"miunpk: error reading message.");
                return(ier);
            }
            /* convert into output buffer */
```

```
                dcvscv_(&htype,&len,ptr,cptr,&ier);
                if (ier != SUCCESSFUL)
                    ohnooo_(&ier,"miunpk: conversion error.");
                cptr += len * sizeof(short);   /* adjust output ptr */
                alen -= nbyts[0];               /* and length remain */
            }
            len = 0;            /* temp buffer is empty */
            lptr = ptr;
        }
        /* still some remain that fit in temp buf */
        if (rlen > 0)
        {
            mi[i].func = dcvscv_;   /* set up function */
            from[i]    = lptr;      /* point to temp buffer for read */
            mi[i].to   = cptr;      /* point to out buffer for cvt */
            nelem[i]   = rlen;      /* number of doubles to be procd */
            nbyts[i++] = rlen * vsize;
            len        = MIALIGN((rlen * vsize)); /* align */
            lptr      += len;       /* and adjust temp buf pointer */
        }
      }
    }
}

if (mibuf->n_str > 0)
{
    dcvctp_(&htype,&flag);
    if (flag == SUCCESSFUL)
    {
        for (j = 0; j < mibuf->n_str; j++)
        {
            nelem[i]   = 0;
            from[i]    = (char *)mibuf->str_arr[j].str;
            nbyts[i++] = mibuf->str_arr[j].nelem * mibuf->str_arr[j].len;
        }
    }
    else
    {
        /* Not compatible; conversion will have to be done */
        dcvcsz_(&htype,&vsize,&ier);
        if (ier != SUCCESSFUL)
        {
            if (samehost == FALSE) free(ptr);
            free(from);
            ohnooo_(&ier,"miunpk: remote's string type is not recognized.");
            return;
        }
        for (j = 0; j < mibuf->n_str; j++)
        {
            rlen = mibuf->str_arr[j].nelem *
                   mibuf->str_arr[j].len;      /* get length */
            alen = rlen * vsize;              /* convert to bytes */
            cptr = mibuf->str_arr[j].str;   /* get output buffer */
            if ((len + alen) > NW_NPSZ)
            {
                /* current buffer will cause overflow of temp. buffer; *
```

```
     * so, process previous buffers                               */
    nbyts[i] = 0; /* terminate buffer list */
    /* previous buffers exist, process them */
    if (i > 0)
    {
        nwrecv_(handle,nbyts,from,&ier);
        if (ier != SUCCESSFUL)
        {
            if (samehost == FALSE) free(ptr);
            free(from);
            ohnooo_(&ier,"miunpk: error reading message.");
            return(ier);
        }
        for (k = 0; k < i; k++)
        {
            /* convert when needed */
            if (nelem[k] != 0)
            {
                (*mi[k].func)(&htype,&nelem[k],from[k],
                              mi[k].to,&ier);
                if (ier != SUCCESSFUL)
                    ohnooo_(&ier,"miunpk: conversion error.");
            }
        }
        i = 0;        /* reset index to control array */
        len = 0;      /* temp buffer is empty */
    }
    nbyts[1] = 0;    /* prepare buffer list of length 1 */
    while (alen > NW_NPSZ)
    {
        len       = NW_NPSZ / vsize; /* fit packet */
        rlen     -= len;            /* remaining to be done */
        nbyts[0] = len * vsize;
        from[0]  = ptr;    /* read into temporary buffer */
        nwrecv_(handle,nbyts,from,&ier);
        if (ier != SUCCESSFUL)
        {
            if (samehost == FALSE) free(ptr);
            free(from);
            ohnooo_(&ier,"miunpk: error reading message.");
            return(ier);
        }
        /* convert into output buffer */
        dcvccv_(&htype,&len,ptr,cptr,&ier);
        if (ier != SUCCESSFUL)
            ohnooo_(&ier,"miunpk: conversion error.");
        cptr += len * sizeof(char);  /* adjust output ptr */
        alen -= nbyts[0];            /* and length remain */
    }
    len = 0;              /* temp buffer is empty */
    lptr = ptr;
}
/* still some remain that fit in temp buf */
if (rlen > 0)
{
    mi[i].func = dcvccv_;    /* set up function */
```

```
                from[i]      = lptr;        /* point to temp buffer for read */
                mi[i].to     = cptr;        /* point to out buffer for cvt */
                nelem[i]     = rlen;        /* number of doubles to be-procd */
                nbyts[i++] = rlen * vsize;
                len          = MIALIGN((rlen * vsize)); /* align */
                lptr        += len;         /* and adjust temp buf pointer */
            }
        }
    }
}

if (mibuf->n_ptr > 0)
{
    nelem[i]    = 0;
    from[i]     = (char *)mibuf->ptr_arr;
    nbyts[i++] = (mibuf->n_ptr * mibuf->l_ptr - 1) / MI_NBBY + 1;
}
nbyts[i] = 0;
/* previous buffers exist, process them */
if (i > 0)
{
    nwrecv_(handle,nbyts,from,&ier);
    if (ier != SUCCESSFUL)
    {
        if (samehost == FALSE) free(ptr);
        free(from);
        ohnooo_(&ier,"miunpk: error reading message.");
        return(ier);
    }
    for (k = 0; k < i; k++)
```

```
/*
C --- CHECKIN DATE: 05/23/88
C --- MODULE NUMBER:  520001
C
C
CA  NAME:       MIACPT
CA
CA
CA  FUNCTION:  To accept client's initial request for network connection
CA             and set up data conversion routines.
CA
CA
CA  APPLICATION/SUBSYSTEM:  Message Interface (mi) EXTERNAL
CA
CA
C   AUTHOR:     Jonathan Winata
C
C
CA  LINKAGE:    CALL MIACPT(HANDLE,HDLRET,IER)
CA
CA
CA  ARGUMENT
CA    NAME        USE   TYPE     DESCRIPTION
CA  ---------     ---   ----     -----------
CA  HANDLE         I     I       server's file handle (returned by MISINT)
CA  HDLRET         O     I       client's handle received
CA  IER            O     I       return status
CA                                       0 = successful
CA                               352000107 = error exchanging host type
CA                               x4000yyzz = data conversion error
CA                               x5300yyzz = network routine error
CA
CA
CA  NOTES:
CA
CA  This routine is to be called by server process.  It allows the server
CA  accept a client request for connection at one of its server-handles.
CA  (Data will come in client's handle.)
CA
CA  Example of usage:
CA
CA  #include    <lgc/nwdefs.h>
CA  main()
CA  {
CA      long    hdl[NW_MXHL], rhdl[NW_MXHL+1], numsrv, i, j, ier;
CA
CA >>>> misint_("<host_name>","<server_name",hdl,&numsrv,&ier);
CA      if (ier != 0)
CA          exit(-1);
CA      j = numsrv;
CA      for (;;) {
CA >>>>     michki_(&numsrv,hdl,rhdl,&ier);
CA          if (ier != 0) {
CA              ohnooo_(ier,"SDServer: check input error.");
CA              continue;
CA          }
```

```
CA          i = 0;
CA          while (rhdl[i] >= 0) {
CA >>>>         miacpt_(&rhdl[i],&hdl[j--],&ier);
CA              if (ier != 0) {
CA                  ohnooo_(ier,"SDServer: accept client's connection error.");
CA                  continue;
CA              }
CA              i++;
CA          }
CA            .
CA            .
CA      }
CA  }
CA
CA
CA  RESTRICTIONS:
CA
CA
C   PORTABILITY:   PORTABLE
C
C
C   METHOD:
C
C   Steps taken by this routine:
C     a. calls network subsystem to receive connection request,
C     b. exchanges host type with remote host, and
C     c. initializes data conversion routine for that client.
C
C
C   REVISED:
C
C   1. 06/05/88 - Jonathan Winata - Original version.
C   2. 07/28/88 - EEA - changed to use X11 path in #include statements
C   3. 08/09/88 - Jonathan Winata - Adds status returns in the header.
C
C
C ---------------------------------------------------------------------
C  Copyright (C) 1988, LANDMARK GRAPHICS CORP.
C  All rights reserved.
C ---------------------------------------------------------------------
C
*/
#include        <lgc/lgcdef.h>
#ifdef  NW_INCL
#undef  NW_INCL
#endif
#include        <lgc/nwdefs.h>
#include        <lgc/dcdefs.h>

#ifdef  MI_INIT
#undef  MI_INIT
#endif
#include        <lgc/micoms.h>

extern  void    dcinit_();
extern  void    nwh2nl_();
```

```
extern  void    nwn2hl_();
extern  void    nwread_();
extern  void    nwsacc_();
extern  void    nwwrit_();
extern  void    ohnooo_();

#ifdef  MODULE
#undef  MODULE
#endif
#define MODULE  520001

void miacpt_ (handle, hdlret, ier)
long *handle;
long *hdlret;
long *ier;
{
    long    nbyts;                   /* byte counts on network I/O */
    long    htype;-                  /* host type in host format */
    char    ntype[4];                /* host type in network format */

    *ier = SUCCESSFUL;

    nwsacc_(handle, hdlret, ier);    /* accept a handle from net */
    if (*ier != 0) {
        ohnooo_(ier,"miacpt: error accepting handle.");
        return;
    }

    /* exchange host type to set up data conversion routines */
    htype = DC_LHTP;                 /* this is my type */
    nwh2nl_(&htype,ntype,ier);
    if (*ier != SUCCESSFUL) {        /* should never happen!!! */
        ohnooo_(ier,"miacpt: can't convert to 32-bit network data type.");
        return;
    }
    nbyts = 4;
    nwwrit_(hdlret,&nbyts,ntype,ier);
    if (*ier != SUCCESSFUL) {
        ohnooo_(ier,"miacpt: error exchanging host type (send).");
        return;
    }

    nbyts = 4;
    nwread_(hdlret,&nbyts,ntype,ier); /* Get remote host's type */
    if (*ier != SUCCESSFUL || nbyts != 4) {
        if (*ier == SUCCESSFUL)
            *ier = LEV3ER + MODULE * 100 + MI_NODT;
        ohnooo_(ier,"miacpt: error exchanging host type (receive).");
        return;
    }
    nwn2hl_(ntype,&htype,ier);
    if (*ier != SUCCESSFUL) {        /* should never happen!!! */
        ohnooo_(ier,"miacpt: can't convert from 32-bit network data type.");
        return;
    }
```

```
    /* Now I should be able to set up the necessary routines for data  *
     * conversion.                                                     */
    micoms_.dc_map[*hdlret] = htype;
    micoms_.hd_typ[*hdlret] = NW_SCTP;
    dcinit_(&htype,ier);
    if (*ier != SUCCESSFUL) {
        ohnooo_(ier,"miacpt: can't initialize data convertion routine.");
        return;
    }

    ohnooo_(ier, "miacpt: tracing");
    return;
}
```

```
/*
C --- CHECKIN DATE: 08/23/88
C --- MODULE NUMBER:  520005
C
C
CA  NAME:       MIRECV
CA
CA
CA  FUNCTION:  Receive and format network message in to a structure that
CA             is self descriptive.  (Data type conversion applied here).
CA
CA
CA  APPLICATION/SUBSYSTEM:  Message Interface (mi) CONTROLLED
CA
CA
C   AUTHOR:    Jonathan Winata
C
C
CA  LINKAGE:   void mirecv(handle,mibuf,ier)
CA
CA
CA  ARGUMENT
CA    NAME        USE   TYPE    DESCRIPTION
CA  ---------     ---   ----    -----------
CA  handle         I    long *  file handle for network comm.
CA  mibuf          O    MI_DsAd self-descriptive structure
CA  ier            O    long *  return status
CA                                        0 = successful
CA                              352000502 = illegal data type count
CA                              352000503 = malloc failure
CA                              352000506 = illegal handle
CA                              x4000yyzz = data conversion error
CA                              x5300yyzz = network routine error
CA
CA
CA  NOTES:
CA
CA  *** IMPORTANT *** mibuf header is owned by the caller.  This routine
CA  appends array descriptors and buffers on to the user's mibuf.
CA  For example:
CA
CA      long    handle, more, ier;
CA      struct  MI_DSC  mibuf;
CA      ...
CA      (void) mirecv(&handle,&mibuf,&ier);
CA      ...
CA
CA  This routine may be called by other subsystems (i.e. pd and db).
CA  It is CONTROLLED only because it is not callable from FORTRAN.
CA
CA  If the caller know exactly the message that will be received, he should
CA  call micrcv and provide the buffers that are needed to receive message.
CA
CA  The user should not generally free the dynamic memory allocated by this
CA  routine since this routine will use the previously allocated buffer
CA  in subsequent calls except when it needs more than what was allocated,
```

```
CA  in which case it will reallocate the buffer for a larger one.
CA  Call MICLOS to free dynamic memory allocated by mirecv and close
CA  the communication channel, or MIPURG to free memory only if you run_out
CA  of memory.
CA
CA  This routine does not generate its own error status but passes on
CA  the status from network calls or data-conversion.
CA
CA  Function address is a special data-type that does not go through data
CA  conversion.  They are passed as bit-streams of a certain length (which
CA  may be different from system to system) rounded to the next byte boundary.
CA  This length is specified in the structure.
CA
CA
CA  RESTRICTIONS:
CA
CA  Callable only from C program because of the complexity of the structure.
CA
CA
C   PORTABILITY:   PORTABLE
C
C
C   METHOD:
C
C   This routine assumes that MIxINT has been called to get the handle to
C   network I/O.  The key to this routine is the mibuf_t structure.
C   This structure contains the number of elements for each data-type and
C   a pointer to an array of values for each data-type.
C
C   The structure is described in midefs.h
C
C   The following is the sequence of event in this routine:
C   a) Read message header and check for correct header length.
C   b) Read array lengths section as determined in the header portion.
C   c) Fill in array descriptors for "mibuf" to be returned to caller.
C   d) Read data into array describes by step (c).
C
C   Each array is received at long type boundary hopefully that will
C   satisfy the boundary requirements of all systems that OpenWorks
C   will be ported to.
C
C   Data conversion is done after every reads whenever needed.
C
C
C   REVISED:
C
C   1. 06/29/88 - Jonathan Winata - Original version.
C   2. 07/28/88 - EEA - changed to use lgc/X11 path in #include statements
C   3. 07/29/88 - Jonathan Winata - Checks for valid handle.
C   4. 08/10/88 - Jonathan Winata - Fix bug.
C   5. 08/12/88 - EEA - changed to use lgc path in #include statements
C
C
C -------------------------------------------------------------------
C Copyright (C) 1988, LANDMARK GRAPHICS CORP.
C All rights reserved.
```

```
C --------------------------------------------------------------------------
C
*/
#include        <lgc/lgcdef.h>
#ifdef  NW_INCL
#undef  NW_INCL
#endif
#include        <lgc/nwdefs.h>
#include        <lgc/dcdefs.h>

#ifdef  MI_INIT
#undef  MI_INIT
#endif
#include        <lgc/micoms.h>

extern  void    dcvlcv_();
extern  void    dcvlsz_();
extern  void    dcyltp_();
extern  long    miunpk();
extern  void    nwrecv_();
extern  void    ohnooo_();

#ifdef  MODULE
#undef  MODULE
#endif
#define MODULE  520005

void mirecv(handle, mibuf, ier)
long    *handle;
MI_DsAd mibuf;
long    *ier;
{
    long    *lptr;              /* general pointer for header item */
    char    *ptr[2];            /* list of pointers for nwrecv */
    long    len[3];             /* list of buffer lengths for nwrecv */
    long    ntypes;             /* number of data types supported */
    long    narrays;            /* number of arrays in mibuf */
    long    htype;              /* host type for data conversion */
    long    temp;               /* general purpose temporary storage */
    long    i;                  /* loop count/index */
    long    flag;               /* flag for integer type compatibility */
    long    isize;              /* size of remote integer type */
    long    local[MI_NDTP];     /* local buffer for message header */
    MI_DbAd dbarr;              /* pointer to double type array */
    MI_FlAd flarr;              /* pointer to float type array */
    MI_LnAd lnarr;              /* pointer to long type array */
    MI_ShAd sharr;              /* pointer to short type array */
    MI_StAd starr;              /* pointer to string type array */
    char    *cptr;              /* pointer to character type array */

    if (*handle < 0 || *handle >= NW_MXHL) {
        *ier = LEV3ER + MODULE * 100 + MI_IHDL;
        ohnooo_(ier,"mirecv: invalid handle");
        return;
    }
```

```
    *ier = SUCCESSFUL;
    len[2] = 0;

/*************************************************************************
 * Check message header by:                                              *
 *   a. allocating enough memory for temporary buffer (if needed),      *
 *      read the message header, and                                     *
 *   b. check for correct header length                                  *
 *************************************************************************/

    /* Check header of packet */
    ntype = micoms_.dc_map[*handle];
    dcvltp_(&htype,&flag);
    if (flag != SUCCESSFUL) {
        dcvlsz_(&htype,&isize,ier);
        if (*ier != SUCCESSFUL) {
            ohnooo_(ier,"mirecv: unknown integer type");
            return;
        }
        len[0] = isize;
        len[1] = MI_NDTP * isize;
        if (micoms_.hdr_len < (MIALIGN(len[0]) + len[1])) {
            if (micoms_.hdr_len > 0)
                free(micoms_.hdr_ptr);
            micoms_.hdr_ptr = (long *)malloc(MIALIGN(len[0]) + len[1]);
            if (micoms_.hdr_ptr == NULL) {
                micoms_.hdr_len = 0;
                *ier = LEV3ER + MODULE * 100 + MI_IMEM;
                ohnooo_(ier,"mirecv: no memory to read header.");
                return;
            }
            micoms_.hdr_len = MIALIGN(len[0]) + len[1];
        }
        ptr[0] = (char *)micoms_.hdr_ptr;
        ptr[1] = ptr[0] + MIALIGN(len[0]);
    } else {
        ptr[0] = (char *)&ntypes;
        ptr[1] = (char *)local;
        len[0] = sizeof(long);
        len[1] = MI_NDTP * sizeof(long);
    }

    /* retrieve a message from network buffer */
    nwrecv_(handle, len, ptr, ier);
    if (*ier != SUCCESSFUL) {
        ohnooo_(ier, "mirecv: error receiving header");
        return;
    }

    /* convert header to current host's format if need to */
    temp = 1;
    if (flag != SUCCESSFUL)
        dcvlcv_(&htype,&temp,ptr[0],&ntypes,ier);
    if (ntypes != MI_NDTP) {
        *ier = LEV3ER + MODULE * 100 + MI_IDSC;
        ohnooo_(ier,"mirecv: invalid header element count.");
```

```
        return;
    }
    temp = MI_NDTP;
    if (flag != SUCCESSFUL)
        dcvlcv_(&htype,&temp,ptr[1],local,ier);

/* * * * * * * * * * * * * * * * * * * * * * * * * * * * * * * * * * * * * * *
 * Construct mibuf structure by:                                             *
 *   a. convert array lengths entries,                                       *
 *   b. read array lengths from message,                                     *
 *   c. calculate dynamic memory area needed for array descriptors and data, *
 *   d. allocate memory for structure, and                                   *
 *   e. set up array descriptor pointers and lengths.                        *
 * * * * * * * * * * * * * * * * * * * * * * * * * * * * * * * * * * * * * */

    /* Get length of arrays and prepare mibuf descriptors */

    narrays = local[0] + local[1] + local[2] + local[3] + local[4];

    len[0] = narrays * sizeof(long);
    len[1] = 0;
    if (flag != SUCCESSFUL)
        len[0] += narrays * isize;
    if (micoms_.hdr_len < len[0]) {
        if (micoms_.hdr_len > 0)
            free(micoms_.hdr_ptr);
        micoms_.hdr_len = 0;
        micoms_.hdr_ptr = (long *)malloc(len[0]);
        if (micoms_.hdr_ptr == NULL) {
            *ier = LEV3ER + MODULE * 100 + MI_IMEM;
            ohnooo_(ier,"mirecv: no memory for array lengths.");
            return;
        }
        micoms_.hdr_len = len[0];
    }
    lptr = micoms_.hdr_ptr;

    /* retrieve array lengths from message */
    if (flag != SUCCESSFUL) {
        len[0] = narrays * isize;
        lptr  += narrays;
    }
    ptr[0] = (char *)lptr;
    nwrecv_(handle, len, ptr, ier);
    if (*ier != SUCCESSFUL) {
        ohnooo_(ier, "mirecv: error receiving array lengths");
        return;
    }

    /* convert lengths to current host's format if need to */
    if (flag != SUCCESSFUL)
        dcvlcv_(&htype,&narrays,ptr[0],micoms_.hdr_ptr,ier);
    lptr = micoms_.hdr_ptr;

    /* Prepare mibuf descriptors */
    /* Calculate dynamic memory area needed for descriptors */
```

```
len[0] = MI_NALG - 1;
if (local[0] > 0)
    len[0] += local[0] * MIALIGN(sizeof(struct MI_DBD));
if (local[1] > 0)
    len[0] += local[1] * MIALIGN(sizeof(struct MI_FLD));
if (local[2] > 0)
    len[0] += local[2] * MIALIGN(sizeof(struct MI_LND));
if (local[3] > 0)
    len[0] += local[3] * MIALIGN(sizeof(struct MI_SHD));
if (local[4] > 0)
    len[0] += local[4] * MIALIGN(sizeof(struct MI_STD));

/* Add area needed to receive data */
if (local[0] > 0)
    for (i = 0; i < local[0]; i++)
        len[0] += MIALIGN((*lptr++ * sizeof(double)));
if (local[1] > 0)
    for (i = 0; i < local[1]; i++)
        len[0] += MIALIGN((*lptr++ * sizeof(float)));
if (local[2] > 0)
    for (i = 0; i < local[2]; i++)
        len[0] += *lptr++ * sizeof(long);
if (local[3] > 0)
    for (i = 0; i < local[3]; i++)
        len[0] += MIALIGN((*lptr++ * sizeof(short)));
if (local[4] > 0)
    for (i = 0; i < local[4]; i++)
        len[0] += MIALIGN(((*lptr / 65536) * (*lptr++ % 65536)));
if (local[5] > 0)
    len[0] += (local[5] * local[6] - 1) / MI_NBBY + 1;

/* allocate memory for structure and set up pointers */
if (len[0] > micoms_.mib_len) {
    if (micoms_.mib_ptr != NULL) {
        free(micoms_.mib_ptr);
        micoms_.mib_len = 0;
    }
    micoms_.mib_ptr = (char *)malloc(len[0]);
    if (micoms_.mib_ptr == NULL) {
        *ier = LEV3ER + MODULE * 100 + MI_IMEM;
        ohnooo_(ier,"mirecv: can't get memory for descs and data");
        return;
    }
    micoms_.mib_len = len[0];
}
cptr = (char *) MIALIGN((int)micoms_.mib_ptr);

/* copy hader portion of message to mibuf */
bcopy((char *)local,(char *)mibuf,MI_NDTP * sizeof(long));

/* set up array descriptors */
if (mibuf->n_dbl > 0) {
    dbarr = (MI_DbAd)cptr;
    cptr += MIALIGN((mibuf->n_dbl * sizeof(struct MI_DBD)));
}
if (mibuf->n_flt > 0) {
```

```
        flarr = (MI_FlAd)cptr;
        cptr += MIALIGN((mibuf->n_flt * sizeof(struct MI_FLD)));
    }
    if (mibuf->n_lng > 0) {
        lnarr = (MI_LnAd)cptr;
        cptr += MIALIGN((mibuf->n_lng * sizeof(struct MI_LND)));
    }
    if (mibuf->n_shr > 0) {
        sharr = (MI_ShAd)cptr;
        cptr += MIALIGN((mibuf->n_shr * sizeof(struct MI_SHD)));
    }
    if (mibuf->n_str > 0) {
        starr = (MI_StAd)cptr;
        cptr += MIALIGN((mibuf->n_str * sizeof(struct MI_STD)));
    }

    /* attach array descriptors and buffers for arrays to mibuf */
    lptr = (long *)micoms_.hdr_ptr;
    if (mibuf->n_dbl > 0) {
        mibuf->dbl_arr = dbarr;
        for (i = 0; i < mibuf->n_dbl; i++) {
            dbarr[i].nelem = *lptr;
            dbarr[i].arr_ptr = (double *)cptr;
            cptr += MIALIGN((*lptr++ * sizeof(double)));
        }
    }
    if (mibuf->n_flt > 0) {
        mibuf->flt_arr = flarr;
        for (i = 0; i < mibuf->n_flt; i++) {
            flarr[i].nelem = *lptr;
            flarr[i].arr_ptr = (float *)cptr;
            cptr += MIALIGN((*lptr++ * sizeof(float)));
        }
    }
    if (mibuf->n_lng > 0) {
        mibuf->lng_arr = lnarr;
        for (i = 0; i < mibuf->n_lng; i++) {
            lnarr[i].nelem = *lptr;
            lnarr[i].arr_ptr = (long *)cptr;
            cptr += MIALIGN((*lptr++ * sizeof(long)));
        }
    }
    if (mibuf->n_shr > 0) {
        mibuf->shr_arr = sharr;
        for (i = 0; i < mibuf->n_shr; i++) {
            sharr[i].nelem = *lptr;
            sharr[i].arr_ptr = (short *)cptr;
            cptr += MIALIGN((*lptr++ * sizeof(short)));
        }
    }
    if (mibuf->n_str > 0) {
        mibuf->str_arr = starr;
        for (i = 0; i < mibuf->n_str; i++) {
            starr[i].nelem = *lptr / 65536;
            starr[i].len = *lptr % 65536;
            starr[i].str = cptr;
```

```
            cptr += MIALIGN((starr[i].nelem * starr[i].len));
            lptr++;
        }
    }
    if (mibuf->n_ptr > 0) {
        mibuf->ptr_arr = cptr;
        narrays++;
    }
/* * * * * * * * * * * * * * * * * * * * * * * * * * * * * * * * * * * * * * *
 * Read data and do data conversion if needed.                                  *
 * * * * * * * * * * * * * * * * * * * * * * * * * * * * * * * * * * * * * * */

    /* receive data and do conversion when needed. */
    *ier = miunpk(handle,narrays,mibuf);
    if (*ier != SUCCESSFUL) {
        ohnooo_(ier, "mirecv: unpacking message error");
        return;
    }

    ohnooo_(ier, "mirecv: tracing");
    return;
}
```

```
C --- CHECKIN DATE: 06/23/88
C --- MODULE NUMBER:  520004
C
C
CA  NAME:      MICHKI
CA
CA
CA  FUNCTION:  Checks input ready from any of multiple connected handles.
CA
CA
CA  APPLICATION/SUBSYSTEM:  Message Interface (mi) EXTERNAL
CA
CA
C   AUTHOR:    Jonathan Winata
C
C
CA  LINKAGE:   CALL MICHKI(NUMHDL,HDLARR,RDYARR,IER)
CA
CA
CA  ARGUMENT
CA    NAME       USE    TYPE      DESCRIPTION
CA  ---------    ---    ----      -----------
CA  NUMHDL        I      I        number of handles to check
CA  HDLARR(1:*)   I      I        array of connected handles to be check
CA  RDYARR(1:*)   O      I        array of handles ready for input
CA  IER           O      I        return status
CA                                          0 = successful
CA                                x5300yyzz = network routine status
CA
CA
CA
CA  NOTES:
CA
CA  The first NEGATIVE element in rdyarr terminates the list.
CA  hdlarr is an array of longword at least numhdl long.
CA  rdyarr is an array of longword at least numhdl+1 long.
CA
CA  Example of usage:
CA
CA  main()
CA  {
CA      long   hdlarr[10], rdyarr[11], ier, numhdl, numsrv, i;
CA          .
CA          .
CA          .
CA >>>> misint_("<node_name>","<server_name>",hdlarr,&numsrv,&ier);
CA      if (ier != 0) exit(-1);
CA      numhdl = numsrv;
CA      for (;;) {
CA >>>>     michki_(&numhdl,hdlarr,rdyarr,&ier);
CA          i = 0;
CA          while (rdyarr[i] >= 0) {
CA              if (rdyarr[i] == hdlarr[0]) {
CA >>>>             miacpt_(&hdlarr[0],&hdlarr[numhdl],&ier);
CA                  if (ier != 0) exit(-1);
```

```
CA                  numhdl++;
CA              } else {
CA                  ... get message using (mirecv or micrcv) ...
CA                  ... then process it (looping when necessary) ...
CA              }
CA              i++;
CA          }
CA      }
CA  }
CA
CA
CA  RESTRICTIONS:  none
CA
CA
C   PORTABILITY:   PORTABLE
C
C
C   METHOD:  none
C
C
C   REVISED:
C
C   1. 06/29/88 - Jonathan Winata - Original version.
C   2. 07/28/88 - EEA - changed to use X11 path in #include statements
C
C
C ---------------------------------------------------------------------
C  Copyright (C) 1988, LANDMARK GRAPHICS CORP.
C  All rights reserved.
C ---------------------------------------------------------------------
C
*/
#include        <lgc/lgcdef.h>

extern  void    nwchki_();
extern  void    ohnooo_();

#ifdef  MODULE
#undef  MODULE
#endif
#define MODULE  520004

void michki_(numhdl, hdlarr, rdyarr, ier)
long *numhdl;
long *hdlarr;
long *rdyarr;
long *ier;
{
    *ier = SUCCESSFUL;

    nwchki_(numhdl, hdlarr, rdyarr, ier);
    if (*ier != SUCCESSFUL) {
        ohnooo_(ier,"michki: check input error.");
        return;
    }
```

```
        ohnooo_(ier,"michki: tracing");
        return;
    }
```

```
/*
C --- CHECKIN DATE: 08/23/89
C --- MODULE NUMBER:  520012
C
C
CA  NAME:      MIXHDL
CA
CA
CA  FUNCTION:  Get a handle for X-Window-socket.
CA
CA
CA  APPLICATION/SUBSYSTEM:  Message Interface (mi) EXTERNAL
CA
CA
C   AUTHOR:    Jonathan Winata
C
C
CA  LINKAGE:   CALL MIXHDL(XSOCK,TYPE,HANDLE,IER)
CA
CA
CA  ARGUMENT
CA    NAME       USE   TYPE    DESCRIPTION
CA  ---------    ---   ----    -----------
CA  XSOCK         I     I      X-Window socket id.
CA  TYPE          I     C*(*)  Network protocol type (TCP, LOCAL, DECNET)
CA  HANDLE        I     I      file handle for network comm.
CA  IER           O     I      return status
CA                                     0 = successful
CA                             x4000yyzz = network routine status
CA
CA
CA  NOTES:
CA
CA  #include    <lgc/nwdefs.h>
CA  main()
CA  {
CA      long    ier, handle[NW_MXHDL], Xsock, Xidx, numsrv;
CA
CA >>>> misint_("<host_name>","<server_name>",handle,&numsrv,&ier);
CA      if (ier != 0) exit(-1);
CA      ... get socket id for X and store in Xsock ...
CA
CA      Xidx = numsrv;
CA >>>> mixhdl_(&Xsock, "TCP", &handle[Xidx], &ier);
CA      ... ready to send or receive messages ...
CA      ... if there is any handle[Xidx] is returned in michki_ call,
CA      ...      X socket needs to be service (NOTE: do not call MI
CA      ...      subsystem to receive message from handles that are
CA      ...      not received through MICINT and MIACPT).
CA
CA  }
CA
CA
CA  RESTRICTIONS:  none
CA
CA
```

```
C   PORTABILITY:   PORTABLE
C
C
C   METHOD:
C
C   Calls NW routine to do the actual insertion.
C
C
C   REVISED:
C
C   1. 29/04/88 - Jonathan Winata - Original version.
C   2. 07/28/88 - EEA - changed to use X11 path in #include statements
C
C
C -----------------------------------------------------------------------
C  Copyright (C) 1988, LANDMARK GRAPHICS CORP.
C  All rights reserved.
C -----------------------------------------------------------------------
C
*/
#include        <lgc/lgcdef.h>


extern  void    nwxhdl_();
extern  void    ohnooo_();

#ifdef  MODULE
#undef  MODULE
#endif
#define MODULE  520012

void mixhdl_(Xsock, type, handle, ier)
long *Xsock;
char *type;
long *handle;
long *ier;
{
    *ier = SUCCESSFUL;

    nwxhdl_(Xsock, type, handle, ier);
    if (*ier != SUCCESSFUL) {
        ohnooo_(ier,"mixhdl: error calling nwxhdl");
        return;
    }

    ohnooo_(ier,"mixhdl: tracing");
    return;
}
```

```
/*
CA  CHECKIN DATE: 09/02/88
CA  MODULE NUMBER:  530009
CA
CA
CA  NAME:        NWCLOS
CA
CA
CA  FUNCTION:  Closes the network connection.
CA
CA
CA  APPLICATION/SUBSYSTEM:  Network (nw) CONTROLLED
CA
CA
C   AUTHOR:     Jonathan Winata
C
C
CA  LINKAGE:    CALL NWCLOS (HANDLE, IER)
CA
CA
CA  ARGUMENT
CA    NAME       USE   TYPE    DESCRIPTION
CA  ---------    ---   ----    -----------
CA  HANDLE        I     I      communication handle.
CA  IER           O     I      Error Return code
CA                                     0 = successful
CA                             253000902 = illegal handle
CA
CA
CA  NOTES:
CA
CA  Example of usage:
CA
CA          PROGRAM SAMPLE
CA  C Client program
CA  C   Include files:
CA          INCLUDE '/usr/include/lgc/lgcdef.cmn'
CA          INCLUDE '/usr/include/lgc/X11/nwdefs.cmn'
CA  C   Variables declaration:
CA          INTEGER HANDLE, IER
CA  C   Start of program:
CA >>>>>> CALL NWCOPN('<DB_NODE>','OWSD_Server',HANDLE,IER)
CA          IF (IER.NE.SUCCES) THEN
CA              CALL OHNOOO(IER,'SAMPLE: error opening network communication.')
CA              STOP 'Stopped due to error.'
CA          ENDIF
CA  C       ... start processing till done ...
CA  C
CA  C   When done close the network communication.
CA >>>>>> CALL NWCLOS(HANDLE,IER)
CA          STOP 'Normal Completion.'
CA          END
CA
CA
CA  RESTRICTIONS:  none
CA
```

```
CA
C   PORTABILITY:   DEPENDENT
C
C
C   METHOD:
C
C   Current implementation uses Unix stream, TCP/IP, and DECNET protocols.
C   This routine calls "close" to close the connection.
C
C
C   REVISED:
C
C   1. 04/28/88 - Jonathan Winata - Original version.
C   2. 06/02/88 - Jonathan Winata - Fixup header and include an example to
C                                   clarify usage.
C   3. 06/30/88 - Jonathan Winata - Fixup header and symbols to conform
C                                   to standard coding rules for portability.
C   4. 07/28/88 - EEA - changed to use X11 path in #include statements
C   5. 07/29/88 - Jonathan Winata - Checks for valid handle.
C   6. 08/16/88 - EEA - changed back to original #include path.
C   7. 08/24/88 - WKH - Added shutdown command before close command
C   8. 07NOV88  EES  changed from EXTERNAL to CONTROLLED
C
C
C ----------------------------------------------------------------
C  Copyright (C) 1988, LANDMARK GRAPHICS CORP.
C  All rights reserved.
C ----------------------------------------------------------------
C
*/
#include        <lgc/lgcdef.h>

#ifdef  NW_INIT
#undef  NW_INIT
#endif
#ifdef  NW_INCL
#undef  NW_INCL
#endif
#include        <lgc/nwcoms.h>

extern  void    ohnooo_();

#ifdef  MODULE
#undef  MODULE
#endif
#define MODULE  530009

void nwclos_(handle,ier)
long *handle;
long *ier;
{
     /* check if handle is open */
     if (*handle < 0 || *handle >= NW_MXHL ||
            nwntbf_[*handle].used == FALSE) {
        *ier = LEV2ER + MODULE * 100 + NW_NCNC;
         ohnooo_(ier,"nwclos: handle is not a connected handle.");
```

```
        return;
    }

    /* if yes, then close it */
    shutdown(nwntbf_[*handle].handle,2);
    close(nwntbf_[*handle].handle);

    nwntbf_[*handle].used = FALSE;        /* flag as not used */
    *ier = SUCCESSFUL;
    ohnooo_(ier, "nwclos: tracing");
    return;
}
```

```
/*
CA   CHECKIN DATE: 08/23/88
CA   MODULE NUMBER:   530001
CA
CA
CA   NAME:       NWSACC
CA
CA
CA   FUNCTION:  This routine accepts the network connection.
CA
CA
CA   APPLICATION/SUBSYSTEM:  Network (nw) CONTROLLED
CA
CA
C    AUTHOR:      Jonathan Winata
C
C
CA   LINKAGE:    CALL NWSACC (HANDLE, HDLRET, IER)
CA
CA
CA   ARGUMENT
CA     NAME        USE    TYPE     DESCRIPTION
CA   ---------     ---    ----     -----------
CA   HANDLE         I      I       server communication handle.
CA   HDLRET         O      I       client's communication handle.
CA   IER            O      I       Error Return code
CA                                             0 = successful
CA                                 253000302 = no connection made
CA                                 353000305 = error: internal table full
CA                                 353000308 = illegal handle type
CA
CA
CA   NOTES:
CA
CA   Handles are NOT file descriptors.  Handles are indices to an internal table
CA   that contains actual file descriptors.
CA
CA   See NOTES on "nwchki" routine for an example on how to use this routine.
CA
CA
CA   RESTRICTIONS:  none
CA
CA
C    PORTABILITY:   DEPENDENT
C
C
C    METHOD:
C
C    Current implementation supports Unix stream, TCP/IP, and DECnet protocol.
C    This routine calls "accept" to establish the connection and return the
C    connection handle to the client.
C
C
C    REVISED:
C
C    1. 04/28/88 - Jonathan Winata - Original version.
```

```
C    2. 06/02/88 - Jonathan Winata - Fixup header to declare this routine
C                                    external and also include a skeleton
C                                    of a server program to clarify usage
C                                    of this module.
C    3. 07/01/88 - Jonathan Winata - Fixup header and symbols used to conform
C                                    to new coding standard.
C    4. 07/28/88 - EEA - changed to use X11 path in #include statements
C    5. 07/29/88 - Jonathan Winata - Checks for valid handle.
C    6. 08/16/88 - EEA - changed back to original #include path.
C    7. 07NOV88  EES  changed from EXTERNAL to CONTROLLED
C
C
C -----------------------------------------------------------------------
C  Copyright (C) 1988, LANDMARK GRAPHICS CORP.
C  All rights reserved.
C -----------------------------------------------------------------------
C
*/
#include        <lgc/lgcdef.h>

#ifdef  NW_INIT
#undef  NW_INIT
#endif
#ifndef NW_INCL
#define NW_INCL
#endif
#include        <lgc/nwcoms.h>

extern  void    ohnooo_();

#ifdef  MODULE
#undef  MODULE
#endif
#define MODULE  530001

void nwsacc_(handle,hdlret,ier)
long *handle;
long *hdlret;
long *ier;
{
    int     fd;          /* file descriptor to communication */
    int     i;           /* index/loop counter */

    /* check validity of handle */
    if (*handle < 0 || *handle >= NW_MXHL ||
            nwntbf_[*handle].used == FALSE) {
        *ier = LEV2ER + MODULE * 100 + NW_NCNC;
        ohnooo_(ier,"nwsacc: handle is not a connected handle.");
        return;
    }
    if (nwntbf_[*handle].type != NW_SVTP) {
        *ier = LEV3ER + MODULE * 100 + NW_IHDL;
        ohnooo_(ier,"nwsacc: handle specified is not server's handle.");
        return;
    }
```

```
    i = -1;
    while (nwntbf_[++i].used && i < NW_MXHL); /* get free slot */
    if (i == NW_MXHL) {
        *ier = LEV3ER + MODULE * 100 + NW_FSLT;
        ohnooo_(ier,"nwsacc: no more free slot for handle.");
        return;
    }

    /* accept connect request */
    fd = accept(nwntbf_[*handle].handle,(struct sockaddr *)NULL,(int *)NULL);
    if (fd == -1) {
#ifdef  DBGSW
        perror("accept");
#endif
        *ier = LEV3ER + MODULE * 100 + NW_NCNC;
        ohnooo_(ier,"nwsacc: error accepting client handle");
        return;
    }

    nwntbf_[i].handle = fd;     /* save file descriptor    */
    nwntbf_[i].type = NW_SCTP;  /* handle type is server's client */
    nwntbf_[i].used = TRUE;     /* flag as being used      */
    *hdlret = i;                /* return index to caller  */
    *ier = SUCCESSFUL;          /* and also status         */
    ohnooo_(ier, "nwsacc: tracing");
    return;
}
```

```
/*
CA  CHECKIN DATE: 11/09/88
CA  MODULE NUMBER:  530003
CA
CA
CA  NAME:       NWSEND
CA
CA
CA  FUNCTION:  This routine sends multiple buffers.
CA
CA
CA  APPLICATION/SUBSYSTEM:  Network (nw) EXTERNAL
CA
CA
C   AUTHOR:     Jonathan Winata
C
C
CA  LINKAGE:    CALL NWSEND (HANDLE, LEN, MSGPTR, IER)
CA
CA
CA  ARGUMENT
CA    NAME        USE   TYPE    DESCRIPTION
CA  ---------     ---   ----    -----------
CA  HANDLE         I     I      communication handle
CA  LEN(1:*)       I     I      length of buffers
CA  MSGPTR(1:*)    I     I      address of buffers to send
CA  IER            O     I      Error Return code:
CA                                      0 = successful
CA                              353000303 = send error
CA                              353000307 = handle not valid
CA                              353000308 = illegal handle type
CA                              353000309 = malloc failure
CA                              353000309 = unrecoverable malloc failure
CA
CA
CA  NOTES:
CA
CA  See NOTES on nwrecv.c for an example on how to use this routine.
CA
CA  *** ATTENTION *** msgptr is declared to be an integer array; but,
CA  its content is actually an array of pointers.  Current standard
CA  fortran does not support pointer data type, so a utility routine
CA  (utlptr) is written to store the address of a variable into an array.
CA  This array can then be passed to this routine.
CA
CA  Handles are NOT file descriptors.  Handles are indices to an internal table
CA  that contains actual file descriptors.
CA
CA
CA  RESTRICTIONS:  none
CA
CA
C   PORTABILITY:   DEPENDENT
C
C
C   METHOD:
```

```
c
c   This routine recognizes the compile switch NOIOV.  When this switch is not
c   defined, it builds a structure of iovec type and load the lengths and
c   addresses of buffers into this structure.  Then it loops and calls
c   "writev" system routine to send the buffers.  If the switch is defined,
c   it uses "write" system routine and sends the buffers one at a time.
c
c
c   REVISED:
c
c   1. 04/28/88 - Jonathan Winata - Original version.
c   2. 06/02/88 - Jonathan Winata - Add ability to send from multiple buffers.
c   3. 07/01/88 - Jonathan Winata - Fixup header and symbols used to conform
c                                   to new coding standard
c   4. 07/28/88 - EEA - changed to use X11 path in #include statements
c   5. 07/29/88 - Jonathan Winata - Checks for valid handle.
c   6. 08/23/88 - JW/EEA - back to '/usr/include/lgc' path
c   7. 08/24/88 - WKH - Added shutdown command before socket close command
c   8. 10/07/88 - WKH - Freed memory allocated using malloc.
c   9. 10/13/88 - WKH - Moved free memory to just before exit program.
c  10. 10/17/88 - WKH - Reset first flag to TRUE after memory is freed so
c                 that next time this function is entered, malloc will be
c                 called again.
c  11. 10/20/88 - WKH - Change malloc error code to fatal and return
c                 if malloc fails. Free memory again at before program
c                 exits.
c  12. 10/24/88 - WKH - Last change only change the comment on the error
c                 code, this time changed the actual malloc error to
c                 level 3.
c  13. 11/09/88 - WKH - Removed un-needed first flag and free allocated
c                 memory every time just before return.
c
c
c -----------------------------------------------------------------
c  Copyright (C) 1988, LANDMARK GRAPHICS CORP.
c  All rights reserved.
c -----------------------------------------------------------------
c
*/
#include        <lgc/lgcdef.h>

#ifdef  NW_INIT
#   undef  NW_INIT
#endif
#ifdef  NOIOV
#   ifdef  NW_INCL
#       undef  NW_INCL
#   endif
#else
#   ifndef NW_INCL
#       define NW_INCL
#   endif
#endif
#include        <lgc/nwcoms.h>

extern  void    ohnooo_();
```

```
#ifdef  MODULE
#undef  MODULE
#endif
#define MODULE  530003

void nwsend_(handle,len,msgptr,ier)
long *handle;
long *len;
char **msgptr;
long *ier;
{
    long    count;          /* number of buffers to send */
    long    i;              /* loop counter/index */
    long    rlen, remlen;   /* transfer count */
#ifdef  NOIOV
    char    *lclbuf;  /* pointer to local buffer for short buffers */
    char    *curlcl;  /* pointer to current position in local buffer */
    int     lcllen;       /* length of local buffer */
    static  int first = TRUE;   /* first time flag */
    char    *curptr;        /* pointer to current position in user buffers */
#else
    struct  iovec *iov;     /* pointer to vector structure for writev */
#endif
    /* check for valid handle */
    if (*handle < 0 || *handle >= NW_MXHL ||
            nwntbf_[*handle].used == FALSE)
    {
        *ier = LEV3ER + MODULE * 100 + NW_NHDL;
        ohnooo_(ier,"nwsend: handle is not connected.");
        return;
    }
    if (nwntbf_[*handle].type == NW_SVTP)
    {
        *ier = LEV3ER + MODULE * 100 + NW_IHDL;
        ohnooo_(ier,"nwsend: can not write data to server's handle");
        return;
    }
#ifdef  NOIOV

    lclbuf = (char *) malloc(NW_NPSZ);
    if (lclbuf == NULL)
    {
        *ier = LEV3ER + MODULE * 100 + NW_NDMM;
        ohnooo_(ier,"nwsend: no memory for temporary buffer.");
        return;
    }

    /* send message from multiple buffers */
    lcllen = 0;
    curlcl = lclbuf;
    i = 0;

    /* send one buffer at a time */
    while ((remlen = len[i]) > 0)
    {
```

```
    curptr = msgptr[i];
    if (lclbuf != NULL && len[i] > 0)
    {
        if ((lcllen + remlen) < NW_NPSZ)
        {
            bcopy(curptr,curlcl,remlen);
            lcllen += remlen;
            curlcl += remlen;
            remlen = 0;
        }
        else
        {
            curlcl = lclbuf;
            while (lcllen > 0)
            {
                count = rlen = 0;

                if ((rlen = write(nwntbf_[*handle].handle,curlcl,
                        MIN(lcllen,NW_NPSZ))) <= 0)
                {
#ifdef  DBGSW
                    perror("write");
#endif
                    free(lclbuf);
                    shutdown(nwntbf_[*handle].handle,2);
                    close(nwntbf_[*handle].handle);
                    nwntbf_[*handle].used = FALSE;
                    *ier = LEV3ER + MODULE * 100 + NW_SNDR;
                    ohnooo_(ier,"nwsend: write error, handle closed.");
                    return;
                }
                /* else, update pointer and remaining length, and   *
                 * continue sending packets until all buffers are   *
                 * exhausted.                                       */
                curlcl += rlen;
                lcllen -= rlen;
            }
            curlcl = lclbuf;
            if (remlen < NW_NPSZ)
            {
                bcopy(curptr,curlcl,remlen);
                lcllen = remlen;
                curlcl += remlen;
                remlen = 0;
            }
        }
    }
    while (remlen > 0) {
        count = rlen = 0;
        if ((rlen = write(nwntbf_[*handle].handle, curptr,
                    MIN(remlen,NW_NPSZ))) <= 0) {
#ifdef  DBGSW
            perror("write");
#endif
            free(lclbuf);
```

```
                shutdown(nwntbf_[*handle].handle,2);
                close(nwntbf_[*handle].handle);
                nwntbf_[*handle].used = FALSE;
                *ier = LEV3ER + MODULE * 100 + NW_SNDR;
                ohnooo_(ier,"nwsend: write error, handle is closed.");
                return;
            }
            /* else, update pointer and remaining length, and continue *
             * sending packets until all buffers are exhausted.        */
            curptr += rlen;
            remlen -= rlen;
        }
        i++;            /* done with this buffer, do next one */
    }
    curlcl = lclbuf;    /* flush data in local buffer */
    while (lcllen > 0)
    {
        count = rlen = 0;
        if ((rlen = write(nwntbf_[*handle].handle,curlcl,
                MIN(lcllen,NW_NPSZ))) <= 0)
        {
#ifdef  DBGSW
            perror("write");
#endif
            free(lclbuf);
            shutdown(nwntbf_[*handle].handle,2);
            close(nwntbf_[*handle].handle);
            nwntbf_[*handle].used = FALSE;
            *ier = LEV3ER + MODULE * 100 + NW_SNDR;
            ohnooo_(ier,"nwsend: write error, handle closed.");
            return;
        }

        /* else, update pointer and remaining length, and  *
         * continue sending packets until all buffers are  *
         * exhausted.                                      */
        curlcl += rlen;
        lcllen -= rlen;
    }
    /* Free allocated memory iand reset first flag, so next time
       around, malloc will be called again */
    free(lclbuf);
#else
    /* set up I/O vector */
    count = 0;
    while (len[count++] > 0);
    count--;
    iov = (struct iovec *) malloc(count * sizeof(struct iovec));
    if (iov == NULL) {
        *ier = LEV3ER + MODULE * 100 + NW_NDMM;
        ohnooo_(ier,"nwsend: no memory left for iov array.");
        return;
    }
    remlen = 0;
    for (i = 0; i < count; i++) {
        iov[i].iov_len = len[i];
```

```
        iov[i].iov_base = msgptr[i];
        remlen += len[i];
    }

    /* send buffers */
    i = 0;
    while ((rlen = writev(nwntbf_[*handle].handle, iov, count)) != remlen) {
        if (rlen > 0) {
            remlen -= rlen;
            while (iov[i].iov_len < rlen) {
                rlen -= iov[i].iov_len;
                iov[i++].iov_len = 0;
            }
            iov[i].iov_len -= rlen;
            iov[i].iov_base += rlen;
        } else {
#ifdef  DBGSW
            perror("writev");
#endif
            free(iov);
            shutdown(nwntbf_[*handle].handle,2);
            close(nwntbf_[*handle].handle);
            nwntbf_[*handle].used = FALSE;
            *ier = LEV3ER + MODULE * 100 + NW_SNDR;
            ohnooo_(ier,"nwsend: error sending buffers, handle is closed.");
            return;
        }
    }
    /* All buffers sent */
    free(iov);
#endif
    free(lclbuf);      /* free allocated memory one more time just in case */
    *ier = SUCCESSFUL;
    ohnooo_(ier,"nwsend: tracing");
    return;
}
```

```
/*
CA  CHECKIN DATE: 10/04/88
CA  MODULE NUMBER:  530000
CA
CA
CA  NAME:        NWSOPN
CA
CA
CA  FUNCTION:   This routine opens sockets for network server and
CA              then return with the sockets passively listening for
CA              client request to connect.
CA
CA
CA  APPLICATION/SUBSYSTEM:  Network (nw) CONTROLLED
CA
CA
C   AUTHORS:    Jonathan Winata
C
C
CA  LINKAGE:    call nwsopn (node, server, handle, nhdl, ier)
CA
CA
CA  ARGUMENT
CA    NAME         USE    TYPE     DESCRIPTION
CA  ----------     ---    ----     -----------
CA  node            I     C*(*)    node name of host
CA  server          I     C*(*)    server name to create
CA  handle(1:*)     O     I        file handle for communication
CA  nhdl            O     I        number of handles connected
CA  ier             O     I        Error Return code
CA                                           0 = successful
CA                                 153000000 = handle option debug
CA                                 153000002 = no connection made (for a protocol)
CA                                 353000002 = no connection made at all
CA                                 353000009 = malloc failure
CA                                 153000011 = this routine has been called before
CA
CA
CA  NOTES:
CA
CA  This routine returns NW_NCNC on ohnooo_ and SUCCESSFUL otherwise.
CA
CA  Look at NOTES section of the routine "nwchki" for an example on how
CA  to use this routine.
CA
CA
CA  RESTRICTIONS:
CA
CA  Node name specified must be the current host's name or NULL string.
CA
CA
C   PORTABILITY:  DEPENDENT
C
C
C   METHOD:
C
```

```
C   Depending of the compile switch, this routine will attempt to create
C   a socket for each of the specified network protocol currently supported.
C   The protocol supported are currently Unix stream connection, TCP/IP, and
C   DECnet.
C
C   1) If node is a NULL string, get current host name.
C   2) Get host address' information and check for Internet type.
C   3) Get server information to get the port number of server.
C   4) Set up structure for socket.
C   5) Create socket.
C   6) Bind socket to server's port
C   7) Listen in on socket for accept requests.
C
C
C   REVISED:
C
C   1. 09/09/87 - Jonathan Winata - Original version.
C   2. 07/05/88 - Jonathan Winata - Fixup header for conformity to new
C                                   coding standard.
C   3. 07/28/88 - EEA - changed to use X11 path in #include statements
C   4. 07/29/88 - Jonathan Winata - Checks for valid handle and allow
C                                   multiple calls.
C   5. 08/21/88 - Jonathan Winata - document discrepancy in RT when calling
C                                   setsockoption.
C   6. 08/16/88 - EEA - changed back to original #include path.
C   7. 08/24/88 - WKH - Changed ier return from gethostname from compare
C                       to "!= 0" to compare to "< 0" for fail logic.  The
C                       RT returns 0 for success, other systems such as
C                       the HP may return a positive number for success.
C                       Delete perror call after setsockopt call.
C   8. 10/03/88 - Olivier Lhemann - In TCP part, removed gethostbyname call,
C                                   and bcopy of host address to socket address
C                                   and set socket address to 0
C   9. 07NOV88  EES  changed from EXTERNAL to CONTROLLED
C
C
C ----------------------------------------------------------------------
C  Copyright (C) 1988, LANDMARK GRAPHICS CORP.
C  All rights reserved.
C ----------------------------------------------------------------------
C
*/
#include        <lgc/lgcdef.h>

#ifdef  NW_INIT
#undef  NW_INIT
#endif
#ifndef NW_INCL
#define NW_INCL
#endif
#include        <lgc/nwcoms.h>

extern  void    ohnooo_();

#ifdef  MODULE
#undef  MODULE
```

```
#endif
#define MODULE  530000

void nwsopn_(node, server, handle, nhdl, ier)
char * node;
char * server;
long * handle;
long * nhdl;
long * ier;
{
    static  int first = TRUE;          /* first time flag */
    long    i;                         /* index/loop counter */
    long    fd;                        /* file descriptor for comm. */
#ifdef  LOCAL
    struct  sockaddr_un     s_un;      /* Unix stream socket */
    int     oldmask;                   /* current protection mask */
#endif
#ifdef  TCP
    struct  sockaddr_in     s_in;      /* Internet socket */
    struct  servent *sp;               /* Server entry description */
#endif
#ifdef  DECNET
    struct  sockaddr_dn     s_dn;      /* DECnet socket */
#endif

    if (first) {
        nwinit(ier);
        if (*ier != SUCCESSFUL) {
            *ier = LEV3ER + MODULE * 100 + NW_NDMM;
            ohnooo_(ier,"nwsopn: no memory for internal table");
            return;
        }
        first = FALSE;
    } else {
        *ier = LEV1ER + MODULE * 100 + NW_OPND;
        ohnooo_(ier,"nwsopn: called more than once.");
    }

    i = 0;
#ifdef  LOCAL
    s_un.sun_family = AF_UNIX;
    strcpy(s_un.sun_path,NW_SPTH);
    strcat(s_un.sun_path,server);
    oldmask = umask(0);
    mkdir(NW_SDIR, 0777);
    (void) umask(oldmask);
    unlink(s_un.sun_path);
    if ((fd = socket(AF_UNIX,SOCK_STREAM,0)) < 0) {
#ifdef  DBGSW
        perror("socket");
#endif
        *ier = LEV1ER + MODULE * 100 + NW_NCNC;
        ohnooo_(ier,"nwsopn: no local socket connection.");
    } else if (bind(fd,(struct sockaddr *)&s_un,strlen(s_un.sun_path)+2)) {
#ifdef  DBGSW
        perror("bind");
```

```
#endif
        *ier = LEV1ER + MODULE * 100 + NW_NCNC;
        ohnooo_(ier,"nwsopn: local bind failed.");
        close(fd);
    } else if (listen(fd,5)) {
#ifdef  DBGSW
        perror("listen");
#endif
        *ier = LEV1ER + MODULE * 100 + NW_NCNC;
        ohnooo_(ier,"nwsopn: failed listen to local socket.");
        close(fd);
    } else {
        handle[i]         = i;
        nwntbf_[i].handle = fd;
        nwntbf_[i].used   = TRUE;
        nwntbf_[i++].type = NW_SVTP;
    }
#endif
#ifdef  TCP
    if ((sp = getservbyname(server,"tcp")) == NULL) {
#ifdef  DBGSW
        perror("getservbyname");
#endif
        *ier = LEV1ER + MODULE * 100 + NW_NCNC;
        ohnooo_(ier,"nwsopn: get server by name failed.");
    } else {
#ifdef  CRAY
        s_in.sin_addr = 0;
#else
        s_in.sin_addr.s_addr = 0;
#endif

        s_in.sin_family        = AF_INET;
        s_in.sin_port          = sp->s_port;

        if ((fd = socket(AF_INET, SOCK_STREAM, 0)) < 0) {
#ifdef  DBGSW
            perror("socket");
#endif
            *ier = LEV1ER + MODULE * 100 + NW_NCNC;
            ohnooo_(ier,"nwsopn: error creating tcp socket.");
        } else if (bind(fd, (char *)&s_in, sizeof(s_in)) < 0) {
#ifdef  DBGSW
            perror("bind");
#endif
            close(fd);
            *ier = LEV1ER + MODULE * 100 + NW_NCNC;
            ohnooo_(ier,"nwsopn: bind tcp socket error.");
        } else {
#ifdef  DBGSW
/* for some reason, IBM/RT thinks the socket is not connected        *
 * other systems does this fine though, so just ignore the message   *
 * on the RT.                                                        */
            if (setsockopt(fd, SOL_SOCKET, SO_DEBUG, 0, 0) < 0) {
                *ier = LEV1ER + MODULE * 100 + SUCCESSFUL;
                ohnooo_(ier, "nwsopn: Set socket option to debug.");
```

```
            }
#endif
            if (listen(fd, 5) < 0) {
#ifdef  DBGSW
                perror("listen");
#endif
                close(fd);
                *ier = LEV1ER + MODULE * 100 + NW_NCNC;
                ohnooo_(ier, "nwsopn: listen to tcp socket failed.");
            } else {
                handle[i]        = i;
                nwntbf_[i].handle = fd;
                nwntbf_[i].used   = TRUE;
                nwntbf_[i++].type = NW_SVTP;
            }
        }
    }
#endif
#ifdef  DECNET
    if (fd = socket(AF_DECnet, SOCK_STREAM, 0)) < 0) {
#ifdef  DBGSW
        perror("socket");
#endif
        *ier = LEV1ER + MODULE * 100 + NW_NCNC;
        ohnooo_(ier, "nwsopn: create DECnet socket error.");
    } else {
        bzero((char *)&s_dn, sizeof(s_dn));
        s_dn.sdn_family = AF_DECnet;
        strcpy(s_dn.sdn_objname, server);
        s_dn.sdn_objnamel = strlen(server);
        if (bind(fd, (struct sockaddr *)&s_dn, sizeof(s_dn))) {
#ifdef  DBGSW
            perror("bind");
#endif
            close(fd);
            *ier = LEV1ER + MODULE * 100 + NW_NCNC;
            ohnooo_(ier, "nwsopn: error binding DECnet socket.");
        } else if (listen(fd, 5)) {
#ifdef  DBGSW
            perror("listen");
#endif
            close(fd);
            *ier = LEV1ER + MODULE * 100 + NW_NCNC;
            ohnooo_(ier, "nwsopn: error listening on DECnet socket.");
        } else {
            handle[i]        = i;
            nwntbf_[i].handle = fd;
            nwntbf_[i].used   = TRUE;
            nwntbf_[i++].type = NW_SVTP;
        }
    }
#endif
    if (i == 0) {
        *ier = LEV3ER + MODULE * 100 + NW_NCNC;
        ohnooo_(ier, "nwsopn: no connection made at all.");
        return;
```

```
    }
    *nhdl = i;
    *ier = SUCCESSFUL;
    ohnooo_(ier, "nwsopn: tracing");
    return;
}
```

```
/*
CA  CHECKIN DATE: 09/27/88
CA  MODULE NUMBER:  530004
CA
CA
CA  NAME:        NWCHKI
CA
CA
CA  FUNCTION:  This routine checks input from multiple communication handles
CA
CA
CA  APPLICATION/SUBSYSTEM:  Network (nw) CONTROLLED
CA
CA
C   AUTHORS:   Jonathan Winata
C
C
CA  LINKAGE:   CALL NWCHKI (NUMHDL, HDLARR, RDYARR, IER)
CA
CA
CA  ARGUMENT
CA    NAME         USE    TYPE      DESCRIPTION
CA  ----------     ---    ----      -----------
CA  NUMHDL          I      I        number of handles to check
CA  HDLARR(1:*)     I      I        array of handles
CA  RDYARR(1:*)     O      I        list of handles ready for input
CA  IER             O      I        Error Return code
CA                                          0 = successful
CA                                   35300401 = select error
CA                                   25300401 = illegal condition returned by select
CA
CA
CA  NOTES:
CA
CA  Handles are NOT the actual I/O handle of the operating system (i.e. Unix
CA  file descriptor).  Handles are indices to an internal table that contains
CA  the actual file descriptor or device channel or whatever name it has).
CA
CA  "NUMHDL" is the number of handles in the array to be examined.
CA  If the value of a handle in "HDLARR" is NEGATIVE, that
CA  handle is ignored.
CA
CA  This routine "blocks" until there is at least one handle is ready for
CA  input.
CA
CA  The first NEGATIVE element in "RDYARR" terminates the list.
CA  "HDLARR" is an array of integers at least "NUMHDL" long.
CA  "RDYARR" is an array of integers at least "NUMHDL"+1 long.
CA
CA  The following is a skeleton example of a server written in Fortran:
CA
CA          PROGRAM SDSRVR
CA  C   SmartData SeRVeR program
CA  C    Include files:
CA          INCLUDE '/usr/include/lgc/lgcdef.cmn'
CA          INCLUDE '/usr/include/lgc/nwdefs.cmn'
```

```
CA          ...
CA  C   Variable declarations:
CA         INTEGER HDLARR(NWMXHL), RDYARR(NWMXHL+1)
CA         INTEGER IER, NUMHDL, NUMSRV, I, J, K
CA         LOGICAL MSGTYP
CA  C   Start of program:
CA >>>>>> CALL NWSOPN('<host_name>','<server_name>',HDLARR,NUMSRV,IER)
CA         IF (IER.NE.SUCCES) THEN
CA              CALL OHNOOO(IER,'SDSRVR: error opening network communication.')
CA              STOP 'Stoped due to error.'
CA         ENDIF
CA         NUMHDL = NUMSRV
CA  C   Server enter endless loop checking for any messages directed to him:
CA  100    CONTINUE
CA >>>>>>       CALL NWCHKI(NUMHDL,HDLARR,RDYARR,IER)
CA              I = 1
CA  C          Process each message received at its list of handles
CA  200         CONTINUE
CA                   IF (RDYARR(I).GE.0) THEN
CA  C                  Check for connect request:
CA                       MSGTYP = .TRUE.
CA                       DO 500 J = 1, NUMSRV
CA                            IF (RDYARR(I).EQ.HDLARR(J)) THEN
CA  C                           Search for a free slot in handle array
CA                                DO 300 K = 1, NUMHDL
CA                                     IF (HDLARR(J).LT.0) GOTO 400
CA  300                           CONTINUE
CA                                IF (K.GT.NWMXHL) THEN
CA  C                                  ... maximum number of handles overflowed ...
CA                                     GOTO 500
CA                                ENDIF
CA  400                           CONTINUE
CA  C                           Accept the new handle in the free slot
CA >>>>>>                         CALL NWSACC(HDLARR(J),HDLARR(K),IER)
CA                                IF (IER.NE.SUCCES) THEN
CA                                     CALL OHNOOO(IER,
CA        *                            'SDSRVR: error accepting connection.')
CA                                ELSE
CA                                     IF (K.GT.NUMHDL) NUMHDL = K
CA                                ENDIF
CA                                MSGTYP = .FALSE.
CA                            ENDIF
CA  500                  CONTINUE
CA  C                  Must be message:
CA                       IF (MSGTYP) THEN
CA  C                         ... get message by calling NWREAD ...
CA  C                         ... then process the message (don't forget to ......
CA  C                         ...... perform data conversion if necessary) ...
CA  C                         ... if the message request for closing network ......
CA  C                         ...... communication, set that handle to -1.
CA  C                         DO 600 J = NUMSRV+1, NUMHDL
CA  C                              IF (HDLARR(J).EQ.RDYARR(I)) THEN
CA >>>>>>                               CALL NWCLOS(HDLARR(J),IER)
CA  C                                   HDLARR(J) = -1
CA  C                                   IF (J.EQ.NUMHDL) NUMHDL = NUMHDL - 1
CA  C                              ENDIF
```

```
CA  C600                    CONTINUE
CA  C                       ... if automatic data conversion is desired, ......
CA  C                       ...... see documents on "MI" subsystem. ...
CA                      ENDIF
CA  C                 Check next handle in the list
CA                      I = I + 1
CA                      GOTO 200
CA                  ENDIF
CA  C         Go and receive input again.
CA              GOTO 100
CA          END
CA
CA
CA  RESTRICTIONS: none
CA
CA
C   PORTABILITY:  DEPENDENT
C
C
C   METHOD:
C
C   Current implementation uses LOCAL, TCP/IP, and DECNET protocol.
C   This routine calls "select" to check available input.
C
C   The following is the steps taken by this module:
C        a. Clear mask words of sockets to select.
C        b. Set the mask bits for desired sockets to read.
C        c. Call "select" with the mask words.
C        d. Parse mask bits and return appropriate handles in rdyarr.
C
C
C   REVISED:
C
C   1. 05/17/88 - Jonathan Winata - Original version.
C   2. 06/02/88 - Jonathan Winata - Fixup header to declare this routine
C                                   external and also include a skeleton
C                                   of a server program to clarify usage
C                                   of this module.
C   3. 06/30/88 - Jonathan Winata - Fixup header and code to conform to
C                                   coding standard and portability
C                                   guide lines.  And changed select call
C                                   to "blocking".
C   4. 07/28/88 - EEA - changed to use X11 path in #include statements
C   5. 07/29/88 - Jonathan Winata - Initialize rdyarr to no handle ready.
C   6. 08/16/88 - EEA - changed back to original #include path.
C   7. 09/27/88 - WKH - Add code to test handle used flag for temporary
C                 index j to check handle closed on previous client job.
C   8. 07NOV88  EES  changed from EXTERNAL to CONTROLLED
C
C
C -------------------------------------------------------------------
C  Copyright (C) 1988, LANDMARK GRAPHICS CORP.
C  All rights reserved.
C -------------------------------------------------------------------
C
*/
```

```
#include        <lgc/lgcdef.h>

#ifdef  NW_INIT
#undef  NW_INIT
#endif
#ifdef  NW_INCL
#undef  NW_INCL
#endif
#include        <lgc/nwcoms.h>

extern  void    ohnooo_();

#ifdef  MODULE
#undef  MODULE
#endif
#define MODULE  530004

void nwchki_(numhdl,hdlarr,rdyarr,ier)
long *numhdl;
long *hdlarr;
long *rdyarr;
long *ier;
{
    long rhdl[NW_MKLN];             /* mask for read ready handles */
    long    i, j;                   /* general loop counter/index */
    long    fd;                     /* actual handle for net I/O */
    long    nhdl;                   /* largest handle number to be checked */
    long    nfound;                 /* number of handles found ready */

    /* clear read mask and largest socket number */
    for (i = 0; i < NW_MKLN; rhdl[i++] = 0);
    nhdl = 0;
    rdyarr[0] = -1;                 /* no handle is ready */

    /* set up mask and note largest socket number for call to select */
    for (i = 0; i < *numhdl; i++)
        if (hdlarr[i] >= 0 && hdlarr[i] < NW_MXHL) {
            if (nwntbf_[hdlarr[i]].used) {
                fd = nwntbf_[hdlarr[i]].handle;
                rhdl[(fd / NW_NBWD)] |= (1 << (fd % NW_NBWD));
                nhdl = MAX(nhdl, fd);
            }
        }

    /* call select and check for error */
    nfound = select(nhdl+1,rhdl,0,0,0);
    if (nfound < 0) {
#ifdef  DBGSW
        perror("select");
#endif
        *ier = LEV3ER + MODULE * 100 + NW_NETR;
        ohnooo_(ier,"nwchki: select error");
        return;
    } if (nfound == 0) {
        *ier = SUCCESSFUL;      /* return successful */
        ohnooo_(ier,"nwchki: no handle ready");
```

```
        return;
    }
    /* for every bit that is on in the mask, return the handle   *
     * in rdyarr.                                                 *
     * Winnie modified to add test of used flag                   */
    j = 0;

    for (i = 0; i < *numhdl; i++)
        {
         if ((hdlarr[i] >= 0) && (nwntbf_[hdlarr[i]].used))
             {
              fd = nwntbf_[hdlarr[i]].handle;
              if ((rhdl[(fd / NW_NBWD)] & (1 << (fd % NW_NBWD))) != 0)
                  rdyarr[j++] = hdlarr[i];
             }
    }
    rdyarr[j] = -1;          /* terminate list */


    if (j > nfound) {        /* this condition should never happen */
        *ier = LEV2ER + MODULE * 100 + NW_NETR;
        ohnooo_(ier,"nwchki: bits set > found ready");
        return;
    }
    *ier = SUCCESSFUL;       /* return successful */
    ohnooo_(ier,"nwchki: tracing");
    return;
}
```

```
/*
CA  CHECKIN DATE: 08/23/88
CA  MODULE NUMBER:  530010
CA
CA
CA  NAME:          NWH2NL
CA
CA
CA  FUNCTION:  Converts the host's integer data type to the 32-bit integer of
CA             the network data type.
CA
CA
CA  APPLICATION/SUBSYSTEM:  Network (nw) CONTROLLED
CA
CA
C   AUTHOR:     Jonathan Winata
C
C
CA  LINKAGE:    CALL NWH2NL (SOURCE, RESULT, IER)
CA
CA
CA  ARGUMENT
CA    NAME        USE    TYPE     DESCRIPTION
CA  ---------     ---    ----     -----------
CA  SOURCE         I      I       Host's integer to be converted
CA  RESULT         O      I       32-bit integer of network data type
CA  IER            O      I       Error Return code
CA                                        O = successful
CA                                353001010 = host is not supported
CA
CA
CA  NOTES:
CA
CA  Only the first four bytes of "result" is valid.  The rest (for 64-bits
CA  integers) are not defined.
CA
CA  This routine is not meant to be used for heavy data conversion.
CA  One of the use of this routine is exchange of host architecture type
CA  to set-up data conversion routine (dc subsystem).
CA
CA
CA  RESTRICTIONS:  none
CA
CA
C   PORTABILITY:   DEPENDENT
C
C
C   METHOD:
C
C   This routine loads a one into a long integer word then examines each
C   byte in the integer.  If the value is in the first byte, the host
C   architecture is such that the LSB is in the first byte; otherwise,
C   the MSB is in the first byte.  If MSB first, then it checks whether
C   there are 4 bytes to the longword or 8 bytes to the longword.
C
C   If LSB is in the first byte, it does not matter whether the integer
```

```
C   word is 4 bytes or 8 bytes since only the first four bytes are the
C   ones that is used.
C
C   32-bit integer network data type is a 4-bytes/2's-complement integer
C   word with the least significant bit in the last byte.
C
C          +---+
C       A:    !MSB!  - most significant bit in first byte.
C          +---+
C       A+1: !   !
C          +---+
C       A+2: !   !
C          +---+
C       A+3: !LSB!  - least significant bit in last byte.
C          +---+
C
C   where A is memory pointer for the 32-bit integer data.
C
C   In MSB First 32-bit systems, "source" is copied to "result".
C   In MSB First 64-bit systems, "source" is left-shifted by 32 bits and stored
C   in "result".
C   In LSB First systems, the byte order must be swapped --
C       1. A: -> A+3:,
C       2. A+1: -> A+2:,
C       3. A+2: -> A+1:, and
C       4. A+3: -> A:
C   It does not matter whether the integer is 32-bits or 64-bits because
C   the value of concern will be in the first four bytes.
C
C
C   REVISED:
C
C   1. 06/03/88 - Jonathan Winata - Original version.
C   2. 06/30/88 - Jonathan Winata - Fixup header and symbols to conform
C                                   to new standard coding.
C   3. 07/28/88 - EEA - changed to use X11 path in #include statements
C   4. 08/16/88 - EEA - changed back to original #include path.
C   5. 07NOV88  EES  changed from EXTERNAL to CONTROLLED
C
C
C
C ---------------------------------------------------------------------
C  Copyright (C) 1988, LANDMARK GRAPHICS CORP.
C  All rights reserved.
C ---------------------------------------------------------------------
C
*/
#include        <lgc/lgcdef.h>
#ifdef  NW_INCL
#undef  NW_INCL
#endif
#include        <lgc/nwdefs.h>

extern  void    ohnooo_();

#ifdef  MODULE
```

```
#undef MODULE
#endif
#define MODULE  530010

void nwh2nl_(source,result,ier)
long *source;
long *result;
long *ier;
{
    char    *sp, *rp;               /* byte pointers to source and result */
    static  int first = TRUE;       /* first time flag */
    static  int type;               /* host integer type */
    int     tmp;                    /* temporary storage */

    /* figure out local host's integer format */
    if (first) {
        tmp = 1;
        sp  = (char *) &tmp;
        if (*sp)
            type = NW_LFST;
        else if (*(sp+3))
            type = NW_MF32;
        else if (*(sp+7))
            type = NW_MF64;
        else {
            type = NW_UNDF;
            *ier = LEV3ER + MODULE * 100 + NW_UHAR;
            ohnooo_(ier,"nwh2nl: unable to determine architecture.");
            return;
        }
        first = FALSE;
    }

    /* convert host integer to network type */
    switch (type) {
        case NW_MF32:
            *result = *source;
            break;
        case NW_MF64:   /* shifts are split because some compiler */
            *result = *source << 16;    /* dislike 32 bit shifts */
            *result <<= 16;
            break;
        case NW_LFST:
            sp = (char *)source;
            rp = (char *)result;
            *(rp+3) = *sp++;
            *(rp+2) = *sp++;
            *(rp+1) = *sp++;
            *rp     = *sp;
            break;
        default:
            *ier = LEV3ER + MODULE * 100 + NW_UHAR;
            ohnooo_(ier,"nwh2nl: unable to determine architecture.");
            return;
    }
    *ier = SUCCESSFUL;
```

```
        ohnooo_(ier, "nwh2n1: tracing");
        return;
    }
```

```
/*
CA   CHECKIN DATE: 08/23/88
CA   MODULE NUMBER:  530011
CA
CA
CA   NAME:        NWN2HL
CA
CA
CA   FUNCTION:   Converts the 32-bit integer of the network data type to the
CA               host's integer data type.
CA
CA
CA   APPLICATION/SUBSYSTEM:   Network (nw) CONTROLLED
CA
CA
C    AUTHOR:      Jonathan Winata
C
C
CA   LINKAGE:     CALL NWN2HL (SOURCE, RESULT, IER)
CA
CA
CA   ARGUMENT
CA     NAME         USE    TYPE       DESCRIPTION
CA   ---------      ---    ----       -----------
CA   SOURCE          I      I         32-bit integer of network data type
CA   RESULT          O      I         Host's integer to be converted
CA   IER             O      I         Error Return code
CA                                              0 = successful
CA                                    353001110 = host architecture is not supported
CA
CA
CA   NOTES:
CA
CA   This routine is not meant to be used for heavy data conversion.
CA   One of the uses of this routine is the exchange of the host's architecture
CA   type to set up the data conversion routine.
CA
CA
CA   RESTRICTIONS:   none
CA
CA
C    PORTABILITY:    DEPENDENT
C
C
C    METHOD:
C
C    This routine loads a one into a long integer word then examines each
C    byte in the integer.  If the value is in the first byte, the host
C    architecture is such that the LSB is in the first byte; otherwise,
C    the MSB is in the first byte.  If MSB first, then it checks whether
C    there are 4 bytes to the longword or 8 bytes to the longword.
C
C    If LSB is in the first byte, it does not matter whether the integer
C    word is 4 bytes or 8 bytes since only the first four bytes are the
C    ones that is used.
C
```

```
C   32-bit integer network data type is a 4-bytes/2's-complement integer
C   word with the least significant bit in the last byte.
C
C            +---+
C       A:   |MSB|  - most significant bit in first byte.
C            +---+
C       A+1: |   |
C            +---+
C       A+2: |   |
C            +---+
C       A+3: |LSB|  - least significant bit in last byte.
C            +---+
C
C   where A is memory pointer for the 32-bit integer data.
C
C   In MSB First 32-bit systems, "source" is copied to "result".
C   In MSB First 64-bit systems, "source" is right-shifted by 32 bits and
C   the upper 32-bits are cleared before it is stored in "result".
C   In LSB First systems, the byte order must be swapped --
C       1. A: -> A+3:,
C       2. A+1: -> A+2:,
C       3. A+2: -> A+1:, and
C       4. A+3: -> A:
C   It does not matter whether the integer is 32-bits or 64-bits because
C   the value of concern will be in the first four bytes.  Except that
C   in 64-bit systems, the next 4 bytes will be zeroed out.
C
C
C   REVISED:
C
C   1. 06/03/88 - Jonathan Winata - Original version.
C   2. 06/07/88 - Jonathan Winata - Fixup header for conformity to
C                                   new coding standard.
C   3. 07/28/88 - EEA - changed to use X11 path in #include statements
C   4. 08/16/88 - EEA - changed back to original #include path.
C   5. 07NOV88  EES  changed from EXTERNAL to CONTROLLED
C
C
C
C ----------------------------------------------------------------------
C  Copyright (C) 1988, LANDMARK GRAPHICS CORP.
C  All rights reserved.
C ----------------------------------------------------------------------
C
*/
#include        <lgc/lgcdef.h>
#ifdef  NW_INCL
#undef  NW_INCL
#endif
#include        <lgc/nwdefs.h>

extern  void    ohnooo_();

#ifdef  MODULE
#undef  MODULE
#endif
```

```
#define MODULE  530011

void nwn2hl_(source,result,ier)
long *source;
long *result;
long *ier;
{
    char    *sp, *rp;           /* byte pointers to result and source */
    int     i;                  /* temporary variable */
    static  int first = TRUE;   /* first time flag */
    static  int type;

    if (first) {                /* determine integer format of local host */
        i = 1;
        sp  = (char *) &i;
        if (*sp)
            type = NW_LFST;
        else if (*(sp+3))
            type = NW_MF32;
        else if (*(sp+7))
            type = NW_MF64;
        else {
            type = NW_UNDF;
            *ier = LEV3ER + MODULE * 100 + NW_UHAR;
            ohnooo_(ier,"Unable to determine host's architecture.");
            return;
        }
        first = FALSE;
    }

    switch (type) {             /* convert integer from network to host format */
        case NW_MF32:
            *result = *source;
            break;
        case NW_MF64:
            *result = *source >> 16;
            *result >>= 16;
            *result &= 0x0ffffffff;
            break;
        case NW_LFST:
            sp = (char *)source;
            rp = (char *)result;
            *rp++ = *(sp+3);
            *rp++ = *(sp+2);
            *rp++ = *(sp+1);
            *rp++ = *sp;
            if (sizeof(long) > 4)
                for (i = (sizeof(long) - 4); i > 0; i--)
                    *rp++ = '\0';
            break;
        default:
            *ier = LEV3ER + MODULE * 100 + NW_UHAR;
            ohnooo_(ier,"nwn2hl: unable to recognize architecture.");
            return;
    }
    *ier = SUCCESSFUL;
```

```
        ohndoo_(ier, "nwn2hl: tracing");
        return;
    }
```

```
/*
CA  CHECKIN DATE: 09/02/88
CA  MODULE NUMBER:  530005
CA
CA
CA  NAME:        NWREAD
CA
CA
CA  FUNCTION:  This routine does a single read.
CA
CA
CA  APPLICATION/SUBSYSTEM:  Network (nw) CONTROLLED
CA
CA
C   AUTHOR:     Jonathan Winata
C
C
CA  LINKAGE:    CALL NWREAD (HANDLE, LEN, MSGPTR, IER)
CA
CA
CA  ARGUMENT
CA    NAME        USE   TYPE    DESCRIPTION
CA  ----------    ---   ----    -----------
CA  HANDLE         I     I      handle for communication
CA  LEN           I/O    I      length of the buffer in bytes
CA  MSGPTR(1:*)    O     I      data message buffer
CA  IER            O     I      Error Return code
CA                                        0 = successful
CA                              353000504 = receive error
CA                              353000507 = not connected handle
CA                              253000508 = illegal handle
CA
CA
CA  NOTES:
CA
CA  Handles are NOT file descriptors.  Handles are indices to an internal table
CA  that contains actual file descriptors.
CA
CA  The following is a skeleton example of a server written in Fortran:
CA
CA          PROGRAM SDSRVR
CA  C  SmartData SeRVeR program
CA  C    Include files:
CA          INCLUDE '/usr/include/lgc/lgcdef.cmn'
CA  C    Variable declarations:
CA          INTEGER HDLARR(MAXHDL), RDYARR(MAXHDL+1), BUFFER(1000)
CA          INTEGER IER, NUMHDL, NUMSRV, BUFLEN, I, J, K
CA          LOGICAL MSGTYP
CA  C    Start of program:
CA >>>>>> CALL NWSOPN('<DB_NODE>', 'DWSD_Server', HDLARR, NUMSRV, IER)
CA          IF (IER.NE.SUCCES) THEN
CA              CALL DHNOOO(IER,'SDSRVR: error opening network communication.')
CA              STOP 'Stoped due to error.'
CA          ENDIF
CA          NUMHDL = NUMSRV
CA  C    Server enter endless loop checking for any messages directed to him:
```

```
CA  100   CONTINUE
CA >>>>>>      CALL NWCHKI(NUMHDL, HDLARR, RDYARR, IER)
CA             I = 1
CA  C         Process each message received at its list of handles
CA  200        CONTINUE
CA                 IF (RDYARR(I).GE.0) THEN
CA  C                Check for connect request:
CA                     MSGTYP = .TRUE.
CA                     DO 500 J = 1, NUMSRV
CA                         IF (RDYARR(I).EQ.HDLARR(J)) THEN
CA                             DO 300 K = 1, NUMHDL
CA                                 IF (HDLARR(J).LT.0) GOTO 400
CA  300                        CONTINUE
CA  400                        CONTINUE
CA >>>>>>                      CALL NWSACC(HDLARR(J), HDLARR(K), IER)
CA                             IF (IER.NE.SUCCES) THEN
CA                                 CALL OHNDOO(IER,
CA         *                           'SDSRVR: error accepting connection.')
CA                             ELSE
CA                                 IF (K.GT.NUMHDL) NUMHDL = K
CA                             ENDIF
CA                             MSGTYP = .FALSE.
CA                         ENDIF
CA  500                CONTINUE
CA  C                Must be message:
CA                     IF (MSGTYP) THEN
CA                         BUFLEN = 1000 * 4
CA  >>>>>>                 CALL NWREAD(RDYARR(I), BUFLEN, BUFFER, IER)
CA                         IF (IER.NE.SUCCES) THEN
CA  C                          ... process error on read ...
CA                         ELSE
CA  C                          ... then process the message (don't forget to
CA  C                          ...... perform data conversion if necessary) ...
CA  C                          ... you may need to do several more reads to
CA  C                          ...... actually read a complete message. ...
CA  C
CA  C                          ... if the message is for closing network ......
CA  C                          ...... communication, set that handle to -1.
CA                             DO 600 J = NUMSRV+1, NUMHDL
CA                                 IF (HDLARR(J).EQ.RDYARR(I)) THEN
CA >>>>>>                              CALL NWCLOS(HDLARR(J), IER)
CA                                     HDLARR(J) = -1
CA                                     IF (J.EQ.NUMHDL) NUMHDL = NUMHDL - 1
CA                                 ENDIF
CA  600                        CONTINUE
CA  C
CA  C                          ... if message requires a reply, then ......
CA  C                          ...... call NWWRIT routine ...
CA  C                          ..........prepares buffer here and then ...
CA >>>>>>                      CALL NWWRIT(RDYARR(I), BUFLEN, BUFFER, IER)
CA  C                          ... and check for error returned ...
CA  C
CA  C                          ... if automatic data conversion is desired,
CA  C                          ...... see documents on "MI" subsystem. ...
CA                         ENDIF
CA                     ENDIF
```

```
CA  C                Check next handle in the list
CA                     I = I + 1
CA                     GOTO 200
CA                  ENDIF
CA  C         If no input at all, delay for a second to prevent tight loop:
CA              IF (I.EQ.1) CALL UTLSLP(1)
CA  C         Go and receive input again.
CA              GOTO 100
CA        END
CA
CA
CA  RESTRICTIONS:   none
CA
CA
C   PORTABILITY:    DEPENDENT
C
C
C   METHOD:
C
C   This routine performs a read operation from the network port and
C   attempt to receive a packet from the network.  It will return
C   one packet of size less than or equal to the length specified.
C
C
C   REVISED:
C
C   1. 06/02/88 - Jonathan Winata - Original version.
C   2. 06/30/88 - Jonathan Winata - Fixup header and symbols to conform
C                                   to new Coding standard.
C   3. 07/28/88 - EEA - changed to use X11 path in #include statements
C   4. 07/29/88 - Jonathan Winata - Checks for valid handle.
C   5. 08/16/88 - EEA - changed back to original #include path.
C   6. 08/24/88 - WKH - Added shutdown socket before close socket
C   7. 07NOV88  EES  changed from EXTERNAL to CONTROLLED
C
C
C -----------------------------------------------------------------
C  Copyright (C) 1988, LANDMARK GRAPHICS CORP.
C  All rights reserved.
C -----------------------------------------------------------------
C
*/

#include        <lgc/lgcdef.h>
#ifdef  NW_INIT
#undef  NW_INIT
#endif
#ifdef  NW_INCL
#undef  NW_INCL
#endif
#include        <lgc/nwcoms.h>

extern  void    ohnooo_();

#ifdef  MODULE
#undef  MODULE
```

```
#endif
#define MODULE  530005

void nwread_(handle, len, msgptr, ier)
long *handle;
long *len;
char *msgptr;
long *ier;
{
    long   rlen;          /* length of read */

    if (*handle < 0 || *handle >= NW_MXHL ||
            nwntbf_[*handle].used == FALSE) {
        *ier = LEV3ER + MODULE * 100 + NW_NHDL;
        ohnooo_(ier,"nwread: handle is not connected.");
        return;
    }

    if (nwntbf_[*handle].type == NW_SVTP) {
        *ier = LEV2ER + MODULE * 100 + NW_IHDL;
        ohnooo_(ier,"nwread: can not read data on server's handle.");
        return;
    }

    rlen  = 0;
    if ((rlen = read(nwntbf_[*handle].handle,msgptr,*len)) <= 0) {
#ifdef  DBGSW
        perror("read");
#endif
        shutdown(nwntbf_[*handle].handle,2);
        close(nwntbf_[*handle].handle);   /* close this handle */
        nwntbf_[*handle].used = FALSE;
        *ier = LEV3ER + MODULE * 100 + NW_RCVR;
        ohnooo_(ier,"nwread: read error, handle is closed");
        return;
    }
    *len = rlen;
    *ier = SUCCESSFUL;
    ohnooo_(ier,"nwread: tracing");
    return;
}
```

```
/*
CA  CHECKIN DATE: 09/02/88
CA  MODULE NUMBER:  530007
CA
CA
CA  NAME:       NWWRIT
CA
CA
CA  FUNCTION:  This routine sends a client's message.
CA
CA
CA  APPLICATION/SUBSYSTEM:  Network (nw) CONTROLLED
CA
CA
C   AUTHOR:     Jonathan Winata
C
C
CA  LINKAGE:   CALL NWWRIT (HANDLE, LEN, BUFFER, IER)
CA
CA
CA  ARGUMENT
CA    NAME        USE   TYPE    DESCRIPTION
CA  ---------     ---   ----    -----------
CA  HANDLE         I     I      communication handle
CA  LEN            I     I      length of the message in bytes
CA  BUFFER(1:*)    I     I      message to send
CA  IER            O     I      Error Return code
CA                                       O = successful
CA                              353000703 = send error
CA                              353000707 = specified handle not connected
CA
CA
CA  NOTES:
CA
CA  See nwread routine for an example to use this routine.
CA
CA
CA  RESTRICTIONS:  none
CA
CA
C   PORTABILITY:   DEPENDENT
C
C
C   METHOD:
C
C   This routine calls "write" system function to send the buffer.
C   It will retry until the whole buffer is sent or the retry count
C   is exhausted.
C
C
C   REVISED:
C
C   1. 06/02/88 - Jonathan Winata - Original version.
C   2. 07/01/88 - Jonathan Winata - Fixup headers and symbols to conform
C                                   to new coding standard.
C   3. 07/28/88 - EEA - changed to use X11 path in #include statements
```

```
C   4. 07/29/88 - Jonathan Winata - Checks for valid handle.
C   5. 08/16/88 - EEA - changed back to original #include path.
C   6. 08/24/88 - WKH - Added shutdown command before socket close command
C   7. 07NOV88  EES  changed from EXTERNAL to CONTROLLED
C
C
C -----------------------------------------------------------------
C  Copyright (C) 1988, LANDMARK GRAPHICS CORP.
C  All rights reserved.
C -----------------------------------------------------------------
C
*/
#include        <lgc/lgcdef.h>

#ifdef  NW_INIT
#undef  NW_INIT
#endif
#ifdef  NW_INCL
#undef  NW_INCL
#endif
#include        <lgc/nwcoms.h>

extern  void    ohnooo_();

#ifdef  MODULE
#undef  MODULE
#endif
#define MODULE  530007

int nwwrit_(handle,len,buffer,ier)
long *handle;
long *len;
char *buffer;
long *ier;
{
    long    cursiz, remlen;     /* transfer lengths */
    char *  ptr;                /* pointer to I/O buffer */

    if (*handle < 0 || *handle >= NW_MXHL ||
            nwntbf_[*handle].used == FALSE) {
        *ier = LEV3ER + MODULE * 100 + NW_NHDL;
        ohnooo_(ier,"nwwrit: handle is not connected.");
        return;
    }
    remlen = *len;
    ptr = buffer;
    while (remlen > 0) {       /* may have to call write multiple times */
        if ((cursiz = write(nwntbf_[*handle].handle,ptr,
                        MIN(NW_NPSZ,remlen),0)) < 0) {
#ifdef  DBGSW
            perror("write");
#endif
            shutdown(nwntbf_[*handle].handle,2);
            close(nwntbf_[*handle].handle);
            nwntbf_[*handle].used = FALSE;
            *ier = LEV3ER + MODULE * 100 + NW_SNDR;
```

```
            ohnooo_(ier,"nuwrit: write failed, handle closed");
            return;
        }
        remlen -= cursiz;       /* update count and buffer pointer */
        ptr += cursiz;
    }
    *ier = SUCCESSFUL;          /* everything is OK if this is reached */
    ohnooo_(ier,"nuwrit: tracing");
    return;
}
```

```
/*
CA  CHECKIN DATE: 09/02/88
CA  MODULE NUMBER:  530006
CA
CA
CA  NAME:        NWRECV
CA
CA
CA  FUNCTION:  This routine reads into scattered buffers.
CA
CA
CA  APPLICATION/SUBSYSTEM:  Network (nw) CONTROLLED
CA
CA
C   AUTHOR:      Jonathan Winata
C
C
CA  LINKAGE:     CALL NWRECV (HANDLE, LEN, MSGPTR, IER)
CA
CA
CA  ARGUMENT
CA    NAME         USE    TYPE     DESCRIPTION
CA  ---------      ---    ----     -----------
CA  HANDLE          I      I       handle for communication
CA  LEN(1:*)        I      I       lengths of the buffers
CA  MSGPTR(1:*)     O      I       data message buffers
CA  IER             O      I       Error Return code
CA                                          0 = successful
CA                                 353000604 = receive error
CA                                 353000607 = not connected handle
CA                                 353000608 = illegal handle type
CA                                 353000609 = malloc failure
CA
CA
CA  NOTES:
CA
CA  BEWARE !! This routine will not return until all buffers are filled.
CA
CA  *** ATTENTION *** msgptr is declared to be an integer array, but,
CA  its content is actually an array of pointers.  Current standard
CA  fortran does not support pointer data type, so a utility routine
CA  (utlptr) is written to store the address of a variable into an array.
CA  This array can then be passed to this routine.
CA
CA  Handles are NOT file descriptors.  Handles are indices to an internal table
CA  that contains actual file descriptors.
CA
CA  The following is a skeleton example of a server written in C:
CA
CA  !* SmartData SeRVeR program *!
CA  !*  Include files:          *!
CA  #include      <lgc/lgcdef.h>
CA  #include      <lgc/nwdefs.h>
CA  main()
CA  {
CA       !* Variable declarations: *!
```

```
CA      long     hdlarr[MAXHDL], rdyarr[MAXHDL+1], buflen[4];
CA      long     ier, numsrv, numhdl, i, j, k;
CA      int      msgtyp;
CA      char *   buffer[3];
CA
CA >>>> nwsopn_("<host_name>","<server_name>",hdlarr,&numsrv,&ier);
CA      if (ier != SUCCESSFUL) {
CA          ohnooo_(ier,"sdsrvr: error opening network communication.');
CA          exit(-2);
CA      }
CA      numhdl = numsrv;
CA     !* Server enters endless loop checking for any messages: *!
CA      for (;;) {
CA >>>>     nwchki_(&numhdl,hdlarr,rdyarr,&ier);
CA          i = 0;
CA          while (rdyarr[i] >= 0) {
CA            !* Check for connect request:  *!
CA             msgtyp = TRUE;
CA             for (j = 0; j < numsrv; j++) {
CA                 if (rdyarr[i] == hdlarr[j]) {
CA                     k = -1;
CA                     while (hdlarr[++k] >= 0 && k < numhdl);
CA >>>>                nwsacc_(hdlarr[j],hdlarr[k],&ier);
CA                     if (ier != SUCCESSFUL)
CA                         ohnooo_(ier,
CA                         "sdsrvr: error accepting connection.");
CA                     else
CA                         if (k == numhdl)
CA                             numhdl++;
CA                     msgtyp = FALSE;
CA                 }
CA             }
CA            !* Must be client message:  *!
CA             if (msgtyp) {
CA               !* Prepares buffer list and length list *!
CA                 buflen[0] = 1024;
CA                 buffer[0] = malloc(buflen[0]);
CA                 buflen[1] = 256;
CA                 buffer[1] = malloc(buflen[1]);
CA                 buflen[2] = 128;
CA                 buffer[2] = malloc(buflen[2]);
CA                 buflen[3] = 0;      !* zero terminate *!
CA               !* of course you should check if those mallocs are *
CA                * successful                                       *!
CA >>>>            nwrecv_(rdyarr[i],buflen,buffer,&ier);
CA                 if (ier != SUCCESSFUL) {
CA                     !* process error on receive here *!
CA                 } else {
CA                     !* process data here *!
CA                     !*    ...             *!
CA                     !* if you need to return a reply (for this example  *
CA                      * we assume we store the reply in the same buffers *
CA                      * but different lengths)                           *!
CA                      buflen[0] = 4;
CA                      buflen[1] = 128;
CA                      buflen[2] = 0;   !* only two buffers *!
```

```
CA >>>>                          nwsend_(rdyarr[i],buflen,buffer,&ier);
CA                               if (ier != SUCCESSFUL) {
CA                                   !* process error on send here *!
CA                               }
CA                           }
CA                       }
CA                   !* Check next handle in the list *!
CA                       i++;
CA               }
CA          }
CA   }
CA
CA
CA   RESTRICTIONS:    none
CA
CA
C    PORTABILITY:     DEPENDENT
C
C
C    METHOD:
C
C    This routine receives packets from the network sequentially and
C    put them in its buffers.  Each buffer is filled before the next buffer
C    gets its turn.  The first zero length terminate the buffer list.
C
C    There is a conditional compile NOIOV switch in this routine.  When
C    this is not defined, this routine will use the system function "readv"
C    to read the data to its multiple buffers, else it performs multiple
C    "read" to fill the buffers.
C
C
C    REVISED:
C
C    1. 04/28/88 - Jonathan Winata - Original version.
C    2. 06/02/88 - Jonathan Winata - Add ability to read into multiple buffers.
C    3. 06/30/88 - Jonathan Winata - Fixup headers and symbols to conform to
C                                    new coding standard.
C    4. 07/28/88 - EEA - changed to use X11 path in #include statements
C    5. 07/29/88 - Jonathan Winata - Checks for valid handle.
C    6. 08/16/88 - EEA - changed back to original #include path.
C    7. 08/24/88 - WKH - Added shutdown command before socket close command
C    8. 07NOV88  EES  changed from EXTERNAL to CONTROLLED
C
C
C -------------------------------------------------------------------
C  Copyright (C) 1987, LANDMARK GRAPHICS CORP.
C  All rights reserved.
C -------------------------------------------------------------------
C
*/

#include        <lgc/lgcdef.h>
#ifdef  NW_INIT
#undef  NW_INIT
#endif
#ifdef  NOIOV
```

```
#   ifdef  NW_INCL
#       undef  NW_INCL
#   endif
#else
#   ifndef NW_INCL
#       define NW_INCL
#   endif
#endif
#include        <lgc/nwcoms.h>

extern  void    ohnooo_();

#ifdef  MODULE
#undef  MODULE
#endif
#define MODULE  530006

void nwrecv_(handle, len, msgptr, ier)
long *handle;
long *len;
char **msgptr;
long *ier;
{
    long   rlen, remlen;           /* transfer lengths */
    long   i;                      /* index/loop counter */
#ifdef  NOIOV
    char * curptr;                 /* pointer to current buffer */
#else
    struct iovec *iov;             /* buffer lengths and pointers */
    int    count;                  /* number of buffers to receive */
#endif

    /* check for valid handle */
    if (*handle < 0 || *handle >= NW_MXHL ||
            nwntbf_[*handle].used == FALSE) {
        *ier = LEV3ER + MODULE * 100 + NW_NHDL;
        ohnooo_(ier,"nwrecv: handle is not connected.");
        return;
    }
    if (nwntbf_[*handle].type == NW_SVTP) {
        *ier = LEV3ER + MODULE * 100 + NW_IHDL;
        ohnooo_(ier,"nwrecv: can not read data on server's handle.");
        return;
    }
#ifdef  NOIOV
    /* receive the message into multiple buffers */
    i = 0;
    while ((remlen = len[i]) > 0) { /* read it one buffer at a time */
        curptr = msgptr[i];
        while (remlen > 0) {
            rlen = 0;
            /* read one packet at a time */
            if ((rlen = read(nwntbf_[*handle].handle,curptr,
                            MIN(remlen,NW_NPSZ))) <= 0) {
#ifdef  DBGSW
                perror("read");
```

```
#endif
                shutdown(nwntbf_[*handle].handle,2);
                close(nwntbf_[*handle].handle);    /* close this side */
                nwntbf_[*handle].used = FALSE;
                *ier = LEV3ER + MODULE * 100 + NW_RCVR;
                ohnooo_(ier,"nwrecv: receive error, handle is closed");
                return;
            }
            /* update pointer and remaining length, and continue *
             *   reading messages until this buffer is filled    */
            curptr += rlen;
            remlen -= rlen;    /* length yet to be received */
        }
        /* done with one buffer, go to the next */
        i++;
    }
#else
    count = 0;        /* count the number of buffers to be received */
    while (len[++count] > 0);
    iov = (struct iovec *) malloc(count * sizeof(struct iovec));
    if (iov == NULL) {
        *ier = LEV3ER + MODULE * 100 + NW_NDMM;
        ohnooo_(ier,"nwrecv: no memory left for iov array");
        return;
    };
    remlen = 0;
    for (i = 0; i < count; i++) {
        iov[i].iov_len = len[i];
        iov[i].iov_base = msgptr[i];
        remlen += len[i];
    }
    /* read buffers */
    i = 0;
    while ((rlen = readv(nwntbf_[*handle].handle, iov, count)) != remlen) {
        if (rlen > 0) {
            remlen -= rlen;
            while (iov[i].iov_len < rlen) {
                rlen -= iov[i].iov_len;
                iov[i++].iov_len = 0;
            }
            iov[i].iov_len -= rlen;
            iov[i].iov_base += rlen;
        } else {
#ifdef  DBGSW
            perror("readv");
#endif
            free(iov);
            shutdown(nwntbf_[*handle].handle,2);
            close(nwntbf_[*handle].handle);      /* close this side */
            nwntbf_[*handle].used = FALSE;
            *ier = LEV3ER + MODULE * 100 + NW_RCVR;
            ohnooo_(ier,"nwrecv: receive error, handle is closed.");
            return;
        }
    }
    free(iov);
```

```
#endif
     /* if we got this far, things must be alright */
     *ier = SUCCESSFUL;
     ohnooo_(ier,"nwrecv:  tracing");
     return;
}
```

```
/*
CA  CHECKIN DATE: 08/23/88
CA  MODULE NUMBER:  400015
CA
CA
CA  NAME:         DCVCCV
CA
CA
CA  FUNCTION:     Convert an array of string type from remote host's type to
CA                local host's type.
CA
CA
CA  APPLICATION/SUBSYSTEM:  Data Conversion (dc) CONTROLLED
CA
CA
C   AUTHOR:       Jonathan Winata
C
C
CA  LINKAGE:      CALL DCVCCV(HTYPE,NELEM,SRC,DST,IER)
CA
CA
CA  ARGUMENT
CA    NAME        USE    TYPE     DESCRIPTION
CA  ----------    ---    ----     -----------
CA  HTYPE          I      I       host type to be checked against
CA  NELEM          I      I       number of elements to convert
CA  SRC(1:*)       I      *       array of remote host's string type
CA  DST(1:*)       O      C*(*)   result of conversion
CA  IER            O      I       Error Return code
CA                                         0 = successful
CA                                 140001501 = host specified is not supported
CA
CA
CA  NOTES:   none
CA
CA
CA  RESTRICTIONS:   none
CA
CA
C   PORTABILITY:    DEPENDENT
C
C
C   METHOD:   none
C
C
C   REVISED:
C
C   1. 07/05/88 - Jonathan Winata - Original version.
C   2. 07/28/88 - EEA - changed to use lgc/X11 path in #include statements
C   3. 08/10/88 - Jonathan Winata - updated header for new standards
C   4. 08/12/88 - EEA - changed to use lgc path in #include statements
C   5. 07NOV88  EES  changed from EXTERNAL to CONTROLLED
C
C
C
C ----------------------------------           ----------------------
```

```
C  Copyright (C) 1988, LANDMARK GRAPHICS CORP.
C  All rights reserved.
C ------------------------------------------------------------------
C
*/
#include        <lgc/lgcdef.h>
#include        <lgc/dcdefs.h>

extern  void    bcopy();
extern  void    ohnooo_();

#ifdef  MODULE
#undef  MODULE
#endif
#define MODULE  400015

void dcvccv_(htype, nelem, src, dst, ier)
long    *htype;
long    *nelem;
char    *src;
char    *dst;
long    *ier;
{
     *ier = SUCCESSFUL;

     switch (*htype) {
          case DCIEEE:
          case DCCNVX:
          case DCINTL:
          case DCVAX:
          case DCCRAY:
               bcopy(src,dst,(*nelem * sizeof(char)));
               break;
          default:
               *ier = LEV1ER + MODULE * 100 + DCNSPT;
               ohnooo_(ier,"dcvccv: remote's string type is not supported");
               return;
     }
     ohnooo_(ier,"dcvccv: tracing");
     return;
}
```

```
/*
CA   CHECKIN DATE: 08/23/88
CA   MODULE NUMBER:  400014
CA
CA
CA   NAME:        DCVCSZ
CA
CA
CA   FUNCTION:  Returns the size of remote's character type in bytes.
CA
CA
CA   APPLICATION/SUBSYSTEM:  Data Conversion (dc) CONTROLLED
CA
CA
C    AUTHOR:       Jonathan Winata
C
C
CA   LINKAGE:    CALL DCVCSZ(HTYPE,SIZE,IER)
CA
CA
CA   ARGUMENT
CA     NAME         USE    TYPE     DESCRIPTION
CA   ---------      ---    ----     -----------
CA   HTYPE           I      I       host type to be checked against
CA   SIZE            O      I       size of remote's long type
CA   IER             O      I       Error Return code
CA                                          0 = successful
CA                                  140001401 = host specified is not supported
CA
CA
CA   NOTES:  none
CA
CA
CA   RESTRICTIONS:   none
CA
CA
C    PORTABILITY:    DEPENDENT
C
C
C    METHOD:  none
C
C
C    REVISED:
C
C     1. 07/05/88 - Jonathan Winata - Original version.
C     2. 07/28/88 - EEA - changed to use lgc/X11 path in #include statements
C     3. 08/10/88 - Jonathan Winata - updated header for new standards
C     4. 08/12/88 - EEA - changed to use lgc path in #include statements
C     5. 07NOV88  EES  changed from EXTERNAL to CONTROLLED
C
C
C
C -----------------------------------------------------------------------
C  Copyright (C) 1988, LANDMARK GRAPHICS CORP.
C  All rights reserved.
C ---------------------------------                -----------------------
```

```
C
*/
#include        <lgc/lgcdef.h>
#include        <lgc/dcdefs.h>

extern  void    ohnooo_();

#ifdef  MODULE
#undef  MODULE
#endif
#define MODULE  400014

void dcvcsz_(htype, size, ier)
long   *htype;
long   *size;
long   *ier;
{
     *ier = SUCCESSFUL;
     switch (*htype) {
#if (DC_LHTP == DCIEEE) || (DC_LHTP == DCCNVX) \
 || (DC_LHTP == DCINTL) || (DC_LHTP == DCVAX)  || (DC_LHTP == DCCRAY)
          case DCIEEE:
          case DCCNVX:
          case DCINTL:
          case DCVAX:
          case DCCRAY:
               *size = 1;
               break;
#endif
          default:
               *ier = LEV1ER + MODULE * 100 + DCNSPT;
               ohnooo_(ier,"dcvcsz: remote's string type is not supported");
               return;
     }
     ohnooo_(ier,"dcvcsz: tracing");
     return;
}
```

```
/*
CA  CHECKIN DATE: 08/23/88
CA  MODULE NUMBER:  400013
CA
CA
CA  NAME:        DCVCTP
CA
CA
CA  FUNCTION:  Checks if string type is compatible with local host.
CA
CA
CA  APPLICATION/SUBSYSTEM:  Data Conversion (dc) CONTROLLED
CA
CA
C   AUTHOR:      Jonathan Winata
C
C
CA  LINKAGE:     CALL DCVCTP(HTYPE, IER)
CA
CA
CA  ARGUMENT
CA    NAME         USE    TYPE     DESCRIPTION
CA  ---------      ---    ----     -----------
CA  HTYPE           I      I       host type to be checked against
CA  IER             O      I       Error Return code
CA                                         0 = successful
CA                                 140001302 = host specified is not compatible
CA
CA
CA  NOTES:   none
CA
CA
CA  RESTRICTIONS:   none
CA
CA
C   PORTABILITY:    DEPENDENT
C
C
C   METHOD:  none
C
C
C   REVISED:
C
C    1. 07/05/88 - Jonathan Winata - Original version.
C    2. 07/28/88 - EEA - changed to use lgc/X11 path in #include statements
C    3. 08/10/88 - Jonathan Winata - updated header for new standards
C    4. 08/12/88 - EEA - changed to use lgc path in #include statements
C    5. 07NOV88  EES  changed from EXTERNAL to CONTROLLED
C                                         :
C
C
C ---------------------------------------------------------------------
C  Copyright (C) 1988, LANDMARK GRAPHICS CORP.
C  All rights reserved.
C ---------------------------------------------------------------------
C
```

```
*/
#include        <lgc/lgcdef.h>
#include        <lgc/dcdefs.h>

extern  void    ohnooo_();

#ifdef  MODULE
#undef  MODULE
#endif
#define MODULE  400013

void dcvctp_(htype, ier)
long    *htype;
long    *ier;
{
    switch (*htype) {
        case DCIEEE:
        case DCCNVX:
        case DCINTL:
        case DCVAX:
        case DCCRAY:
            *ier = SUCCESSFUL;
            ohnooo_(ier,"dcvctp: string type is compatible");
            return;
        default:
            *ier = LEV1ER + MODULE * 100 + DCNCPT;
            ohnooo_(ier,"dcvctp: string type is not compatible");
            return;
    }
}
```

```
/*
CA  CHECKIN DATE: 08/23/88
CA  MODULE NUMBER:  400012
CA
CA
CA  NAME:        DCVDCV
CA
CA
CA  FUNCTION:    Convert an array of double type from remote host's type to
CA               local host's type.
CA
CA
CA  APPLICATION/SUBSYSTEM:  Data Conversion (dc) CONTROLLED
CA
CA
C   AUTHOR:      Jonathan Winata
C
C
CA  LINKAGE:     CALL DCVDCV(HTYPE,NELEM,SRC,DST,IER)
CA
CA
CA  ARGUMENT
CA    NAME          USE    TYPE    DESCRIPTION
CA  ----------      ---    ----    -----------
CA  HTYPE            I      I      host type to be checked against
CA  NELEM            I      I      number of elements to convert
CA  SRC(1:*)         I      *      array of remote host's long type
CA  DST(1:*)         O      D      result of conversion
CA  IER              O      I      Error Return code
CA                                         0 = successful
CA                                 140001201 = host specified is not supported
CA
CA
CA  NOTES:   none
CA
CA
CA  RESTRICTIONS:   none
CA
CA
C   PORTABILITY:    DEPENDENT
C
C
C   METHOD:   none
C
C
C   REVISED:
C
C   1. 06/29/88 - Jonathan Winata - Original version.
C   2. 07/28/88 - EEA - changed to use lgc/X11 path in #include statements
C   3. 08/10/88 - Jonathan Winata - updated header for new standards
C   4. 08/12/88 - EEA - changed to use lgc path in #include statements
C   5. 07NOV88  EES  changed from EXTERNAL to CONTROLLED
C
C
C
C ------------------------------                 ----------------------
```

```
C  Copyright (C) 1988, LANDMARK GRAPHICS CORP.
C  All rights reserved.
C -----------------------------------------------------------------
C
C
*/
#include        <lgc/lgcdef.h>
#include        <lgc/dcdefs.h>

extern  void    ohnooo_();

#ifdef  MODULE
#undef  MODULE
#endif
#define MODULE  400012

void dcvdcv_(htype, nelem, src, dst, ier)
long    *htype;
long    *nelem;
char    *src;
char    *dst;
long    *ier;
{
    long    i;          /* loop counter */

    *ier = SUCCESSFUL;

    switch (*htype) {
#if (DC_LHTP == DCIEEE)
        case DCIEEE:
            bcopy(src,dst,(*nelem * sizeof(double)));
            break;
/*
        case DCCNVX:
*/
        case DCINTL:
        case DCVAX:
            src += 7;
            for (i = 0; i < *nelem; i++) {
                *dst++ = *src--;
                *dst++ = *src--;
                *dst++ = *src--;
                *dst++ = *src--;
                *dst++ = *src--;
                *dst++ = *src--;
                *dst++ = *src--;
                *dst++ = *src--;
                src += 16;
            }
            break;
/*
        case DCCRAY:
*/
#endif
#if (DC_LHTP == DCCNVX)
/*
        case DCIEEE:
```

```
*/
        case DCCNVX:
            bcopy(src,dst,(*nelem * sizeof(double)));
            break;
/*
        case DCINTL:
        case DCVAX:
        case DCCRAY:
*/
#endif
#if (DC_LHTP == DCINTL)
        case DCIEEE:
            src += 7;
            for (i = 0; i < *nelem; i++) {
                *dst++ = *src--;
                *dst++ = *src--;
                *dst++ = *src--;
                *dst++ = *src--;
                *dst++ = *src--;
                *dst++ = *src--;
                *dst++ = *src--;
                *dst++ = *src--;
                src += 16;
            }
            break;
/*
        case DCCNVX:
*/
        case DCINTL:
        case DCVAX:
            bcopy(src,dst,(*nelem * sizeof(double)));
            break;
/*
        case DCCRAY:
*/
#endif
#if (DC_LHTP == DCVAX)
/*
        case DCIEEE:
        case DCCNVX:
        case DCINTL:
*/
        case DCVAX:
            bcopy(src,dst,(*nelem * sizeof(double)));
            break;
/*
        case DCCRAY:
*/
#endif
#if (DC_LHTP == DCCRAY)
/*
        case DCIEEE:
        case DCCNVX:
        case DCINTL:
        case DCVAX:
*/
```

```
        case DCCRAY:
            bcopy(src,dst,(*nelem * sizeof(double)));
            break;
#endif
        default:
            *ier = LEV1ER + MODULE * 100 + DCNSPT;
            ohnooo_(ier,"dcvdcv: remote's double type is not supported");
            return;
    }
    ohnooo_(ier,"dcvdcv: tracing");
    return;
}
```

```
/*
CA  CHECKIN DATE: 10/03/88
CA  MODULE NUMBER:  400011
CA
CA
CA  NAME:       DCVDSZ
CA
CA
CA  FUNCTION:  Returns the size of remote's double type in bytes.
CA
CA
CA  APPLICATION/SUBSYSTEM:  Data Conversion (dc) CONTROLLED
CA
CA
C   AUTHOR:     Jonathan Winata
C
C
CA  LINKAGE:    CALL DCVDSZ(HTYPE,SIZE,IER)
CA
CA
CA  ARGUMENT
CA    NAME        USE   TYPE    DESCRIPTION
CA  ---------     ---   ----    -----------
CA  HTYPE          I     I      host type to be checked against
CA  SIZE           O     I      size of remote's long type
CA  IER            O     I      Error Return code
CA                                      0 = successful
CA                              140001101 = host specified is not supported
CA
CA
CA  NOTES:  none
CA
CA
CA  RESTRICTIONS:  none
CA
CA
C   PORTABILITY:   DEPENDENT
C
C
C   METHOD:  none
C
C
C   REVISED:
C
C   1. 06/29/88 - Jonathan Winata - Original version.
C   2. 07/28/88 - EEA - changed to use lgc/X11 path in #include statements
C   3. 08/10/88 - Jonathan Winata - updated header for new standards
C   4. 08/12/88 - EEA - changed to use lgc path in #include statements
C   5. 10/03/88 - OL - added break after case DCCRAY
C   6. 07NOV88  EES  changed from EXTERNAL to CONTROLLED
C
C
C
C ------------------------------------------------------------------
C  Copyright (C) 1988, LANDMARK GRAPHICS CORP.
C  All rights reserved.
```

```
C ---------------------------------------------------------------------
C
*/
#include        <lgc/lgcdef.h>
#include        <lgc/dcdefs.h>

extern  void    ohnooo_();

#ifdef  MODULE
#undef  MODULE
#endif
#define MODULE  400011

void dcvdsz_(htype, size, ier)
long    *htype;
long    *size;
long    *ier;
{
    *ier = SUCCESSFUL;
    switch (*htype) {
#if (DC_LHTP == DCIEEE) || (DC_LHTP == DCCNVX) \
 || (DC_LHTP == DCINTL) || (DC_LHTP == DCVAX)
        case DCIEEE:
        case DCCNVX:
        case DCINTL:
        case DCVAX:
            *size = sizeof(double);
            break;
        case DCCRAY:
            *size = 8;
            break;
#endif
#if (DC_LHTP == DCCRAY)
        case DCIEEE:
        case DCCNVX:
        case DCINTL:
        case DCVAX:
            *size = 8;
            break;
        case DCCRAY:
            *size = sizeof(double);
            break;

#endif
        default:
            *ier = LEV1ER + MODULE * 100 + DCNSPT;
            ohnooo_(ier,"dcvdsz: remote's double type is not supported");
            return;
    }
    ohnooo_(ier,"dcvdsz: tracing");
    return;
}
```

```
/*
CA  CHECKIN DATE: 08/23/88
CA  MODULE NUMBER:  400010
CA
CA
CA  NAME:       DCVDTP
CA
CA
CA  FUNCTION:  Checks if double type is compatible with local host.
CA
CA
CA  APPLICATION/SUBSYSTEM:  Data Conversion (dc) CONTROLLED
CA
CA
C   AUTHOR:     Jonathan Winata
C
C
CA  LINKAGE:    CALL DCVDTP(HTYPE, IER)
CA
CA
CA  ARGUMENT
CA    NAME       USE   TYPE    DESCRIPTION
CA  ---------    ---   ----    -----------
CA  HTYPE         I     I      host type to be checked against
CA  IER           O     I      Error Return code
CA                                     0 = successful
CA                             140001002 = host specified is not compatible
CA
CA
CA  NOTES:  none
CA
CA
CA  RESTRICTIONS:   none
CA
CA
C   PORTABILITY:   DEPENDENT
C
C
C   METHOD:  none
C
C
C   REVISED:
C
C   1. 06/29/88 - Jonathan Winata - Original version.
C   2. 07/28/88 - EEA - changed to use lgc/X11 path in #include statements
C   3. 08/10/88 - Jonathan Winata - updated header for new standards
C   4. 08/12/88 - EEA - changed to use lgc path in #include statements
C   5. 07NOV88  EES  changed from EXTERNAL to CONTROLLED
C
C
C
C ----------------------------------------------------------------------
C  Copyright (C) 1988, LANDMARK GRAPHICS CORP.
C  All rights reserved.
C ----------------------------------------------------------------------
C
```

```
*/
#include        <lgc/lgcdef.h>
#include        <lgc/dcdefs.h>

extern  void    ohnooo_();

#ifdef  MODULE
#undef  MODULE
#endif
#define MODULE  400010

void dcvdtp_(htype, ier)
long    *htype;
long    *ier;
{
    switch (*htype) {
#if  (DC_LHTP == DCIEEE)
        case DCIEEE:
#endif
#if  (DC_LHTP == DCCNVX)
        case DCCNVX:
#endif
#if  (DC_LHTP == DCVAX) || (DC_LHTP == DCINTL)
        case DCINTL:
        case DCVAX:
#endif
#if  (DC_LHTP == DCCRAY)
        case DCCRAY:
#endif
            *ier = SUCCESSFUL;
            ohnooo_(ier,"dcvdtp: double type is compatible");
            return;
        default:
            *ier = LEV1ER + MODULE * 100 + DCNCPT;
            ohnooo_(ier,"dcvdtp: double type is not compatible");
            return;
    }
}
```

```
/*
CA   CHECKIN DATE: 08/23/88
CA   MODULE NUMBER:   400009
CA
CA
CA   NAME:        DCVFCV
CA
CA
CA   FUNCTION:  Convert an array of float type from remote host's type to
CA              local host's type.
CA
CA
CA   APPLICATION/SUBSYSTEM:   Data Conversion (dc) CONTROLLED
CA
CA
C    AUTHOR:      Jonathan Winata
C
C
CA   LINKAGE:    CALL DCVFCV(HTYPE, NELEM, SRC, DST, IER)
CA
CA
CA   ARGUMENT
CA     NAME         USE    TYPE      DESCRIPTION
CA   ----------     ---    ----      -----------
CA   HTYPE           I      I        host type to be checked against
CA   NELEM           I      I        number of elements to convert
CA   SRC(1:*)        I      *        array of remote host's float type
CA   DST(1:*)        O      R        result of conversion
CA   IER             O      I        Error Return code
CA                                             0 = successful
CA                                   140000901 = host specified is not supported
CA
CA
CA   NOTES:   none
CA
CA
CA   RESTRICTIONS:   none
CA
CA
C    PORTABILITY:    DEPENDENT
C
C
C    METHOD:   none
C
C
C    REVISED:
C
C    1. 06/29/88 - Jonathan Winata - Original version.
C    2. 07/28/88 - EEA - changed to use lgc/X11 path in #include statements
C    3. 08/10/88 - Jonathan Winata - updated header for new standards
C    4. 08/12/88 - EEA - changed to use lgc path in #include statements
C    5. 07NOV88  EES  changed from EXTERNAL to CONTROLLED
C
C
C
C ------------------------------                ----------------------
```

```
C  Copyright (C) 1988, LANDMARK GRAPHICS CORP.
C  All rights reserved.
C ------------------------------------------------------------------------
C
C
*/
#include        <lgc/lgcdef.h>
#include        <lgc/dcdefs.h>

extern  void    bcopy();
extern  void    ohnooo_();

#ifdef  MODULE
#undef  MODULE
#endif
#define MODULE  400009

void dcvfcv_(htype, nelem, src, dst, ier)
long    *htype;
long    *nelem;
char    *src;
char    *dst;
long    *ier;
{
    long    i;          /* loop counter */

    *ier = SUCCESSFUL;

    switch (*htype) {

#if (DC_LHTP == DCIEEE)
        case DCIEEE:
#endif
#if (DC_LHTP == DCCNVX)
        case DCCNVX:
#endif
#if (DC_LHTP == DCINTL) || (DC_LHTP == DCVAX)
        case DCINTL:
        case DCVAX:
#endif
#if (DC_LHTP == DCCRAY)
        case DCCRAY:
#endif
            bcopy(src,dst,(*nelem * sizeof(float)));
            break;
#if (DC_LHTP == DCIEEE)
        case DCINTL:
        case DCVAX:
#endif
#if (DC_LHTP == DCINTL) || (DC_LHTP == DCVAX)
        case DCIEEE:
#endif
            src += 3;
            for (i = 0; i < *nelem; i++) {
                *dst++ = *src--;
                *dst++ = *src--;
                *dst++ = *src--;
```

```
                    *dst++ = *src--;
                    src += 8;
                }
                break;
#if (DC_LHTP == DCIEEE)
/*
            case DCCNVX:
            case DCCRAY:
*/
#endif
#if (DC_LHTP == DCINTL) || (DC_LHTP == DCVAX)
/*
            case DCCNVX:
            case DCCRAY:
*/
#endif
#if (DC_LHTP == DCCNVX)
/*
            case DCIEEE:
            case DCINTL:
            case DCVAX:
            case DCCRAY:
*/
#endif
#if (DC_LHTP == DCCRAY)
/*
            case DCIEEE:
            case DCCNVX:
            case DCINTL:
            case DCVAX:
*/
#endif
            default:
                *ier = LEV1ER + MODULE * 100 + DCNSPT;
                ohnooo_(ier,"dcvfcv: remote's float type is not supported");
                return;
        }
        ohnooo_(ier,"dcvfcv: tracing");
        return;
}
```

```
/*
CA  CHECKIN DATE: 10/03/88
CA  MODULE NUMBER:  400008
CA
CA
CA  NAME:       DCVFSZ
CA
CA
CA  FUNCTION:  Returns the size of remote's float type in bytes.
CA
CA
CA  APPLICATION/SUBSYSTEM:  Data Conversion (dc) CONTROLLED
CA
CA
C   AUTHOR:     Jonathan Winata
C
C
CA  LINKAGE:   CALL DCVFSZ(HTYPE,SIZE,IER)
CA
CA
CA  ARGUMENT
CA    NAME         USE    TYPE     DESCRIPTION
CA  ---------      ---    ----     -----------
CA  HTYPE           I      I       host type to be checked against
CA  SIZE            O      I       size of remote's float type
CA  IER             O      I       Error Return code
CA                                          0 = successful
CA                                 140000801 = host specified is not supported
CA
CA
CA  NOTES:  none
CA
CA
CA  RESTRICTIONS:  none
CA
CA
C   PORTABILITY:   DEPENDENT
C
C
C   METHOD:  none
C
C
C   REVISED:
C
C   1. 06/29/88 - Jonathan Winata - Original version.
C   2. 07/28/88 - EEA - changed to use lgc/X11 path in #include statements
C   3. 08/10/88 - Jonathan Winata - updated header for new standards
C   4. 08/12/88 - EEA - changed to use lgc path in #include statements
C   5. 10/03/88 - OL - added break after case DCCRAY
C   6. 07NOV88  EES  changed from EXTERNAL to CONTROLLED
C
C
C
C ---------------------------------------------------------------------
C   Copyright (C) 1988, LANDMARK GRAPHICS CORP.
C   All rights reserved.
```

```
C ------------------------------------------------------------------------
C
*/
#include        <lgc/lgcdef.h>
#include        <lgc/dcdefs.h>

extern  void    ohnooo_();

#ifdef  MODULE
#undef  MODULE
#endif
#define MODULE  400008

void dcvfsz_(htype, size, ier)
long    *htype;
long    *size;
long    *ier;
{
    *ier = SUCCESSFUL;
    switch (*htype) {
#if (DC_LHTP == DCIEEE) || (DC_LHTP == DCCNVX) \
 || (DC_LHTP == DCINTL) || (DC_LHTP == DCVAX)
        case DCIEEE:
        case DCCNVX:
        case DCINTL:
        case DCVAX:
            *size = sizeof(float);
            break;
        case DCCRAY:
            *size = 8;
            break;
#endif
#if (DC_LHTP == DCCRAY)
        case DCIEEE:
        case DCCNVX:
        case DCINTL:
        case DCVAX:
            *size = 4;
            break;
        case DCCRAY:
            *size = sizeof(float);
            break;

#endif
        default:
            *ier = LEV1ER + MODULE * 100 + DCNSPT;
            ohnooo_(ier,"dcvfsz: remote's long type is not supported");
            return;
    }
    ohnooo_(ier,"dcvfsz: tracing");
    return;
}
```

```
/*
CA  CHECKIN DATE: 08/23/88
CA  MODULE NUMBER:  400007
CA
CA
CA  NAME:        DCVFTP
CA
CA
CA  FUNCTION:  Checks if float type is compatible with local host.
CA
CA
CA  APPLICATION/SUBSYSTEM:  Data Conversion (dc) CONTROLLED
CA
CA
C   AUTHOR:      Jonathan Winata
C
C
CA  LINKAGE:     CALL DCVFTP(HTYPE, IER)
CA
CA
CA  ARGUMENT
CA    NAME        USE    TYPE      DESCRIPTION
CA  ---------     ---    ----      -----------
CA  HTYPE          I      I        host type to be checked against
CA  IER            O      I        Error Return code
CA                                           0 = successful
CA                                   140000702 = host specified is not compatible
CA
CA
CA  NOTES:   none
CA
CA
CA  RESTRICTIONS:   none
CA
CA
C   PORTABILITY:   DEPENDENT
C
C
C   METHOD:  none
C
C
C   REVISED:
C
C   1. 06/29/88 - Jonathan Winata - Original version.
C   2. 07/28/88 - EEA - changed to use lgc/X11 path in #include statements
C   3. 08/10/88 - Jonathan Winata - updated header for new standards
C   4. 08/12/88 - EEA - changed to use lgc path in #include statements
C   5. 07NOV88  EES  changed from EXTERNAL to CONTROLLED
C
C
C
C ----------------------------------------------------------------------
C  Copyright (C) 1988, LANDMARK GRAPHICS CORP.
C  All rights reserved.
C ----------------------------------------------------------------------
C
```

```
*/
#include        <lgc/lgcdef.h>
#include        <lgc/dcdefs.h>

extern  void    ohnooo_();

#ifdef  MODULE
#undef  MODULE
#endif
#define MODULE  400007

void dcvftp_(htype, ier)
long    *htype;
long    *ier;
{
    switch (*htype) {
#if  (DC_LHTP == DCIEEE)
        case DCIEEE:
#endif
#if  (DC_LHTP == DCCNVX)
        case DCCNVX:
#endif
#if  (DC_LHTP == DCVAX) || (DC_LHTP == DCINTL)
        case DCINTL:
        case DCVAX:
#endif
#if  (DC_LHTP == DCCRAY)
        case DCCRAY:
#endif
            *ier = SUCCESSFUL;
            ohnooo_(ier,"dcvftp: float type is compatible");
            return;
        default:
            *ier = LEV1ER + MODULE * 100 + DCNCPT;
            ohnooo_(ier,"dcvftp: float type is not compatible");
            return;
    }
}
```

```
/*
CA   CHECKIN DATE: 08/23/88
CA   MODULE NUMBER:  400016
CA
CA
CA   NAME:        DCVHTP
CA
CA
CA   FUNCTION:  Checks if data type is compatible with local host.
CA
CA
CA   APPLICATION/SUBSYSTEM:  Data Conversion (dc) CONTROLLED
CA
CA
C    AUTHOR:      Jonathan Winata
C
C
CA   LINKAGE:     CALL DCVHTP(HTYPE, IER)
CA
CA
CA   ARGUMENT
CA     NAME         USE    TYPE     DESCRIPTION
CA   ---------      ---    ----     -----------
CA   HTYPE           I      I       host type to be checked against
CA   IER             O      I       Error Return code
CA                                            0 = successful
CA                                  140001602 = host specified is not compatible
CA
CA
CA   NOTES:   none
CA
CA
CA   RESTRICTIONS:   none
CA
CA
C    PORTABILITY:    DEPENDENT
C
C
C    METHOD:  none
C
C
C    REVISED:
C
C    1. 06/29/88 - Jonathan Winata - Original version.
C    2. 07/28/88 - EEA - changed to use lgc/X11 path in #include statements
C    3. 08/10/88 - Jonathan Winata - updated header for new standards
C    4. 08/12/88 - EEA - changed to use lgc path in #include statements
C    5. 07NOV88  EES  changed from EXTERNAL to CONTROLLED
C
C
C
C -------------------------------------------------------------------
C  Copyright (C) 1988, LANDMARK GRAPHICS CORP.
C  All rights reserved.
C -------------------------------------------------------------------
C
```

```
*/
#include        <lgc/lgcdef.h>
#include        <lgc/dcdefs.h>

extern  void    ohnooo_();

#ifdef  MODULE
#undef  MODULE
#endif
#define MODULE  400016

void dcvhtp_(htype, ier)
long    *htype;
long    *ier;
{
     if (*htype == DC_LHTP) {
          *ier = SUCCESSFUL;
          ohnooo_(ier,"dcvhtp: long type is compatible");
          return;
     } else {
          *ier = LEV1ER + MODULE * 100 + DCNCPT;
          ohnooo_(ier,"dcvhtp: long type is not compatible");
          return;
     }
}
```

```
/*
CA  CHECKIN DATE: 08/23/88
CA  MODULE NUMBER:  400003
CA
CA
CA  NAME:        DCVLCV
CA
CA
CA  FUNCTION:   Convert an array of long type from remote host's type to
CA              local host's type.
CA
CA
CA  APPLICATION/SUBSYSTEM:  Data Conversion (dc) CONTROLLED
CA
CA
C   AUTHOR:     Jonathan Winata
C
C
CA  LINKAGE:    CALL DCVLSZ(HTYPE,NELEM,SRC,DST,IER)
CA
CA
CA  ARGUMENT
CA    NAME        USE   TYPE    DESCRIPTION
CA  ---------     ---   ----    -----------
CA  HTYPE          I     I      host type to be checked against
CA  NELEM          I     I      number of elements to convert
CA  SRC(1:*)       I     *      array of remote host's long type
CA  DST(1:*)       O     I      result of conversion
CA  IER            O     I      Error Return code
CA                                        O = successful
CA                              140000301 = host specified is not supported
CA
CA
CA  NOTES:   none
CA
CA
CA  RESTRICTIONS:   none
CA
CA
C   PORTABILITY:   DEPENDENT
C
C
C   METHOD:  none
C
C
C   REVISED:
C
C   1. 06/29/88 - Jonathan Winata - Original version.
C   2. 07/28/88 - EEA - changed to use lgc/X11 path in #include statements
C   3. 08/10/88 - Jonathan Winata - updated header for new standards
C   4. 08/12/88 - EEA - changed to use lgc path in #include statements
C   5. 07NOV88  EES  changed from EXTERNAL to CONTROLLED
C
C
C
C ------------------------------------               ------------------
```

```
C  Copyright (C) 1988, LANDMARK GRAPHICS CORP.
C  All rights reserved.
C -----------------------------------------------------------------------
C
*/
#include        <lgc/lgcdef.h>
#include        <lgc/dcdefs.h>

extern  void    bcopy();
extern  void    ohnooo_();

#ifdef  MODULE
#undef  MODULE
#endif
#define MODULE  400003

void dcvlcv_(htype, nelem, src, dst, ier)
long    *htype;
long    *nelem;
char    *src;
char    *dst;
long    *ier;
{
    long    *lsrc;          /* source long pointer */
    long    *ldst;          /* destination long pointer */
    long    i;              /* loop count */

    *ier = SUCCESSFUL;

    switch (*htype) {

#if (DC_LHTP == DCIEEE) || (DC_LHTP == DCCNVX)
        case DCIEEE:
        case DCCNVX:
#endif
#if (DC_LHTP == DCINTL) || (DC_LHTP == DCVAX)
        case DCINTL:
        case DCVAX:
#endif
#if (DC_LHTP == DCCRAY)
        case DCCRAY:
#endif
            bcopy(src,dst,(*nelem * sizeof(long)));
            break;

#if (DC_LHTP == DCIEEE) || (DC_LHTP == DCCNVX)
        case DCINTL:
        case DCVAX:
#endif
#if (DC_LHTP == DCINTL) || (DC_LHTP == DCVAX)
        case DCIEEE:
        case DCCNVX:
#endif
            src += 3;
            for (i = 0; i < *nelem; i++) {
                *dst++ = *src--;
```

```
                    *dst++ = *src--;
                    *dst++ = *src--;
                    *dst++ = *src--;
                    src += 8;
               }
               break;
#if (DC_LHTP == DCIEEE) || (DC_LHTP == DCNVX)
          case DCCRAY:
               lsrc = (long *)src;
               ldst = (long *)dst;
               for (i = 0; i < *nelem; i++) {
                    lsrc++;
                    *ldst++ = *lsrc++;
               }
               break;
#endif
#if (DC_LHTP == DCINTL) || (DC_LHTP == DCVAX)
          case DCCRAY:
               src += 7;
               for (i = 0; i < *nelem; i++) {
                    *dst++ = *src--;
                    *dst++ = *src--;
                    *dst++ = *src--;
                    *dst++ = *src--;
                    src += 12;
               }
               break;
#endif
#if (DC_LHTP == DCCRAY)
          case DCIEEE:
          case DCCNVX:
               lsrc = (long *)src;
               ldst = (long *)dst;
               for (i = 0; i < (*nelem - 1); i += 2) {
                    *ldst++ = (*lsrc >> 32) & 0x0ffffffff;
                    *ldst++ = *lsrc++ & 0x0ffffffff;
               }
               if ((*nelem % 2) != 0)
                    *ldst = (*lsrc >> 32) & 0x0ffffffff;
               break;
          case DCINTL:
          case DCVAX:
               src += 3;
               for (i = 0; i < *nelem; i++) {
                    *dst++ = '\0';
                    *dst++ = '\0';
                    *dst++ = '\0';
                    *dst++ = '\0';
                    *dst++ = *src--;
                    *dst++ = *src--;
                    *dst++ = *src--;
                    *dst++ = *src--;
                    src += 8;
               }
               break;
#endif
```

```
        default:
            *ier = LEVIER + MODULE * 100 + DCNSPT;
            ohnooo_(ier,"dcvlsz: remote's long type is not supported");
            return;
    }
    ohnooo_(ier,"dcvlsz:  tracing");
    return;
}
```

```
/*
CA  CHECKIN DATE: 10/03/88
CA  MODULE NUMBER:  400002
CA
CA
CA  NAME:        DCVLSZ
CA
CA
CA  FUNCTION:  Returns the size of remote's long type in bytes.
CA
CA
CA  APPLICATION/SUBSYSTEM:  Data Conversion (dc) CONTROLLED
CA
CA
C   AUTHOR:      Jonathan Winata
C
C
CA  LINKAGE:    CALL DCVLSZ(HTYPE, SIZE, IER)
CA
CA
CA  ARGUMENT
CA    NAME        USE    TYPE     DESCRIPTION
CA  ----------    ---    ----     -----------
CA  HTYPE          I      I       host type to be checked against
CA  SIZE           O      I       size of remote's long type
CA  IER            O      I       Error Return code
CA                                        0 = successful
CA                                140000201 = host specified is not supported
CA
CA
CA  NOTES:  none
CA
CA
CA  RESTRICTIONS:  none
CA
CA
C   PORTABILITY:   DEPENDENT
C
C
C   METHOD:  none
C
C
C   REVISED:
C
C   1. 06/29/88 - Jonathan Winata - Original version.
C   2. 07/28/88 - EEA - changed to use lgc/X11 path in #include statements
C   3. 08/10/88 - Jonathan Winata - updated header for new standards
C   4. 08/12/88 - EEA - changed to use lgc path in #include statements
C   5. 10/03/88 - OL - added break after case DCCRAY
C   6. 07NOV88  EES  changed from EXTERNAL to CONTROLLED
C
C
C
C -----------------------------------------------------------------
C  Copyright (C) 1988, LANDMARK GRAPHICS CORP.
C  All rights reserved.
```

```
C ------------------------------------------------------------------
C
*/
#include        <lgc/lgcdef.h>
#include        <lgc/dcdefs.h>

extern  void    ohnooo_();

#ifdef  MODULE
#undef  MODULE
#endif
#define MODULE  400002

void dcvlsz_(htype, size, ier)
long    *htype;
long    *size;
long    *ier;
{
    *ier = SUCCESSFUL;
    switch (*htype) {
#if (DC_LHTP == DCIEEE) || (DC_LHTP == DCCNVX) \
 || (DC_LHTP == DCINTL) || (DC_LHTP == DCVAX)
        case DCIEEE:
        case DCCNVX:
        case DCINTL:
        case DCVAX:
            *size = sizeof(long);
            break;
        case DCCRAY:
            *size = 8;
            break;
#endif
#if (DC_LHTP == DCCRAY)
        case DCIEEE:
        case DCCNVX:
        case DCINTL:
        case DCVAX:
            *size = 4;
            break;
        case DCCRAY:
            *size = sizeof(long);
            break;

#endif
        default:
            *ier = LEVIER + MODULE * 100 + DCNSPT;
            ohnooo_(ier,"dcvlsz: remote's long type is not supported");
            return;
    }
    ohnooo_(ier,"dcvlsz: tracing");
    return;
}
```

```
/*
CA  CHECKIN DATE: 08/23/88
CA  MODULE NUMBER:   400001
CA
CA
CA  NAME:       DCVLTP
CA
CA
CA  FUNCTION:  Checks if long type is compatible with local host.
CA
CA
CA  APPLICATION/SUBSYSTEM:  Data Conversion (dc) CONTROLLED
CA
CA
C   AUTHOR:     Jonathan Winata
C
C
CA  LINKAGE:    CALL DCVLTP(HTYPE, IER)
CA
CA
CA  ARGUMENT
CA    NAME        USE    TYPE     DESCRIPTION
CA  ---------     ---    ----     -----------
CA  HTYPE          I      I       host type to be checked against
CA  IER            O      I       Error Return code
CA                                        0 = successful
CA                                140000102 = host specified is not compatible
CA
CA
CA  NOTES:   none
CA
CA
CA  RESTRICTIONS:   none
CA
CA
C   PORTABILITY:    DEPENDENT
C
C
C   METHOD:  none
C
C
C   REVISED:
C
C    1. 06/29/88 - Jonathan Winata - Original version.
C    2. 07/28/88 - EEA - changed to use lgc/X11 path in #include statements
C    3. 08/10/88 - Jonathan Winata - updated header for new standards
C    4. 08/12/88 - EEA - changed to use lgc path in #include statements
C    5. 07NOV88  EES  changed from EXTERNAL to CONTROLLED
C
C
C
C ----------------------------------------------------------------------
C  Copyright (C) 1988, LANDMARK GRAPHICS CORP.
C  All rights reserved.
C ----------------------------------------------------------------------
C
```

```
*/
#include        <lgc/lgcdef.h>
#include        <lgc/dcdefs.h>

extern  void    ohnooo_();

#ifdef  MODULE
#undef  MODULE
#endif
#define MODULE  400001

void dcvltp_(htype, ier)
long   *htype;
long   *ier;
{
    switch (*htype) {
#if (DC_LHTP == DCIEEE) || (DC_LHTP == DCCNVX)
        case DCIEEE:
        case DCCNVX:
#endif
#if (DC_LHTP == DCINTL) || (DC_LHTP == DCVAX)
        case DCINTL:
        case DCVAX:
#endif
#if (DC_LHTP == DCCRAY)
        case DCCRAY:
#endif
            *ier = SUCCESSFUL;
            ohnooo_(ier,"dcvltp: long type is compatible");
            return;
        default:
            *ier = LEV1ER + MODULE * 100 + DCNCPT;
            ohnooo_(ier,"dcvltp: long type is not compatible");
            return;
    }
}
```

```
/*
CA  CHECKIN DATE: 08/23/88
CA  MODULE NUMBER:  400006
CA
CA
CA  NAME:        DCVSCV
CA
CA
CA  FUNCTION:  Convert an array of short type from remote host's type to
CA             local host's type.
CA
CA
CA  APPLICATION/SUBSYSTEM:  Data Conversion (dc) CONTROLLED
CA
CA
C   AUTHOR:      Jonathan Winata
C
C
CA  LINKAGE:    CALL DCVSCV(HTYPE,NELEM,SRC,DST,IER)
CA
CA
CA  ARGUMENT
CA    NAME        USE    TYPE    DESCRIPTION
CA  ----------    ---    ----    -----------
CA  HTYPE          I      I      host type to be checked against
CA  NELEM          I      I      number of elements to convert
CA  SRC(1:*)       I      *      array of remote host's long type
CA  DST(1:*)       O      I      result of conversion
CA  IER            O      I      Error Return code
CA                                       0 = successful
CA                               140000601 = host specified is not supported
CA
CA
CA  NOTES:
CA
CA  Even though the argument TYPE specifies INTEGER type, which normally
CA  associated with long integer type, the routine will move short integer
CA  type array from SRC to DST.  NELEM, of course, refers to the number
CA  of short integers to be converted.
CA
CA
CA  RESTRICTIONS:  none
CA
CA
C   PORTABILITY:   DEPENDENT
C
C
C   METHOD:  none
C
C
C   REVISED:
C
C   1. 07/05/88 - Jonathan Winata - Original version.
C   2. 07/28/88 - EEA - changed to use lgc/X11 path in #include statements
C   3. 08/10/88 - Jonathan Winata - updated header for new standards
C   4. 08/12/88 - EEA - changed to use lgc path in #include statements
```

```
C    5. 07NOV88  EES  changed from EXTERNAL to CONTROLLED
C
C
C
C ----------------------------------------------------------------
C  Copyright (C) 1988, LANDMARK GRAPHICS CORP.
C  All rights reserved.
C ----------------------------------------------------------------
C
*/
#include        <lgc/lgcdef.h>
#include        <lgc/dcdefs.h>

extern  void    bcopy();
extern  void    ohnooo_();

#ifdef  MODULE
#undef  MODULE
#endif
#define MODULE  400006

void dcvscv_(htype, nelem, src, dst, ier)
long    *htype;
long    *nelem;
char    *src;
char    *dst;
long    *ier;
{
    short   *ssrc;          /* source short pointer */
    short   *sdst;          /* destination short pointer */
    long    i;              /* loop counter */

    *ier = SUCCESSFUL;

    switch (*htype) {

#if (DC_LHTP == DCIEEE) || (DC_LHTP == DCCNVX)
        case DCIEEE:
        case DCCNVX:
#endif
#if (DC_LHTP == DCINTL) || (DC_LHTP == DCVAX)
        case DCINTL:
        case DCVAX:
#endif
#if (DC_LHTP == DCCRAY)
        case DCCRAY:
#endif
            bcopy(src,dst,(*nelem * sizeof(short)));
            break;

#if (DC_LHTP == DCIEEE) || (DC_LHTP == DCCNVX)
        case DCINTL:
        case DCVAX:
#endif
#if (DC_LHTP == DCINTL) || (DC_LHTP == DCVAX)
        case DCIEEE:
```

```
        case DCCNVX:
#endif
            src += 1;
            for (i = 0; i < *nelem; i++) {
                *dst++ = *src--;
                *dst++ = *src--;
                src += 4;
            }
            break;
#if (DC_LHTP == DCIEEE) || (DC_LHTP == DCCNVX)
        case DCCRAY:
            ssrc = (short *)src;
            sdst = (short *)dst;
            for (i = 0; i < *nelem; i++) {
                ssrc += 3;
                *sdst++ = *ssrc++;
            }
            break;
#endif
#if (DC_LHTP == DCINTL) || (DC_LHTP == DCVAX)
        case DCCRAY:
            src += 7;
            for (i = 0; i < *nelem; i++) {
                *dst++ = *src--;
                *dst++ = *src--;
                src += 10;
            }
            break;
#endif
#if (DC_LHTP == DCCRAY)
        case DCIEEE:
        case DCCNVX:
            ssrc = (short *)src;
            sdst = (short *)dst;
            for (i = 0; i < (*nelem - 1); i += 2) {
                *sdst++ = (*ssrc >> 48) & 0x0ffff;
                *sdst++ = (*ssrc >> 32) & 0x0ffff;
                *sdst++ = (*ssrc >> 16) & 0x0ffff;
                *sdst++ = *ssrc++ & 0x0ffff;
            }
            switch (*nelem % 4) {
                case 3:
                    *sdst++ = (*ssrc >> 48) & 0x0ffff;
                case 2:
                    *sdst++ = (*ssrc >> 32) & 0x0ffff;
                case 1:
                    *sdst++ = (*ssrc >> 16) & 0x0ffff;
                default:
                    break;
            }
            break;
        case DCINTL:
        case DCVAX:
            src += 1;
            for (i = 0; i < *nelem; i++) {
                *dst++ = '\0';
```

```
                *dst++ = '\0';
                *dst++ = '\0';
                *dst++ = '\0';
                *dst++ = '\0';
                *dst++ = '\0';
                *dst++ = *src--;
                *dst++ = *src--;
                src += 4;
            }
            break;
#endif
        default:
            *ier = LEV1ER + MODULE * 100 + DCNSPT;
            ohnooo_(ier,"dcvscv: remote's short type is not supported");
            return;
    }
    ohnooo_(ier,"dcvscv: tracing");
    return;
}
```

```
/*
CA  CHECKIN DATE: 10/03/88
CA  MODULE NUMBER:  400005
CA
CA
CA  NAME:        DCVSSZ
CA
CA
CA  FUNCTION:  Returns the size of remote's short type in bytes.
CA
CA
CA  APPLICATION/SUBSYSTEM:  Data Conversion (dc) CONTROLLED
CA
CA
C   AUTHOR:      Jonathan Winata
C
C
CA  LINKAGE:     CALL DCVSSZ(HTYPE,SIZE,IER)
CA
CA
CA  ARGUMENT
CA    NAME        USE    TYPE     DESCRIPTION
CA  ---------     ---    ----     -----------
CA  HTYPE          I      I       host type to be checked against
CA  SIZE           O      I       size of remote's short type
CA  IER            O      I       Error Return code
CA                                      0 = successful
CA                                140000501 = host specified is not supported
CA
CA
CA  NOTES:   none
CA
CA
CA  RESTRICTIONS:   none
CA
CA
C   PORTABILITY:    DEPENDENT
C
C
C   METHOD:   none
C
C
C   REVISED:
C
C   1. 06/29/88 - Jonathan Winata - Original version.
C   2. 07/28/88 - EEA - changed to use lgc/X11 path in #include statements
C   3. 08/10/88 - Jonathan Winata - updated header for new standards
C   4. 08/12/88 - EEA - changed to use lgc path in #include statements
C   5. 10/03/88 - OL - added break after case DCCRAY
C   6. 07NOV88  EES  changed from EXTERNAL to CONTROLLED
C
C
C
C -----------------------------------------------------------------------
C  Copyright (C) 1988, LANDMARK GRAPHICS CORP.
C  All rights reserved.
```

```
C ----------------------------------------------------------------------
C
*/
#include        <lgc/lgcdef.h>
#include        <lgc/dcdefs.h>

extern  void    ohnooo_();

#ifdef  MODULE
#undef  MODULE
#endif
#define MODULE  400005

void dcvssz_(htype, size, ier)
long    *htype;
long    *size;
long    *ier;
{
    *ier = SUCCESSFUL;
    switch (*htype) {
#if (DC_LHTP == DCIEEE) || (DC_LHTP == DCCNVX) \
 || (DC_LHTP == DCINTL) || (DC_LHTP == DCVAX)
        case DCIEEE:
        case DCCNVX:
        case DCINTL:
        case DCVAX:
            *size = sizeof(short);
            break;
        case DCCRAY:
            *size = 8;
            break;
#endif
#if (DC_LHTP == DCCRAY)
        case DCIEEE:
        case DCCNVX:
        case DCINTL:
        case DCVAX:
            *size = 2;
            break;
        case DCCRAY:
            *size = sizeof(short);
            break;

#endif
        default:
            *ier = LEVIER + MODULE * 100 + DCNSPT;
            ohnooo_(ier,"dcvssz: remote's short type is not supported");
            return;
    }
    ohnooo_(ier,"dcvssz: tracing");
    return;
}.
```

```
/*
CA  CHECKIN DATE: 08/23/88
CA  MODULE NUMBER:  400004
CA
CA
CA  NAME:       DCVSTP
CA
CA
CA  FUNCTION:  Checks if short type is compatible with local host.
CA
CA
CA  APPLICATION/SUBSYSTEM:  Data Conversion (dc) CONTROLLED
CA
CA
C   AUTHOR:      Jonathan Winata
C
C
CA  LINKAGE:     CALL DCVSTP(HTYPE, IER)
CA
CA
CA  ARGUMENT
CA    NAME        USE    TYPE     DESCRIPTION
CA  ---------     ---    ----     -----------
CA  HTYPE          I      I       host type to be checked against
CA  IER            O      I       Error Return code
CA                                        0 = successful
CA                                140000402 = host specified is not compatible
CA
CA
CA  NOTES:   none
CA
CA
CA  RESTRICTIONS:   none
CA
CA
C   PORTABILITY:   DEPENDENT
C
C
C   METHOD:  none
C
C
C   REVISED:
C
C   1. 06/29/88 - Jonathan Winata - Original version.
C   2. 07/28/88 - EEA - changed to use lgc/X11 path in #include statements
C   3. 08/10/88 - Jonathan Winata - updated header for new standards
C   4. 08/12/88 - EEA - changed to use lgc path in #include statements
C   5. 07NOV88  EES  changed from EXTERNAL to CONTROLLED
C
C
C
C ------------------------------------------------------------------
C  Copyright (C) 1988, LANDMARK GRAPHICS CORP.
C  All rights reserved.
C ------------------------------------------------------------------
C
```

```
*/
#include        <lgc/lgcdef.h>
#include        <lgc/dcdefs.h>

extern  void    ohnooo_();

#ifdef  MODULE
#undef  MODULE
#endif
#define MODULE  400004

void dcvstp_(htype, ier)
long    *htype;
long    *ier;
{
     switch (*htype) {
#if (DC_LHTP == DCIEEE) || (DC_LHTP == DCCNVX)
          case DCIEEE:
          case DCCNVX:
#endif
#if (DC_LHTP == DCINTL) || (DC_LHTP == DCVAX)
          case DCINTL:
          case DCVAX:
#endif
#if (DC_LHTP == DCCRAY)
          case DCCRAY:
#endif
               *ier = SUCCESSFUL;
               ohnooo_(ier,"dcvstp: short type is compatible");
               return;
```

```
/*
CA  CHECKIN DATE: 08/23/88
CA  MODULE NUMBER:  400000
CA
CA
CA  NAME:       DCINIT
CA
CA
CA  FUNCTION:   Checks whether host is supported.
CA
CA
CA  APPLICATION/SUBSYSTEM:  Data Conversion (dc) CONTROLLED
CA
CA
C   AUTHOR:     Jonathan Winata
C
C
CA  LINKAGE:    CALL DCINIT(HTYPE,IER)
CA
CA
CA  ARGUMENTS
CA    NAME      USE     TYPE      DESCRIPTION
CA  ---------   ---     ----      -----------
CA  HTYPE        I       I        Host type for which the data is to be
CA                                converted FROM (not the host type of the
CA                                machine on which this task is running).
CA  IER          O       I        Error Return code
CA                                        0 = successful
CA                                340000001 = host specified is not supported
CA
CA
CA  NOTES:  none
CA
CA
CA  RESTRICTIONS:   none
CA
CA
C   PORTABILITY:    PORTABLE
C
C
C   METHOD:  none
C
C
C   REVISED:
C
C   1. 12/30/87 - Jonathan Winata - Original version.
C   2. 02/26/88 - Jonathan Winata - Added argument for the structure of
C                                   subroutines.
C   3. 03/28/88 - EEA - changed error return call to 'ohnooo'
C   4. 07/06/88 - Jonathan Winata - Delete argument for data conversion
C                                   routines.
C   5. 07/28/88 - EEA - changed to use lgc/X11 path in #include statements
C   6. 08/10/88 - Jonathan Winata - updated header for new standards
C   7. 08/12/88 - EEA - changed to use lgc path in #include statements
C   8. 07NOV88  EES  changed from EXTERNAL to CONTROLLED
C
```

```
C
C-----------------------------------------------------------------------
C     Copyright (C) 1987, 1988, LANDMARK GRAPHICS CORP.
C     All rights reserved.
C-----------------------------------------------------------------------
*/

#include         <lgc/lgcdef.h>
#include         <lgc/dcdefs.h>

extern  void ohnooo_();

#ifdef  MODULE
#undef  MODULE
#endif
#define MODULE  400000

void dcinit_(htype, ier)
long    *htype;
long    *ier;
{
    if (*htype >= DC_STYPS && *htype < (DC_STYPS + DC_NTYPS)) {
        *ier = SUCCESSFUL;
        ohnooo_(ier,"dcinit: host type is supported.");
    } else {
        *ier = LEV3ER + MODULE * 100 + DCNSPT;
        ohnooo_ (ier, "dcinit: ERROR - host type not supported.");
    }

    return;
}
```

```
/*
C --- CHECKIN DATE: 04/04/88
C --- MODULE NUMBER:  100010
C
C
CA  NAME:      WXOPND
CA
CA
CA  FUNCTION:  Opens a connection to the X-server on the specified host.
CA
CA
CA  APPLICATION/SUBSYSTEM:  Windows (wx) EXTERNAL
CA
CA
C   AUTHOR:    Marie Jansen
C
C
CA  LINKAGE:   call wxopnd ( ihost, ier )
CA
CA
CA  ARGUMENTS
CA  NAME      USE     TYPE     DESCRIPTION
CA  ----      ---     ----     -----------
CA  ihost      I      C*(*)    Name of the host containing the XServer to
CA                             which you want to connect (NULL terminated
CA                             string, no longer than 50 characters).
CA  ier        O      I*4      Error Return code
CA                             0 = successful completion
CA                    310001001 = failed to open the display
CA
CA
CA  METHOD:
CA
CA  1) Calls XOpenDisplay for display 0 on the specified host.
CA  2) Calls XErrorHandler to set up wxerrh as the default X error
CA     handler.
CA  3) Initializes the luts (wxluti) for each screen that exists on the
CA     specified host.
CA
CA
CA  NOTES:
CA
CA  This routine must be called by each application task BEFORE
CA  attempting to call or execute any other X routines!
CA
CA  The host name input should be the network name of the host on which
CA  an XServer is running.  (An XServer is started up by running xinit.)
CA  Therefore, the host name input is not necessarily the name of the
CA  host on which your task is running.  For example, suppose you are sitting
CA  at the console of "becks" (and have started up an XServer by running
CA  xinit).  Then you login remotely to "strohs" with another shell opened
CA  up.  Now if you want to execute your task remotely on "strohs" (while
CA  sitting at the console of "becks"), your task should call wxopnd with
CA  the host name = "becks" NOT "strohs".  This is because the XServer is
CA  on "becks".  Even if there was another XServer running on "strohs", you
CA  wouldn't want to connect to it from becks because then you wouldn't be
```

```
CA  able to use the mouse on becks! (unless your task was strictly display
CA  graphics only).
CA
CA  HOWEVER, if your task is running on the same machine as the XServer (i.e.,
CA  you're not doing any remote execution), use "unix" for the host name.  You
CA  may use the actual name of the host you are running on if you want to,
CA  and it will work, but it will be significantly slower.  This is because
CA  if you actually specify a host name, even if it's the local machine,
CA  X goes thru the network board to execute.  If you specify "unix" instead,
CA  X knows to run locally, and therefore does not go all the way down to the
CA  network card for its communications.
CA
CA  This routine also initializes the luts (color hardware) for each existing
CA  screen (on the same host as specified).
CA
CA
CA  RESTRICTIONS:
CA
CA  Until multi-tasking lut management is available, this routine will
CA  ignore any errors returned from the call to wxluti, even if it is
CA  a level 3.  Unless you are running on a monochrome system, the
CA  allocation error which shows up in the "OHNOOO" file can be ignored.
CA
CA
C   REVISED:  NON-COMPLIANT
C
C   07/30/87 - Initial release.  MSJ.
C   09/19/87 - Added calls to rcgrpt, updated error codes used. MSJ.
C   10/06/87 - Changed rcgrpt calls to ohnooo.  MSJ.
C   11/05/87 - Added call to XErrorHandler to set up wxerrh as the
C              routine to handle X errors.  Also changed the way I
C              had externs included.  MSJ.
C   01/12/88 - Changed to use new lgcdef.h include file.  MSJ.
C   01/12/88 - Uncommented call to wxluti_().  MCM.
C   02/23/88 - Added argument to specify which host to open.  MSJ.
C   03/28/88 -- eea -- changed error return call to 'ohnooo'
C   04/04/88 - Cleaned up some documentation.  MSJ.
C
C
C-----------------------------------------------------------------------
C    Copyright (C) 1987, 1988, LANDMARK GRAPHICS CORP.
C    All rights reserved.
C-----------------------------------------------------------------------
*/

#include <lgc/lgcdef.h> /* must be included before wxopnd.h! */

#define WXOPND          /* WXOPND is only defined here! */
#include <lgc/wxopnd.h>
#undef WXOPND

int wxerrh_ ();          /* X Error Handler routine */
extern void wxluti_ (); /* wx lut initialization routine */

void wxopnd_ (ihost, ier)
char *ihost;     /* host name */
```

```
long *ier;      /* error code */

{
    long i;                      /* index variable */
    pintfn handler = wxerrh_;    /* Error handler */
    char servname[50];

    /*
       Build up the server name for the call to XOpenDisplay.
       (Have to append :0 to the name.)
    */
    for (i = 0; ihost[i] != NULL; i++)
         servname[i] = ihost[i];
    servname[i++] = ':';
    servname[i++] = '0';
    servname[i] = NULL;

    /*
       XOpenDisplay returns NULL on failure;  therefore, if a failure occurs,
       reset ier to 310001001; else if successful, reset ier to 0 (because
       XOpenDisplay returns a pointer to the opened display structure, which
       we don't want to return to the calling routine).
    */
    if ((wxdpy[0] = XOpenDisplay (servname)) == NULL)
       {
        *ier = OPND_1DSP_FAIL;
        ohnooo_ ( ier,
  "wxopnd: failed on call to XOpenDisplay for the 1st color screen");
        return;
       }

    /*
       Set up the X error handler.
    */
    XErrorHandler ( handler );

    /*
       Initialize the luts
    */
    wxluti_ (ier);
    /* ignore failure to allocate the luts, due to temp color problems! */
    if (*ier != SUCCESSFUL && *ier != 310008701)
    {
         ohnooo_ ( ier, "wxopnd: failed to initialize the luts");
         return;
    }

    *ier = SUCCESSFUL;
    ohnooo_ ( ier, "wxopnd: completed successfully");
    return;
}
```

```
/*
C --- CHECKIN DATE: 04/04/88
C --- MODULE NUMBER:  none
C
C
CA  NAME:       PXINPT.H
CA
CA
CA  FUNCTION:  Include file for pxinpt, for handling the
CA             various X events and their structures.
CA
CA
CA  APPLICATION/SUBSYSTEM:  Pointing Dispatcher/Xevents (px) EXTERNAL
CA
CA
C   AUTHOR:    Marie Jansen
C
C
CA  LINKAGE:   #include <lgc/pxinpt.h>
CA
CA
CA  ARGUMENT
CA    NAME       USE   TYPE    DESCRIPTION
CA  --------     ---   ----    -----------
CA
CA
CA  NOTES:
CA
CA  This file must be included by any C routine which handles X events
CA  dispatched by pxinpt (it does not have to be included in a routine
CA  just because that routine calls pxinpt; only if it handles the
CA  resulting structures which are defined in this file)  OR  if the
CA  C routine handles pd messages (which are also dispatched by pxinpt;
CA  this include file also includes pdclnt.h, which has the pd structure
CA  definitions in it).
CA
CA  Fortran routines which handle the X events resulting from calling
CA  pxinpt cannot include this file; instead, they simply need to include
CA  the appropriate common block, as indicated in Appendix A of the
CA  Reference Manual.
CA  The 4 (Xevent)  common block variations map one-to one with the
CA  structures defined in this file (and the structure's member names are
CA  the same as the Fortran variable names).
CA
CA  Similarly, the structures set up for pd messages map one-to-one
CA  with Fortran common blocks.
CA
CA  Don't forget to include the file <lgc/lgcdef.h> in your routine
CA  BEFORE this pxinpt.h file, in order to get the X window definitions.
CA
CA  For more information on the details of X-events and their structures,
CA  see Appendix A of the Reference Manual.  For more information on PD
CA  messages, see Appendix B of the Reference Manual.
CA
CA
CA  RESTRICTIONS:  none
```

```
CA
CA
C   PORTABILITY:   PORTABLE
C
C
C   METHOD:  none
C
C
C   REVISED:
C
C   1. 10/03/87 -- MSJ -- Initial release.
C   2. 10/19/87 -- AK  -- Added comments for each structure member.
C   3. 11/04/87 -- MSJ -- Beefed up the documentation.  Added the definition of
C                         the common block variable to this file (instead
C                         of pxinpt.c) with surrounding ifdef.
C   4. 12/16/87 -- MSJ -- Changed all the variable names to be the same within
C                         each structure.
C   5. 12/31/87 -- MSJ -- Initialized the window array to NULL.
C   6. 01/18/88 -- MSJ -- Added ifdef sandwich around the file; incorporated
C                         references to pd.
C   7. 02/20/88 -- MSJ -- Moved definition of global variable pdgenr to pdstrc.
C                         Changed NUM_XCODES to PX_NUM_XCODES.
C   8. 04/04/88 -- MSJ -- Cleaned up documentation.
C   9. 07/14/88 -- WKH -- Renamed include file pdstrc.h to be pdclnt.h,
C                         renamed PXINPT to be PXINPT_INC, and updated
C                         documentation to new standard.
C
C
C-----------------------------------------------------------------------
C    Copyright (C) 1987, 1988, LANDMARK GRAPHICS CORP.
C    All rights reserved.
C-----------------------------------------------------------------------
C
C
*/

#ifndef PXINPT_INC    /* in case this file is included more than once */

#    define PXINPT_INC
#    include <lgc/pdclnt.h>

#    define PX_NUM_XCODES 15

     /* Error codes */
#    define PXIN_SELECT_FAIL     222001001       /* from pxinpt */
#    define PBEV_BAD_CODE        222001101       /* from pxpbev */
#    define PXRCV_EVNT_UNDEF     222001501       /* from pxrcv */

    /*
       The Xemous structure is for all keyboard and mouse related X events:
       (1) KeyPressed, (2) KeyReleased, (3) ButtonPressed, (4) ButtonReleased,
       (5) EnterWindow, (6) LeaveWindow, (7) MouseMoved, (11) RightDownMotion,
       (12) MiddleDownMotion, and (13) LeftDownMotion.
    */
    typedef struct _Xemous
        {
```

```
    long xetype;    /* Landmark's code number indicating the event type,
                       not X's code (i.e., for regular X events, the
                       number will be from 1 thru 15; for other lg events,
                       the number will be in the 200 or 300 range; pxinpt
                       takes care of automatically translating from X's
                       code number to Landmark's number.)
                       Therefore, you canNOT check this code against the
                       X mnemonics such as ButtonRelease, MouseMoved,
                       etc. */
    Window xewin;   /* ID number of the window in which the event
                       occurred. */
    short xetime;   /* "Current" time of the event (in 10 millisecond
                       ticks). This only appears with key pressed/
                       released and mouse button pressed/released events.
                       Since there are only 16 bits of time, this value
                       wraps after approximately 11 minutes. */
    short xedetl;   /* Detail code. The high byte indicates the presence
                       of a key modifier (control, shift, etc.);
                       The LOW byte varies depending on the event type:
                          Key pressed/released events - gives the actual
                          character pressed ('n', 'h', etc.), as
                          translated by pxinpt.
                          Mouse pressed/released events - gives the button
                          code (0, 1, or 2, for right, middle, or left).
                          Mouse entering/leaving - 0, 1, or 2, indicating
                          type of crossing.
                          Mouse moved/motion down events - unused?
                       See Appendix B for more information.
                    */
    short xex;      /* X coordinate of the mouse, relative to
                       the window (even if the mouse isn't in
                       the event window) */
    short xey;      /* Y coordinate of the mouse, relative to
                       the window (even if the mouse isn't in
                       the event window) */
    Window xesubw;  /* ID of the child window the mouse is in
                       (if any); else 0 */
    Locator xeloct;    /* Absolute x and y coordinates (screen-
                          relative) of the mouse.  This value
                          must be decoded before it can be used
                          (use XInterpretLocator) */
    } Xemous;

/*
   The Xeexpo structure is for the ExposeWindow (8) and ExposeRegion (9)
   events.
*/
typedef struct _Xeexpo
    {
     long xetype;    /* Landmark code indicating event type (8 or 9) */
     Window xewin;   /* ID number of the window which received the event. */
     short xepad;    /* Unused */
     short xedetl;   /* Either 0 or ExposeCopy (512) */
     short xewdth;   /* Width of the exposed area */
     short xehght;   /* Height of the exposed area */
     Window xesubw;  /* ID of the child window exposed (if any) */
```

```
        short xey;      /* 0 (for ExposeWindow event); else, the
                           top of the exposed area */
        short xex;      /* 0 (for ExposeWindow event); else, the
                           left edge of the exposed area */
      } Xeexpo;

   /*
      The Xeunmp structure is for ExposeCopy(10) and UnmapWindow events (14).
   */
   typedef struct _Xeunmp
      {
      long xetype;      /* Landmark code indicating the event type (14) */
      Window xewin;     /* ID number of the window which received the event */
      long xepad1;      /* Unused */
      long xepad2;      /* Unused */
      Window xesubw;    /* ID of the child window exposed (if any) */
      long xepad3;      /* Unused */
      }Xeunmp;

   /*
      The Xefocs structure is for Keyboard focus change events (15).
   */
   typedef struct _Xefocs
      {
      long xetype;      /* Landmark code indicating the event type (15). */
      Window xewin;     /* ID number of the window which received the event. */
      short xepad;      /* Unused */
      short xedetl;     /* Either EnterWindow or LeaveWindow */
      long xepad2;      /* Unused */
      Window xesubw;    /* ID of the child window (if any) of the focus
                           change */
      long xepad3;      /* Unused */
      } Xefocs;

#  ifdef PXINPT_DEF   /* only defined in pxinpt.c */
      /*
         Starting with element 1, these are all the reserved X Windows
         event codes.  The index of each element corresponds to the code
         (1 thru 15) used by the applications (which is why element 0 is
         ignored).
      */
      long pxcodes[] =          /* for internal use only! */
         {
          NULL,
          KeyPressed,
          KeyReleased,
          ButtonPressed,
          ButtonReleased,
          EnterWindow,
          LeaveWindow,
          MouseMoved,
          ExposeWindow,
          ExposeRegion,
          ExposeCopy,
          RightDownMotion,
          MiddleDownMotion,
```

```
                LeftDownMotion,
                UnmapWindow,
                FocusChange
               };

        Xemous xemous_;         /* external X-event storage */
#   else
        extern long pxcodes[];
        extern Xemous xemous_;
#   endif
#endif
```

```
/*
C --- CHECKIN DATE: 03/14/88
C --- MODULE NUMBER:  220015
C
C
CA  NAME:       PXXRCV
CA
CA
CA  FUNCTION:  Receives and handles a single X event.
CA
CA
CA  APPLICATION/SUBSYSTEM:  Pointing Dispatcher/Xevents (px) INTERNAL
CA
CA
C   AUTHOR:     Marie Jansen
C
C
CA  LINKAGE:    call pxxrcv (ier)
CA
CA
CA  ARGUMENTS
CA  NAME      USE      TYPE     DESCRIPTION
CA  ----      ---      ----     -----------
CA  ier       O        I*4              0 = successful completion.
CA                              222001501 = event received for window that
CA                                          wasn't registered thru adcnct.
CA                              222001502 = unknown event type received.
CA                                          all error codes from adecnt.
CA
CA
CA  METHOD:
CA
CA  - Call XNextEvent, to get the next available X event off the queue.
CA  - Handle the event, depending on the type:
CA
CA     a) LGEVNT (hex 8000): simply move the code found in the time
CA        member of the event into the event type (to replace the 0x8000
CA        with our specific code number).  The code originally got into
CA        the time field when the event was pushed onto the stack by
CA        a call to pxevpb.
CA
CA     b) KeyPressed events:  A KeyPressed event could be just that,
CA        a simple Key press, or it could be any of our several control
CA        events (notepad, pointing, help, etc.).  First, extract the
CA        high byte from the detail code field, and then call
CA        XLookupMapping to convert the low byte to an ascii character.
CA        - If the low byte is a modifier key by itself, ignore this
CA          event (if a user presses control-n, for example, first
CA          a keypress event is received with just the control, then
CA          a 2nd event is received with the control and n;.therefore
CA          the first event is pointless).
CA        - If the high byte is a modifier (shift, alt or control),
CA          then an internal table of control events must be searched
CA          for a match.  (The table contains the key code and the
CA          modifier required for each of our special "events", along
CA          with our code number; for example, notepad is 'n' and control,
```

```
CA          and the code is 202.) If a match is found, and the matching
CA          entry also has a function associated with it, execute that
CA          function and do nothing else for this event (the 1 existing
CA          example of this is the menu event, which is always
CA          to be intercepted by pxinpt, rather than be handled by
CA          the applications). Else, if there is no function stored
CA          with the matching entry, simply move the code in that entry
CA          to the event type field. (Thus, the calling application
CA          would see the event as a 202 - notepad - rather than a
CA          simple KeyPressed event, for example).
CA        - If no match is found in the table, OR if there was nothing
CA          in the high byte of detail, this was a simple KeyPressed
CA          event, so move a 1 into the event type field.
CA
CA     c) MouseMoved event:   First, check the high byte of the detail
CA        code to see if a button was held down while the mouse moved.
CA        If so, check if the application had actually registered
CA        for one of the MotionDown events (motion down events don't
CA        actually occur in X).  If the type event registered for
CA        matches the button held down (for example, the right button
CA        was down, and the application had registered for
CA        RightDownMotion), change the event type field to the
CA        appropriate MotionDown event code (11 - 13); else change
CA        it to 7 for plain old mouse moved.
CA
CA     d) All other events: Simply change the event type code from the
CA        X hex code to the corresponding Landmark event code (1 - 15).
CA
CA  - Use memcpy to copy the modified event data into the
CA    global common block/structure.
CA  - Call adecnt (unless the event is to be ignored), for this event.
CA
CA
CA  NOTES:
CA
CA  PXINPT will continue waiting for X events and handling them, until
CA  a non-zero status code is received back from adecnt (the indirect
CA  execution).  As soon as this happens, control is returned from
CA  pxinpt to the calling routine.
CA
CA
CA  RESTRICTIONS:  none
CA
CA
C   REVISED:  NON-COMPLIANT
C
C   01/16/88 - Initial release.  MSJ.
C   01/29/88 - Changed to pass in 0 to adgmsk if the event window is
C              the RootWindow.  MSJ.
C   02/15/88 - Cleaned up the documentation some.  MSJ.
C   02/23/88 - Added check for warning errors returned from adgmsk and
C              adecnt, to ignore problems with spurious events appearing. MSJ.
C   02/26/88 - Changed the use of a few defines, to match new include files.
C              MSJ.
C   03/14/88 - Changed the command menu event (which is normally automatically
C              intercepted) to have a code number.  MSJ.
```

```
C   03/28/88 - EEA - changed error return call to 'ohnooo'
C
C
C------------------------------------------------------------------------
C    Copyright (C) 1987, 1988, LANDMARK GRAPHICS CORP.
C    All rights reserved.
C------------------------------------------------------------------------
*/

#include <lgc/lgcdef.h>
#include <lgc/pxinpt.h>
#include <lgc/pxxrcv.h>

extern void adecnt_ ();
extern void adgmsk_ ();

void pxxrcv_ ( ier )
long *ier;

    {
    long cdindx;         /* Index variable for the list of lg event codes */
    XEvent event;        /* Where the Xevent received is initially stored */
    XButtonEvent *bevent = (XButtonEvent *) &event; /* a more detailed way of
                                                   looking at the event*/
    long imask;          /* Xevent mask for which window is registered */
    short smask;         /* short version of imask */
    short button;        /* high "byte" of the detail button code */
    char *key;           /* key code that has been converted to ascii */
    short high, low;     /* temp storage for the high & low parts in detail */
    char lowbyte;
    long indx;           /* index variable in one of the loops */
    long temp;
    long ignore;         /* Whether or not the received event is processed */
    char str[80];

    /*
       Wait until an X event is received.
    */
    XNextEvent (&event);
    ignore = FALSE;

    /*
       Before the event can be processed, it has to be
       decoded into its lg equivalent code.  This is done
       differently, depending on the X-event which occurred.
    */
    switch (event.type)
        {
         case LGEVNT:  /* hex 8000 */
            /*
               This event is actually in the 300+ range, even though
               to X it looks like a hex 8000 (LGEVNT).  The actual
               300 level event code is (supposed to be) stored in
               the time field of the event structure.  Therefore,
               simply move it into the event type.
            */
```

```
            event.type = (long) bevent->time;
        break;

        case KeyPressed:
            /*
               First, go through all sorts of gyrations with the
               detail code to figure out what's in the most and
               least significant bytes.  Mask out the LSB of detail
               and store in high (the LSB of high will be zeros).
               Mask out the MSB of detail and store in low (the MSB
               of low will be zeros).- If either Control or Alt was
               pressed along with the key, set detail equal to low
               so that the Modifier portion will not be present when
               converting the keycode (if it's there, the key won't
               convert properly; however, if Shift was pressed with
               the key, that must remain in detail before converting
               or else you'll get a lower case character returned
               instead of upper-case!).
            */
            high = bevent->detail & HIGHMASK;
            low = bevent->detail & ValueMask;
            if (high != ShiftMask && high != ShiftLockMask)
                bevent->detail = low;
            /*
               The gyrations done on the next line are to insure
               portability, no matter which byte order the machine uses.
            */
            lowbyte = (char) ((low << 8) | low);
            /*
               Convert the key code in detail (the key code is
               actually in the LSB of detail) to its ascii character
               representation.  It it doesn't convert, set key equal
               to the original value of the LSB of detail (someone
               may have pushed an already-converted KeyPressed event
               back on the queue with pxpbev).
            */
            if ( (key = XLookupMapping (bevent, &temp)) == NULL
                    || temp == 0)
                key = (char *) &lowbyte;

            /*
               If the user presses a "shift" key (control, shift, alt,
               etc.) with a regular key (control-n, for example),
               first an event will be received with just the shift
               code present (in the low byte), then a second event
               will be received that
               contains both the shift code and the actual character
               code (this is also true of a "shift" key in combination
               with a mouse button).  The first event is useless and
               should just be thrown out.
            */
            if ( low >= PX_SHIFT_CODE  &&  low <= PX_ALT_CODE )
                ignore = TRUE;
            else
                {
                 /*
```

```
            Now check if the high byte is a "shift" key.
            If so, this event is actually a key with a
            modifier, so it must first be checked for
            either the pull-up or pull-down menu keys
            (u or d), and then be compared against our
            list of lg event keys.
        */
        if ( high == ControlMask || high == MetaMask
                || high == ShiftMask  )
            {
             for ( indx = 0;
                    indx < PX_NUM_LGEVENTS
                       && (*key != lgkevent[indx].keychar
                       ||  high != lgkevent[indx].modkey);
                    indx++ )
                  ;
             if (indx < PX_NUM_LGEVENTS
                    && lgkevent[indx].execfunc != NULL)
                  {
                   /* execute for menu event */
                   ignore = TRUE;
                   lgkevent[indx].execfunc ();
                  }
             else if (indx < PX_NUM_LGEVENTS)
                  {
                   event.type = lgkevent[indx].lgevcode;
                  }
             else
                  {
                   /*
                      All the alternatives have been exhausted;
                      event must be regular key press which
                      just happened to have a control key
                      along with it!
                   */
                   event.type = WXKEYP;
                  }
            }  /* end of if high is a control key */
        else
            event.type = WXKEYP;

        } /* end of else - key wasn't just control key alone */

    bevent->detail = ((short) *key & ValueMask) | high;
break;

case MouseMoved:
    /*
       Since mouse moved with motion events can be registered
       for, but never actually received per se (you can only
       receive mouse moved events; if you register for any of
       the motion events, you still receive only mouse moved
       events - however, you will only receive them if they
       occurred with the requested type of motion), mousemoved
       events must be decoded to see if it's the type requested.
```

```
           First, get the high byte of the detail button code.
        */
        high = bevent->detail & HIGHMASK;

        /*
           Get the Xevent mask for which this window is registered.
        */
        if (event.window == RootWindow)
            event.window = 0;

        adgmsk_ (&event.window, &imask, ier);
        if (*ier == 117001101)
            {
             event.type = WXMMOV;
             break;
            }
        else if (*ier != SUCCESSFUL)
            {
             ohnooo_ (ier,
"pxxrcv: failed on call to adgmsk when interpreting mouse-moved event");
             return;
            }
        smask = (short) imask;

        /*
           If the right button was pressed, and a RightDownMotion
           event was registered for, then change the event type
           to the lg equivalent of RightDownMotion.
        */
        if ( high == RightMask
               &&  (smask & RightDownMotion == RightDownMotion) )
            event.type = WXMMVR;

        /*
           If the middle button was pressed, and a MiddleDownMotion
           event was registered for, then change the event type
           to the lg equivalent of MiddleDownMotion.
        */
        else if ( high == MiddleMask  &&
                (smask & MiddleDownMotion == MiddleDownMotion))
            event.type = WXMMVM;

        /*
           If the left button was pressed, and a LeftDownMotion
           event was registered for, then change the event type
           to the lg equivalent of LeftDownMotion.
        */
        else if ( high == LeftMask
                 && (smask & LeftDownMotion == LeftDownMotion))
            event.type = WXMMVL;

        /*
           No buttons were held down, so the event truly is
           a MouseMoved event.
        */
        else
```

```
                event.type = WXMMOV;

        break;

        default:
            /*
               Search the pxcodes table to find the index
               (lg code number)
               corresponding to the x event code number.
            */
            for ( cdindx = 1;
                  cdindx <= PX_NUM_XCODES && event.type != pxcodes[cdindx];
                  cdindx++ )
                ;
            if (cdindx > PX_NUM_XCODES)
                {
                 *ier = PXRCV_EVNT_UNDEF;
                  sprintf (str,
                           "pxxrcv: unknown event type received: %d",
                           event.type);
                  ohnooo_ (ier, str);
                  return;
                 }
            event.type = cdindx;
        break;

      }  /* end of the switch */

   /*
      In case the event occurred for the RootWindow, change it to zero
      before copying the event to the common blocks.
   */
   if (event.window == RootWindow)
       event.window = 0;

   /*
      Copy the event structure to the external event structure
      (xemous) which is accessible by Fortran as a common block.
   */
   memcpy ( (char *) &xemous_, (char *) &event, sizeof (xemous_) );

   /*
      Indirectly invoke all the subroutines tied to this window for the
      event which occurred, unless the event is ignorable.
   */
   if ( !ignore &&  *ier != 117001101)
       {
        adecnt_ (&event.window, &event.type, ier);
        if (*ier != SUCCESSFUL  &&  *ier != 117000201)
            {
             ohnooo_ (ier,
   "pxxrcv: non-zero code returned from adecnt; control returned to caller");
             return;
            }
       }
```

```
        *ier = SUCCESSFUL;
        ohnooo_ (ier, "pxxrcv: completed successfully");
        return;
}
```

```
/*
C --- CHECKIN DATE: xx/xx/88
C --- MODULE NUMBER:  220010
C
C
CA  NAME:       PXINPT
CA
CA
CA  FUNCTION:   Captures Xevents, in addition to receiving pointing
CA              dispatcher messages.
CA
CA
CA  APPLICATION/SUBSYSTEM:  Pointing Dispatcher/Xevents (px) EXTERNAL
CA
CA
C   AUTHORS     Marie Jansen
C
C
CA  LINKAGE     CALL PXINPT (ISTAT)
CA
CA
CA  ARGUMENT
CA    NAME       USE   TYPE    DESCRIPTION
CA  --------     ---   ----    -----------
CA  ISTAT        0     I*4     0 = successful completion.
CA                             322001001 = Select function failed.
CA                             222001501 = unknown event type received.
CA                                         all error codes from adecnt.
CA
CA
CA  NOTES:
CA
CA  PXINPT is the only routine you should call in order to receive X events
CA  and pointing dispatcher messages.   You must previously have registered
CA  for the appropriated X events by calling adcnct for each window /
CA  event-code / subroutine combination.  In order to receive pd messages,
CA  you must have previously called pdopen, 1st to open a channel to the
CA  pointing dispatcher, then once for each template for which you are
CA  interested in receiving information.
CA
CA  PXINPT waits until it receives an event from X or PD, performs
CA  any necessary translations on the data received in the event,
CA  copies this modified data into the appropriate event structure/common
CA  block, then causes the appropriate routine(s) to be indirectly
CA  executed.
CA
CA  Since the argument lists for PD versus X-event indirectly executed
CA  routines differ (i.e., you canNOT use the same routine to handle
CA  both PD messages and Xevents), your routine will automatically know
CA  which type of input it received from pxinpt, and therefore which
CA  external event structure / common block to examine.
CA
CA  For X-event indirectly executed routines, the arguments MUST be
CA  window, function, and istat: window is input only, and is the ID of the
CA  window which received the event;  function is also input only, and
CA  is the event code.  DO NOT CHANGE THE VALUES OF THESE 2 VARIABLES FROM
```

```
CA  WITHIN YOUR INDIRECTLY EXECUTED ROUTINE! Ier is the standard error
CA  code variable, and is therefore an output variable.
CA
CA  For PD message indirectly executed routines, there is only ONE argument
CA  istat (again, the standard SmartWindows error code variable).
CA
CA
CA  X EVENT GLOBAL AREAS:
CA
CA  For C routines:
CA
CA  The external variable, xemous_, is available to you by including
CA  the pxinpt.h file. The definitions of the 4 structures which
CA  correspond to the 4 variations of the xemous common block can be
CA  found in Appendix A of the Reference Manual (in addition to
CA  being in the "pxinpt" include file). In order to make use of the
CA  other 3 structures (besides Xemous), you must include code similar
CA  to the following in your routine:
CA
CA       Xeexpo *xeexpo = (Xeexpo *) &xemous_;
CA
CA  This creates a variable xeexpo, which is a pointer to an Xeexpo
CA  structure. It has been set equal to the address of the xemous_
CA  global variable (and this address has been cast to be a pointer
CA  to an Xeexpo structure. In other words, there is only one external
CA  variable available. In order to reference xemous_ in terms of
CA  the other structures, you must cast it (it's address). You
CA  cannot copy xemous to a variable which is a different type of
CA  structure. The only thing you can change in the above code example
CA  is what you name your variable (xeexpo).
CA
CA  The other 2 structure names are Xeunmp and Xefocs.
CA
CA  For pd messages, the external variable, pdgenr_, is available to you,
CA  also by including the pxinpt.h file. It is of type pdtmplt, which
CA  is a structure corresponding to the generic pd message. To use the
CA  other pd structures available, you must perform a cast on pdgenr_,
CA  similar to the above operation with xemous_.
CA
CA
CA  For Fortran routines:
CA
CA  Include the xemous common block in your code, with the
CA  appropriate set of variables, depending on which event you are
CA  planning to handle in that routine (as outlined in Appendix A
CA  of the Reference Manual).
CA
CA
CA  PXINPT will continue waiting for X events and PD messages, and then
CA  handling them, until a non-zero status code is received back from
CA  either adecnt (the indirect execution method for X-event processing)
CA  or from the indirectly-executed subroutine itself (for pd message
CA  processing the subroutine in the template is called directly). As
CA  soon as this happens, control is returned from pxinpt to the calling
CA  routine.
CA
```

```
CA Most indirectly executed routines should set the status code to
CA if they complete successfully.  This causes program control to
CA within pxinpt.  For example, standard "events" such as expose
CA window, notepad, help, abort, etc/, which most all windows must
CA handle, should be handled automatically through pxinpt, without
CA returning to the caller unless an actual error occurs.
CA On the other hand, for events such as button presses, you
CA might want control returned to your routine from pxinpt as
CA soon as one of these occurs.  Your button press routine would
CA therefore set the status code to be something other than zero.
CA
CA You cannot depend on the actual value of the error code returned by
CA pxinpt, however (other than 0 for completed successfully, that is).
CA This is because more than one layer of code (various subsystems built
CA on top of each other) may have registered for the same event on the
CA same window, which is perfectly legitimate (in the case of X-events
CA only; only one subroutine will be executed for any PD messages received).
CA Since all indirect routines connected to the same event/window will
CA be executed, more than one of them could return a non-zero error code;
CA Whichever one happened to return the highest value error code would be
CA the code that gets returned.  (Fatal errors -level 3- are returned
CA immediately, however, without executing any other routines.)  The
CA "highest-value" convention was adopted mainly to ensure that if a level
CA 2 error code occurred, it would be returned instead of any level 1 codes.
CA Level 2 errors should only be set. for true errors, NOT to simply indicate
CA that your routine has received the input it was looking for and is
CA therefore ready to return from pxinpt.  Use only level 1 codes for that.
CA
CA Thus, if a level 2 or higher code is returned from pxinpt, you may or
CA may not have received the input you were looking for, but somewhere along
CA the way a true error occurred, so even if you did receive an expected
CA input, you probably shouldn't continue and process it.
CA
CA If a level 1 code is returned from pxinpt, there are several
CA possibilities.  If you are lucky, it will be YOUR level 1 code which
CA you set in your indirectly executed routine to cause the return.  It
CA might be someone else's code, however, either an informative error, or
CA their code set to return because THEY also received the input they were
CA looking for.  Now, realistically it should RARELY occur that more than
CA one indirectly executed routine is set up to return for the same event.
CA If so, it probably indicates a flaw in the code design.  It is possible,
CA however, that someone else set an informative error, causing the return.
CA It is therefore suggested that you AVOID setting informative errors in
CA indirectly executed routines since they will cause pxinpt to return.
CA
CA All of this explanation boils down to this: although you cannot
CA GUARANTEE the value of the return code, more than likely it will be the
CA one you're looking for.  Always check first if it is.  If it's some
CA other code (especially if it's level 1), you must have an alternative
CA way of finding out if YOUR code was ever set.  This implies that in
CA your indirectly executed routine, you should store the return code in
CA a your own global common block in order to be able to check it when you
CA return from pxinpt.
CA
CA
CA RESTRICTIONS: none
```

```
CA
CA
CA PORTABILITY:   PORTABLE
CA
CA
CA METHOD:
CA
CA Within a loop, as long as the error code remains 0:
CA 1) Continue to handle X client events and call michki to see if any data
CA    comes in from the X client handle and the pd handles.
CA    and the pd socket.
CA 2) Call wxflus to make sure all X events get put on the input queue.
CA    Check how many events ther are with QLength; if any, call XPeekEvent
CA    to peek at the next event.  If it's an expose type event, go
CA    ahead and call pxxcev to process it.  Continue peeking at events
CA    to look for inital expose events, until they have all been procesed.
CA 3) Call michki.  It will block until an input is received from either the
      X or the pd-socket (or both!).
CA 4) Check if the michki found input for the pd socket.  If so:
CA    - Call mirecv to receive the message from pd.
CA    - Move data fromk the MI buffer to the pd buffer.
CA    - If the received message contained an executable function entry, e
CA    execute the appropriate routine (which is included as part of the
CA    message).
CA 5) Check if the michki found input for the X socket.  If so:
CA    - Determine how many events are waiting to be read in by
CA      calling Xpending (which also flushes out the queue).
CA    - In a loop (executed for however many events there are, as
CA      determined in the above step), call pxxrcv, which reads in
CA      the next X event in the queue (by calling XNextEvent),
CA      and which processes the event appropriately (executing the
CA      correct routine from ad, etc.).  Before the loop finishes,
CA      reset the number of events remaining in the queue, by
CA      calling QLength (because the queue may have grown due to
CA      pxpev -put back event- having been called by an indirect
CA      routine.  Since it's shuck onto the queue, the select function
CA      won't see it unless an additional "regular" X event occurs;
CA      therefore, it must be captured here.
CA
CA
CA REVISED:
CA 1.  10/03/87 -- AK  --  Initial release.
CA 2.  10/13/87 -- AK  --  Changed regrpt calls to ohshit.
CA 3.  11/04/87 -- MSJ --  Added ability to handle other LG events, beefed up
CA                         the documentation.
CA 4.  11/19/87 -- MSJ --  Changed variable names within the structures to be
CA                         the same within each structure.  Striped out the
CA                         code to register for Xevents and moved to the
CA                         routines pxreg and pxregw.
CA 5.  11/25/87 -- MSJ --  Discovered that the MSB of detail can't be stripped
CA                         off before convertng the keycode if you want
CA                         upper-case characters to translate properly (but it
CA                         must be stripped off if the other modifistat keys,
CA                         Control and Alt were used!).
CA 6.  01/18/88 -- MSJ --  Changed to use SELECT function, including reading on
CA                         pointing dispatcher socket.  Also, changed to use
```

```
CA                              new ad routines.  Split off the X handling portion
CA                              into the subroutine pxxrcv.
CA 7.  01/25/88 -- MSJ --  Added in handling of pointing dispatcher messages.
CA 8.  02/15/88 -- MSJ --  Beefed up documentation.
CA 9.  02/26/88 -- MSJ --  Changed global variable pdclsk to pdclnt socket.
CA                              Changed the way pdrecv is called.
CA 10. 03/07/88 -- MSJ --  Added a call to XPeekEvent, in order to handle expose
CA                              events right away, since select doesn't seem to
CA                              see them.
CA 11. 03/09/88 -- MSJ --  Added arg for call to new version of pdrecv.
CA 12. 04/04/88 -- MSJ --  Added Enter and LeaVeWindow to the list of events
CA                              checked for when peeking (these events can occur
CA                              "softly" when a window is created or deleted).
CA                              Reset numeents each time through the peek loop,
CA                              rather than decrementing it, in case new expose
CA                              events appear on the queue while procesing the
CA                              1st ones.
CA 13. 08/24/88 -- WKH --  The following items are implemented to use the
CA                              MI and NW subsystem instead of direct interface with
CA                              the network:
CA                              a.  Added PXINPT_DEF definition.
CA                              b.  Include NW definitions.
CA                              c.  Replaced all references to socket by references
CA                                  to handle, and all network calls by MI calls.
CA                              d.  Updated documentation to new standard.
CA
CA
CA-----------------------------------------------------------------------------
CA   Copyright (C) 1987, 1988, LANDMARK GRAPHICS CORP.
CA   All rights reserved.
CA-----------------------------------------------------------------------------
CA
*/

#include <lgc/lgcdef.h>

#define PXINPT_DEF
#include <lgc/pxinpt.h>
#under PXINPT_DEF

#include <lgc/nwdefs.h>

extern void pxxrcv_ ();
extern void mirecv_ ();         /* Receives data from MI */
extern void wxflus_ ();
extern void michki_ ();         /* Checks if data coming into handles */
extern void mixhdl_ ();         /* Inserts X socket to MI handle structure */

void pxinpt_ ( istat )
long *istar;

   {
   long numevents:      /* number of X events waiting in the queue to be read*/
   long dsp;            /* socket number (fd) for X */
   long xhandle;        /* number of X handles */
```

```
pdtmplt msg;             /* message read in from pointing dispatcher */
XEvent event;            /* storage for peeked at events */
long handarr [NW_MXHL];        /* server handle array */
long rdyaar [NW_MXHL-1];       /* I/O ready handle array */
long idx, idj;                 /* internal pindex variables */
long numhdl;                   /* number of server handles */

/*
      Initialize server handle array elements
*/
for (idj=O; idj<NW_MXHL; idj++)
         handarr [idj] = -1;

/*
      Get the X client socket ID number to obtain an X file
      handle number for a network communication

/*
dsp = dpyno (); -

/*
      Put the X client socket into the MI handle structure, MI
      returns a handle number

*/
mixdhl? (&dsp, "LOCAL", &xhandle, istat);

/*
      Initialize istat to zero.  As long as it remains zero, continue
      getting events and handling them.  As soon as something other than
      zero is returned (from adecnt, which gets error codes returned from
      each of the routines it executes), exit pxinpt.
*/
*istat =0;
while (*istat == 0)
     {
     /* Set up to perform a select: We don't care about whether the
        sockets are write ready, but we are interested in reading,
        Both from the X socket (dpyno()) and the pd handle (paclnt.socket).
      */
      handarr [0] = pdclnt. handle;
      handarr [1] = xhandle;

      /*

            Flush the task's X output buffer to make sure all events have
            been sent to the X server (if any), before calling select.
      */
      wxflus_ ():

      /*
            The next chunk of code it to get around a problem with Select:
            select apparently doesn't realize an event has arrived unless
            some sort of hardware interrupt occurs; mouse moves, key
            presses, etc. are obviously tied to the hardware, so there's
            no problem with some most events.  Expose events, however, apparently
            do NOT generate this magical interrupt.  Therefore, if expose
            events are first on the queue, select won't see them until
```

```
        the user moves the mouse or presses a button or key.  The
        work around is to (1) check if there's any Xevents sitting on
        the queue (with the QLength macro).  If so, then I peek at
        the next event (which allows me to look at it, without actually
        removing it from the queue).  If the next (first) event is
        an expose type event, then I go ahead and process it right here
        and now, rather than trying to wait on getting it thru select.
/*
numevents = QLength ();

if (numevents > 0)
    {
    while (numevents > 0)
        {

        XPeekEvent (&event);
        if (event.type == ExposeWindow
            ||    event.type == ExposeRegion
            ||    event.type == ExposeCopy
            ||    event.type == EnterWindow
            ||    event.type == LeaveWindow
            ||    event.type == UnmapWindow

         {

         pxxrcv_ (istat);
         if (*istat != SUCCESSFUL)
             {
              ohnooo_ (istat,
"pxinpt: failed on preliminary call to pxxrcv, to handle exposes");
                   return;
                   }
               /* numevents -= 1; */
               numevents = QLength ();
               }
            else
               break;
            }

        }

 /*
   Now, actually check to see if either the X or PD sockets have
   data ready to be received.

*/

   numhdl = 2;
   michki_ (&numhdl, handarr, rdyarr, istat);

   if (*istat != SUCCESSFUL)
        {
        Ohnooo_ (istat, "pxintp: call michki successful");
   /*
     Check each element of the ready array for an non-negative
```

```
     which is the handle number with date comming in.
*/
idx = 0;
while (rdyarr [idx] != -1)
   {
   /*
     Data comes in from a PD handle, gets the data
   */
    if (rdyarr[idx] == pdcint.handle)
       {
       mirecv (&rdyarr [idx], &pdbuff, istat);
       if (*istat != SUCCESSFUL)
          {
          ohnoo_ (istat, "pxinpt: failed to call mirecv \n");
          break;
         }
/*
 - Move longs from the MI buffer to the PD buffer
*/
if ((pdbuff.n_lng >=1) && (pdbuff.lng_arr[0].nelem >= 1))
      msg.pdcmd = pdbuff.lng_arr[0].arr_ptr[0];
else msg.pdcmd = 0;

if ((pdbuff.n_lng >=2) && (pdbuff.lng_arr[1].nelem >= 1))
      msg.pdkey = pdbuff.lng_arr[1].arr_ptr[0];
else msg.pdkey = 0;

if ((pdbuff.n_lng >=3) && (pdbuff.lng_arr[2].nelem >= 1))
   {
    for (idj=0; idj<pdbuff.ing_arr [2].nelem; idj++)
        msg.pdfld[idj] = pdbuff.lng_arr[2].arr_ptr[idj];


      if (pdbuff.lng_arr[2].nelm < 32)
         for (idj=pdbuff.ing_arr [2].nelem; idj<32; idj++)
              msg.pdfld[idj] = 0;
      }
   else for (idj=0; idj<32; idj++)
             msg.pdfld[idj] = 0;

/*
    Move function pointer from the MI buffer to the PD buffer
*/

if ((pdbuffn._ptr > 0 && (pdbuff.l_ptr > 0))
   {
   bcopy (pdbuff.ptr_arr, (char *) &msg.pdrtn, pdbuff.l_ptr/8);

      /*
        Execute the function indirectly
      */
      msg.pdrtn(istat);
      if (*istat != SUCCESSFUL)
         {
         ohnoo_(istat,
"pxinpt: non-zero returned from indirect routine execution");
             return;
```

```
                        }
                    }
                else
                  ohnoo_(istat, "pxinpt: processed input from pd");
              }

        /*
              Data comes in from a X handle
        */
        if (rdyarr[idx] == handle)
           {

           for (numevents = XPending (); numevents > 0; )
               {
               pxxrcv_ (istat);
              11 (*istat !=SUCCESSFUL)
                 {
                 ohnoo_ (istat,
"pxinpt: non-zero code returned from adecnt; control returned to caller")'
                      return;
                   }

                /*
                      If an event was pushed onto the queue thru
                      XPutBackEvent (pxpbev),
                      it won't be seen by select until another regular
                      event occurs.
                      To avoid this problem, find out the latest number
                      of events sitting on the queue thru QLength
                      (which will always be correct, including
                      any put-back events).

                */
                numevents = QLength ();

                } /* end of for */
             }    /* end of it there was data at the X socket */
          idx++;  /* increase ready handle array index */
          }       /* end of the while for rdyarr */
    }             /* end of the while istat */
    *istat = SUCCESSFUL;
    ohnoo_ (istat, "pxinpt: completed sucessfully ");
```

Thu/Oct.-6 13:46:42 1988 tpxpdmt.doc Page 1

```
*
C    Checkin Data: 07/16/88
C    Module Number: 370
C
C
CA   NAME        TPXPDMT
CA
CA
CA   FUNCTION    Tests the Pointing Dispatacher Template facilities
CA               send a PDPDMT permanent data matching template
CA               to PD. and wait to receive a PDDATA template from
CA               PD. PDDATA template is received through pxinpt.
CA
CA
CA   APPLICATION/SUBSYSTEM
CA               Pointing Dispatcher (pd) INTERNAL
CA
CA
CA   AUTHOR      Winifred K. Herr
C
C
CA   LINKAGE     cc tpxpdmt.c -DRT /u/lgc/lib/libsubsy.a    \
CA                            -lX -lsock -lbsd -o pdaptmpl
CA               OR
CA               cc tpxpdmt.c -DC386 /usr/lgc/lib/libsubsy.a  \
CA                            -lX -Insl s -itcp -o pdaptmpl
CA
CA
CA   NOTES
CA      1.  invoke "tpxpdmt" from separate shell or in background mode
CA
CA
CA   RESTRICTIONS
CA      1.  IBM Ungerman-Bass TCP/IP. IBM AIX/VRM 2.2
CA
CA
C    METHOD
C    To use this test program, do one of the following:
C    1. Start pd - Pointing Dispatcher
C       Start xinit - X window
C       Run   tpxpdmt - to request for a permanent template
C       Run   tpxdata - to send a data template
C
C    2. Start pd - Pointing Dispatcher
C       Start xinit - X window
C       Run   tpxttmt - to ask if any task wants data and send a PDDATA
C                       out once an acknowledgement is sent back from PD
C       Run   tpxpdmt - to request for a permanent template
C
C    REVISED
C    1. 06/16/88 -- WKH -- Initial release
C
C
C-----------------------------------------------------------------------
C    Copyright (C) 1987, 1988, LANDMARK GRAPHICS CORP.
C    All rights reserved.
```

```
C-----------------------------------------------------------------------
*/

#include <lgc/lgcdef.h>
#include <lgc/pdclnt.h>

extern void wxopnd_ ():
extern void pxinpt_ ():
extern void pdopen_ ():
extern void pdrqst_ ():     /*Send template function used for testing only */
extern void pdcios_ ():
extern void tpxtry ():        /* dummy function use for testing */

main\argc: argv:
long  argc:
anar  **argv:

      long      ier:          /* error value = 0 - successful */
      long      pacma:
      long      pokey:
      long      pdfldC320:
      long      idx. idj:

      /*
        Open channel to Pointing Dispatcher
      */
      pdopen  (argc, argv, &ier):
      if (ier l=SUCCESSFUL)
          {
          ohnooo_ (&ier."tpxpdmt: failed to call pdopen "):
          exit ():


/*
      Write template information to Pointing Dispatcher
*/
pacmd       = PDFDMT:
pdfld[0]    = PDTEXT:
pdfld[1]    = POINT:
pdkey       = 3:

For (idx=2:idx(32;idx++) pdfld[idx]  = 0:

pdrqst  (&pdcmd, tpxtry, &pdkey, pdfld, &ier):
if (ier l=SUCCESSFUL)
   {
   ohnooo_ (&ier, "tpxpdmt: failed to call pdrqst "):
   exit ():
   }

/*
   Open to X server
*/
wxopnd  ("unix",&ier):
if (ier l=SUCCESSFUL)
   {
```

```
     ohnooo_  (&ier, "tpxpdmt: failed to call wxopnd "):
     exit ():
    }

/*

   Call pxinpt to get data buffer from X or PD

*/
pxinpt  (&ier);
ohnooo  (&ier, "tpxpdmt: call pxinpt completed "):

/*

   Close Handle.connection

 */
pdclos  (&ier):
If (ier l=SUCCESSFUL)
    {
     ohnooo_ (&ier, "tpxpdmt: failed to call pdclos "):
     exit ():
    }


ier = SUCCESSFUL
ohnooo_ (&ier, "tpxpdmt: completed successsfully "):
```

```
/*
CA   CHECKIN DATE: 10/04/88
CA   MODULE NUMBER:  370500
CA
CA
CA   NAME:        PDRQST
CA
CA
CA   FUNCTION:    Requests information from the Pointing Dispatcher,
CA                for any pd template format.
CA
CA
CA   APPLICATION/SUBSYSTEM:  Pointing Dispatcher (pd) EXTERNAL
CA
CA
C    AUTHOR:      Olivier Lhemann
C
C
CA   LINKAGE:     CALL PDRQST (PDCMD, PDRTN, PDKEY, PDFLD, IER)
CA
CA
CA   ARGUMENT
CA     NAME        USE    TYPE    DESCRIPTION
CA   --------      ---    ----    -----------
CA   PDCMD          I      I      Type of request:
CA                                PDTDMT = temporary data-matching template.
CA                                         (get me only one instance of the
CA                                         data type I'm requesting, as
CA                                         indicated by pdfld(1)).
CA                                PDPDMT = permanent data-matching template.
CA                                         (continually get me every instance of
CA                                         the data type I'm requesting).
CA                                PDTTMT = temporary template-matching template.
CA                                         (inform me - once only - if anyone
CA                                         requests the type of data I own, as
CA                                         indicated by pdfld(1)).
CA                                PDPTMT = permanent template-matching template.
CA                                         (continually inform me whenever anyone
CA                                         requests the type of data I own).
CA                                PDDTTM = delete this template message type
CA                                         from PD's list for my task (i.e.,
CA                                         I'm not interested in receiving this
CA                                         information anymore).
CA    PDRTN         I      EXTERNAL
CA                                Subroutine (address of, actually) which is to
CA                                be executed when the data I am now requesting
CA                                is actually received by PXINPT.  This subroutine
CA                                must have only one argument, IER.
CA    PDKEY         I      I      Bit mask indicating which items in the pdfld
CA                                array must be matched on:
CA                                1 = match on pdfld(1) only (2 to the 0th power).
CA                                2 = match on pdfld(2) only (2 to the 1st).
CA                                4 = match on pdfld(3) only (2 to the 2nd).
CA                                8 = match on pdfld(4) only (2 to the 3rd).
CA                                3 = match on pdfld(1) AND pdfld(2).
CA                                Etc. (add together the appropriate powers of two
```

```
CA                                  to determine your value for pdkey).
CA  PDFLD(32)   I     I             Array of pdfld values to be sent which indicate
CA                                  the values that must be matched when PD
CA                                  determines whether or not you should receive a
CA                                  new piece of data.  Those elements which are not
CA                                  to be matched on should simply not be filled in
CA                                  (but space in the array must still be allocated
CA                                  for them!).
CA  IER         O     I             Error return code:
CA                                  0 = successful completion.
CA
CA
CA  NOTES:
CA
CA  The pointing dispatcher must already be running on your machine.
CA  To do so, either:
CA    a) create another AIX shell thru the X window-manager, then
CA       execute pd
CA    b) from your existing shell, execute pd in background mode ( pd& ).
CA
CA  PD must have been opened for your task (pdopen)
CA
CA  For in-depth information on how to communicate with the pointing
CA  dispatcher, see Appendix B of the Reference Manual.
CA
CA
CA  RESTRICTIONS:  none
CA
CA
C   PORTABILITY:   PORTABLE
C
C
C   METHOD:
C
C   The elements of pdfld are copied one-by-one into the MI data structure.
C
C
C   REVISED:
C
C   1. 09/19/88 -- GL  -- Original version.
C   2. 10/03/88 -- WKH -- Used CAPS for ohnooo message
C
C
C-----------------------------------------------------------------------
C    Copyright (C) 1988 LANDMARK GRAPHICS CORP.
C    All rights reserved.
C-----------------------------------------------------------------------
C
C
*/

#include <lgc/lgcdef.h>
#include <lgc/midefs.h>
#include <lgc/pdclnt.h>

extern void misend ();
```

```
void pdrqst_ (pdcmd, pdrtn, pdkey, pdfld, ier)

long *pdcmd;               /* PD template command */
void (* pdrtn) ();         /* function pointer */
long *pdkey;               /* which fields to match on */
long pdfld[32];            /* values to match on */
long *ier;

{
  struct MI_DSC mibuf;         /* MI buffer */
  struct MI_LND larray[3];     /* MI long arrays */
  char    addr[8];             /* temporary store for function address */
  long idx;                    /* index for the function character string */

  /* fill MI buffer structure */

  mibuf.n_dbl = 0;
  mibuf.n_flt = 0;
  mibuf.n_shr = 0;
  mibuf.n_str = 0;
  mibuf.n_ptr = 1;
  mibuf.l_ptr = 64;            /* The RT and the SUN uses the first 32 bits */
                               /* the rest of the bits are set to 0 */
                               /* The Cray uses all 64 bits */
  mibuf.ptr_arr = addr;

  mibuf.n_lng = 3;
  mibuf.lng_arr = larray;

  /* now we fill long arrays */

  larray[0].nelem = 1;
  larray[0].arr_ptr = pdcmd;
  larray[1].nelem = 1;
  larray[1].arr_ptr = pdkey;
  larray[2].nelem = 32;
  larray[2].arr_ptr = &pdfld[0];

  for (idx=0; idx<8; idx++) addr[idx] = '\0';

  bcopy ((char *)&pdrtn, addr, sizeof(pdrtn));

  /* we send the message */

  misend (&pdclnt.handle, &mibuf, ier);

  if (*ier != SUCCESSFUL)
     {
      ohnooo_(ier,"PDRQST: failed on call to misend");
      return;
     }

  *ier = SUCCESSFUL;
  ohnooo_(ier,"PDRQST: completed successfully");
}
```

```
/*
CA  CHECKIN DATE: 11/02/88
CA  MODULE NUMBER:  530002
CA
CA
CA  NAME:       NWCOPN
CA
CA
CA  FUNCTION:   Opens network communication for client, and establishes a
CA              connection with the server at the remote node.
CA
CA
CA  APPLICATION/SUBSYSTEM:  Network (nw) CONTROLLED
CA
CA
C   AUTHOR:     Jonathan Winata
C
C
CA  LINKAGE:    CALL NWCOPN (NODE, SERVER, HANDLE, IER)
CA
CA
CA  ARGUMENT
CA    NAME        USE    TYPE    DESCRIPTION
CA  ---------     ---    ----    -----------
CA  NODE           I     C*(*)   node name of server's host
CA  SERVER         I     C*(*)   server's name
CA  HANDLE         O     I       file handle for network communication
CA  IER            O     I       Error Return code
CA                                       0 = successful
CA                               153000200 = info: debug option on handle
CA                               353000202 = no connection made
CA                               353000205 = error: internal table is full
CA                               353000209 = malloc failure
CA
CA
CA  NOTES:
CA
CA  *** NOTICE *** specifying "unix::" or "unix:" when desiring the local
CA  node without it being the actual node name of the local host will
CA  result in NO CONNECTION and an error status is returned.
CA
CA  This subsystem can be told to include any of the network protocols by
CA  specifying the appropriate compile switches at compile time.
CA  The compile switches are: DECNET, TCP, and LOCAL.  Any combination
CA  will be accepted.
CA
CA  Example of usage:
CA
CA          PROGRAM SAMPLE
CA  C Client program
CA  C   Include files:
CA          INCLUDE '/usr/include/lgc/lgcdef.cmn'
CA          INCLUDE '/usr/include/lgc/X11/nwdefs.cmn'
CA  C   Variables declaration:
CA          INTEGER HANDLE, IER
CA  C   Start of program:
```

```
CA >>>>>> CALL NWCOPN('<host_name>','<server_name>',HANDLE,IER)
CA          IF (IER.NE.SUCCES) THEN
CA              CALL OHNDOO(IER,'SAMPLE: error opening network communication.')
CA              STOP 'Stopped due to error.'
CA          ENDIF
CA  C       ... start processing till done ...
CA  C
CA  C   When done close the network communication.
CA >>>>>> CALL NWCLOS(HANDLE,IER)
CA          STOP 'Normal Completion.'
CA          END
CA
CA
CA  RESTRICTIONS:   none
CA
CA
C   PORTABILITY:    DEPENDENT
C
C
C   METHOD:
C
C   Current implementation supports Unix stream, TCP/IP, and DECnet protocol.
C   This routine does the following:
C
C   1) Create a client socket and bind it for current host.
C   2) Node specifies location of server through the use of its suffix.
C      "::" -- DECnet protocol,
C      ":"  -- TCP/IP, and
C      no suffix -- local connection.
C   3) Server's socket address is set up and the connection is set.
C   4) If request failed, the socket is closed.
C
C
C   REVISED:
C
C   1. 04/28/88 - Jonathan Winata - Original version.
C   2. 06/02/88 - Jonathan Winata - Fixup header and include an example
C                                   to clarify usage.
C   3. 06/30/88 - Jonathan Winata - Fixup header and symbols to conform
C                                   to new standard coding for portability.
C   4. 07/28/88 - EEA - changed to use lgc path in #include statements
C   5. 07/29/88 - Jonathan Winata - Initialize table by calling NWINIT.
C   6. 08/10/88 - Jonathan Winata - Fix bug
C   7. 08/12/88 - EEA - changed to use lgc/X11 path in #include statements
C   8. 08/16/88 - EEA - changed back to original #include path.
C   9. 10/03/88 - DL -  (a) strncpy fails on SUN when string is NULL.
C                           I have added a test for NULL
C                       (b) I added a test to see if ptr is NULL before
C                           removing ':' (TCP case)
C  10. 11/03/88 - WKH - Changed test on gethostbyname return to test for
C                 less than zero, rather than test for NULL.
C  11. 07NOV88  EES  changed from EXTERNAL to CONTROLLED
C
C
C -------------------------------------------------------------------
C  Copyright (C) 1988, LANDMARK GRAPHICS CORP.
```

```
C  All rights reserved.
C ----------------------------------------------------------------------
C
*/
#include        <lgc/lgcdef.h>

#ifdef  NW_INIT
#undef  NW_INIT
#endif
#ifndef NW_INCL
#define NW_INCL
#endif
#include        <lgc/nwcoms.h>

extern  void    ohnooo_();

#ifdef  MODULE
#undef  MODULE
#endif
#define MODULE  530002

void nwcopn_(node,server,handle,ier)
char * node;
char * server;
long * handle;
long * ier;
{
    static  int     first = TRUE;   /* first time flag */
    char    lclnode[NW_LHNM];       /* local node name */
    char *  ptr;                    /* general purpose pointer */
    int     ptype;                  /* protocol type */
    long    i;                      /* index/loop counter */
    int     fd;                     /* file descriptor */
#ifdef  CRAY
    int     temp;                   /* host address (for CRAY only) */
#endif
    long    addrlen;                /* length of structure of net addr */
    union   {
        struct  sockaddr    sa;     /* general socket address */
#ifdef  LOCAL
        struct  sockaddr_un s_un;   /* unix stream socket (IPC) */
#endif
#ifdef  TCP
        struct  sockaddr_in s_in;   /* Internet socket (TCP/IP) */
#endif
    } addr;                         /* server's socket description */
#ifdef  TCP
    struct  sockaddr_in sout;       /* client socket */
    struct  servent *sp;            /* server's description */
    struct  hostent *hp;            /* host's description */
#endif

    if (first) {        /* initialize internal table */
        nwinit(ier);
        if (*ier != SUCCESSFUL) {
            *ier = LEV3ER + MODULE * 100 + NW_NDMM;
```

```
                ohnooo_(ier,"nwcopn: no memory for internal table");
                return;
            }
            first = FALSE;
        }

        i = -1;              /* find unused slot in internal table */
        while (nwntbf_[++i].used == TRUE && i < NW_MXHL);

        if (i == NW_MXHL) {
            *ier = LEV3ER + MODULE * 100 + NW_FSLT;
            ohnooo_(ier,"nwcopn: no more empty slot");
            return;
        }

        if (node == NULL) lclnode[0] == '\0';
        else (void) strncpy(lclnode, node, NW_LHNM);
        ptr = strchr(lclnode, ':');
        ptype = 0;
#ifdef  DECNET
        if (*(ptr+1) == ':') {
            ptype = AF_DECnet;
            *(ptr) = '\0';
            if ((fd = dnet_conn(lclnode,server,SOCK_STREAM,0,0,0,0)) < 0) {
#ifdef  DBGSW
                perror("dnet_conn");
#endif
                *ier = LEV3ER + MODULE * 100 + NW_NCNC;
                ohnooo_(ier,"nwcopn: error creating socket.");
                return;
            }
        } else
#endif
        {
#ifdef  LOCAL
            if (ptr == (char *)NULL) {
                ptype = AF_UNIX;
                addr.s_un.sun_family = AF_UNIX;
                (void) strcpy(addr.s_un.sun_path, NW_SPTH);
                (void) strcat(addr.s_un.sun_path, server);
                addrlen = (long) strlen(addr.s_un.sun_path) + 2;
                if ((fd = socket(AF_UNIX,SOCK_STREAM,0)) < 0) {
#ifdef  DBGSW
                    perror("socket");
#endif
                    *ier = LEV3ER + MODULE * 100 + NW_NCNC;
                    ohnooo_(ier,"nwcopn: error creating socket.");
                    return;
                }
            } else
#endif
            {
#ifdef  TCP
                ptype = AF_INET;
                if (ptr != NULL) *(ptr) = '\0';
                hp = gethostbyname(lclnode);
```

```
            if (hp < 0) {
#ifdef  DBGSW
                perror("gethostbyname");
#endif
                *ier = LEV3ER + MODULE *100 + NW_NCNC;
                ohnooo_(ier,"nwcopn: get host by name failed.");
                return;
            }

            if (hp->h_addrtype != AF_INET) {
                *ier = LEV3ER + MODULE * 100 + NW_NCNC;
                ohnooo_(ier,"nwcopn: host connection is not internet.");
                return;
            }

            sp = getservbyname(server,"tcp");
            if (sp == NULL) {
#ifdef  DBGSW
                perror("getservbyname");
#endif
                *ier = LEV3ER + MODULE * 100 + NW_NCNC;
                ohnooo_(ier,"nwcopn: get server by name failed.");
                return;
            }

            bzero((char *)&addr, sizeof(addr.s_in));
#ifdef  CRAY
            bcopy(hp->h_addr, (char *)&temp, hp->h_length);
            addr.s_in.sin_addr      = temp;
            sout.sin_addr           = INADDR_ANY;
#else
            bcopy(hp->h_addr, (char *)&addr.s_in.sin_addr,
                                            hp->h_length);
            sout.sin_addr.s_addr    = INADDR_ANY;
#endif

            addr.s_in.sin_family    = hp->h_addrtype;
            addr.s_in.sin_port      = sp->s_port;

            sout.sin_family         = hp->h_addrtype;
            sout.sin_port           = 0;

            fd = socket(AF_INET, SOCK_STREAM, 0);
            if (fd < 0) {
#ifdef  DBGSW
                perror("socket");
#endif
                *ier = LEV3ER + MODULE * 100 + NW_NCNC;
                ohnooo_(ier,"nwcopn: error creating socket.");
                return;
            }

            if (bind(fd, (char *)&sout, sizeof(sout)) < 0) {
#ifdef  DBGSW
                    perror("bind");
#endif
```

```
                    (void)close(fd);
                    *ier = LEV3ER + MODULE * 100 + NW_NCNC;
                    ohnooo_(ier,"nwcopn: bind socket error.");
                    return;
            }

#ifdef  DBGSW
            if (setsockopt(fd, SOL_SOCKET, SO_DEBUG, 0, 0) < 0) {
                    *ier = LEV1ER + MODULE * 100 + SUCCESSFUL;
                    ohnooo_(ier,"nwcopn: Set socket option to debug.");
            }
#endif
            addrlen = sizeof(struct sockaddr_in),
#endif
        }
#if     (defined TCP) || (defined LOCAL)
        if (connect(fd,&addr,addrlen) == -1) {
#ifdef  DBGSW
            perror("connect");
#endif
            (void) close(fd);
            *ier = LEV3ER + MODULE * 100 + NW_NCNC;
            ohnooo_(ier,"nwcopn: connect failed.");
            return;
        }
#end
```

*** * ***

```
/*
CA  CHECKIN DATE: 08/23/88
CA  MODULE NUMBER:  530012
CA
CA
CA  NAME:        NWXHDL
CA
CA
CA  FUNCTION:  Get a handle for X-Window socket.
CA
CA
CA  APPLICATION/SUBSYSTEM:  Network (nw) CONTROLLED
CA
CA
C   AUTHOR:     Jonathan Winata
C
C
CA  LINKAGE:    CALL NWXHDL (XSOCK, TYPE, HANDLE, IER)
CA
CA
CA  ARGUMENT
CA    NAME       USE   TYPE    DESCRIPTION
CA  ---------    ---   ----    -----------
CA  XSOCK         I     I      X-Window socket id.
CA  TYPE          I     C*(*)  Network protocol type (TCP, LOCAL, DECNET)
CA  HANDLE        O     I      file handle for network comm.
CA  IER           O     I      Error Return code
CA                                      0 = successful
CA                             353001205 = error: internal table is full
CA
CA
CA  NOTES:
CA
CA  #include    <lgc/nwdefs.h>
CA  main()
CA  {
CA       long    ier, handle[NW_MXHDL], Xsock, Xidx, numsrv;
CA
CA >>>> nwsopn_("<host_name>","<server_name>",handle,&numsrv,&ier);
CA       if (ier != 0) exit(-1);
CA       ... get socket id for X and store in Xsock ...
CA
CA       Xidx = numsrv;
CA >>>> nwxhdl_(&Xsock, "TCP", &handle[Xidx], &ier);
CA       ... ready to send or receive messages ...
CA       ... if there is any handle[Xidx] is returned in nwchki_ call,
CA       ...      X socket needs to be service.
CA
CA  }
CA
CA
CA  RESTRICTIONS:  none
CA
CA
C   PORTABILITY:   DEPENDENT
C
```

```
C
C   METHOD:
C
C   NWXHDL performs the following:
C     a. Search for a free table entry,
C     b. insert X socket in internal table, and
C     c. return index to free table entry.
C
C     Notice that type is not currently used because all three network
C     protocols that are being used (TCP, local socket, and DECnet) return
C     the same data type (int).
C
C
C   REVISED:
C
C    1. 07/05/88 - Jonathan Winata - Original version.
C    2. 07/20/88 - Jonathan Winata - Mark it dependent and fix error msg.
C    3. 07/28/88 - EEA - changed to use X11 path in #include statements
C    4. 08/16/88 - EEA - changed back to original #include path.
C    5. 07NOV88  EES  changed from EXTERNAL to CONTROLLED
C
C
C ----------------------------------------------------------------------
C  Copyright (C) 1988, LANDMARK GRAPHICS CORP.
C  All rights reserved.
C ----------------------------------------------------------------------
C
*/
#include        <lgc/lgcdef.h>
#ifdef  NW_INCL
#undef  NW_INCL
#endif
#ifdef  NW_INIT
#undef  NW_INIT
#endif
#include        <lgc/nwcoms.h>

extern  void    ohnooo_();

#ifdef  MODULE
#undef  MODULE
#endif
#define MODULE  530012

void nwxhdl_(Xsock, type, handle, ier)
long *Xsock;
char *type;
long *handle;
long *ier;
{
     long   i;          /* index to internal table */

     *ier = SUCCESSFUL;

     i = -1;
     while (nwntbf_[++i].used == TRUE && i < NW_MXHL); /* get free slot */
```

```
    if (i == NW_MXHL) {
        *ier = LEV3ER + MODULE * 100 + NW_FSLT;
        ohnooo_(ier,"nwxhdl: no more free slot for handle.");
        return;
    }

    /* insert X socket to internal table */
    nwntbf_[i].handle = *Xsock;      /* save file descriptor   */
    nwntbf_[i].type = NW_CLTP;       /* handle is owned by client */
    nwntbf_[i].used = TRUE;          /* flag as being used     */
    *handle = i;                     /* return index to caller */
    ohnooo_(ier, "nwxhdl: tracing");
    return;
}
```

```
/*
CA  CHECKIN DATE: 07/27/88
CA  MODULE NUMBER:  100012
CA
CA
CA  NAME:        WXFLUS
CA
CA
CA  FUNCTION:  Send all output requests that have been buffered up to X.
CA
CA
CA  APPLICATION/SUBSYSTEM:  Windows (wx) EXTERNAL
CA
CA
C   AUTHOR:     Marie Steck Jansen
C
C
CA  LINKAGE:    CALL WXFLUS (IER)
CA
CA
CA  ARGUMENT
CA    NAME       USE   TYPE    DESCRIPTION
CA  --------     ---   ----    -----------
CA  IER           O     I      Error Return code
CA                             0 = successful completion.
CA
CA
CA
CA  NOTES:
CA
CA  If you've done a lot of drawing to the screen, but nothing is showing
CA  up or happening, it may be because you need to call this routine!
CA  Calling PXINPT will automatically cause a flush to occur, but if
CA  you have returned from PXINPT and then performed more drawing
CA  routines (creating/deleting windows, drawing lines, etc.), you
CA  may need to call WXFLUS for the graphics to appear.
CA
CA
CA  RESTRICTIONS:  none
CA
CA
C   PORTABILITY:  PORTABLE
C
C
C   METHOD:  none
C
C
C   REVISED:
C
C   1. 07/30/87 -- MSJ -- Original version.
C   2. 09/19/87 -- MSJ -- Added Methods section to the header.
C   3. 10/06/87 -- MSJ -- Added call to the error return call at the end.
C   4. 01/12/88 -- MSJ -- Changed to use the new lgcdef.h include file.
C   5. 03/28/88 -- EEA -- Changed error return call to 'ohnooo'.
C   6. 07/21/88 -- MSJ -- Revised for X11.2; added ier argument per standards.
C
C
```

```
C-----------------------------------------------------------------------
C     Copyright (C) 1987, 1988, LANDMARK GRAPHICS CORP.
C     All rights reserved.
C-----------------------------------------------------------------------
*/

/***********************************************************************
   External variables used:
   NAME          TYPE            USAGE
   --------------------------------------------------------------------
   wxdpy         wxdisp (struc)  Declared/defined in wxdefs.h
                                 Value set by call to wxopnd.
 **********************************************************************/

#include <lgc/lgcdef.h>
#include <lgc/wxdefs.h>

void wxflus_ (ier)
long *ier;        /* error code */

{
    XFlush (wxdpy.display);

    *ier = SUCCESSFUL;
    ohnooo_ (ier, "WXFLUS: completed successfully");
    return;
}
```

```
/*
CA  CHECKIN DATE: 10/04/88
CA  MODULE NUMBER:  370512
CA
CA
CA  NAME:         PDR32
CA
CA
CA  FUNCTION:     Receives PDDATA information from the buffer set up by
CA                PXINPT (which received it from the Pointing Dispatcher),
CA                for any template type which uses only the "standard"
CA                fields (pdcmd, pdrtn, pdkey, and the pdfld array,
CA                dimensioned to 32).
CA
CA
CA  APPLICATION/SUBSYSTEM:  Pointing Dispatcher (pd) EXTERNAL
CA
CA
C   AUTHOR:       Olivier Lhemann
C
C
CA  LINKAGE:      CALL PDR32 (PDFLD, NUMFLD, IER)
CA
CA
CA  ARGUMENT
CA    NAME        USE    TYPE     DESCRIPTION
CA  --------      ---    ----     -----------
CA  PDFLD(32)      O      I       Array into which the data values are to
CA                                be stored.
CA                                (if the pd template format you are using has
CA                                data that extends past pdfld(32), or uses
CA                                other than integer data, you cannot use this
CA                                subroutine).  Max size of pdfld = 32 elements.
CA  NUMFLD         O      I       Number of elements actually stored in pdfld
CA  IER            O      I       Error return code
CA                                0 = successful completion.
CA
CA
CA
CA  NOTES:
CA
CA  You should assume that the pdcmd field of the data received by this
CA  routine = PDDATA.  There is also no need for the subroutine field
CA  (pdrtn) or the pdkey field, since they are both meaningless at this
CA  point.  (The original data template received by PXINPT had a subroutine
CA  field in it, and PXINPT automatically executes that subroutine.  In
CA  fact, you are probably calling PDR32 from that particular indirectly-
CA  executed routine, or if not, you should be!).
CA
CA  The pointing dispatcher must already be running on your machine.
CA  To do so, either:
CA    a) create another AIX shell thru the X window-manager, then
CA         execute pd
CA    b) from your existing shell, execute pd in background mode ( pd& ).
CA
CA  PD must have been opened for your task (pdopen).
CA
```

```
CA  For in-depth information on how to communicate with the pointing
CA  dispatcher, see Appendix B of the Reference Manual.
CA
CA
CA  RESTRICTIONS:  none
CA
CA
C   PORTABILITY:   PORTABLE
C
C
C   METHOD:
C
C   The elements of pdfld are copied one-by-one from the MI data structure.
C
C
C   REVISED:
C
C   1. 09/13/88 -- DL  -- Original version.
C   2. 10/03/88 -- WKH -- Modified ohnooo message to use CAPS.
C
C
C-----------------------------------------------------------------------
C     Copyright (C) 1988 LANDMARK GRAPHICS CORP.
C     All rights reserved.
C-----------------------------------------------------------------------
C
*/

#include <lgc/lgcdef.h>
#include <lgc/pdclnt.h>

void pdr32_ (pdfld, numfld, ier)

long pdfld[32];
long *numfld;
long *ier;

{
  long  idx;

  /* extract info we need (numfld and pdfld) */
  *numfld = pdbuff.lng_arr[2].nelem;

  for (idx=0; idx < MIN(pdbuff.lng_arr[2].nelem,32); idx++)
       pdfld[idx] = pdbuff.lng_arr[2].arr_ptr[idx];

  *ier = SUCCESSFUL;
  ohnooo_ (ier,"PDR32:  completed successfully");
}
```

```
/*
C     CHECKIN DATA:   08/16/88
C     MODULE NUMBER: 375
C
C
CH    NAME          TPXDATA
CH
CH
CH    FUNCTION      Tests the Pointing Dispatcher Data facilities
CH                  Send a PDDATA template to PD.
CH
CH
CH    APPLICATION/SUBSYSTEM
CH                  Pointing Dispatcher (PD) INTERNAL
CH
CH
CH    AUTHOR        Winifred K. Herr
C
C
CH    LINKAGE       cc tpxdata.c -DRT /u/lgc/lib/libsubsv.a  \
CH                                   -lx -lsock -lbsd -o pdaptmp1
CH                  OR
CH                  cc tpxdata.c -DL386 /usr/lgc/lib/libsubsv.a \
CH                                   -lx -lnsl_s -ltcp -o pdaptmp1
CH
CH
CH    NOTES
CH       1.  Invoke "tpxdata" from separate shell or in background mode
CH
CH
CH    RESTRICTIONS
CH       1.  IBM Underman-Mass (LF/IF, IBM AIX/VRM 2.2
CH
CH
C     REVISED
C     1. 08/15/88 -- WKH -- initial release
C
C
C-------------------------------------------------------------------------
C     Copyright (C) 1987, 1988, LANDMARK GRAPHICS CORP.
C     All rights reserved.
C-------------------------------------------------------------------------
*/

#include <lgc/lgcoef.h>

extern void pdclos_ ();
extern void pdopen_ ();
extern void pds32_ ();          /* Send template function used for testing only */

main(argc, argv)
long  argc;
char  **argv;
{
        long     ier;              /* error value = 0 - successful */
        long     pdfid[32];
```

```
      long        num+id;
      long        pocmd;
      long        lox;

/*
      Open channel to Pointing Dispatcher

*/
poopen_ \aroc, argv, &ier);
1+ (ier != SUCCESSFUL)
{
      ohnooo_ (&ler, "tpxoatZ: failed to call poopen ");
      exit ();
}

\*
      write template information to Pointing Dispatcher
*/
pdfld [0] = PDTEXT:
pdfld [1] = POINT:
numfld    = 2;

pds32_ \pdfld. &numfld. &ier);
lf (ier !=SUCCESSFUL)
      {
      ohnooo_ \&ier,"tpxdata: failed to call porqst");
      exit \);
}

/*
      Close handle
*/
      poclos_ (&ier);
if (ier != SUCCESSFUL)
{
      ohnoo_ \&ier, "tpxdata: failed to call pdcios ");
      exit ();
}
ier = SUCCESSFUL;
ohnooo (&ier, "tpxdata: completed successfully ");
```

```
CA --- CHECKIN DATE: 07//88
CA --- MODULE NUMBER: 370511
CA
CA
CA NAME:      _PDS32
CA
CA
CA FUNCTION: Sends PDDATA information to the Pointing Dispatcher,
CA           for any template type which uses only the "standard"
CA           fields (pdcmd, pdrtn, pdkey, and the pdfld array,
CA           dimensioned to 32).
CA
CA
CA APPLICATION/SUBSYSTEM: Pointing Dispatcher (pd) EXTERNAL
CA
CA
CA AUTHOR:   Olivier Lhemann
CA
CA
CA LINKAGE: CALL PDS32 (PDFLD, NUMFLD, IER)
CA
CA
CA ARGUMENT
CA   NAME    USE   TYPE  DESCRIPTION
CA ------    ---   ----  ------------
CA PDFLD()    I      I   Array of pdfld values to be sent as data
CA                       (if the pd template type you are using has
CA                       data that extends past pdfld(32), or uses
CA                       other than integer data, you cannot use this
CA                       subroutine).  Max size of pdfld = 32 elements.
CA NUMFLD     I      I   Number of elements in pdfld, up to a max of 32,
CA                       to be sent.  These must be sequential (i.e.,
CA                       you cannot send elements 2, 3, 7, 12, and 15,
CA                       for example; if numfld = 5, then this routine
CA                       assumes you are sending elements 1 - 5).
CA IER        O      I   return code:
CA                       0 = successful completion.
CA
CA
CA
CA NOTES:
CA
CA This routine assumes that the pdcmd filed of the pd template
CA to be sent = PDDATA.  The subroutine filed (pdrtn) is left blank,
CA since it is meaningless with PDDATA.  The pdkey filed is also
CA meaningless with PDDATA (since the sender of data does not determine
CA what should match - the requestor is in control of that).  Thus,
CA only the 32 pdfld values are used, as passed in by the pdfld array
CA argument.
CA
CA The pointing dispatcher must already be running on your machine.
CA To do so, either:
CA     a) create another AIX shell thru the X window-manager, then
CA        execute pd
CA     b) from your existing shell, execute pd in background mode ( pd& ).
```

```
CA PD must have been opened for your task (pdopen)
CA
CA For in-depth information on how to communicate with the pointing
CA dispatcher, see Appendix B of the Reference Manual.
CA
CA
CA RESTRICTIONS: None
CA
CA
CA PORTABILITY:
CA
CA
CA METHOD:
CA
CA The elements of pdfld are copied one-by-one into the MI data structure.
CA
CA
CA REVISED:
CA
CA 1.  07//88 -- OL -- Original version.
CA
CA
CA---------------------------------------------------------------------------
CA   Copyright (C) 1988, LANDMARK GRAPHICS CORP.
CA   All rights reserved.
CA---------------------------------------------------------------------------
CA
*/

#include <lgc/lgcdef.h>
#include <lgc/midefs.h>
#include <lgc/pdclnt.h>

extern void misend ();

void pds32_ (pdfld, numfld, ier)

long pdrld (32):
long *numfld;
long *ier;

{
struct MI_DSC mibuf;
struct MI_LND larray [3];

long pdcmd = PDDATA;
long pdkey = 0;

/* check if numfld is valid */

if (*numfld < 1 !! *numfld > 32) {
   *ier = 237051101;
   ohnoo_(ier,"pds32: parameter numfld out of range");
   return;
}
```

```
    /* fill mibuf structure */

    midbuf.n_dbl = 0;
    midbuf.n_flt = 0;
    midbuf.n_shr = 0;
    midbuf.n_ptr = 0;
    midbuf.n_ptr = 0;
    midbuf.n_str = 0;
    midbuf.n_lng = 3;
    midbuf.lng_arr = larray;

    /* fill larray */

    larray [0].nelm = 1;
    larray [0].arr_ptr = &pdcmd; /* PDDATA */
    larray [1].nelm = 1;
    larray [1].arr_ptr = &pdkey;
    larray [2].nelm = *numfld;
    larray [2].arr_ptr = pdfld;

    /* We can now send the message */
    misend (&pdclnt.handle, &midbuf, ier);

    if (*ier != SUCCESSFUL) {
       ohnooo_(ier, "pds32: failed on call to misend");
       return;
    }
    *ier = SUCCESSFUL;
    ohnooo_(ier, "pds32: completed successfully");
    return;
}
```